United States Patent
Maeda et al.

(10) Patent No.: US 10,728,857 B2
(45) Date of Patent: Jul. 28, 2020

(54) MOBILE COMMUNICATIONS SYSTEM AND MOBILE TERMINAL

(75) Inventors: Miho Maeda, Tokyo (JP); Mitsuru Mochizuki, Tokyo (JP); Yasushi Iwane, Tokyo (JP); Tetsuya Mishuku, Tokyo (JP); Masaaki Kusano, Tokyo (JP); Ryoichi Fujie, Tokyo (JP); Shigenori Tani, Tokyo (JP); Keiko Tada, Tokyo (JP); Noriyuki Fukui, Tokyo (JP); Michiaki Takano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 13/420,306

(22) Filed: Mar. 14, 2012

(65) Prior Publication Data

US 2012/0170485 A1 Jul. 5, 2012

Related U.S. Application Data

(62) Division of application No. 12/223,807, filed as application No. PCT/JP2007/059230 on Apr. 27, 2007, now Pat. No. 8,149,749.

(30) Foreign Application Priority Data

Jun. 16, 2006 (WO) .................. PCT/JP2006/312145
Mar. 16, 2007 (WO) .................. PCT/JP2007/055423

(51) Int. Cl.
*H04W 52/08* (2009.01)
*H04W 76/28* (2018.01)
(Continued)

(52) U.S. Cl.
CPC ........ *H04W 52/028* (2013.01); *H04B 7/2643* (2013.01); *H04W 72/04* (2013.01);
(Continued)

(58) Field of Classification Search
CPC ........ H04L 47/10; H04L 43/50; H04W 80/04; H04W 88/06
(Continued)

(56) References Cited

U.S. PATENT DOCUMENTS 6,088,576 A 7/2000 Sone
6,311,061 B1 * 10/2001 Sakata .................. H04W 76/02
455/426.1

(Continued)

FOREIGN PATENT DOCUMENTS

CN 1674715 A 9/2005
EP 1 414 201 A1 4/2004
(Continued)

OTHER PUBLICATIONS

"3rd Generation Partnership Project; Technical Specification Group Radio Access Network; Requirements for Evolved UTRA (E-UTRA) and Evolved UTRAN (E-UTRAN), Release 7", 3GPP TR 25.913, V7.2.0. pp. 1-17, (2005).

(Continued)

*Primary Examiner* — Ronald B Abelson
(74) *Attorney, Agent, or Firm* — Oblon, McClelland, Maier & Neustadt, L.L.P.

(57) ABSTRACT

A mobile terminal 3 judges whether or not the mobile terminal is able to make a transition to a DTX period during Active, and, when judging that the mobile terminal is able to make a transition to a DTX period during Active, notifies a base station 2 to that effect. If the base station 2 judges that the mobile terminal is able to make a transition to a DRX period during Active when triggered by the notification from the mobile terminal 3, the base station temporarily stops supply of electric power to the data transmission processing units and the data reception processing units of the mobile terminal 3.

9 Claims, 54 Drawing Sheets

(51) Int. Cl.
*H04W 72/04* (2009.01)
*H04B 7/26* (2006.01)
*H04W 52/02* (2009.01)

(52) U.S. Cl.
CPC ........ *H04W 76/28* (2018.02); *H04W 52/0229* (2013.01); *Y02D 70/1226* (2018.01); *Y02D 70/1262* (2018.01); *Y02D 70/24* (2018.01); *Y02D 70/25* (2018.01); *Y02D 70/449* (2018.01)

(58) Field of Classification Search
USPC .................................................. 370/252, 328
See application file for complete search history.

(56) References Cited

U.S. PATENT DOCUMENTS

| | | | |
|---|---|---|---|
| 8,149,749 | B2 | 4/2012 | Maeda et al. |
| 2003/0046417 | A1* | 3/2003 | Ellis .............................. 709/232 |
| 2003/0087605 | A1 | 5/2003 | Das et al. |
| 2003/0224731 | A1* | 12/2003 | Yamaura ............... H04L 5/0048 455/63.3 |
| 2004/0067757 | A1* | 4/2004 | Fukui ............................ 455/453 |
| 2004/0097268 | A1 | 5/2004 | Kurokawa et al. |
| 2004/0125766 | A1 | 7/2004 | Takano et al. |
| 2004/0162098 | A1 | 8/2004 | Wei et al. |
| 2004/0165574 | A1 | 8/2004 | Kakumaru et al. |
| 2005/0085279 | A1 | 4/2005 | Aoki |
| 2005/0148348 | A1 | 7/2005 | Cramby et al. |
| 2005/0190712 | A1 | 9/2005 | Lee et al. |
| 2005/0250531 | A1 | 11/2005 | Takebe et al. |
| 2006/0034245 | A1 | 2/2006 | Nguyen |
| 2006/0111119 | A1* | 5/2006 | Iochi ............................. 455/450 |
| 2006/0240799 | A1 | 10/2006 | Kim et al. |
| 2007/0066329 | A1 | 3/2007 | Laroia et al. |
| 2008/0102846 | A1* | 5/2008 | Kim et al. .................... 455/450 |
| 2008/0175181 | A1 | 7/2008 | Kakumaru et al. |
| 2008/0176592 | A1 | 7/2008 | Kakumaru et al. |
| 2008/0207245 | A1 | 8/2008 | Wakabayashi et al. |
| 2009/0109917 | A1* | 4/2009 | Pajukoski et al. ............ 370/329 |
| 2010/0178895 | A1 | 7/2010 | Maeda et al. |
| 2011/0216732 | A1 | 9/2011 | Maeda et al. |
| 2011/0261777 | A1 | 10/2011 | Maeda et al. |
| 2011/0280223 | A1 | 11/2011 | Maeda et al. |
| 2012/0044870 | A1 | 2/2012 | Mochizuki et al. |
| 2012/0087314 | A1 | 4/2012 | Maeda et al. |

FOREIGN PATENT DOCUMENTS

| | | |
|---|---|---|
| JP | 2003-87180 | 3/2003 |
| JP | 2003-204298 | 7/2003 |
| JP | 2004-147049 | 5/2004 |
| JP | 2004-172772 | 6/2004 |
| JP | 2004-289234 | 10/2004 |
| JP | 2004-304411 | 10/2004 |
| JP | 2004-328498 | 11/2004 |
| JP | 2006-60809 | 3/2006 |
| KR | 10-2005-0073242 | 7/2005 |
| WO | WO 2004/047474 A1 | 6/2004 |
| WO | WO 2004/091231 A1 | 10/2004 |
| WO | WO 2005/062855 A2 | 7/2005 |
| WO | 2005-078962 | 8/2005 |
| WO | WO 2006/019243 A1 | 2/2006 |
| WO | WO 2007/052917 A1 | 5/2007 |

OTHER PUBLICATIONS

3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Radio interface protocol aspects, Release 7, 3GPP TR 25.813, V0.9.0, pp. 1-39, (2006).
"DRX and DTX Operation in LTE_Active", 3GPP TSG-RAN WG2 Meeting #52, Panasonic, R2-060888, (2006).
"MAC procedures for DRX and DTX in LTE_Active", TSG-RAN WGx Meeting #51, Ericsson, R2-060591, pp. 1-4, (2006).
"Power saving feature for LTE_Active state", 3GPP TSG RAN WG2 #52, ETRI, Tdoc R2-060846, pp. 1-3, (2006).
Views on DRX/DTX control in LTE, 3GPP TSG RAN WG2 #56BIS, NTT DOCOMO, Inc., R2-070279, (2007).
3GPP TR 25.814, V7.0.0, Release 7, pp. 71-73, (2006).
"DRX Scheme", 3GPP TSG-RAN WG2 #56BIS, LG Electronics, R2-070265, pp. 1-4, (2007).
"6, Evolved UTRA and UTRAN", 3GPP TSG RAN WG1 Meeting #48, R1-071245, pp. 14 and 20, (2006).
"Pilot Pattern for Mixed Carrier MBSFN Tarnsmission", 3GPP TSG-RAN WG1#48, Nortel, R1-070701, pp. 1-6, (2007).
"DL Scheduling", 3GPP TSG RAN WG2#57, Freescale Semiconductor, Huawei, IP Wireless, Infineon, Interdigital, LG Electronics, Motorola, Nortel, Sharp, ZTE., R2-070968, (2007).
3$^{rd}$ Generation Partnership Project; Technical Specification Group Radio Access Network; FDD Enhanced Uplink; overall description; Stage 2, Release 6, 3GPP TS 25.309, V6.6.0. pp. 1-34, (2006).
U.S. Appl. No. 11/997,752, filed Feb. 4, 2008, 2008-0207245, Wakabayashi, et al.
U.S. Appl. No. 12/602,781, filed Dec. 3, 2009, 2010-0178895, Maeda, et al.
U.S. Appl. No. 13/127,632, filed May 4, 2011, 2011-0216732, Maeda, et al.
U.S. Appl. No. 13/141,858, filed Jun. 23, 2011, 2011-0261777, Maeda, et al.
U.S. Appl. No. 13/144,972, filed Jul. 18, 2011, 2011-0280223, Maeda, et al.
U.S. Appl. No. 13/264,767, filed Oct. 17, 2011, 2012-0044870, Mochizuki, et al.
U.S. Appl. No. 13/378,380, filed Dec. 15, 2011, 2012-0087314, Maeda, et al.
U.S. Appl. No. 13/420,306, filed Mar. 14, 2012, Maeda, et al.
U.S. Appl. No. 13/499,026, filed Mar. 29, 2012, Maeda, et al.
U.S. Appl. No. 13/499,737, filed Apr. 2, 2012, Mochizuki, et al.
U.S. Appl. No. 13/504,672, filed Apr. 27, 2012, Maeda, et al.
Extended European Search Report dated Jul. 30, 2012, in European Patent Application No. 07742665.8.
Office Action dated Dec. 25, 2017 in Chinese Patent Application No. 201510577625.9, 6 pages, (with English-language Translation; The reference cited therein was previously cited on Mar. 14, 2012.).
U.S. Appl. No. 13/420,306, filed Mar. 14, 2012, 2012-0170485, Maeda, et al.
U.S. Appl. No. 14/707,505, filed May 8, 2015, Maeda, et al.
Office Action dated Feb. 2, 2019 in Chinese Patent Application No. 201510577683.1, with English-language translation, 17 pages. (The references cited therein were previously cited and/or filed.).
Office Action dated Aug. 28, 2017 in European Patent Application No. 16 188 140.4.
Office Action dated Oct. 29, 2018 in Indian Patent Application No. 4046/CHENP/2014, with English-language translation, 5 pages.
Japanese Office Action (with a partial English translation) dated Jan. 28, 2014, in corresponding Japanese Patent Application No. 2013-117931.
Korean Office Action dated Feb. 7, 2014, in corresponding Korean Patent Application No. 10-2012-7010193, with an English translation.
Combined Chinese Office Action and Search Report dated Jan. 15, 2020, in Patent Application No. 201510577625.9, 15 pages (with unedited computer generated English translation).
"Further details of DRX proposal", 3GPP TSG-RAN WG1 #44, Panasonic, R1-060452, 2006, 9 pages.
"Draft LS on DRX interval and CQI reporting cycle in LTE, 3GPP TSG-RAN2 Meeting #56bis", NEC Corporation, R2-070366, 2007, 2 pages.
Extended European Search Report dated Feb. 14, 2020, in Patent Application No. 19217587.5, 7 pages.
Office Action dated Sep. 18, 2018 in Chinese Patent Application No. 201510577682.7, with English-language translation, 10 pages.
Draft LS on DRX interval and CQI reporting cycle in LTE, 3GPP TSG-RAN2 Meeting #56bis, R2-070366, NEC Corporation, Jan. 19, 2007, 2 pages.

(56) References Cited

OTHER PUBLICATIONS

Further details of DRX proposal, 3GPP TSG-RAN WG1 #44. R1-060452, QUALCOMM Europe, Feb. 17, 2006, 9 pages.
Office Action dated Sep. 2, 2019, in Chinese Patent Application No. 201510577683.1, with English-language translation, 9 pages. (The references cited therein were previously filed.).
Office Action dated Feb. 27, 2019 in Chinese Patent Application No. 201510577625.9, with English-language translation, 7 pages. (The references cited therein were previously filed.).
Office Action dated Jan. 2, 2018 in Chinese Patent Application No. 201510577682.7, with English-language Translation, 6 pages.
Signalling in support of DTX/DRX, 3GPP TSG-RAN WG1 #45, R1-061498, May 8-12, 2006, 11 pages.
U.S. Appl. No. 13/420,306, filed Mar. 13, 2012, 2012-0170485, Maeda, et al.
U.S. Appl. No. 14/531,516, filed Nov. 3, 2014, Maeda, et al.
U.S. Appl. No. 14/534,958, filed Nov. 6, 2014, Mochizuki, et al.
Office Action dated May 20, 2014 in Japanese Patent Application No. 2013-117931 (with partial English language translation).
Combined Chinese Office Action and Search Report dated Jun. 30, 2014 in Patent Application No. 201210065257.6 (with partial English language translation and English translation of categories of cited documents).

Office Action dated Mar. 13, 2018 in Chinese Patent Application No. 201510577683.1, with English-language Translation, 22 pages.
Location of DRX/DTX control functionality, NEC, 3GPP TSG-RAN Working Group 2 #53, R2-061347, May 8-12, 2006, 3 pages.
Office Action dated Nov. 16, 2018 in European Patent Application No. 16 188 140.4, 4 pages.
Office Action dated Oct. 31, 2018 in Chinese Patent Application No. 201510577683.1, with English-language translation, 14 pages. (The references cited therein were previously filed.).
Office Action dated Nov. 14, 2018 in Chinese Patent Application No. 201510577625.9, with English-language translation, 5 pages.
TP for Signalling in support of DTX/DRX, 3GPP TSG-RAN WG1 #45, R1-061499, May 8-May 12, 2006, 13 pages.
Office Action dated Aug. 16, 2016 in Japanese Patent Application No. 2015-198433 (with Partial English-language Translation).
Office Action dated May 26, 2015 in Japanese Patent Application No. 2014-155000 (with partial English translation).
"DRX and DTX in LTE_Active", Ericsson, TSG-RAN WG2 Meeting #52, R2-060967, Mar. 27-31, 2006, pp. 1-5.
Chinese Office Action dated Apr. 13, 2020 in Chinese Patent Application No. 2015105776259 with machine translation.
3GPP TSG-RAN WG1 #45 RI-061499, TP for Signalling in support of DTX/DRX; Shanghai, China; May 8, 2006-May 12, 2006.
3GPP TSG-RAN WG1 #45 RI-061498, Signalling in support of DTX/DRX; Shanghai, China; May 8, 2006-May 12, 2006.

* cited by examiner

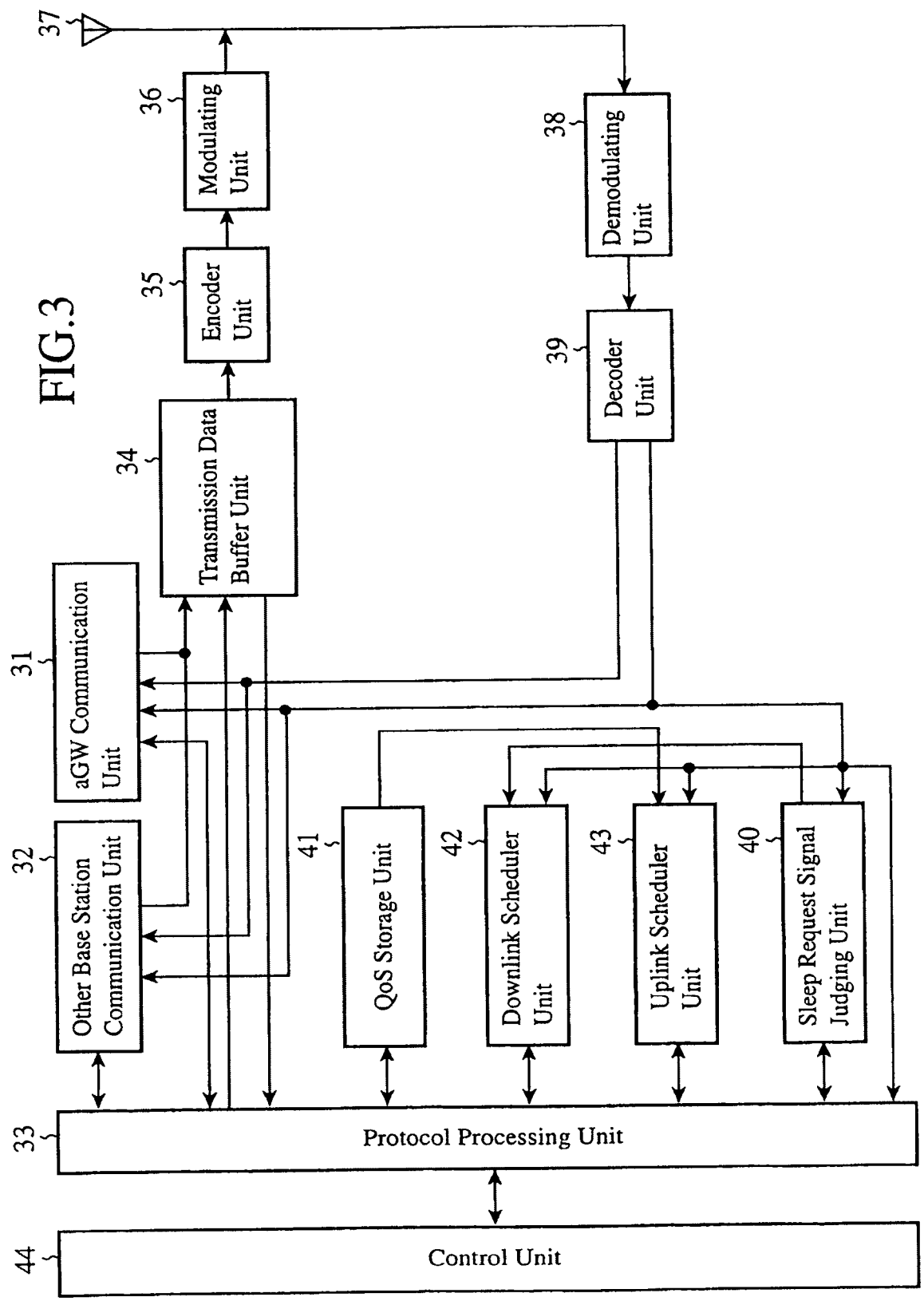

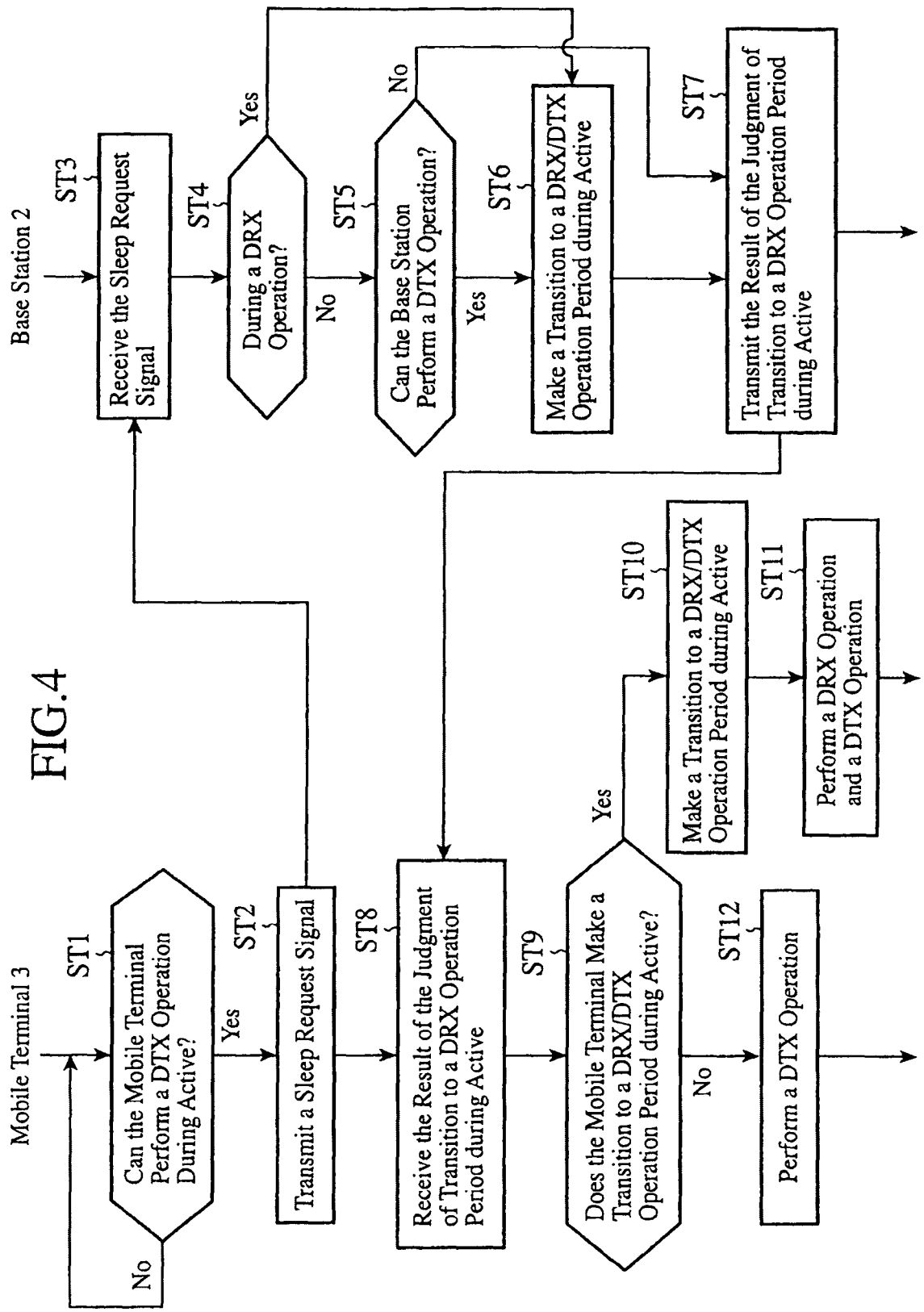

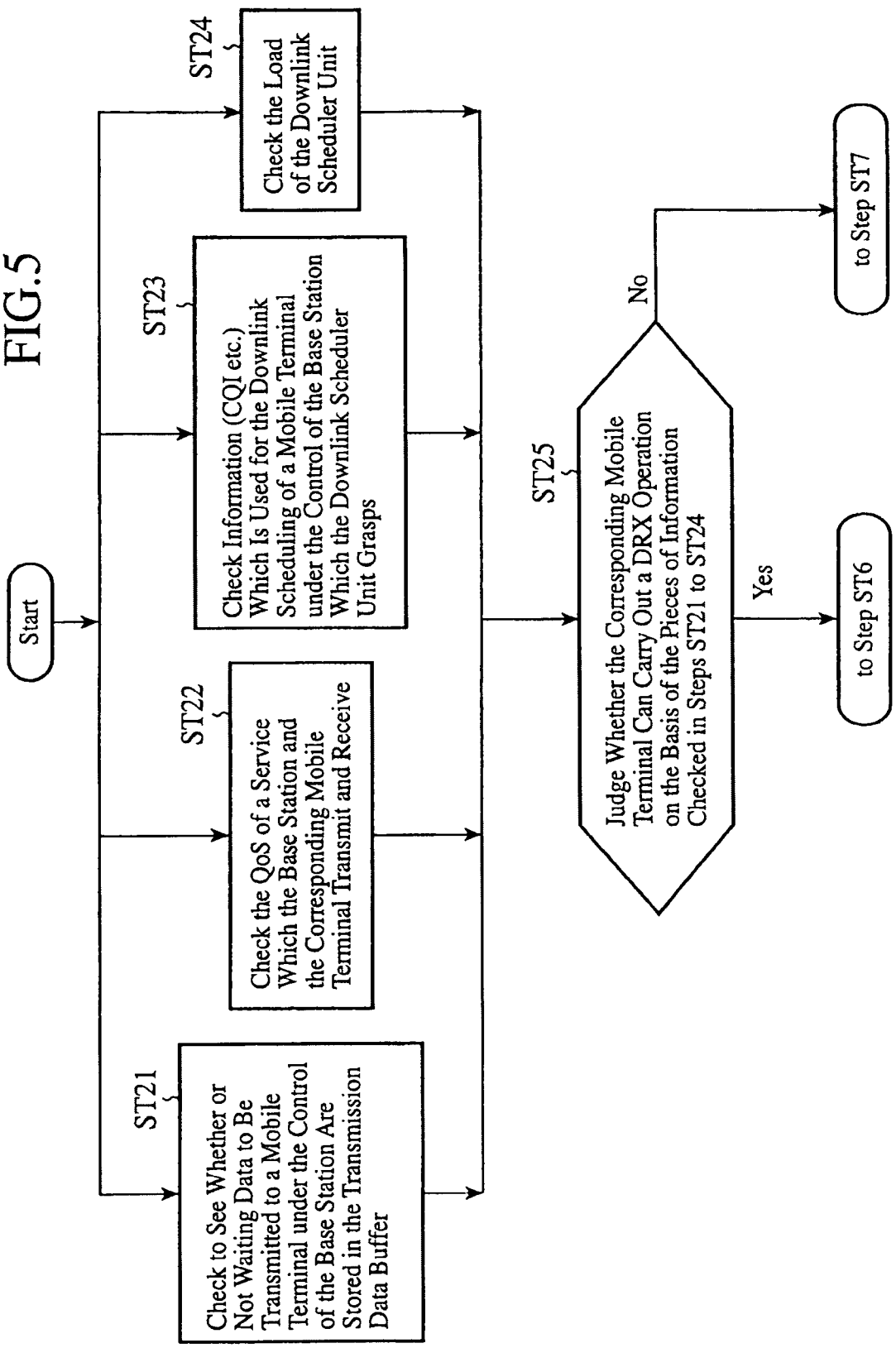

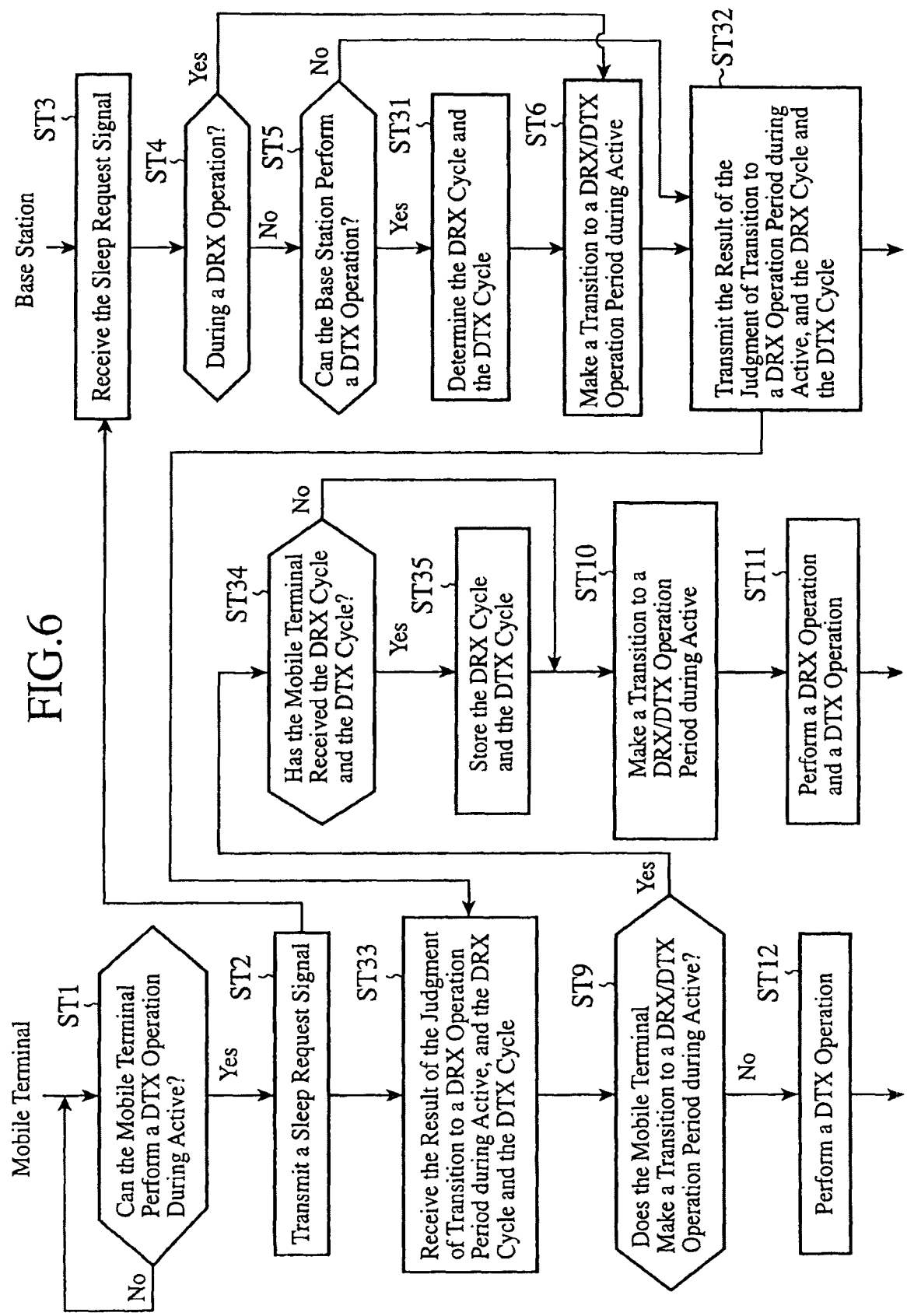

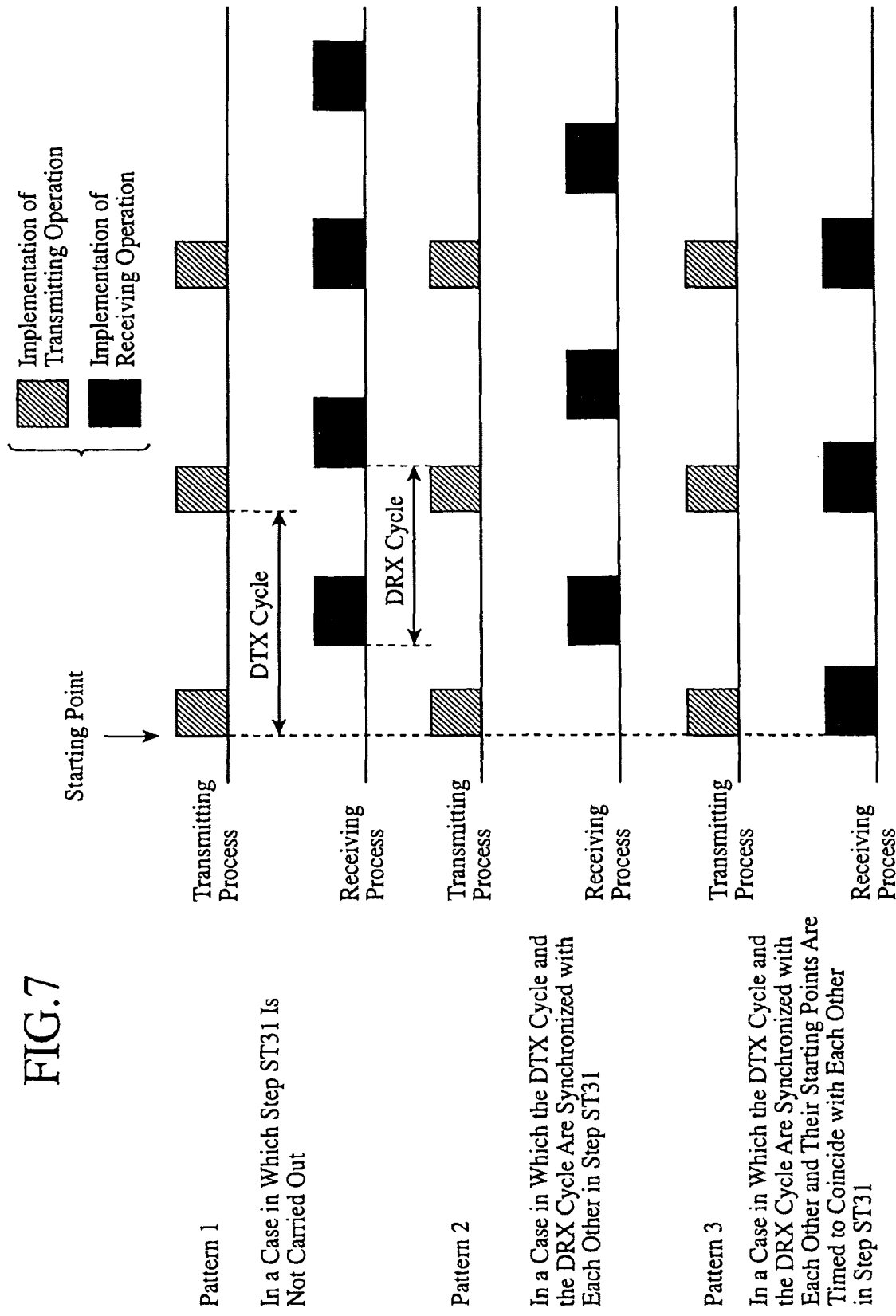

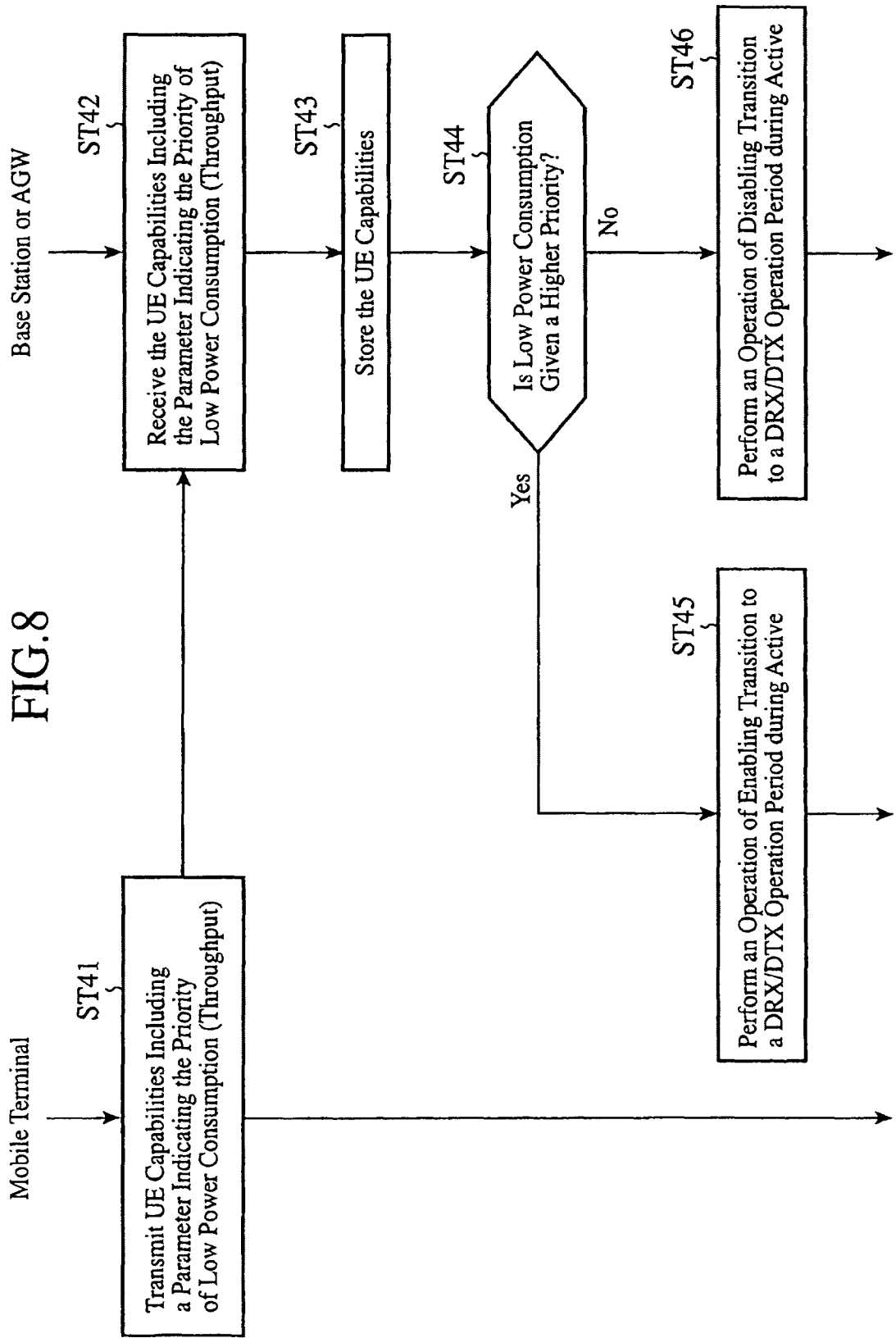

FIG.9

| Bit 1<br><br>Sleep Request Signal | Bit 2 |
|---|---|
| 0 (without Request) | Mapping of a Happy Bit |
| 1 (with Request) | Mapping of the Priority of Low Power Consumption |

FIG.12

| Indicator | Percentage of the Battery Residue to the Capacity of the Battery |
|---|---|
| 11 | Equal to or Greater Than 75% to 100% or During Charged |
| 10 | Equal to or Greater Than 50% to Less Than 75% |
| 01 | Equal to or Greater Than 25% to Less Than 50% |
| 00 | Equal to or Greater Than 0% to Less Than 25% |

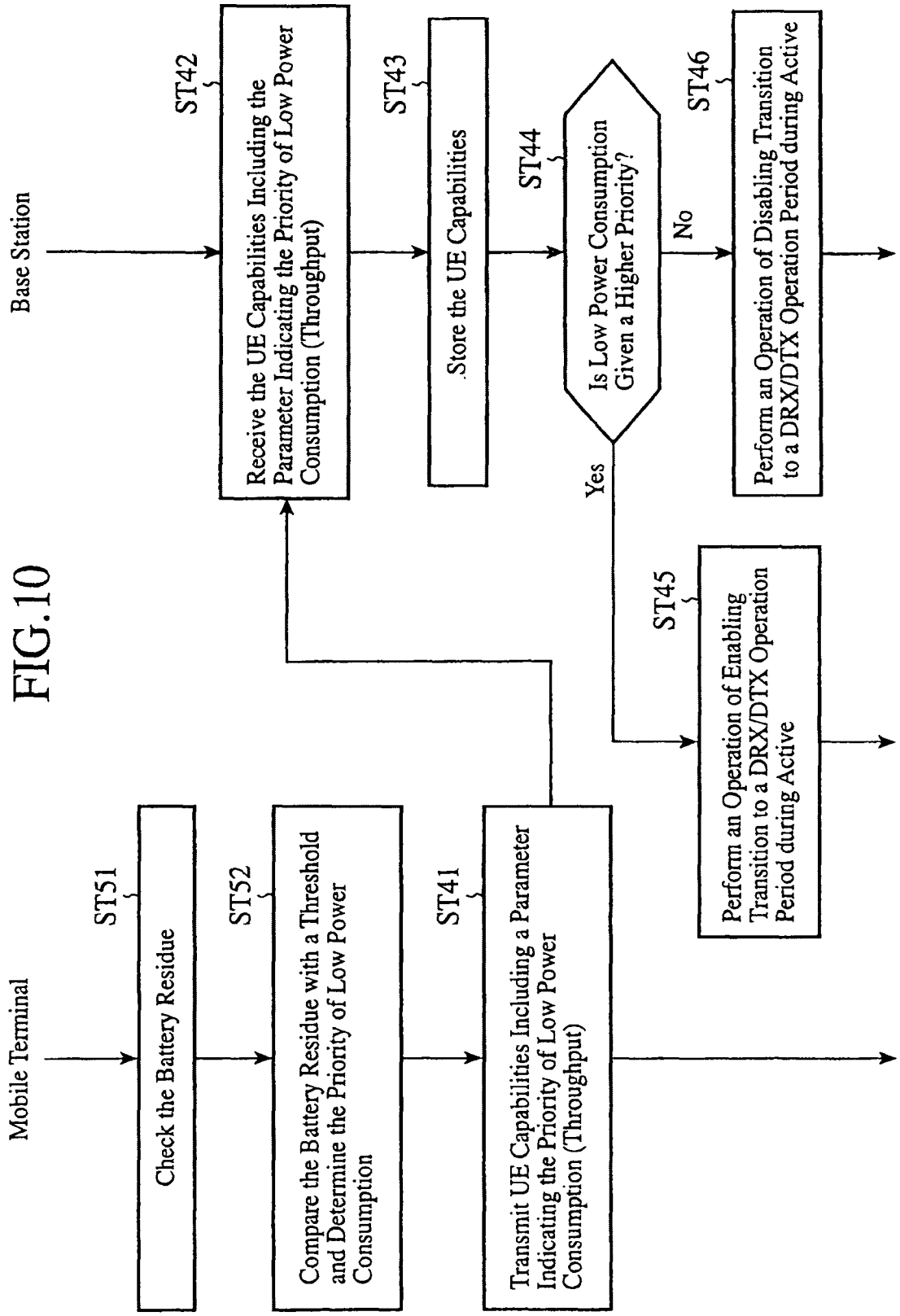

FIG.15
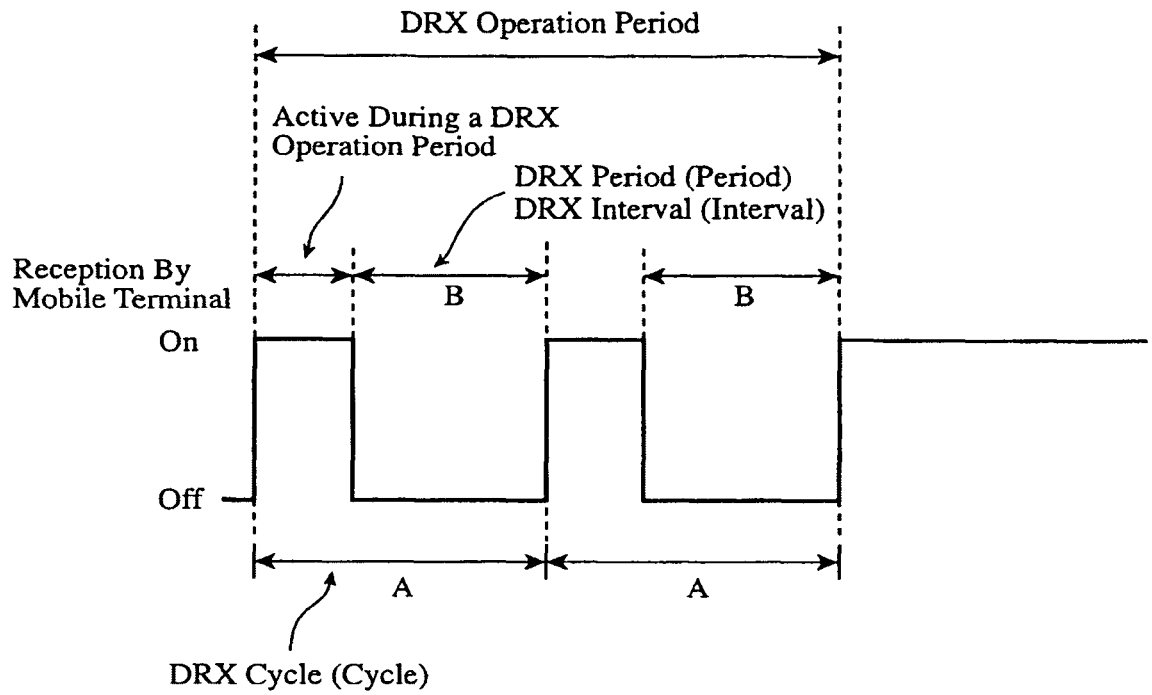
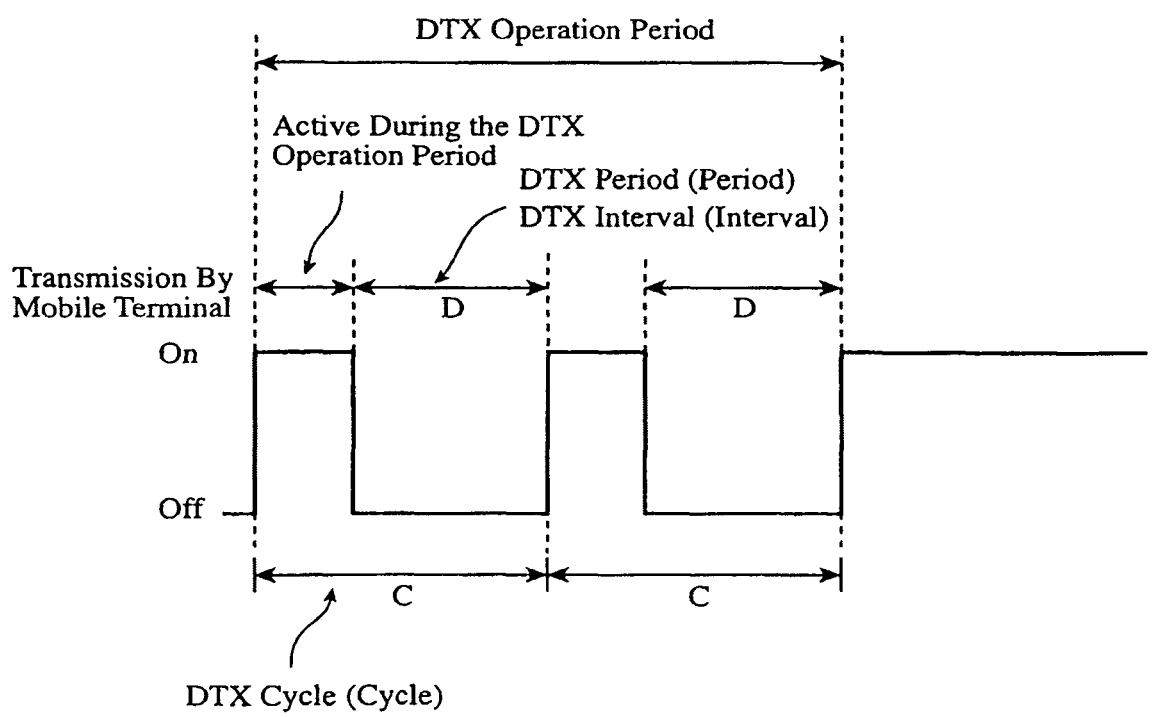

FIG.26
(A) In a Case in Which Downlink Data Are Completed Previously
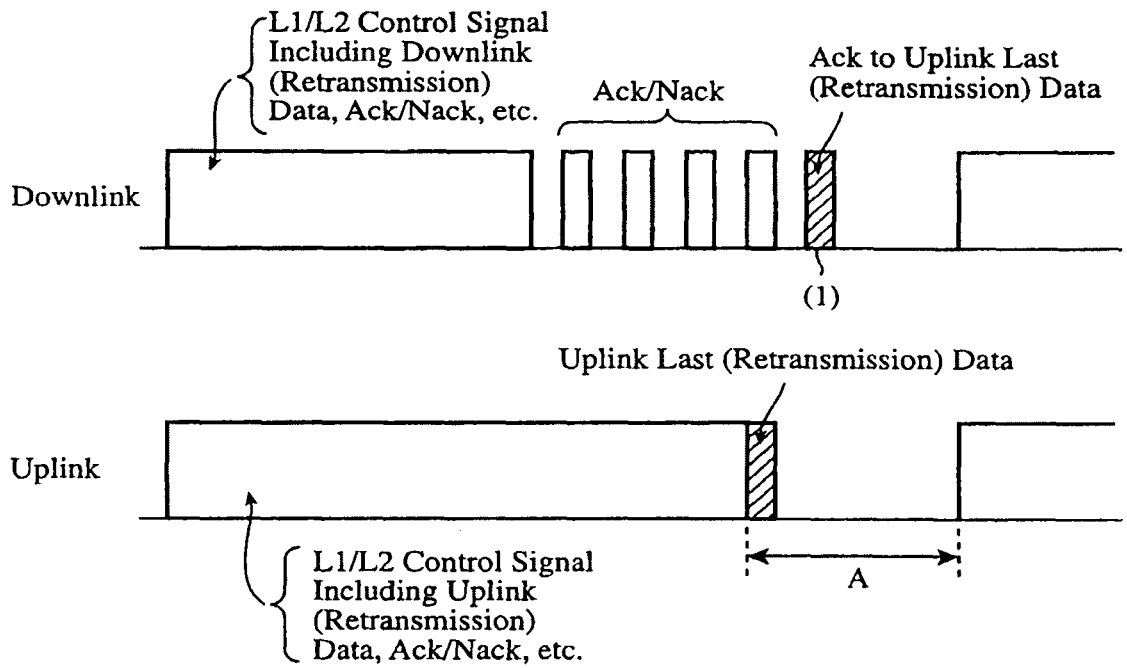
(B) In a Case in Which Uplink Data Are Completed Previously
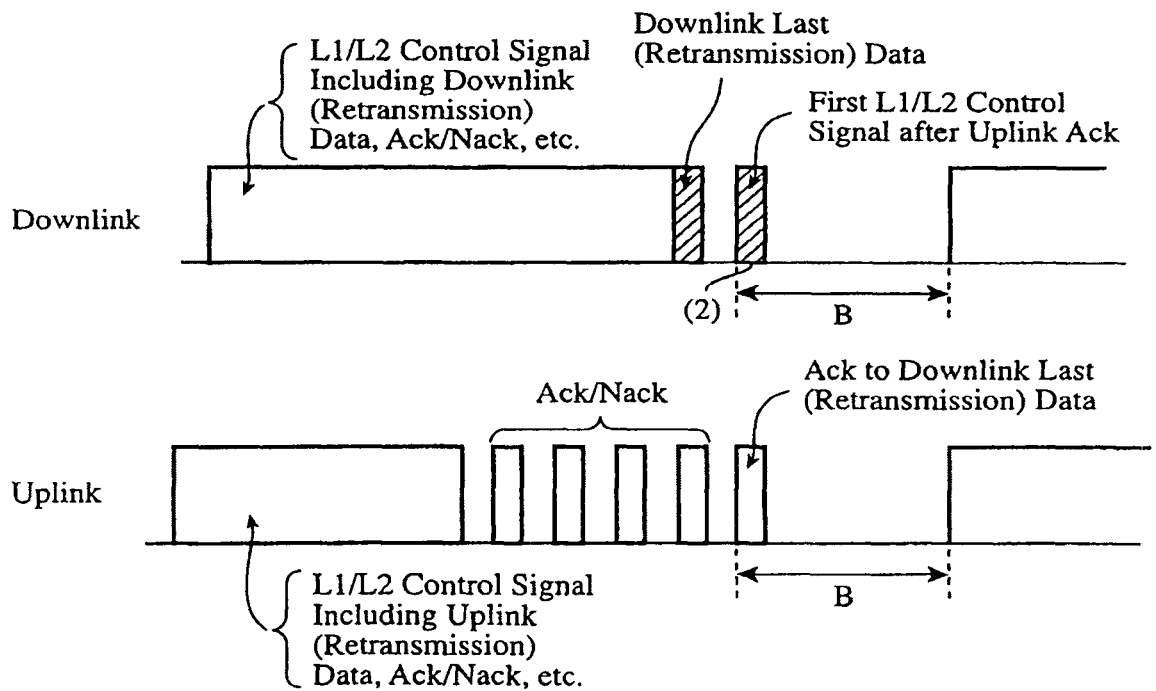

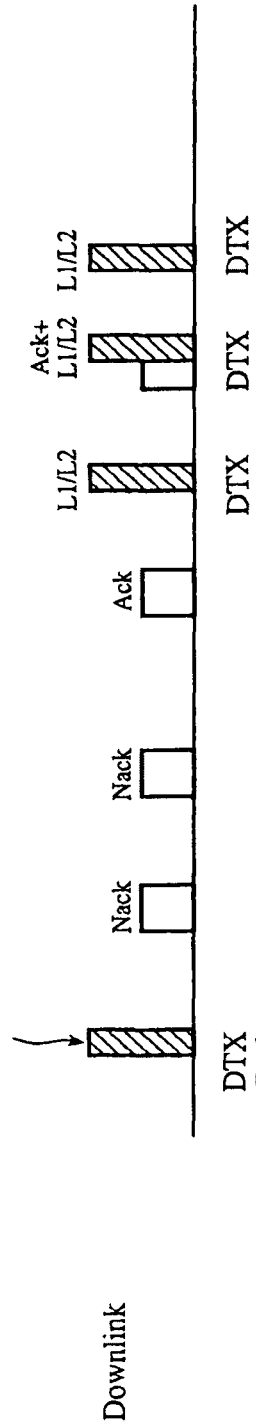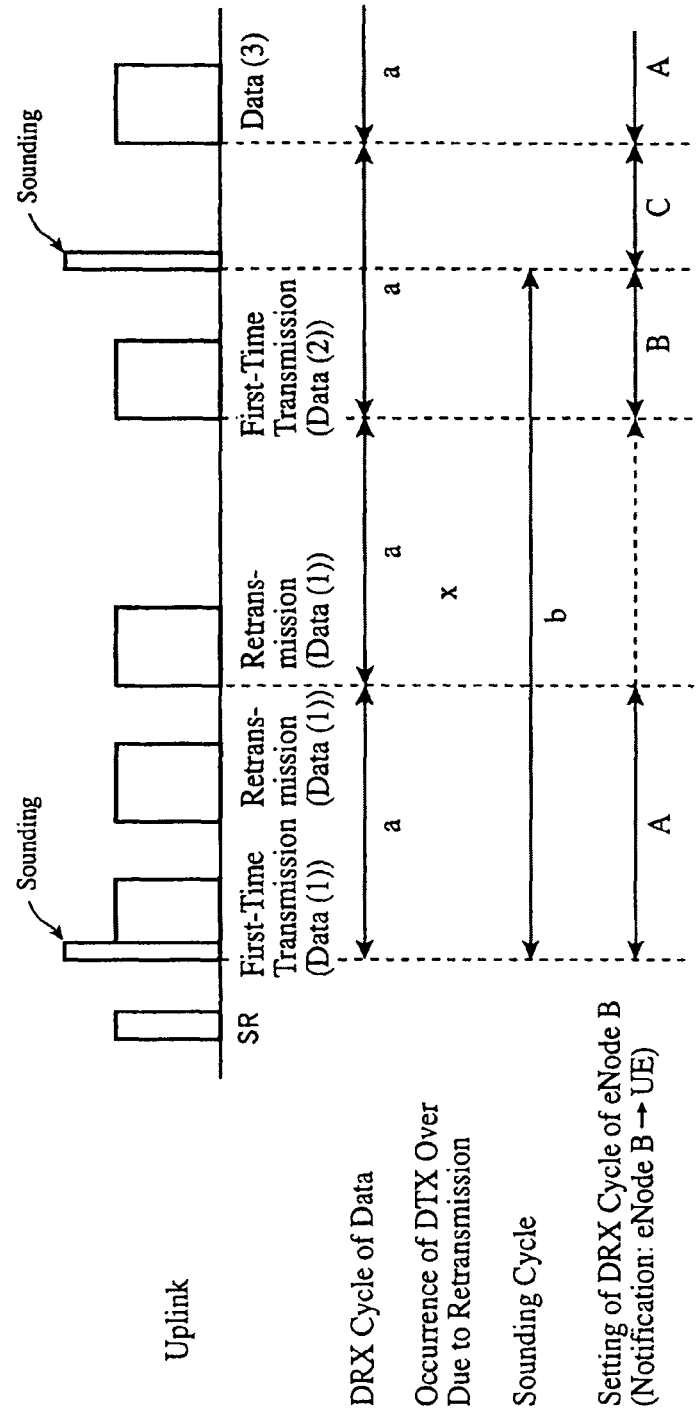
FIG.32

FIG.46

Example 1

| QoS | Initial DRX Cycle [TTI] |
|---|---|
| High | 320 |
| Middle | 2560 |
| Low | 5120 |

Example 2

| QoS | Maximum DRX Cycle [TTI] |
|---|---|
| High | 320 |
| Middle | 2560 |
| Low | 5120 |

MOBILE COMMUNICATIONS SYSTEM AND MOBILE TERMINAL

CROSS REFERENCE TO RELATED APPLICATIONS

This application is a divisional of U.S. application Ser. No. 12/223,807 filed Aug. 11, 2008, the contents of which is incorporated herein in its entirety by reference. U.S. application Ser. No. 12/223,807 is the National Stage of International Application No. PCT/JP07/59230, filed Apr. 27, 2007, which claims priority to International Applications PCT/JP2006/312145, filed Jun. 16, 2006 and PCT/JP2007/055423, filed Mar. 16, 2007.

FIELD OF THE INVENTION

The present invention relates to a mobile communications system in which a base station carries out radio communications with a plurality of mobile terminals by controlling the transmission rates, the transmission powers (the permitted transmission powers and maximum permitted transmission powers), the transmission timings, the available frequencies, and so on of the plurality of mobile terminals, by using a scheduler, and a mobile terminal which constructs the system.

BACKGROUND OF THE INVENTION

In recent years, the mainstream of a data communication method which a mobile communications system uses has been changing from a circuit switching method to a packet communication method.

While, in general, the packet communication method is based on a continuous connection, there is a limit to the available capacity of a battery which a mobile terminal in a mobile communications system can carry.

Therefore, in a case in which the mobile communications system employs a packet communication method (a continuous connection), it is necessary to achieve low power consumption in a mobile terminal.

As a standardization organization of mobile communications systems, the 3GPP (3rd Generation Partnership Project) exists.

Currently, in the 3GPP, a UTRAN system (Release7) and an Evolved RAN system (E-UTRAN, LTE: Long Term Evolution) which are mobile communications systems of the next version have been under debate, and reduction in the power consumption in the packet communication method has also been under debate on the spot.

It has been determined in the debate that because, in a mobile terminal using the packet communication method, a case in which there exist no transmission data and no received data can occur even if a wireless section is being connected, a newly provision of a state of supporting low power consumption in a mobile terminal and an operation of supporting low power consumption in a mobile terminal has been determined.

For an LTE system, a state 1 "Idle" in which a mobile terminal is during inactivity at an RRC level, and a state 2 "Active (in a broad sense)" in which a mobile terminal is during active are defined. Nonpatent reference 1 shown hereafter discloses introduction of a new state 2-A "Active (in a narrow sense)" and a state 2-B "DRX/DTX operation period during Active" into during "Active (in a broad sense)", as shown in FIG. 13.

Furthermore, nonpatent reference 2 shown hereafter describes that it is possible to dispose a DRX/DTX period (DRX/DTX period) in RRC_Connected (corresponding to the state 2 of FIG. 13) in order to achieve low power consumption in a mobile terminal.

The state 1 of FIG. 13 is called "Idle", "LTE_Idle", "RRC_Idle", "NAS_Idle", or the like, and a mobile terminal placed in the state 1 of FIG. 13 performs a receiving operation in a DRX cycle which is set up by NAS (Non-Access Stratum) (i.e., in a cycle different from the DRX cycle of a DRX/DTX operation period during Active (the state 2-B of FIG. 13)). More specifically, the mobile terminal performs a Paging operation.

The state 2 of FIG. 13 is called "Active", "LTE_Active", "RRC_Active", "RRC_Connected", "Connected", "NAS Active", or the like.

The state 2-A of FIG. 13 is called "Active", "MAC_Active", or the like.

The state 2-B of FIG. 13 is called "Dormant", "MAC_Dormant", "DRX/DTX period (DRX/DTX period)", "DRX/DTX period during Active", "DRX/DTX period during Connected", or the like, and, in this state, an operation for achieving low power consumption in a mobile terminal during Active is carried out (for example, a stop of transmission or reception of data (user data and control data) is performed temporarily).

Nonpatent reference 3 shown hereafter discloses a technology of, during a DRX/DTX operation period during Active (the state 2-B of FIG. 13), carrying out a process of signaling both a period during which a DRX operation is performed and a period during which a DTX operation is performed by using MAC (Medium Access Control) by a base station.

Patent references 1 shown hereafter discloses a technology of switching a cycle in which a mobile terminal transmits a CQI (Channel Quality Indicator) to a base station between a high-speed one and a low-speed one according to whether or not transmission of downlink data has been performed, though the cycle differs from the DTX cycle in a DRX/DTX operation period during Active (the state 2-B of FIG. 13). Thereby, effective use of the uplink radio resources is achieved.

Nonpatent reference 4 shown hereafter discloses a technology of making a mobile terminal check to see whether there exist data destined for the mobile terminal itself in a DRX cycle during Active (the state 2 of FIG. 13) by using a downlink scheduling channel.

Nonpatent reference 6 shown hereafter describes a notification method of notifying a DRX period.

The notification method of notifying a DRX period will be explained with reference to FIG. 14.

Information indicating a DRX period is included in control data (e.g., an L1/L2 control signal) which associates first-time transmission data (user data) from a base station.

When the mobile terminal fails in reception of the first-time transmission data transmitted from the base station, the mobile terminal transmits a HARQ-compliant Nack signal (negative response signal) to the base station.

When receiving the Nack signal transmitted from the mobile terminal, the base station retransmits the same data as the first-time transmission data to the mobile terminal. The information indicating a DRX period is not included in the control data which associates this retransmission.

When succeeding in the reception of the retransmission data transmitted from the base station, the mobile terminal starts a timer A while transmitting a HARQ-compliant Ack signal (ACK signal) to the base station.

When receiving the Ack signal transmitted from the mobile terminal, the base station starts a timer A.

After the timers A are expired, the mobile terminal and the base station start their DRX operations.

Nonpatent reference 8 shown hereafter discloses a DRX operation in a case in which two DRX cycles are set up.

Nonpatent reference 5 shown hereafter discloses a technology of judging whether to carry out an operation with low power consumption according to mobile terminal capability information (UE Capabilities) showing the capabilities of a mobile terminal, though the purpose of the technology differs from those disclosed in the above-mentioned nonpatent references 1 to 4 and the patent reference 1.

Control signals which are used to enable communications between a mobile terminal and a base station via a radio link include an upper layer signal, such as an "L3 control signal" (a Layer3 control signaling or an L3 message), and a signal which is called an "L1/L2 control signal" (a Layer1/Layer2 control signaling).

An L3 control signal is typically notified from an upper layer, such as an RRC layer, at a time of initial transmission including a time of occurrence of a call connection (RRC Connect), and is used to perform a setup of uplink or downlink channels via the downlink or allocation of radio resources via the downlink.

In contrast, an L1/L2 control signal is frequently exchanged between a mobile terminal and a base station via both the uplink and the downlink, and includes an uplink scheduling request signal which a mobile terminal outputs to make a request of a base station for allocation of the radio resources via the uplink. Also at a time when the radio resources are irregularly changed in response to a request to change the data size or a request for the quality of the communication path, the time including a time of occurrence of a call connection and a time of continuation, an L1/L2 control signal is used.

An L1/L2 control signal includes an Ack signal/Nack signal which either a base station or a mobile terminal sends back to the party on the other end of the connection when receiving data via uplink or downlink to answer whether either the base station or the mobile terminal has received the data correctly, and a quality information CQI (Channel Quality Indicator) showing the quality of the received data or the quality of the communication path.

Nonpatent reference 7 shown hereafter shows that, in an uplink reference signal (Reference Signal), two types of signals including a reference signal used for demodulation (Demoduration) and synchronous detection (Detection), and a reference signal (Sounding Reference Signal) used for measurement of the quality of an uplink channel exist. The Sounding Reference Signal (Sounding RS) is transmitted from a mobile terminal (UE) to a base station (eNB) in order for the base station to measure the communication quality of the uplink.

The following nonpatent reference 9 discloses that only time division multiplexing (Time Division Multiplexing: TDM) is used as a method of transmitting data for a E-MBMS (Evolved Multimedia Broadcast Multicast Service) and services other than the E-MBMS (non-MBMS and non-EMBMS). Units in which the time division is carried out is set to be subframes (Subframes).

The E-MBMS is a multicast and broadcast type multimedia service.

In this service, a large-volume broadcast content, such as a news content, a weather forecast content, or a mobile broadcast content, is transmitted to a plurality of mobile terminals.

A base station maps E-MBMS data onto either a DL-SCH (Downlink Shared Channel) or an MCH (Multicast Channel), and then transmits the E-MBMS data to mobile terminals.

Furthermore, LTE not only provides a broadcast type communication service (except the E-MBMS (non-MBMS)), but also provides a communication service to an individual mobile terminal among a plurality of mobile terminals. A communication service provided to an individual mobile terminal is called a Unicast service.

Nonpatent reference 10 shown hereafter discloses that either only one leading symbol or only two leading symbols included in a subframe which is allocated to the E-MBMS through time division multiplexing is used by a Unicast service.

However, the nonpatent references 1 to 3 and the patent reference 1 do not disclose any concrete method of effectively achieving low power consumption in a mobile terminal in a DRX/DTX operation period during Active (a state 2-B as shown in FIG. 13).

More specifically, the nonpatent references 1 and 2 disclose newly establishment of a state (the state 2-B shown in FIG. 13) for supporting low power consumption in a mobile terminal, but does not disclose any method of efficiently achieving low power consumption in a mobile terminal in a DRX/DTX operation period during Active (the state 2-B shown in FIG. 13) which is newly established.

Furthermore, the nonpatent reference 3 discloses the technology of signaling information indicating a period during which a DRX operation is performed and a period during which a DTX operation is performed in a DRX/DTX operation period during Active (the state 2-B shown in FIG. 13) by using the MAC of a base station, as mentioned above, but does not disclose any method of setting up DRX/DTX cycles in order to efficiently achieve low power consumption in a mobile terminal.

In addition, the notification method of notifying a DRX period disclosed by the nonpatent reference 6 differs from a notification method of notifying a DRX period which will be disclosed by the present invention.

Furthermore, a problem with the method disclosed by the nonpatent reference 6 is that a base station has to carry out scheduling in order to determine a timing (i.e., a DRX period end timing) at which the base station starts a DRX operation every time when the base station receives a Nack signal from a mobile terminal ("a time (i)", "a time (ii)", and "a time (iii)" shown in FIG. 14), and therefore the load of the scheduling becomes heavy. Thus, the nonpatent reference 6 is not aimed at notifying the information indicating a DRX period while reducing the scheduling load of the base station, and does not offer any suggestion about this purpose.

In a DRX operation in the case in which two DRX cycles are set up, which is disclosed by the nonpatent reference 8, any application of HARQ is not taken into consideration at all.

Therefore, a problem with the method of notifying the DRX cycle information by using an L1/L2 control signal together with the first-time transmission data, notifying the DRX cycle information at a time of a setup of a radio bearer, or determining the DRX cycle information in advance, in a conventional way is that when retransmission based on HARQ exceeds this DRX cycle, it becomes impossible to make a transition to a DRX operation.

The nonpatent reference 9 and 10 describe nothing about a DRX operation (a DRX operation during Active).

Furthermore, these references also disclose nothing about what kind of information is notified using a symbol available for a Unicast service in a subframe allocated to the E-MBMS.

The patent reference 1 discloses the technology of switching a cycle in which a mobile terminal transmits a CQI to a base station between a high-speed one and a low-speed one according to whether or not transmission of downlink data has been performed, but discloses nothing about a signaling between the mobile terminal and the base station for the switching of the cycle between a high-speed one and a low-speed one. The technology disclosed by the patent reference 1 is the one in which no operation with low power consumption is introduced into the operation of a mobile terminal during Active (the state 2 as shown in FIG. 13).

Next, the nonpatent reference 4 discloses the technology of making a mobile terminal check to see whether there exist data destined for the mobile terminal itself in a DRX cycle during Active (the state 2 as shown in FIG. 13) by using a downlink scheduling channel, as mentioned above. In other words, in a mobile terminal during a DRX/DTX operation period during Active (the state 2-B as shown in FIG. 13), a period during which the mobile terminal is unable to receive any downlink data from a base station exists.

Therefore, even when a base station desires to transmit downlink data to a mobile terminal during a DRX/DTX operation period during Active (the state 2-B as shown in FIG. 13), the base station cannot transmit any data to the mobile terminal until a preset cycle has elapsed.

Therefore, the throughput of the mobile terminal decreases, and, even if it is preferable to give a higher priority to the throughput of the mobile terminal than to achievement of low power consumption in the mobile terminal, any improvement in the throughput cannot be achieved.

Nonpatent reference 5 shown hereafter discloses a technology of judging whether a mobile terminal should carry out an operation with low power consumption according to the mobile terminal capability information (UE Capabilities) in order to enable application to a case in which a higher priority should be given to the throughput of the mobile terminal.

However, in the current technology, the mobile terminal capability information (UE Capabilities) is a value specific to each mobile terminal.

The mobile terminal capability information (UE Capabilities) is notified from the mobile terminal to the network at a time of an RRC (Radio Resource Control) connection (e.g., at a time of attach, at a time of calling, and at a time of location registration).

Therefore, in accordance with the current technology, because a parameter showing which achievement of low power consumption in a mobile terminal or an improvement in the throughput of the mobile terminal should be given a higher priority is specific to each mobile terminal, and the timing at which a notification of the parameter can be made is restricted, it is difficult to effectively achieve low power consumption in the mobile terminal during a DRX/DTX operation period during Active (a state 2-B as shown in FIG. 13).

[Nonpatent reference 1] 3GPP technical specifications TR25.913 V7.2.0
[Nonpatent reference 2] 3GPP technical specifications TR25.813 V0.9.0
[Nonpatent reference 3] 3GPP contributions R2-060888
[Nonpatent reference 4] 3GPP contributions R2-060591
[Nonpatent reference 5] 3GPP contributions R2-060846
[Nonpatent reference 6] 3GPP contributions R2-070279
[Nonpatent reference 7] 3GPP technical specifications TR25.814 V7.0.0
[Nonpatent reference 8] 3GPP contributions R2-070265
[Nonpatent reference 9] 3GPP contributions R1-071245
[Nonpatent reference 10] 3GPP contributions R2-070701
[Patent reference 1] JP, 2003-204298, A Because conventional mobile communications systems are constructed as mentioned above, they make it possible to introduce the state 2-B, i.e., a "DRX/DTX operation period during Active" into the state 2, in which the system is operating at an RRC level, i.e., an "Active (in a broad sense)." A problem is, however, that neither a method of efficiently achieving low power consumption in a mobile terminal nor a method of setting up DRX/DTX cycles is defined, and therefore low power consumption cannot be necessarily achieved efficiently in a mobile terminal.

The present invention is made in order to solve the above-mentioned problems, and it is therefore an object of the present invention to provide a mobile communications system which can achieve low power consumption in a mobile terminal efficiently, and a mobile terminal which can achieve low power consumption.

DISCLOSURE OF THE INVENTION

In accordance with the present invention, there is provided a mobile communications system in which a mobile terminal judges whether or not the mobile terminal is able to make a transition to a temporary data transmission stop period during which the mobile terminal temporarily stops transmission of data, and, when the mobile terminal is able to make a transition to the temporary transmission stop period, the mobile terminal temporarily stops supply of electric power to data transmission processing units and data reception processing units of the mobile terminal if the base station judges that the mobile terminal is able to make a transition to a temporary reception stop period during which the mobile terminal temporarily stops reception of data.

As a result, there is provided an advantage of being able to efficiently achieve low power consumption in the mobile terminal.

BRIEF DESCRIPTION OF THE FIGURES

FIG. 3 is a block diagram showing a base station of the mobile communications system in accordance with Embodiment 1 of the present invention;

FIG. 4 is a sequence diagram showing the description of processing carried out by the mobile communications system in accordance with Embodiment 1 of the present invention;

FIG. 5 is a flow chart showing the description of a process of step ST5 which is carried out by a protocol processing unit 33;

FIG. 6 is a sequence diagram showing the description of processing carried out by a mobile communications system in accordance with Embodiment 2 of the present invention;

FIG. 7 is an explanatory drawing showing a example of determination of a DRX cycle and a DTX cycle;

FIG. 8 is a sequence diagram showing the description of processing carried out by the mobile communications system in accordance with Embodiment 3 of the present invention;

FIG. 9 is an explanatory drawing showing a example of mapping of a physical channel;

FIG. 10 is a sequence diagram showing the description of processing carried out by a mobile communications system in accordance with Embodiment 5 of the present invention;

FIG. 12 is an explanatory drawing showing an example of an indicator;

FIG. 15 is an explanatory drawing of terms which are uses in the present invention;

Figure 25:
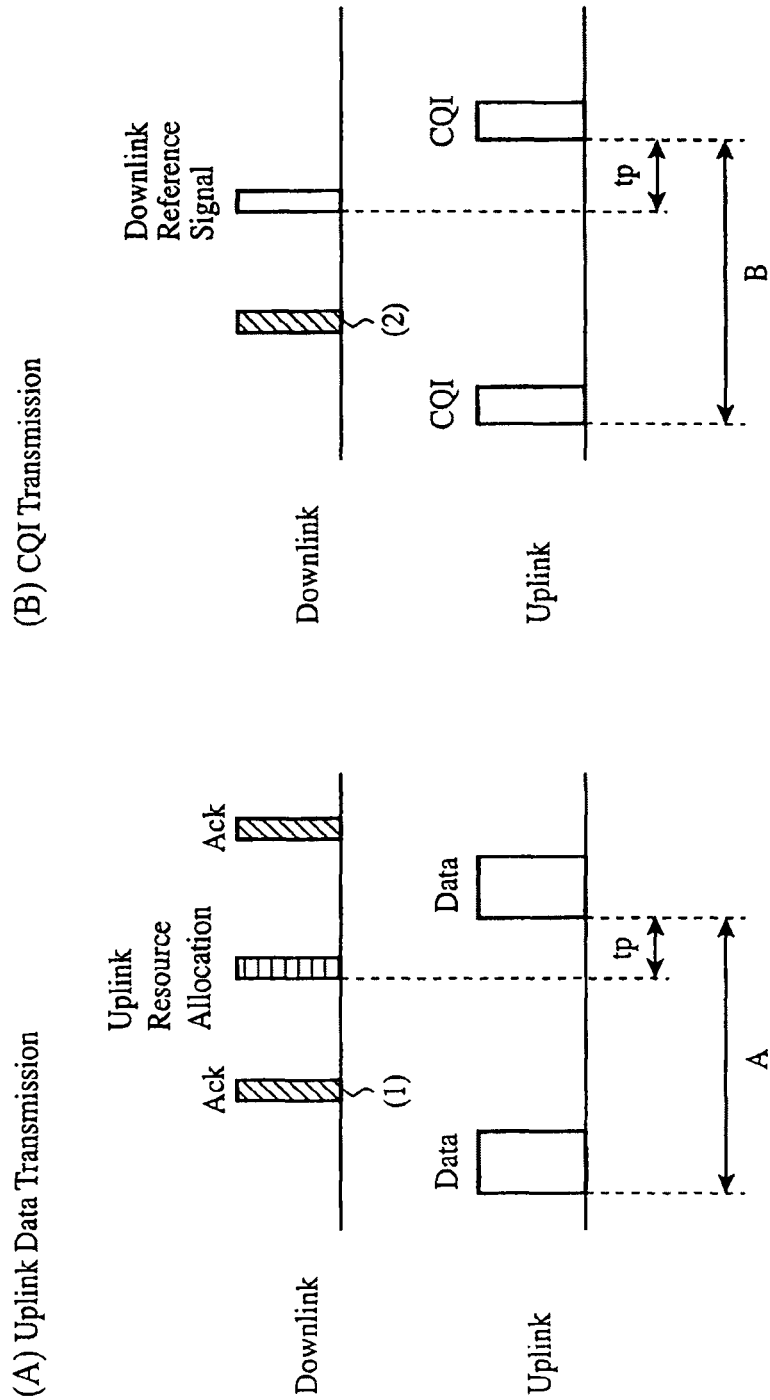
Figure 27:
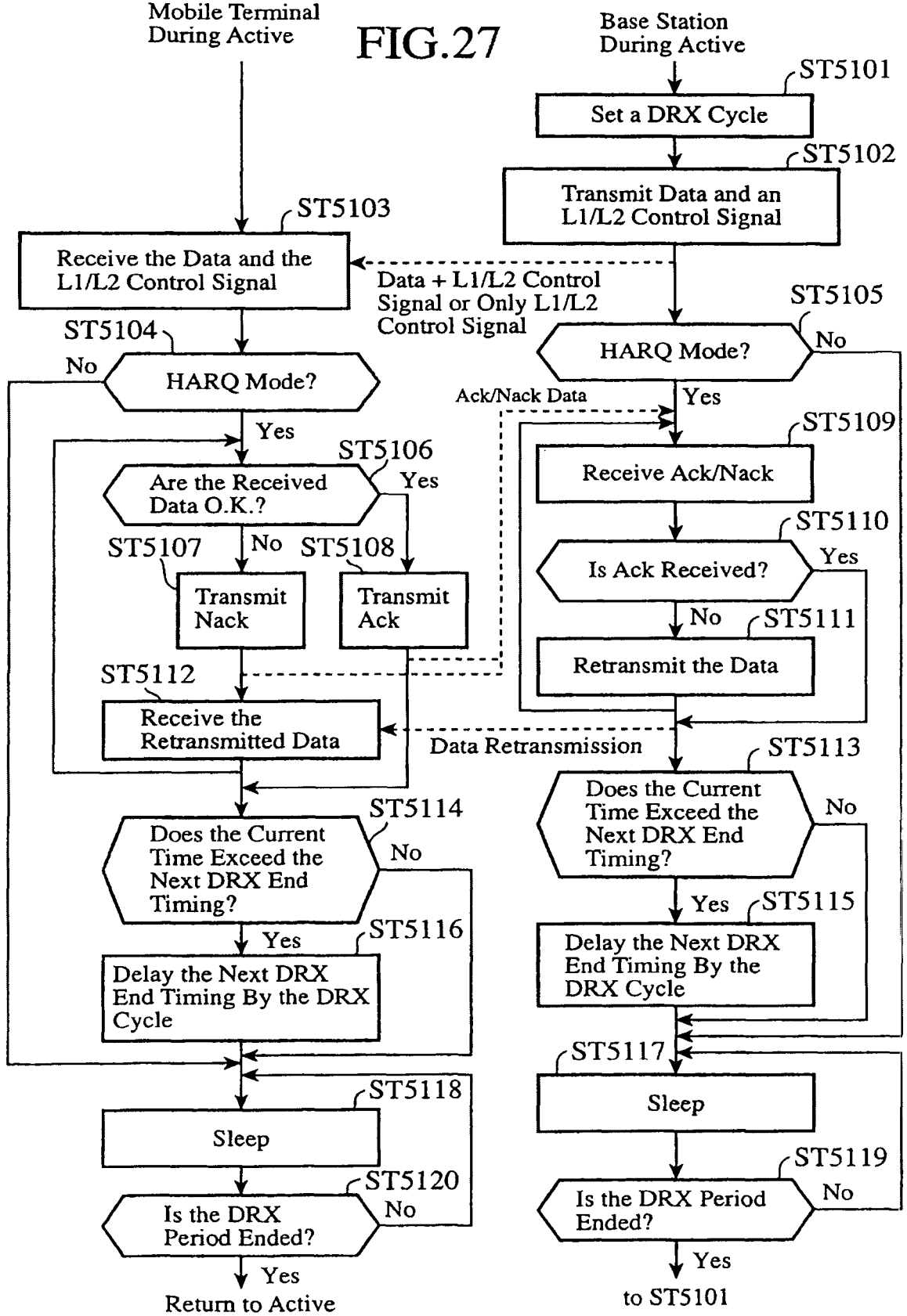
Figure 28:
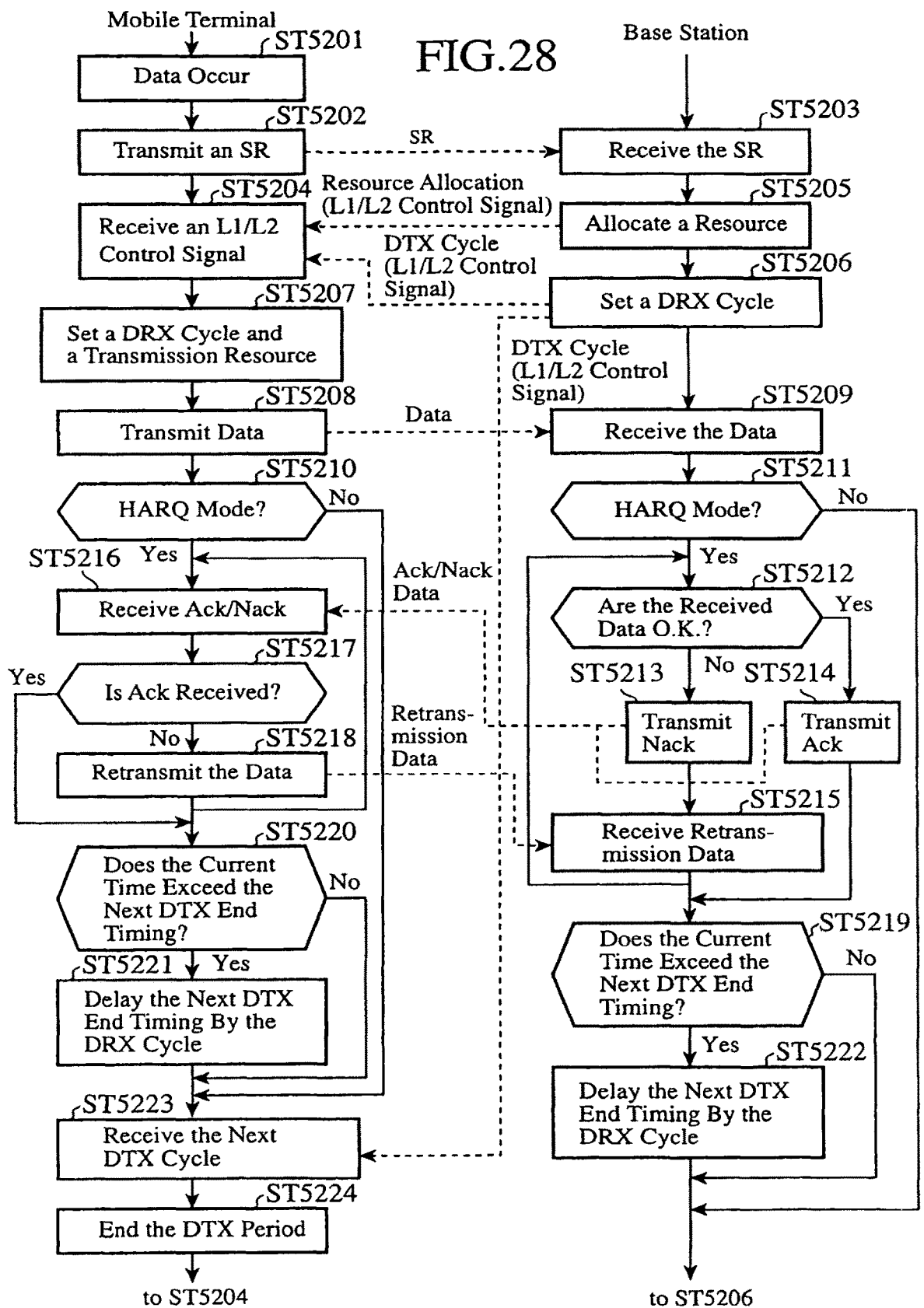
Figure 29:
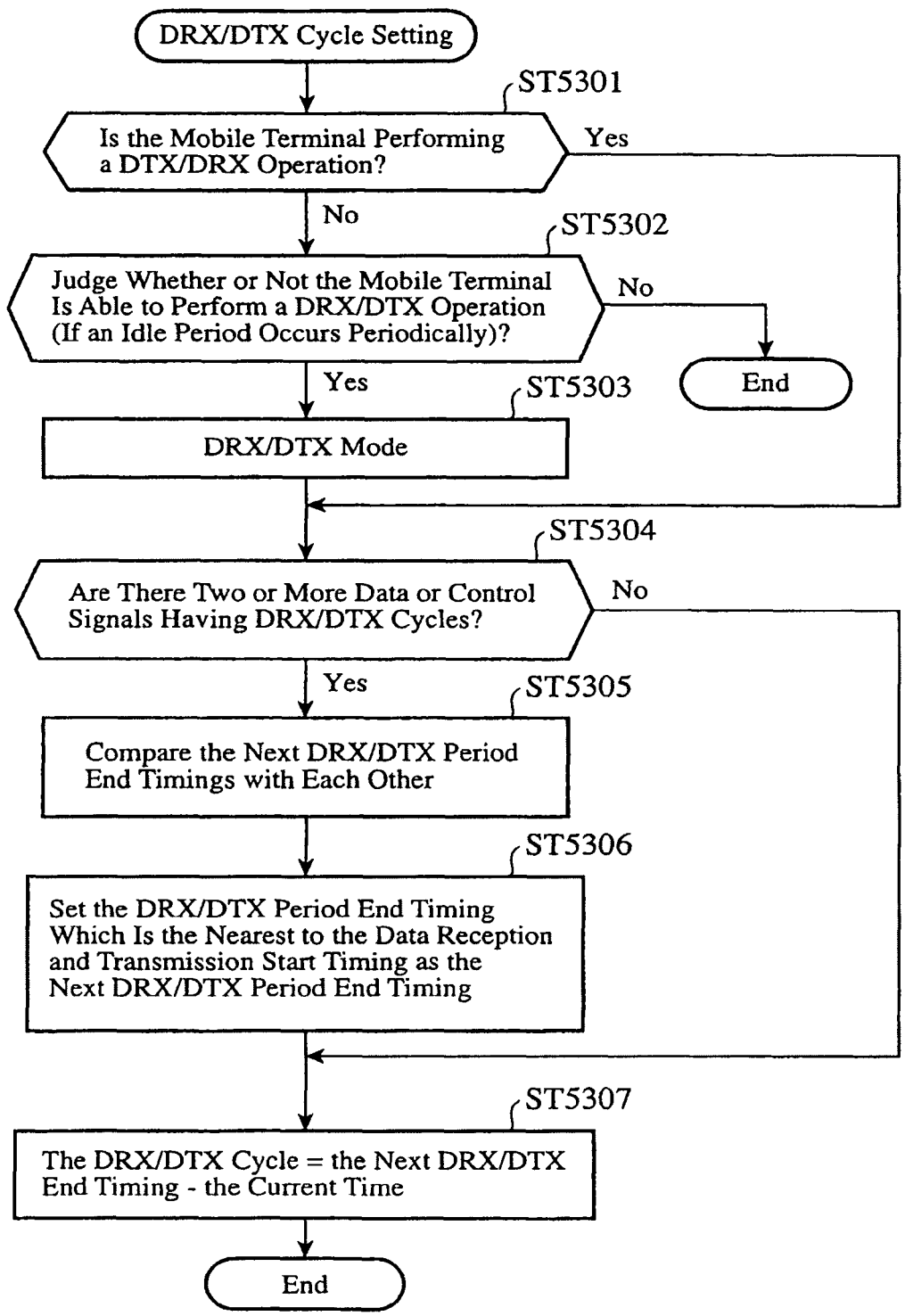
Figure 30:
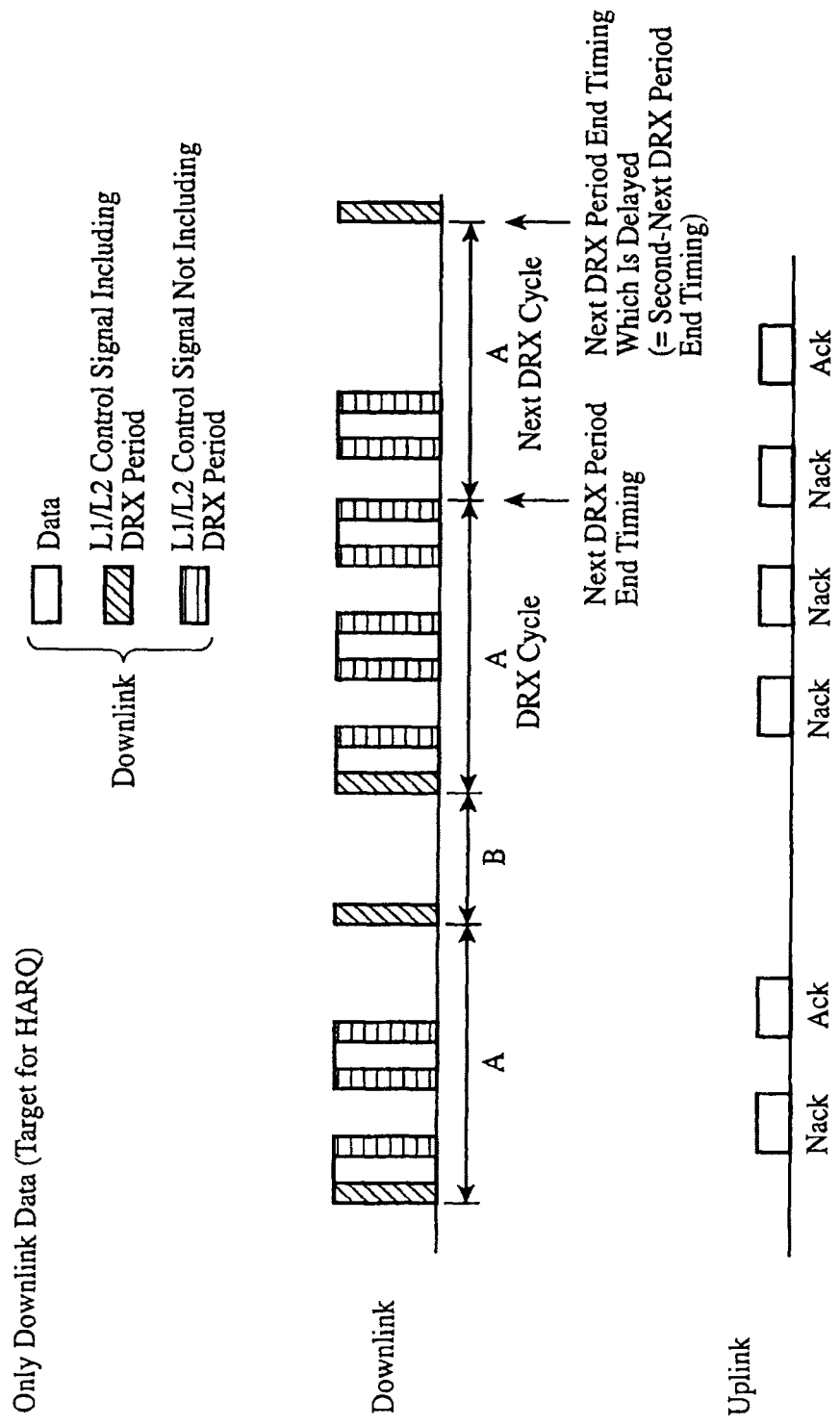
Figure 31:
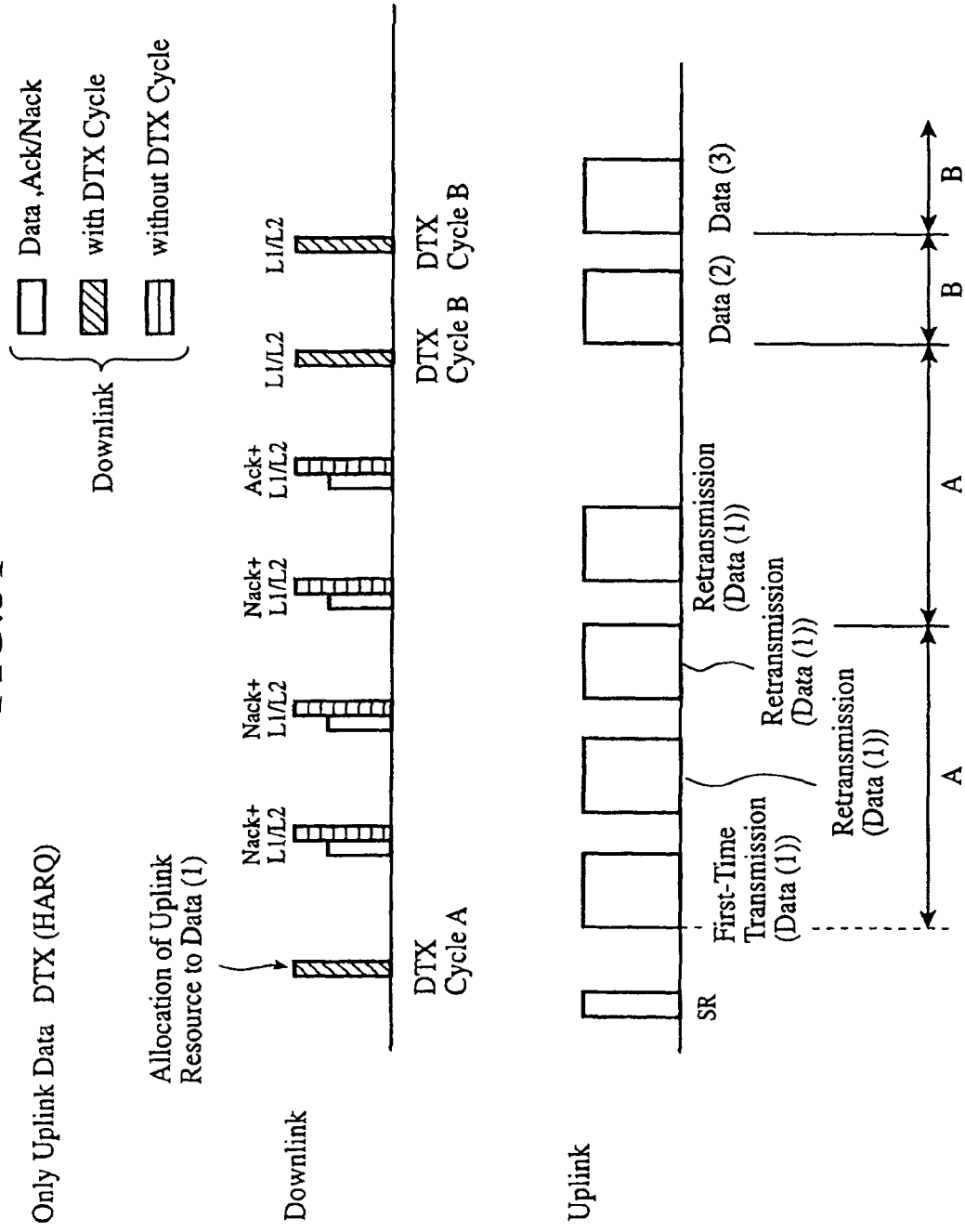
Figure 33:
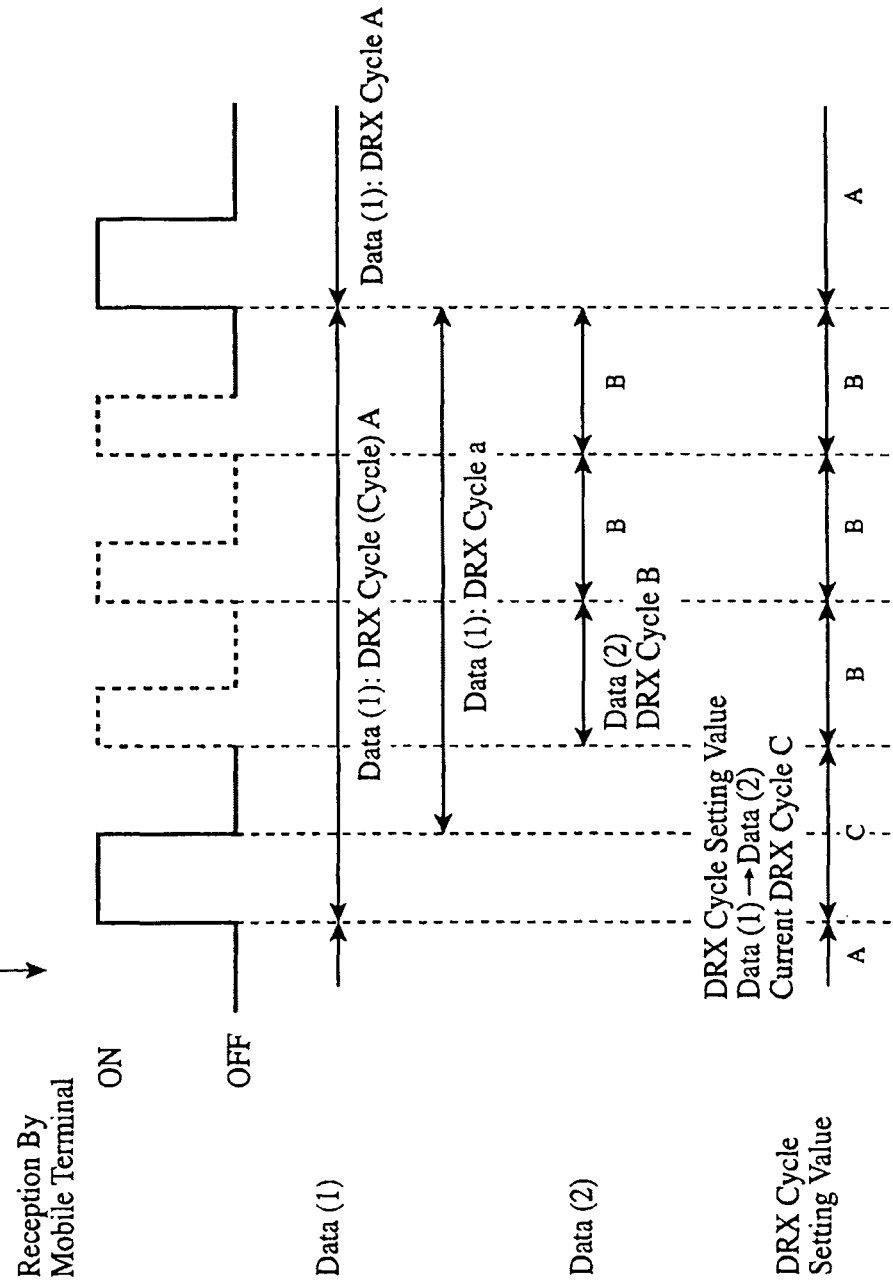
Figure 34:
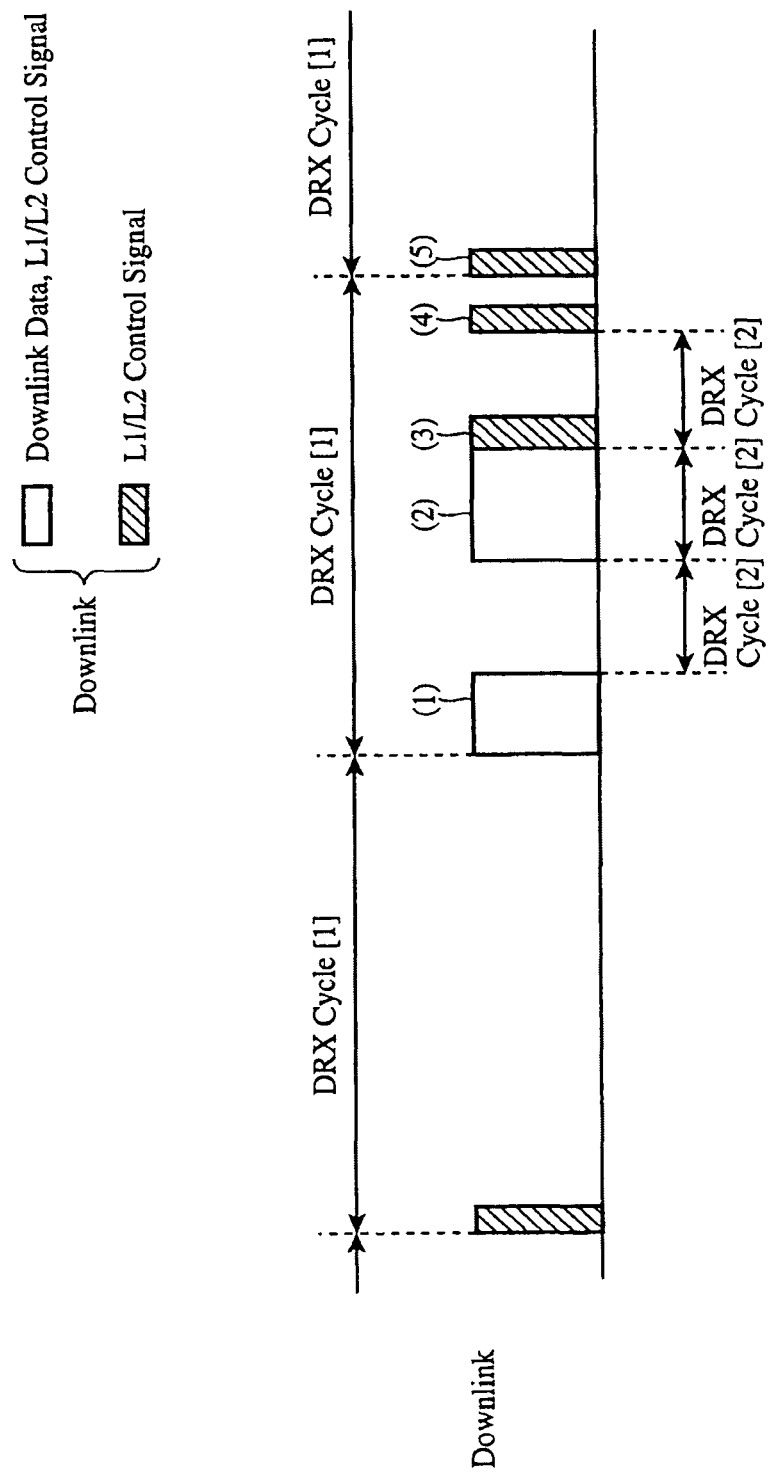
Figure 35:
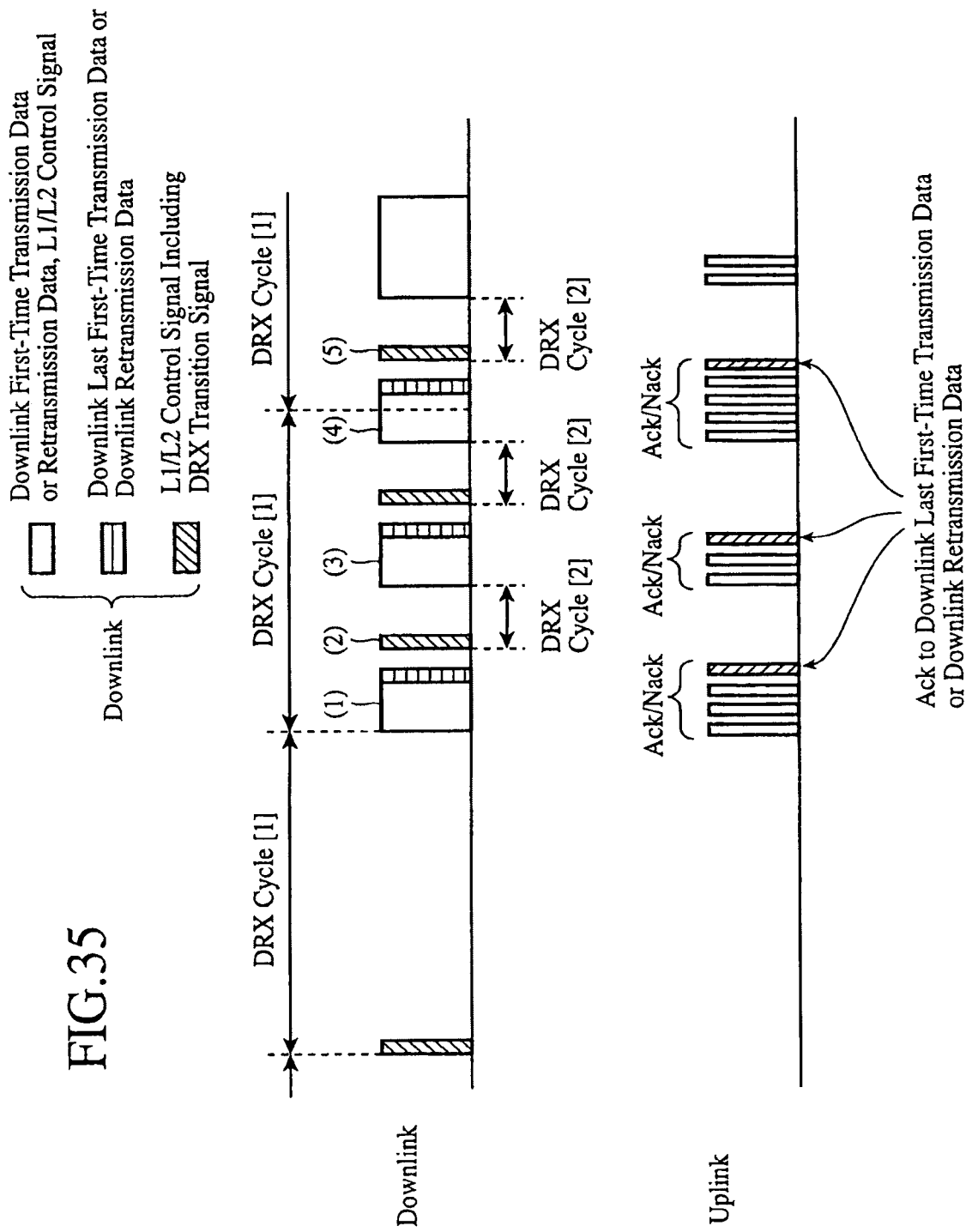
Figure 36:
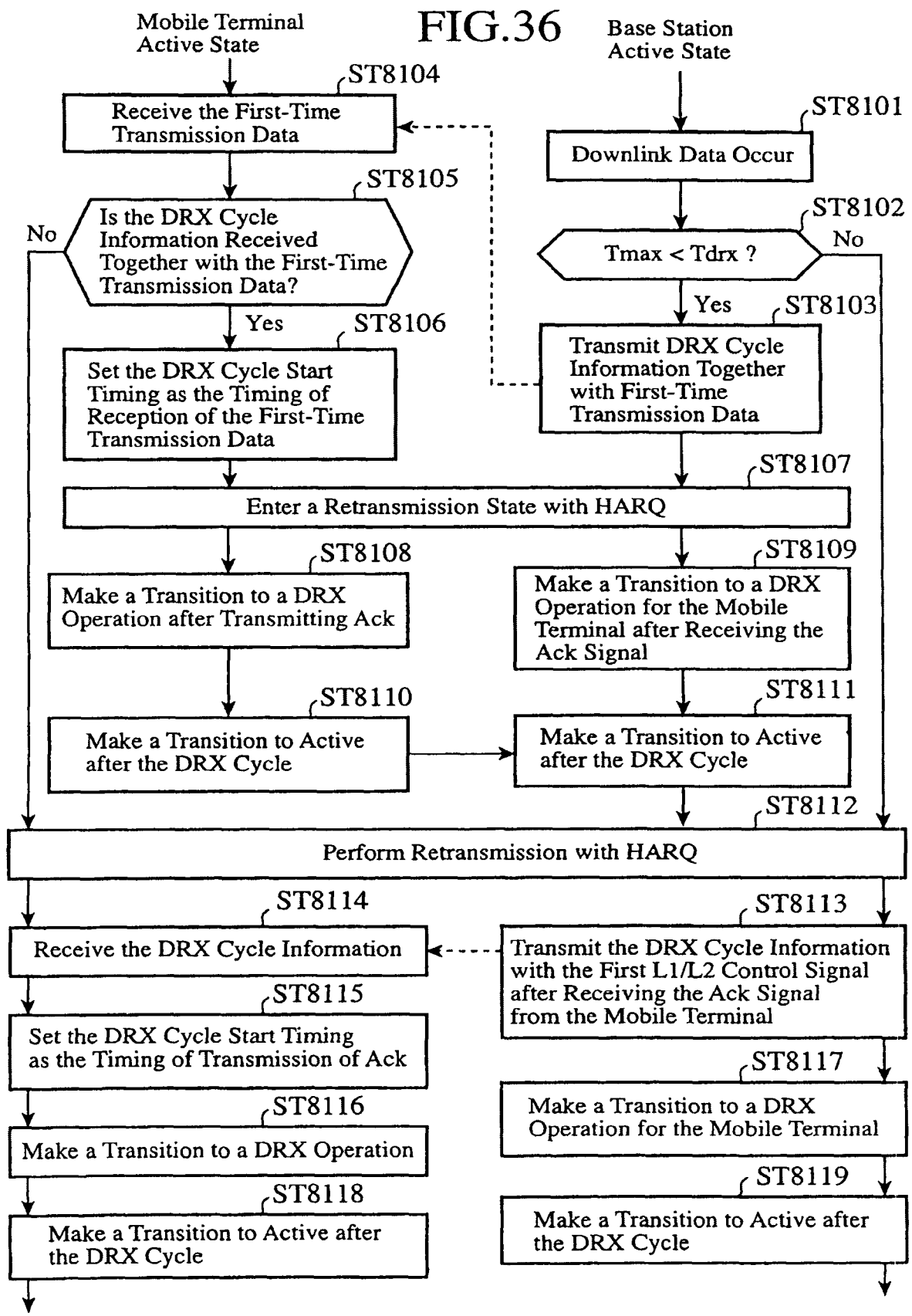
Figure 37:
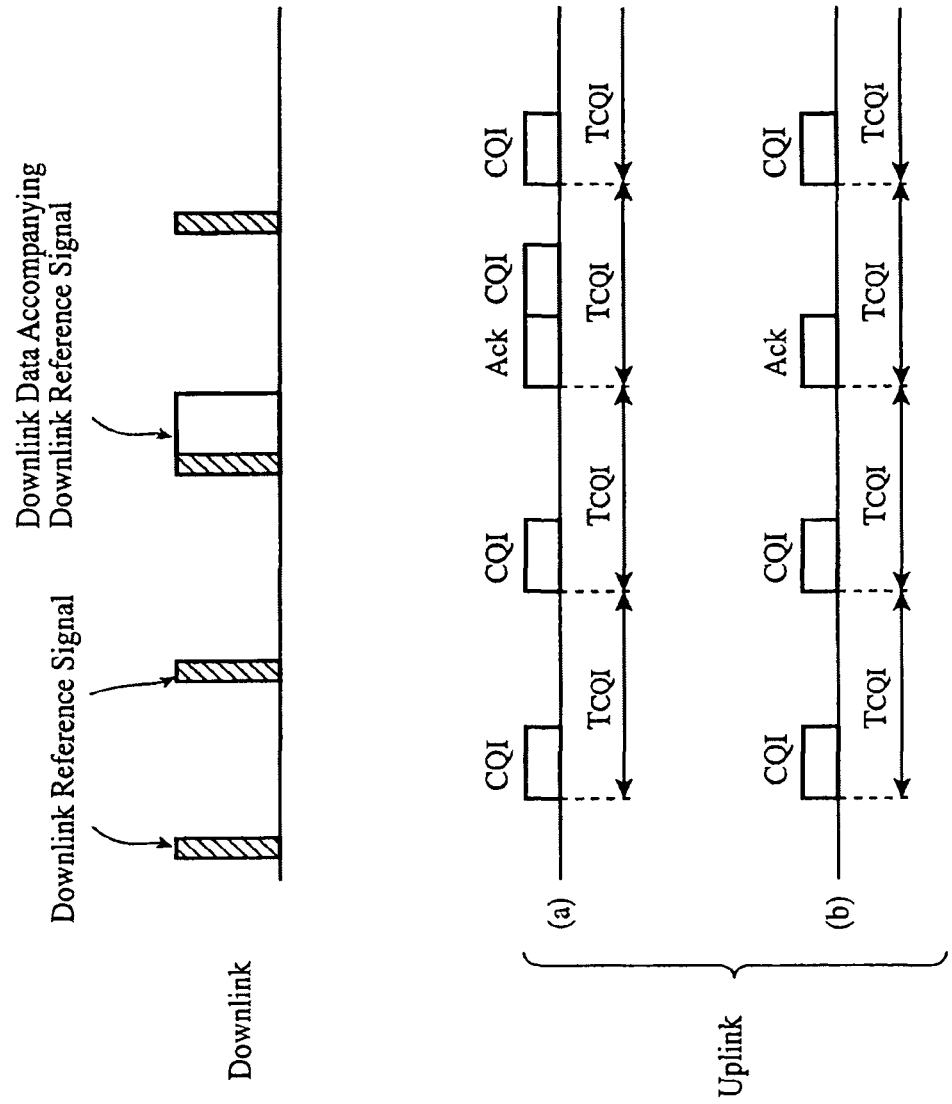
Figure 38:
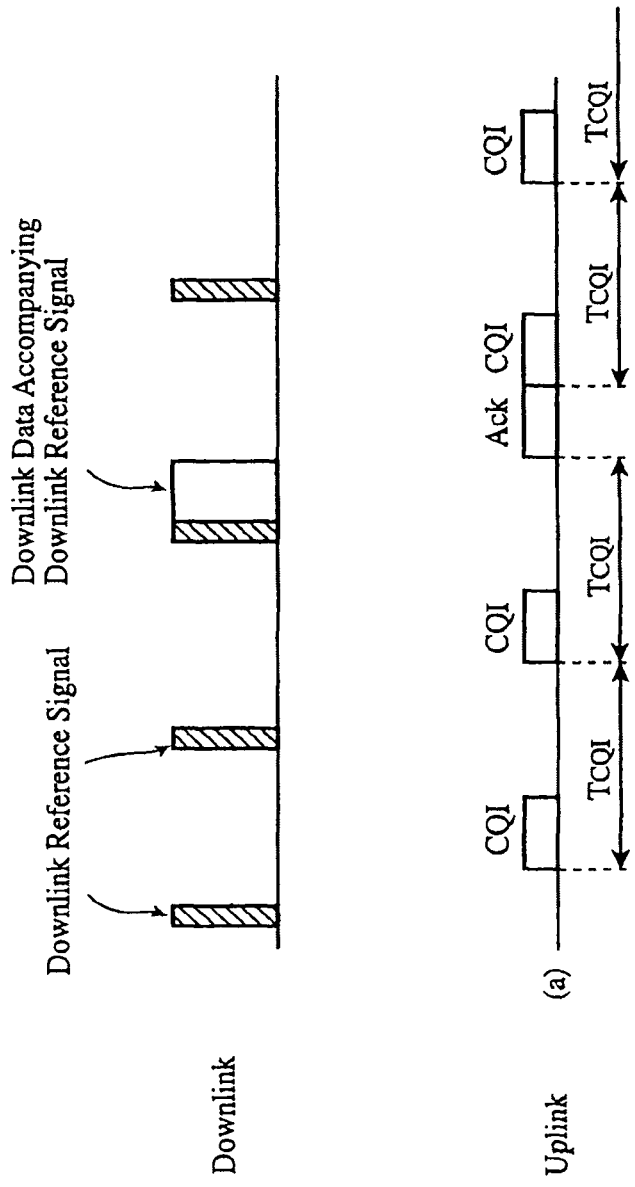
Figure 39:
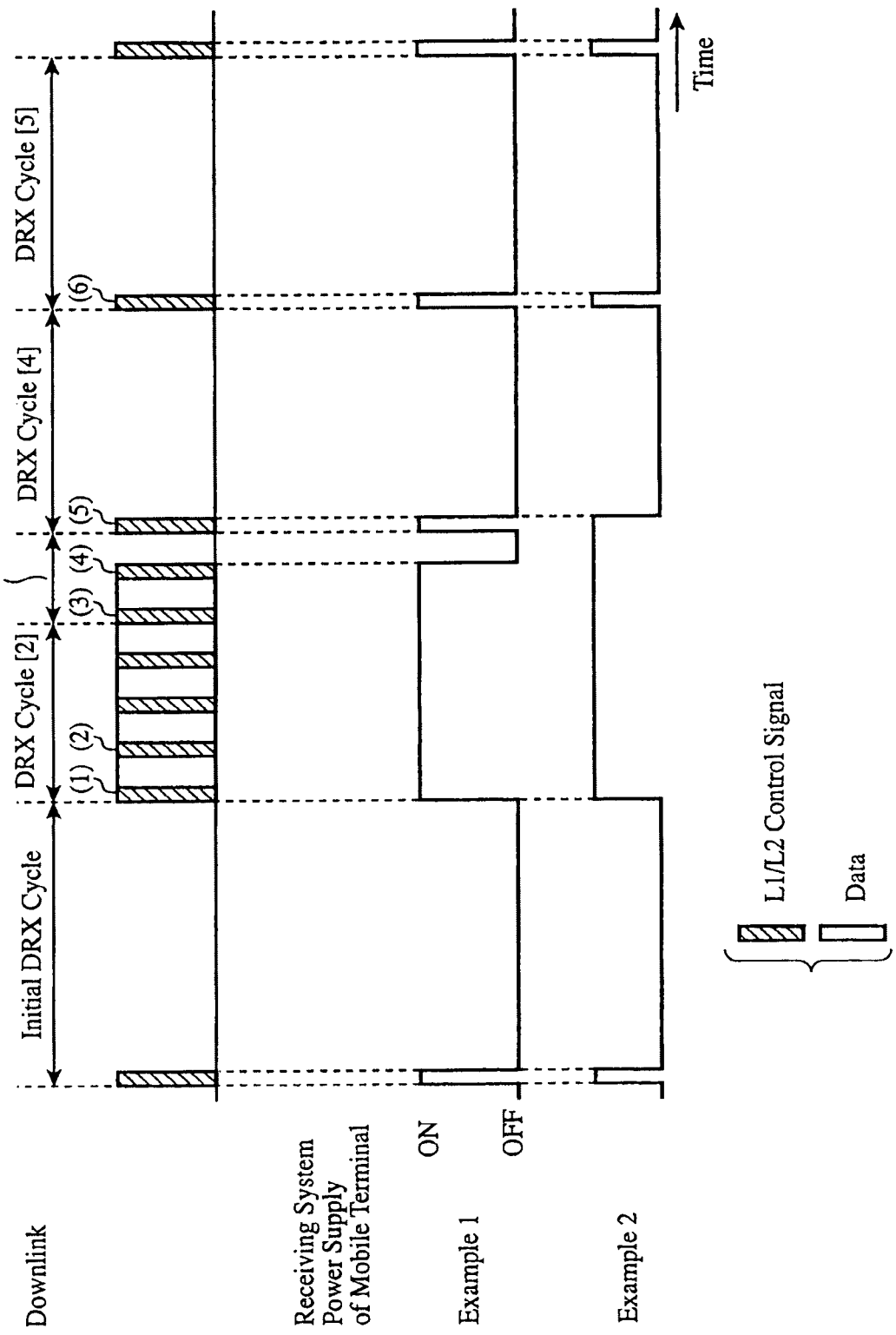
Figure 40:
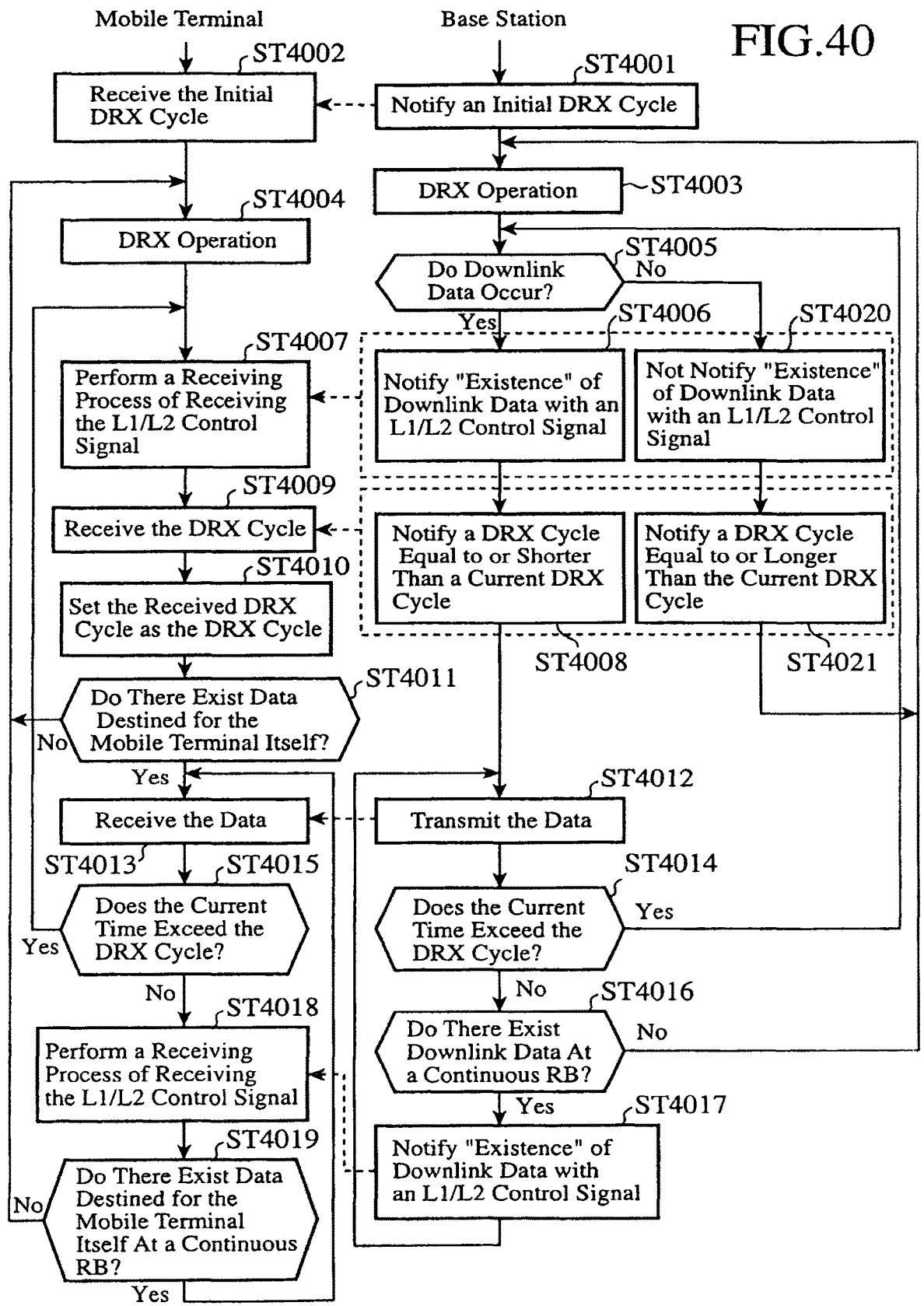
Figure 41:
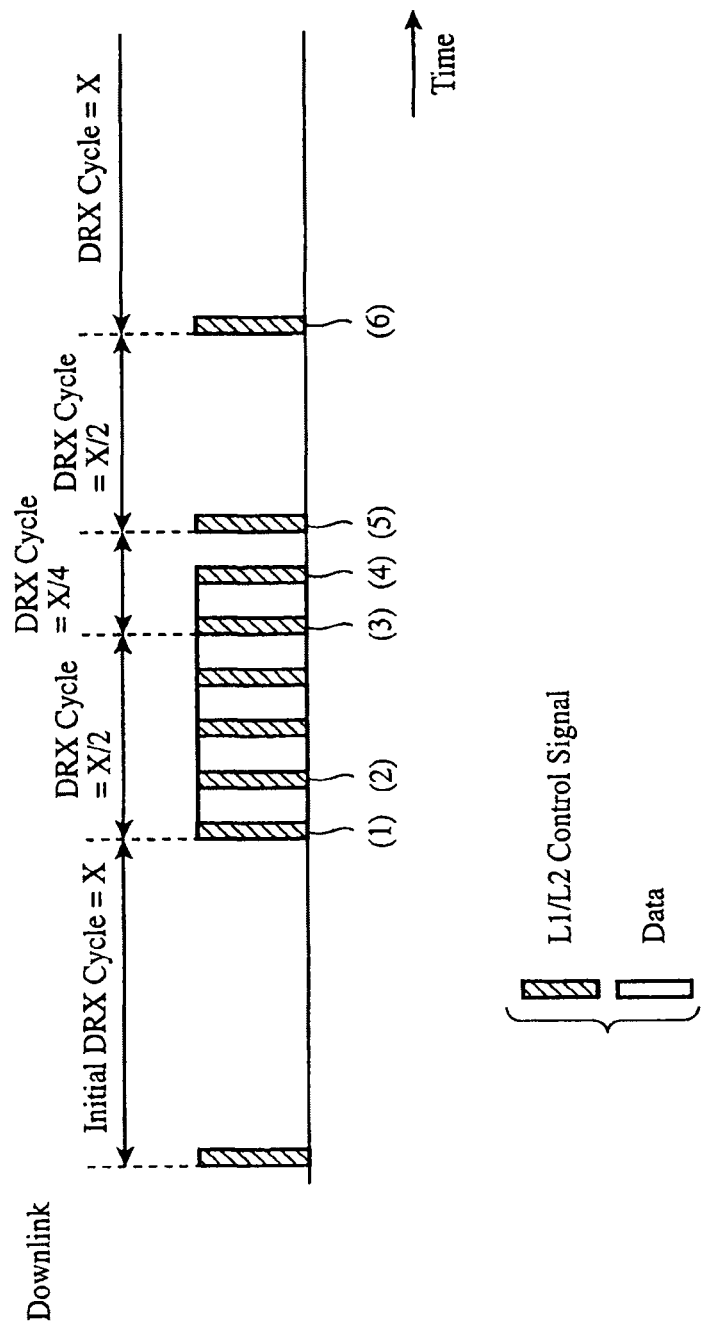
Figure 42:
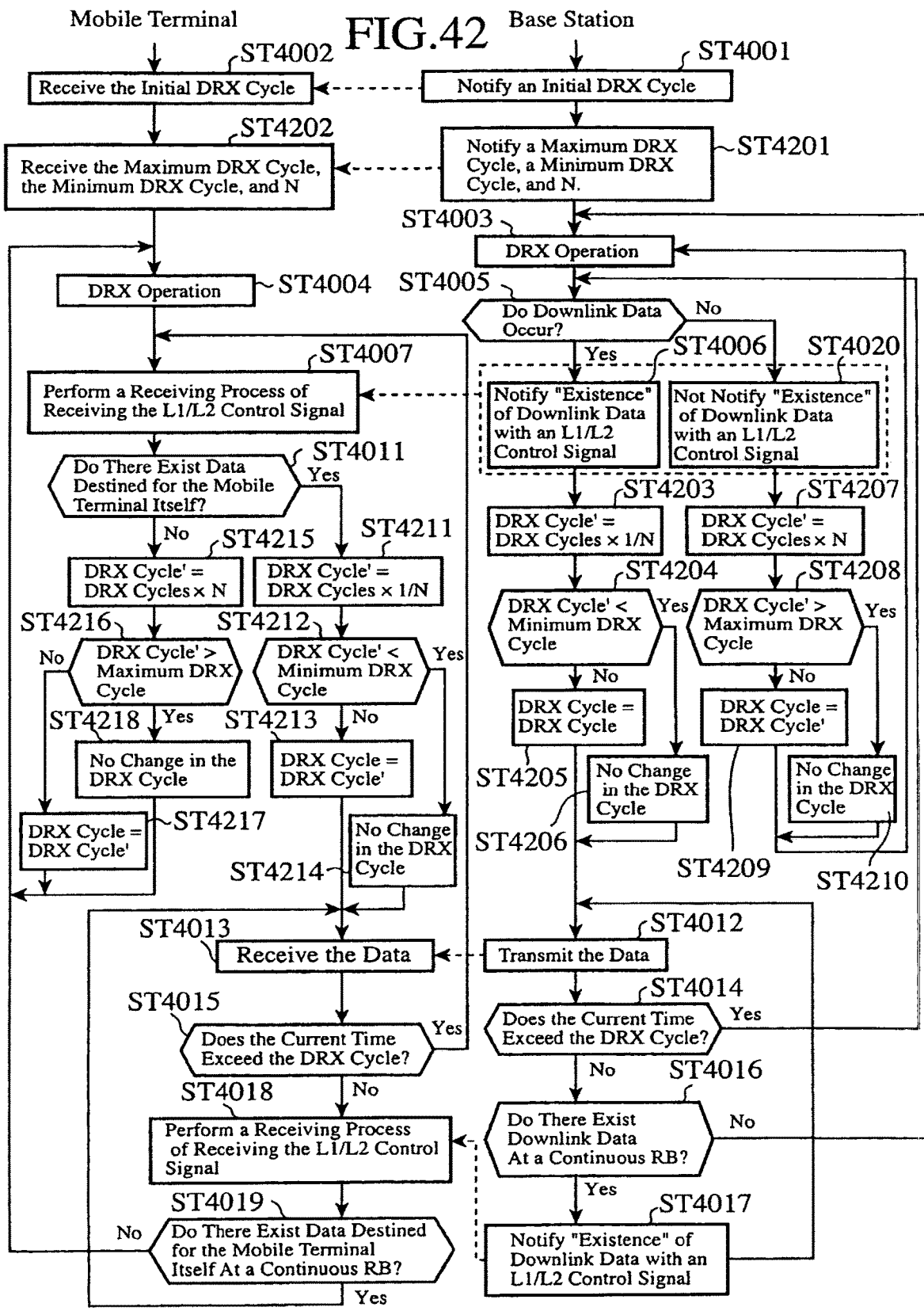
Figure 43:
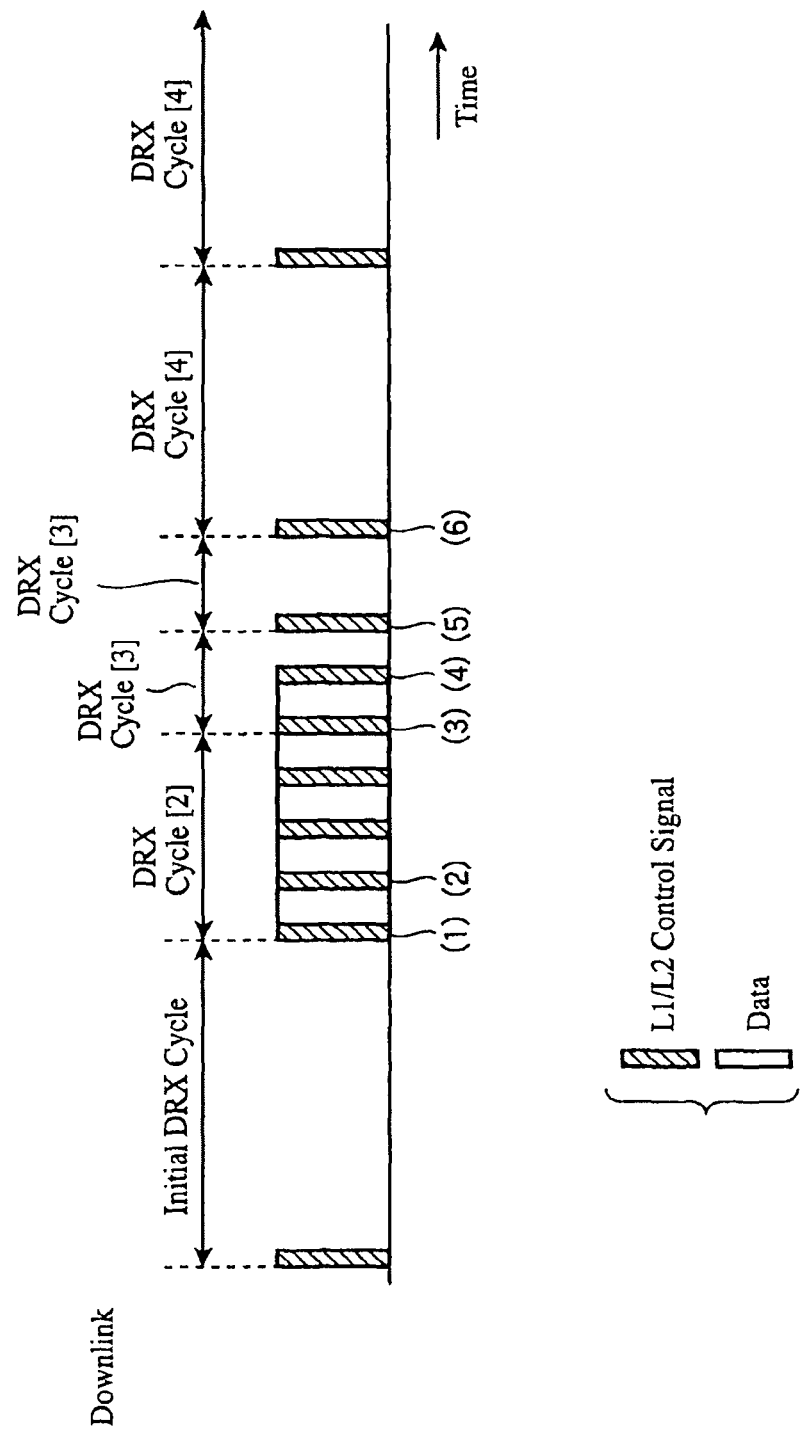
Figure 44:
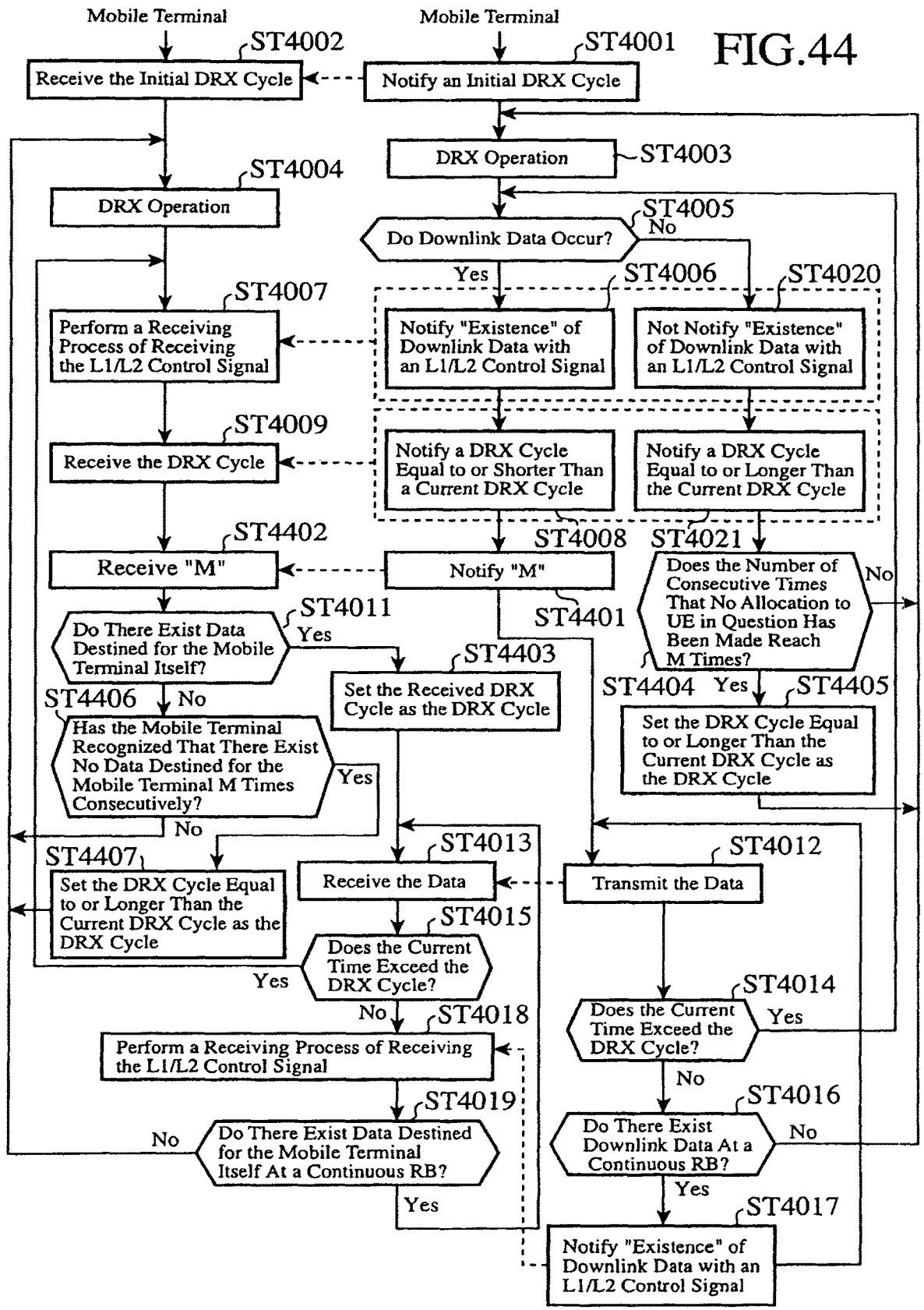
Figure 45:
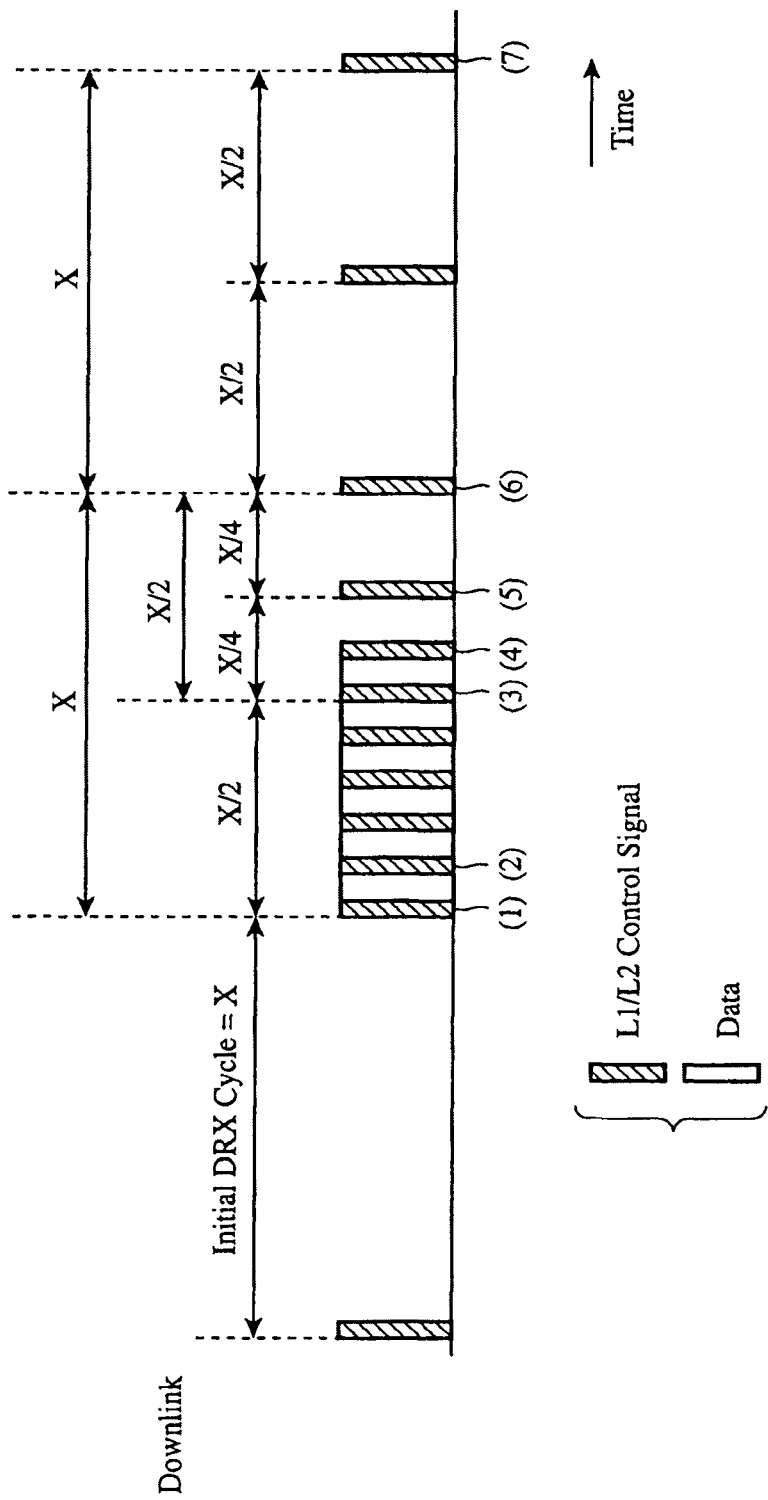
Figure 47:
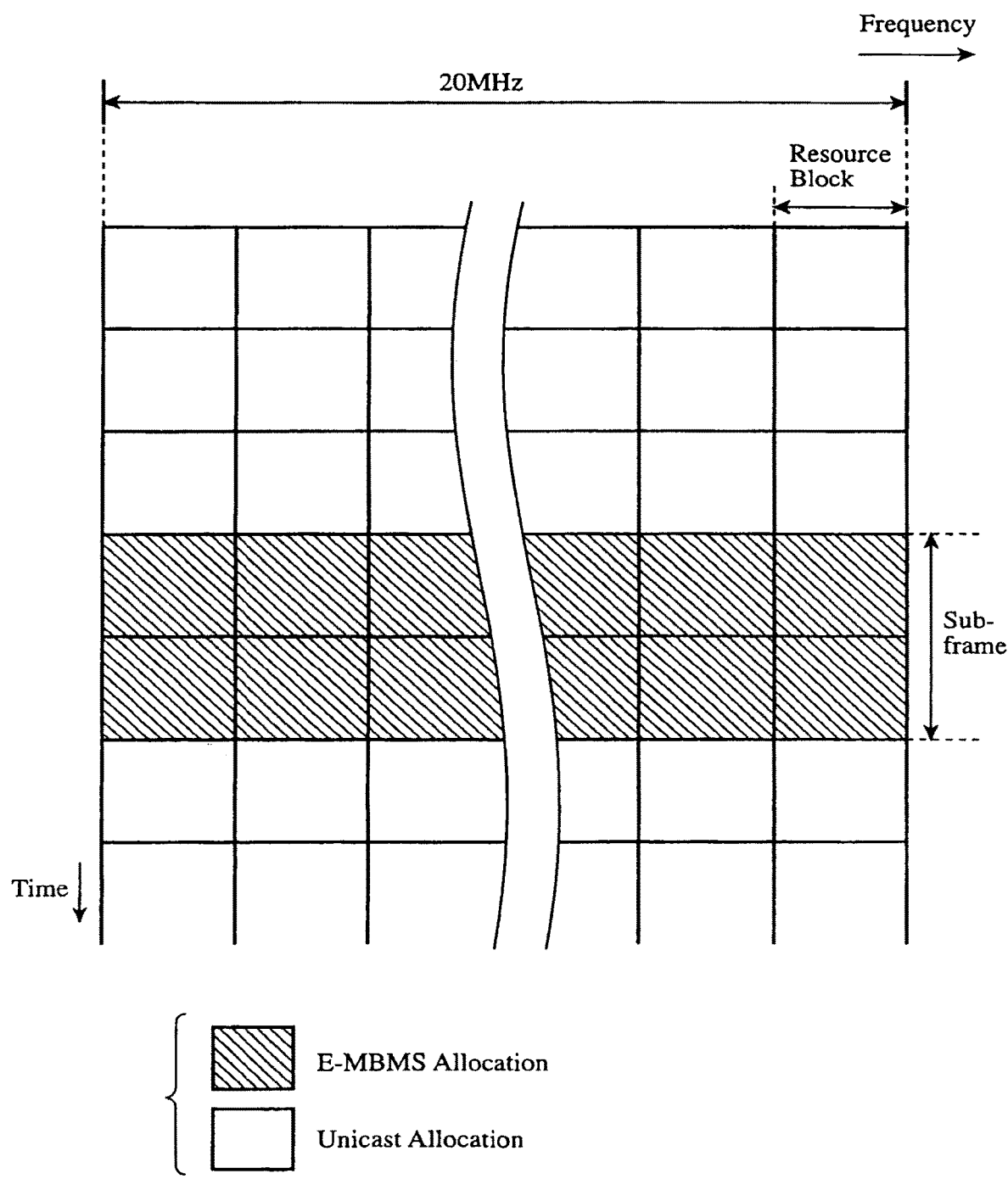
Figure 48:
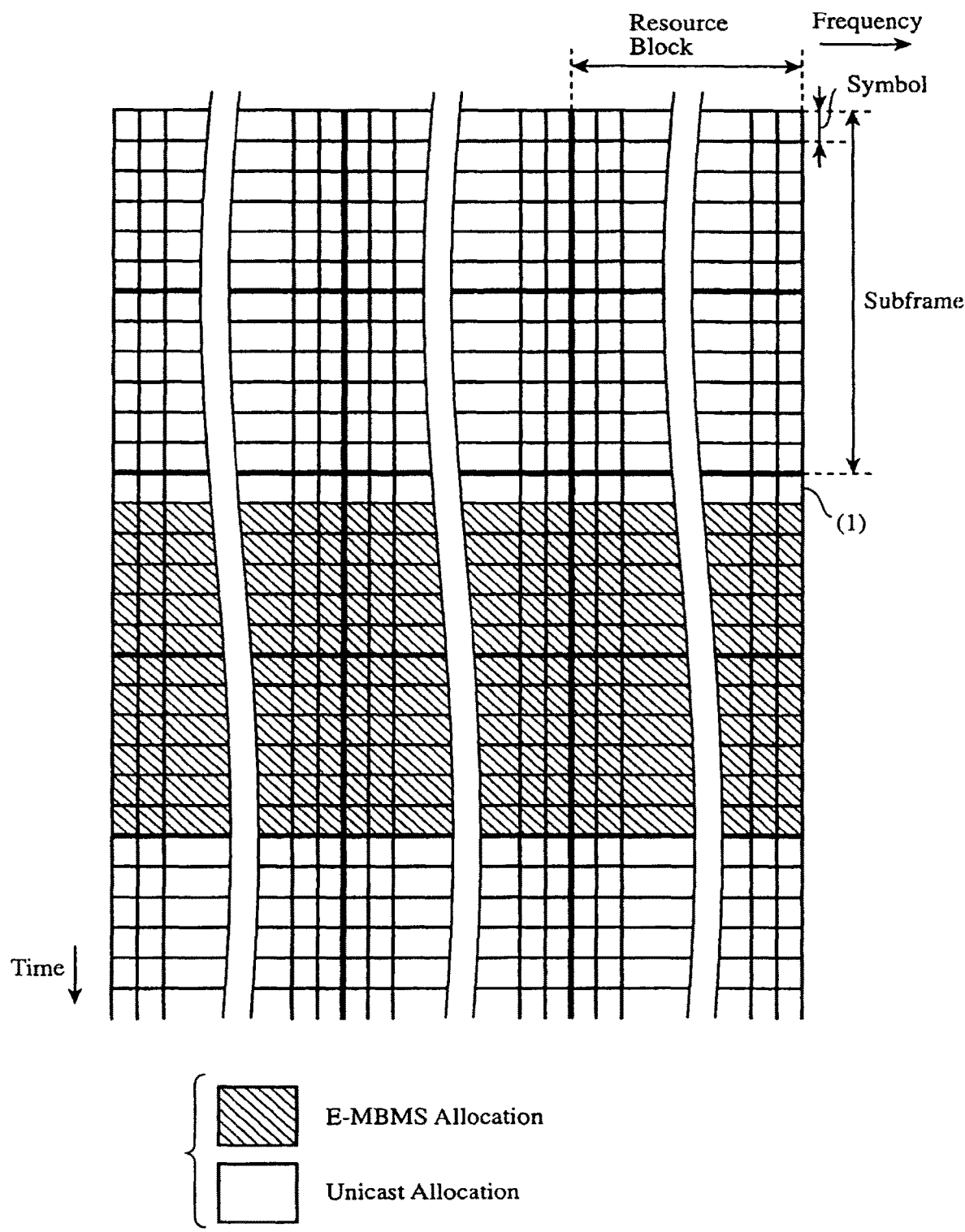
Figure 49:
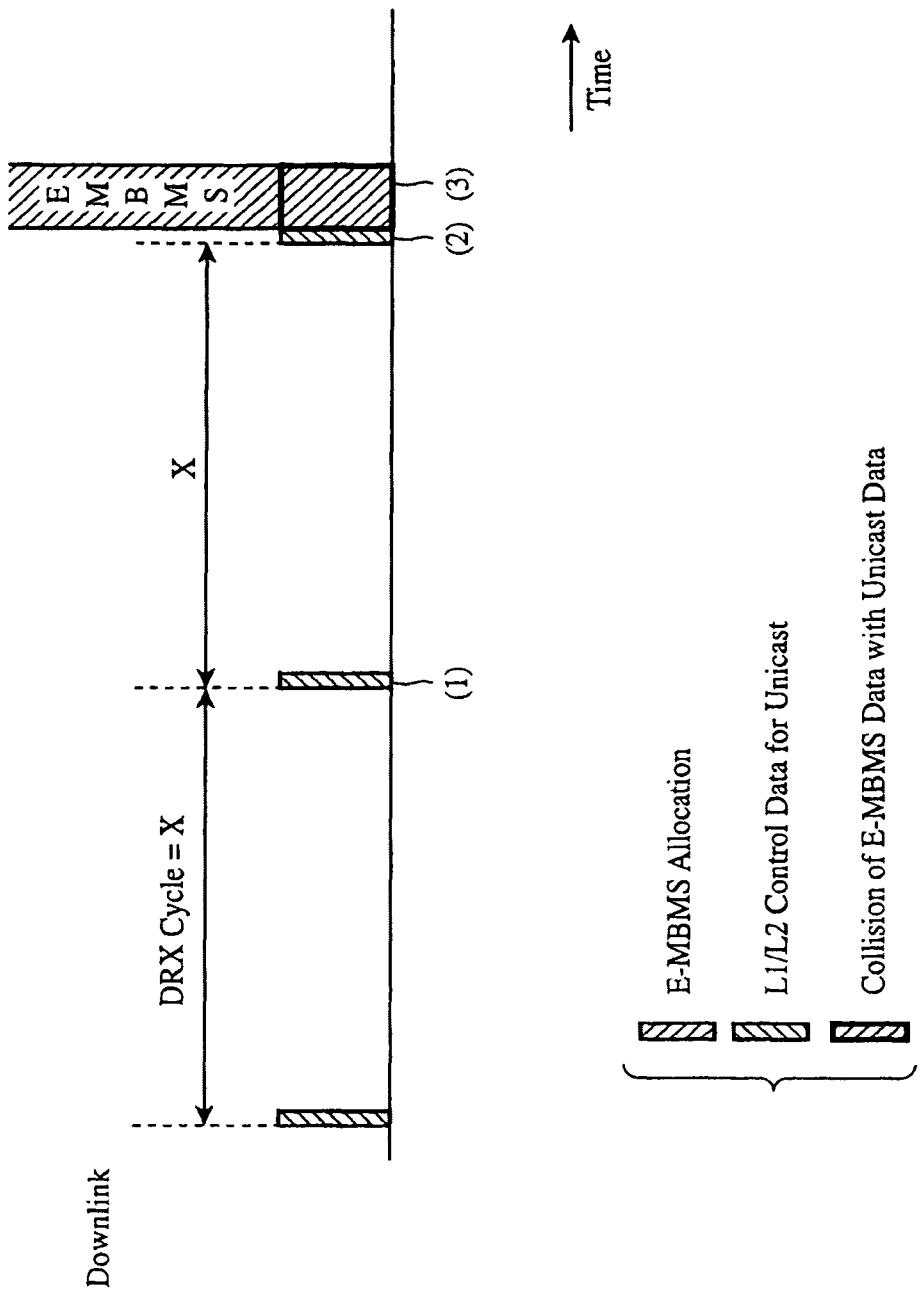
Figure 50:
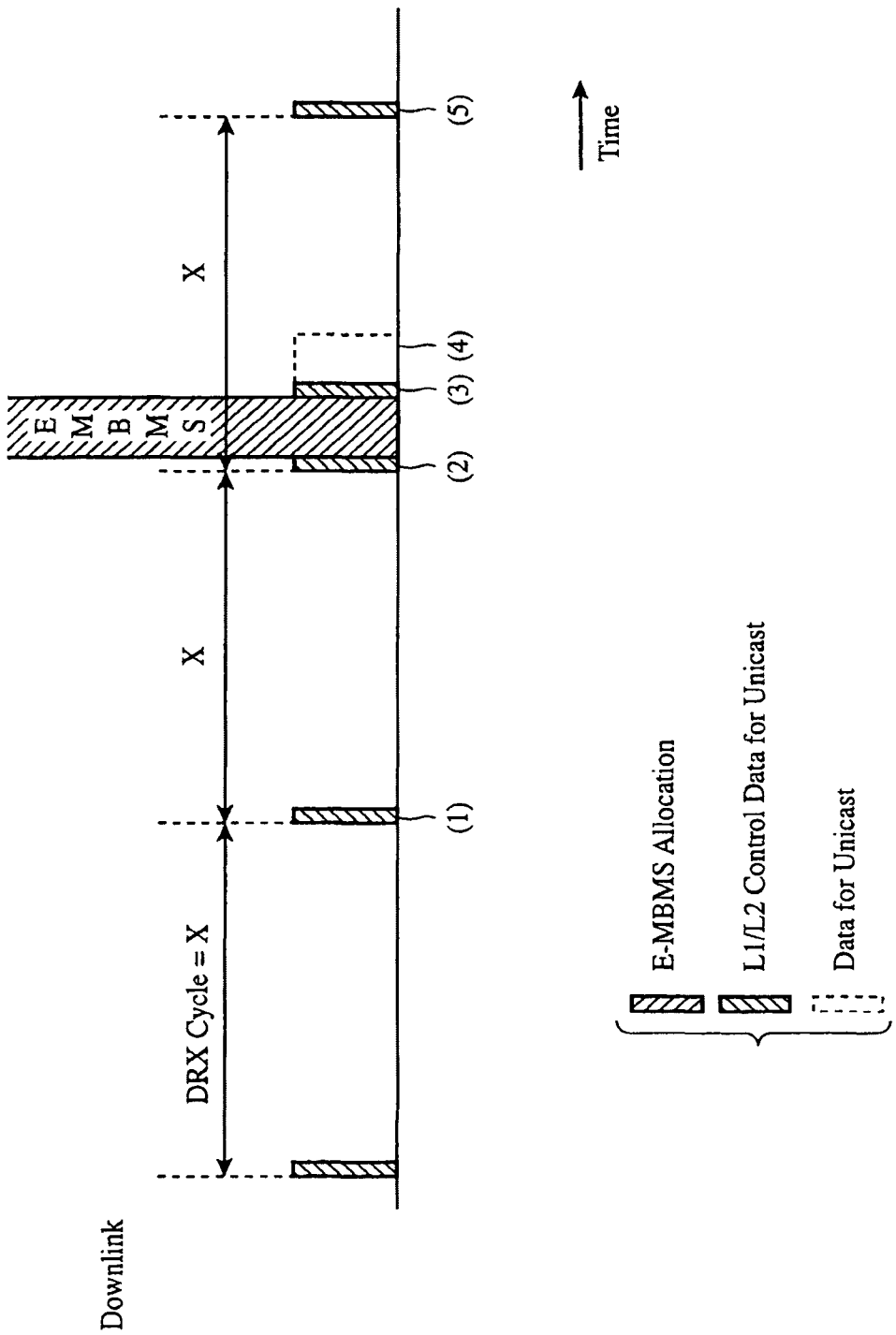

the FIG. 25 is an explanatory drawing showing a parameter indicating a time which elapses from the receiving timing of a received signal to a transmission timing after a DTX operation;

FIG. 26 is an explanatory drawing showing an example of the method of notifying a DRX cycle and a DTX cycle from the base station to the mobile terminal in a case in which there occur data transmissions for downlink and uplink, respectively, and the DTX cycle and the DRX cycle are set up in such a way that they are equal to each other;

FIG. 27 is a sequence diagram showing a flow of DRX control carried out by a mobile communications system in accordance with Embodiment 8 of the present invention;

FIG. 28 is a sequence diagram showing a flow of DTX control carried out by the mobile communications system in accordance with Embodiment 8 of the present invention;

FIG. 29 is a flow chart showing a process flow of a DRX/DTX cycle setting method for use in the DTX control and the DRX control carried out by the mobile communications system in accordance with Embodiment 8 of the present invention;

FIG. 30 is an explanatory drawing showing an example of an actual operation in the DRX control for downlink data transmission in a HARQ mode in the mobile communications system in accordance with Embodiment 8 of the present invention;

FIG. 31 is an explanatory drawing showing an example of an actual operation in the DTX control for uplink data transmission in the HARQ mode in the mobile communications system in accordance with Embodiment 8 of the present invention;

FIG. 32 is an explanatory drawing showing an example of, in a case in which two types of data and a control signal having different DTX cycles occur, an actual operation in the DTX control for uplink data transmission in the HARQ mode in the mobile communications system in accordance with Embodiment 8 of the present invention;

FIG. 33 is an explanatory drawing showing an example of, in a case in which data having different DRX cycles occur while sleeping during a DRX period, an actual operation in the DRX control for downlink data transmission in the HARQ mode in the mobile communications system in accordance with Embodiment 8 of the present invention;

FIG. 34 is an explanatory drawing showing a case in which two DRX cycles are set up, which is shown in the nonpatent reference 8;

FIG. 35 is an explanatory drawing showing a case in which two DRX cycles are set up, and a method disclosed in Embodiment 7 is applied to a setup of a DRX cycle [2] and a method disclosed in Embodiment 8 is applied to a setup of a DRX cycle [1];

FIG. 36 is a sequence diagram of a mobile terminal and a base station which employ a method which is a combination of the method disclosed in Embodiment 7 and a conventional method, for selecting one of them according to a large and small relation between a required time corresponding to a maximum (MAX) number of retransmissions with HARQ, and a DRX cycle;

FIG. 37 is an explanatory drawing showing an example in a case in which the timing of transmission of an uplink Ack signal/Nack signal coincides with that of transmission of a CQI;

FIG. 38 is an explanatory drawing showing an example in the case in which the timing of transmission of an uplink Ack signal/Nack signal coincides with that of transmission of a CQI;

FIG. 39 is an explanatory drawing showing an example of a DRX operation method in a mobile communications system in accordance with Embodiment 12 of the present invention;

FIG. 40 is a sequence diagram showing an example of the description of processing carried out by a mobile terminal and a base station in accordance with Embodiment 12 of the present invention;

FIG. 41 is an explanatory drawing showing an example of a DRX operation method in a mobile communications system in accordance with a variant 1 of Embodiment 12 of the present invention;

FIG. 42 is a sequence diagram showing an example of the description of processing carried out by a mobile terminal and a base station in accordance with the variant 1 of Embodiment 12 of the present invention;

FIG. 43 is an explanatory drawing showing an example of a DRX operation method in a mobile communications system in accordance with a variant 2 of Embodiment 12 of the present invention;

FIG. 44 is a sequence diagram showing an example of the description of processing carried out by a mobile terminal and a base station in accordance with the variant 2 of Embodiment 12 of the present invention;

FIG. 45 is an explanatory drawing showing an example of a DRX operation method in a mobile communications system in accordance with a variant 3 of Embodiment 12 of the present invention;

FIG. 46 is an explanatory drawing showing an example of a relation between the QoS of a service and an initial DRX cycle;

FIG. 47 is an explanatory drawing showing an example of allocation of radio resources to a E-MBMS and allocation of radio resources to services other than the E-MBMS;

FIG. 48 is an explanatory drawing showing an example of allocation of radio resources allocated to the E-MBMS in a subframe;

FIG. 49 is an explanatory drawing showing an example of a DRX operation method in a mobile communications system for explaining a problem shown in Embodiment 13 of the present invention;

FIG. 50 is an explanatory drawing showing an example of an operation of E-MBMS and the DRX operation method in the mobile communications system in accordance with Embodiment 13 of the present invention.

Figure 51:
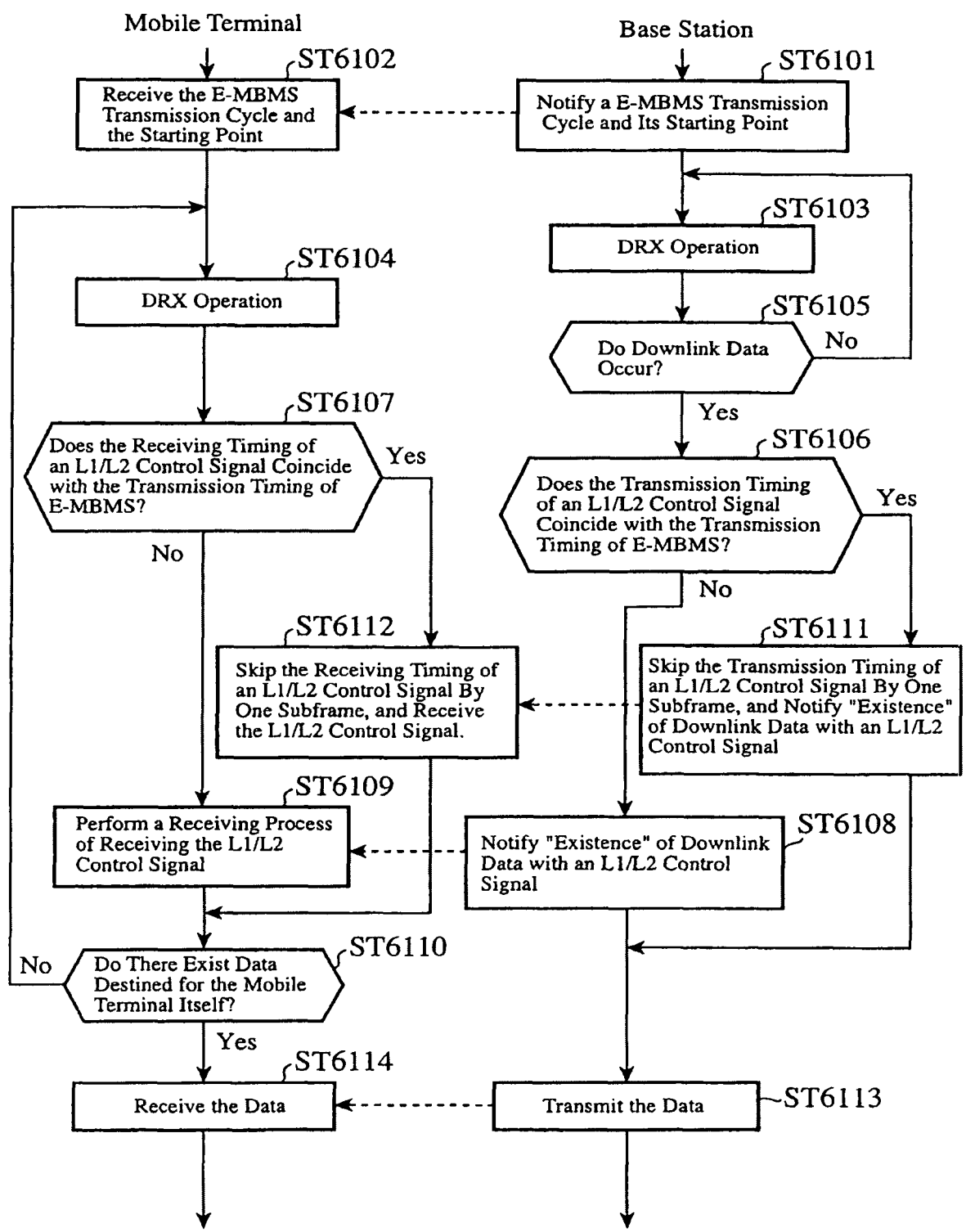
Figure 52:
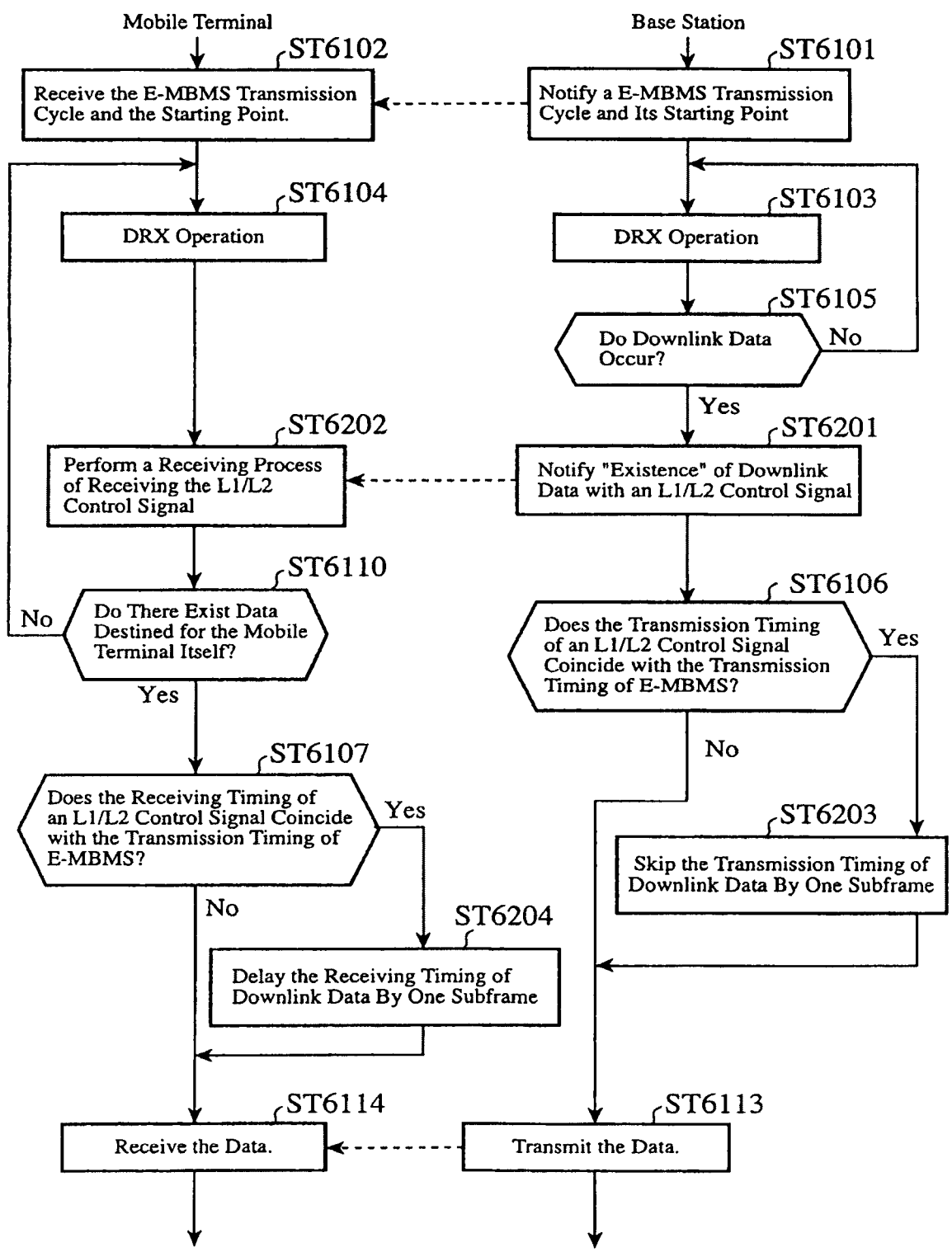
Figure 53:
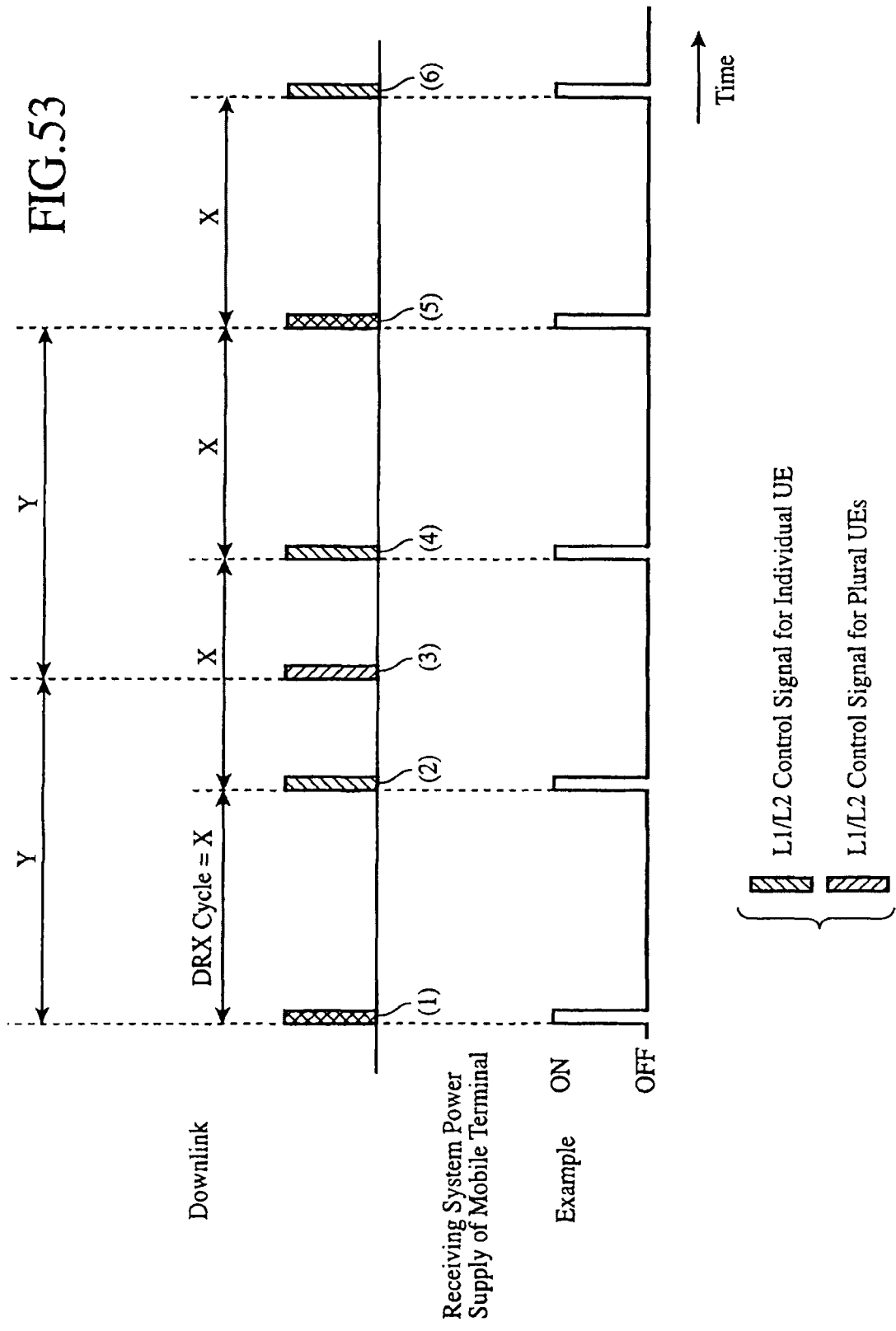
Figure 54:
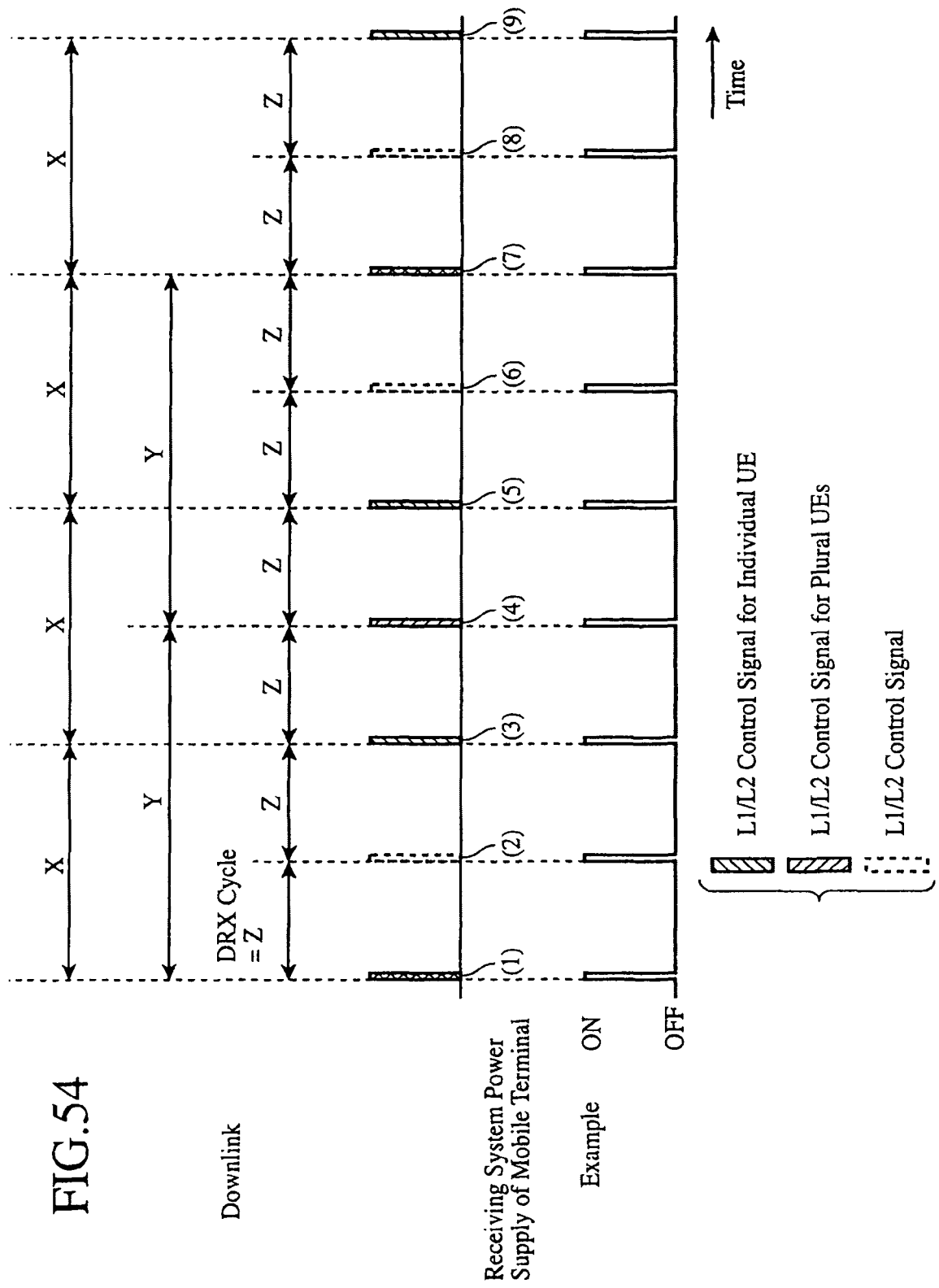
Figure 55:
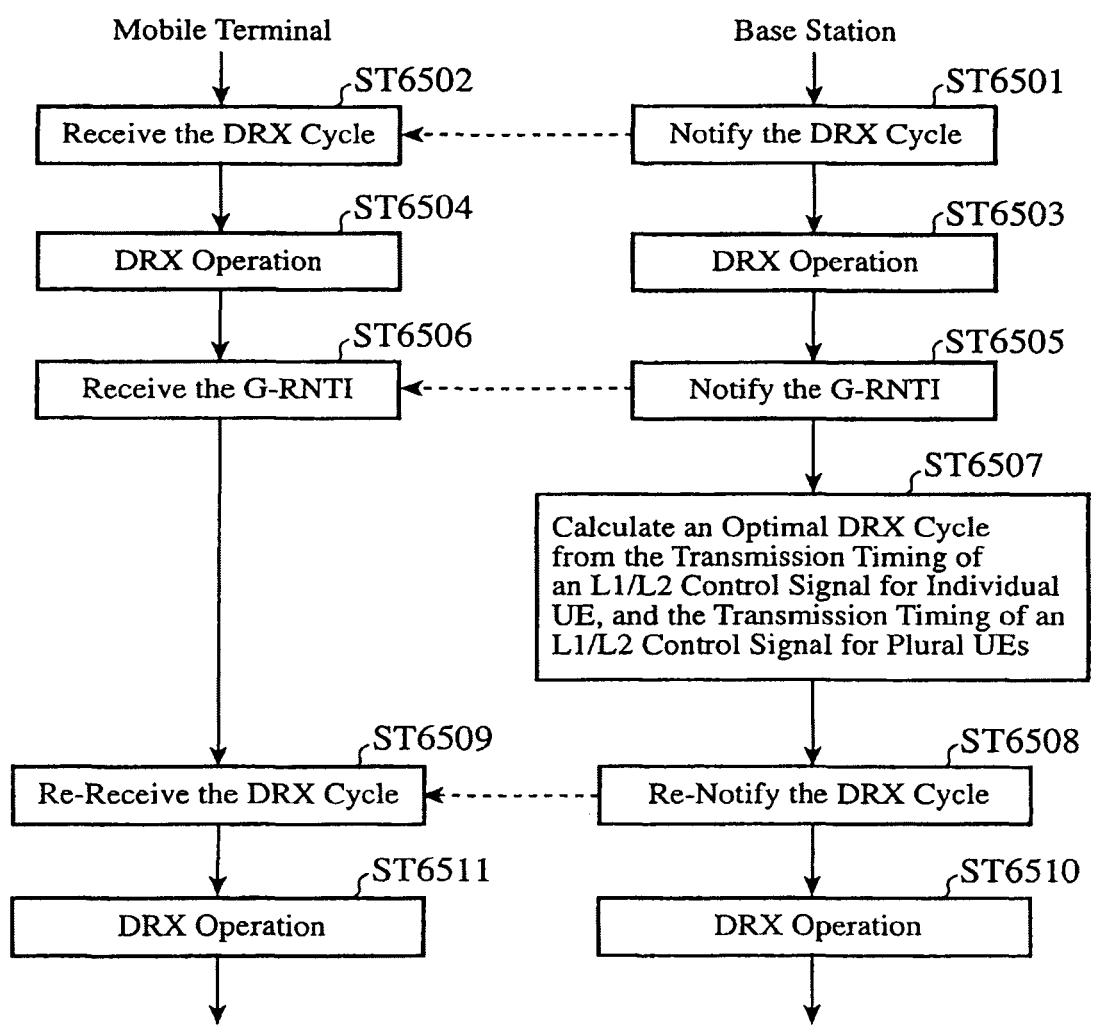

FIG. 51 is a sequence diagram showing an example of the description of processing carried out by a mobile terminal and a base station in accordance with Embodiment 13 of the present invention;

FIG. 52 is a sequence diagram showing an example of the description of processing carried out by a mobile terminal and a base station in accordance with a variant 1 of Embodiment 13 of the present invention;

FIG. 53 is an explanatory drawing showing an example of a DRX operation method in a mobile communications system for explaining a problem shown in Embodiment 14 of the present invention;

FIG. 54 is an explanatory drawing showing an example of the DRX operation method in the mobile communications system in accordance with Embodiment 14 of the present invention; and FIG. 55 is a sequence diagram showing an example of the description of processing carried out by a mobile terminal and a base station in accordance with Embodiment 14 of the present invention.

PREFERRED EMBODIMENTS OF THE INVENTION

Hereafter, in order to explain this invention in greater detail, the preferred embodiments of the present invention will be described with reference to the accompanying drawings.

An LTE system will be explained hereafter. The present invention can be applied to a mobile communications system (e.g., a UTRAN system) in which uplink and downlink schedulers control and specify a transmission rate, transmission power (permitted transmission power and maximum permitted transmission power), a transmission timing, an available frequency, the width of the available frequency, and so on for each mobile terminal.

Embodiment 1

Figure 1:
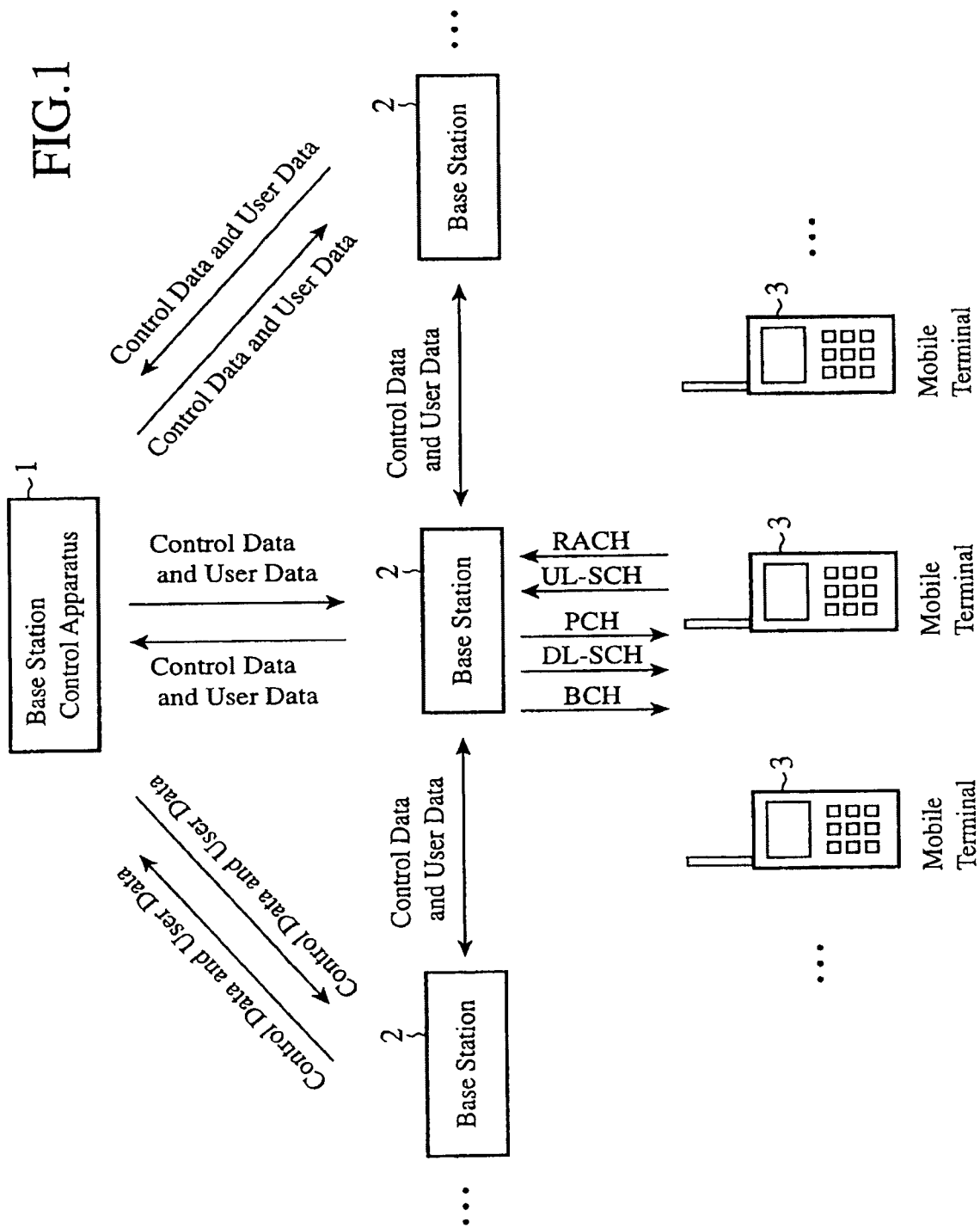
FIG. 1 is a block diagram showing a mobile communications system in accordance with Embodiment 1 of the present invention.

FIG. 1 is a block diagram showing a mobile communications system in accordance with Embodiment 1 of the present invention.

The mobile communications system of FIG. 1 is an LTE system, and an uplink scheduler and a downlink scheduler of a base station controls the transmission rate, the transmission power (the permitted transmission power and the maximum permitted transmission power), the transmission timing, the available frequency, the width of the available frequency, and so on of each of a plurality of mobile terminals.

Transport channels (Transport Channels) via which a mobile terminal and a base station communicate with each other in the mobile communications system of FIG. 1 will be further explained. Although it can be considered that the names and definitions of the transport channels will be changed from now on because the transport channels have been under debate, it cannot be overemphasized that the present invention can be applied to even a case in which the names and definitions of the transport channels are changed.

Figure 13:
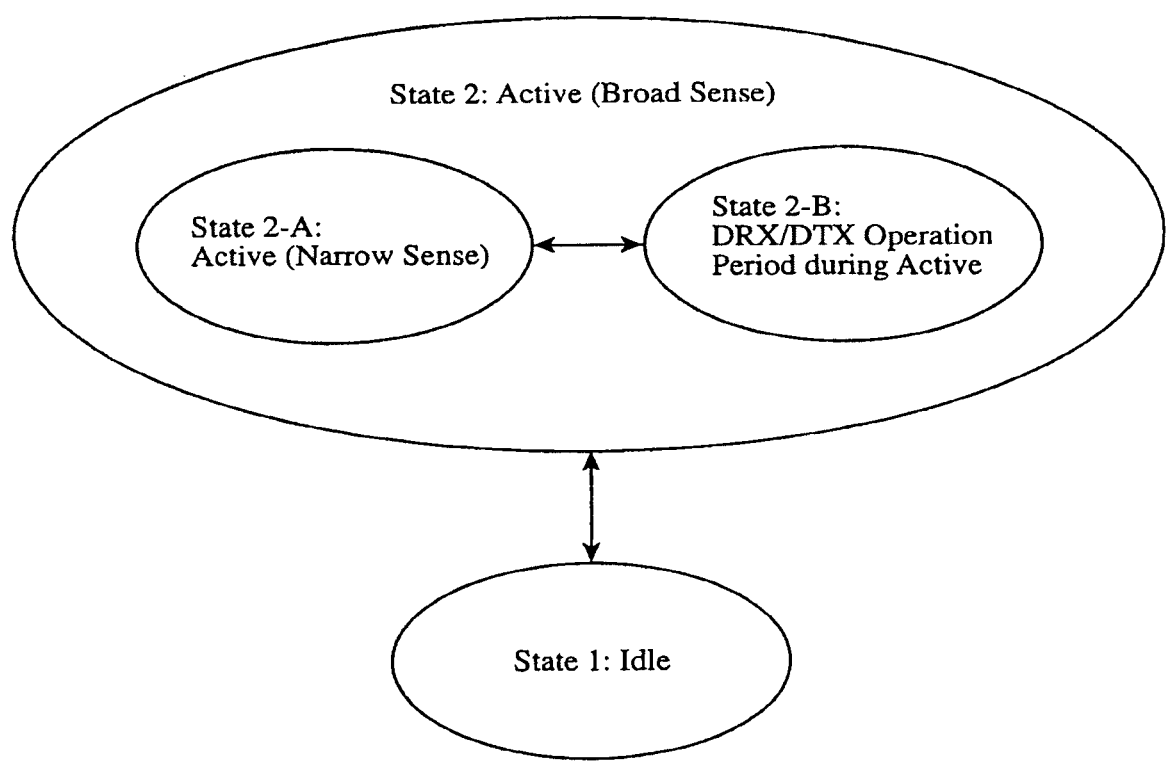
FIG. 13 is an explanatory drawing showing a state transition of the mobile communications system.
Figure 14:
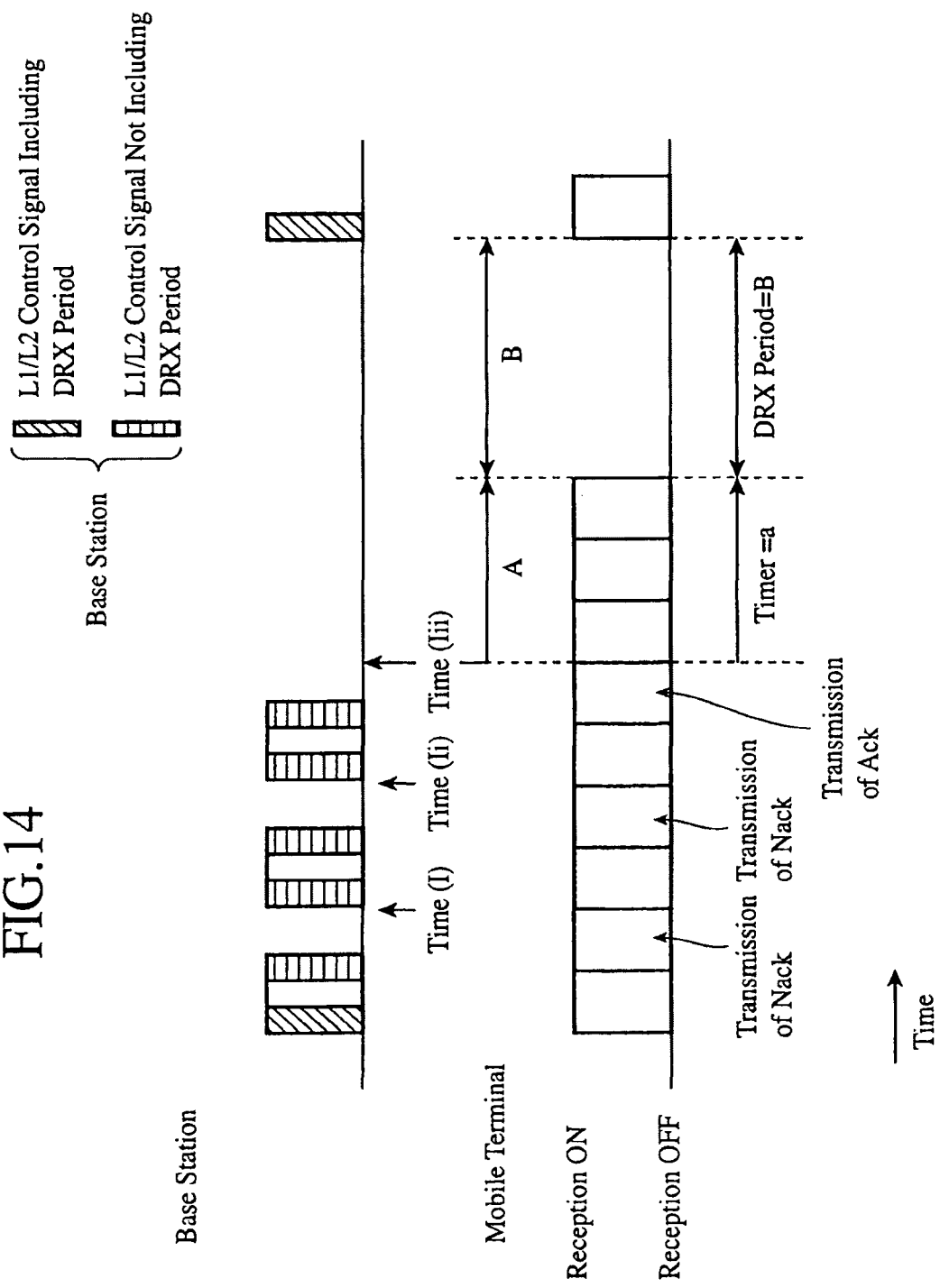
FIG. 14 is an explanatory drawing of a method of a base station notifying a DRX period to a mobile terminal, which is shown in the nonpatent reference 6.

In accordance with the present invention, a state 2-B of FIG. 13 is referred to as "DRX/DTX operation period during Active", though a time period during which a DRX operation period during Active and a DTX operation period during Active overlap each other will be explained as a DRX/DTX operation period during Active (the state 2-B of FIG. 13).

Furthermore, the DRX operation period during Active will be explained as a time period during which a receiving operation during a certain time period and an operation of not carrying out any reception during a certain time period are repeated in a DRX cycle during Active (refer to FIG. 15). There also exists a DRX operation period during Active whose number of repetitions in the DRX cycle is only one.

A time period during which no reception is carried out, the time period falling within the DRX operation period during Active, will be explained as a DRX period (DRX Period) or a DRX interval (DRX Interval) (refer to FIG. 15).

Furthermore, a portion which falls within the DRX operation period during Active, but excludes the DRX period will be explained as Active within the DRX operation period (refer to FIG. 15).

As examples of the receiving operation which the mobile terminal 3 carries out in the DRX cycle during Active within the DRX operation period, the following receiving operations (1) to (8) can be considered.

(1) The mobile terminal 3's data receiving operation of checking to see whether there exist data addressed thereto by using a downlink scheduling channel;

(2) A monitor operation of monitoring a downlink L1/L2 control signal;

(3) A measurement operation (measurement of neighboring cells, measurement of a self-cell, etc.)

(4) A receiving operation of receiving user data (Traffic data);

(5) A receiving operation of receiving uplink timing information (Timing information and Timing Advance (TA));

(6) A receiving operation of receiving a downlink reference signal;

(7) A receiving operation of receiving a HARQ-compliant Ack signal/Nack signal which is a response to uplink data; and (8) A combination of the above-mentioned operations (1) to (7).

In (8), the combination of the operations (1) to (7) can be continuous or discontinuous with respect to time.

Hereafter, HARQ (Hybrid Automatic Repeat Request) will be explained.

A case in which HARQ is applied to transmission data from a base station to a mobile terminal will be explained.

When receiving data from a base station, a mobile terminal performs an error detection process on the data. When not detecting any error through the above-mentioned error detection process, the mobile terminal transmits an Ack signal, as a response signal, to the base station, whereas when detecting an error through the above-mentioned error detection process, the mobile terminal transmits a Nack signal, as a response signal, to the base station.

When receiving the Ack signal from the mobile terminal, the base station transmits new data to the mobile terminal, whereas when receiving the Nack signal from the mobile terminal, the base station retransmits the same data to the mobile terminal.

It is possible to apply HARQ to a case of transmission data from a mobile terminal to a base station, like in the above-mentioned case.

Furthermore, a DTX operation period during Active will be explained as a time period during which a transmitting operation during a certain time period and an operation of not carrying out any transmission during a certain time period are repeated in a DTX cycle during Active (refer to FIG. 15). There also exists a DTX operation period during Active whose number of repetitions in the DTX cycle is only one.

A time period during which no transmission is carried out, the time period falling within the DTX operation period during Active, will be explained as a DTX period (DTX Period) or a DTX interval (DTX Interval) (refer to FIG. 15).

Furthermore, a portion which falls within the DTX operation period during Active, but excludes the DTX period will be explained as Active within the DTX operation period (refer to FIG. 15).

As examples of the transmitting operation which the mobile terminal 3 carries out in the DTX cycle during Active within the DTX operation period, the following transmitting operations (1) to (9) can be considered.

(1) A transmitting operation of transmitting information which is used for downlink scheduling (for example, CQI);

(2) A transmitting operation of transmitting a reference signal which is used for demodulation (Demoduration) and synchronous detection (Detection);

(3) A transmitting operation of transmitting a reference signal (Sounding Reference Signal) intended for measurement of uplink channel quality;

(4) A transmitting operation of transmitting an uplink scheduling request;

(5) A transmitting operation of transmitting user data (Traffic data);

(6) A transmitting operation intended for uplink timing measurement by a base station (for example, transmission of a Soundingu Reference Signal, CQI, RACH, or the like can be considered);

(7) A transmitting operation of transmitting a HARQ-compliant Ack signal/Nack signal which is a response to downlink data;

(8) A transmitting operation of transmitting an L1/L2 control signal; and (9) A combination of the above-mentioned operations (1) to (8).

In (9), the combination of the operations (1) to (8) can be continuous or discontinuous with respect to time.

The present invention can also be applied to a case in which the definitions of the terms previously explained are changed.

For example, it can be considered that (3) when a reference signal (Sounding Reference Signal) intended for measurement of uplink channel quality is transmitted or (6) when a Sounding Reference Signal is transmitted as a transmitting operation for enabling uplink timing measurement by a base station, as the mobile terminal 3's transmitting operation of carrying out transmission in the DTX cycle, the naming is changed from the DTX cycle to a Sounding Reference Signaru transmission cycle. The present invention can also be applied to such a case.

Furthermore, for example, it can be considered that (1) when information (e.g., CQI) which is used for downlink scheduling is transmitted or (6) when CQI is transmitted as a transmitting operation for enabling uplink timing measurement by a base station, as the mobile terminal 3's transmitting operation of carrying out transmission in the DTX cycle, the naming is changed from the DTX cycle to a CQI transmission cycle. The present invention can also be applied to such a case.

Furthermore, the present invention can also be applied to a case in which the DRX operation period during Active, the DTX operation period during Active, or a period during which either the DRX operation period during Active or the DTX operation period is the state 2-B of FIG. 13.

Although the number of states and the definition of each of the states can be changed according to future debate, it cannot be overemphasized that the present invention can also be applied to a case in which the number of states and the definition of each of the states are changed.

In FIG. 1, a base station control apparatus 1 has a plurality of base stations 2 which belong thereto, and transmits and receives control data and user data to and from the plurality of base stations 2 which belong thereto. The base station control apparatus 1 is called aGW, RNC, or the like.

Each of the base stations 2 has a plurality of mobile terminals 3 which belong thereto, and carries out radio communications with the plurality of mobile terminals 3 which belong thereto. More specifically, each of the base stations 2 has uplink and downlink schedulers, and the schedulers enable transmission and reception of data between the base station 2 and a mobile terminal 3 and carries out scheduling for improvements in the throughput of an individual mobile terminal 3 and that of the whole of the mobile communications system. The scheduling means that the uplink and downlink schedulers control the transmission rate, the transmission power (the permitted transmission power and the maximum permitted transmission power), the transmission timing, the available frequency, the width of the available frequency, and so on of each of the plurality of mobile terminals, or specify and notify them to each of the plurality of mobile terminals.

The base stations also carry out control of retransmission of data (control data and user data) using HARQ (Hybrid Automatic Repeat Request) technique. Each base station 2 is called NodeB, E-UTRAN NodeB (E-NodeB, eNB), or the like.

Each mobile terminal 3 carries out radio communications with a base station 2. Each mobile terminal 3 is called a mobile station, UE (User Equipment), MS (Mobile Station), or the like.

Hereafter, a transport channel via which a base station 2 and a mobile terminal 3 communicate with each other will be explained.

A BCH (Broadcast Channel) is a channel via which a base station 2 transmits broadcast information to a mobile terminal 3 which belongs thereto.

A DL-SCH (Downlink Shared Channel) is a shared channel (Shared Channel) via which a base station 2 transmits control data and user data to a mobile terminal 3 which belongs thereto.

A PCH (Paging Channel) is a channel via which a base station 2 supports discontinuous reception (intermittent reception) which a mobile terminal 3 performs in a DRX cycle (i.e., a cycle different from the DRX cycle of the DRX/DTX operation period during Active (the state 2-B of FIG. 13)) of the mobile terminal 3 which is set up via a network.

A UL-SCH (Uplink Shared Channel) is a shared channel via which a mobile terminal 3 transmits control data and user data to a base station 2.

A RACH (Random Access Channel) is a channel via which a mobile terminal 3 transmits to a base station 2 at random.

It has been examined that a plurality of base stations 2 communicate data with one another.

Figure 2:
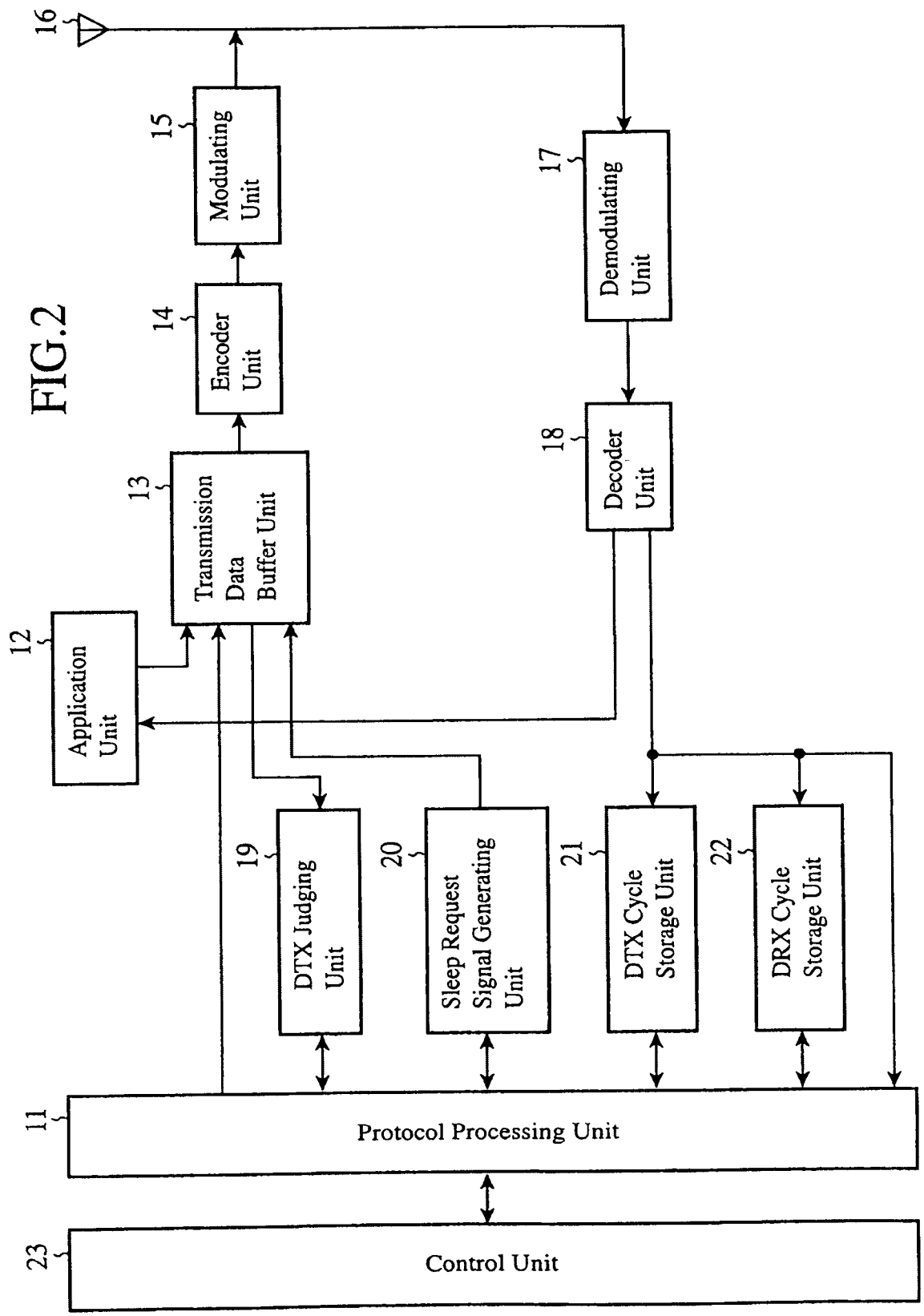
FIG. 2 is a block diagram showing a mobile terminal of the mobile communications system in accordance with Embodiment 1 of the present invention.

FIG. 2 is a block diagram showing a mobile terminal in the mobile communications system in accordance with Embodiment 1 of the present invention.

A protocol processing unit 11 outputs control data destined for either a base station 2 or a base station control apparatus 1 to a transmission data buffer unit 13, and also acquires control data transmitted from a base station 2 and performs a protocol process and so on using the control data.

An application unit 12 outputs user data to the transmission data buffer unit 13, and also acquires user data transmitted from a base station 2 and performs a process of converting the user data into data in the form which the user uses.

The transmission data buffer unit 13 is a memory or the like which temporarily stores the control data outputted from the protocol processing unit 11, and the user data outputted from the application unit 12, and which also temporarily stores, as control data, a Sleep request signal generated by a Sleep request signal generating unit 20.

An encoder unit 14 carries out an encoding process, such as an error correction process of making an error correction to the control data and the user data which are stored in the transmission data buffer unit 13.

The encoder unit 14 can alternatively output the control data and the user data which are stored in the transmission data buffer unit 13 to a modulating unit 15 without performing the encoding process on the control data and the user data.

The modulating unit 15 modulates the control data and the user data which are outputted thereto from the encoder unit 14, and carries out a process of outputting the modulated control data and the modulated user data to an antenna 16.

The antenna 16 transmits, as a radio signal, the signal which is modulated using the data by the modulating unit 15 to a base station 2, and receives a radio signal transmitted from a base station 2 and then outputs the radio signal to a demodulating unit 17.

The demodulating unit 17 carries out a demodulation process of demodulating the radio signal outputted thereto from the antenna 16, and then carries out a process of outputting the control data and the user data which the demodulating unit obtains by demodulating the radio signal to a decoder unit 18.

The decoder unit 18 carries out a decoding process, such as an error correction to the control data and the user data which the demodulating unit 17 has obtained by demodulating the radio signal, outputs the decoded control data to a protocol processing unit 11, a DTX cycle storage unit 21, and a DRX cycle storage unit 22, and carries out a process of outputting the decoded user data to the application unit 12.

More specifically, the decoder unit 18 outputs a judgment result included in the control data and obtained by the base station 2, the judgment result indicating whether or not the mobile terminal is able to make a transition to a DRX operation period during Active which is a temporary stop period during which reception of data is temporarily stopped to the protocol processing unit 11, outputs DTX cycle information (supply stop cycle information) indicating the DTX cycle which is set up by the base station 2 to the DTX cycle storage unit 21, and outputs DRX cycle information (supply stop cycle information) indicating the DRX cycle which is set up by the base station 2 to the DRX cycle storage unit 22.

The decoder unit 18 can alternatively output the control data and the user data to the protocol processing unit 11, the application unit 12, and so on without carrying out the decoding process of decoding the control data and the user data which the demodulating unit 17 has obtained by demodulating the radio signal.

A judgment result receiving means of the base station 2 is comprised of the antenna 16, the demodulating unit 17, the decoder unit 18, and the protocol processing unit 11.

A DTX judging unit 19 checks to see, for example, whether or not data to be transmitted to a base station 2 are stored in the transmission data buffer unit 13, and, when no data to be transmitted to a base station 2 are stored, judges whether or not the mobile terminal is able to make a transition to a DTX operation period during Active which is a temporary transmission stop period during which transmission of data is temporarily stopped. The DTX judging unit 19 constructs a transition judging means.

When the judgment result of the DTX judging unit 19 shows that the mobile terminal is able to make a transition to a DTX operation period during Active, the Sleep request signal generating unit 20 carries out a process of generating a Sleep request signal according to an instruction from the protocol processing unit 11, and outputting, as control data, the Sleep request signal to the transmission data buffer unit 13.

The DTX cycle storage unit 21 is a memory or the like which stores, among the control data decoded by the decoder unit 18, the DTX cycle information (supply stop cycle information) indicating the DTX cycle which is set up by the base station 2.

The DRX cycle storage unit 22 is a memory or the like which stores, among the control data decoded by the decoder unit 18, the DRX cycle information (supply stop cycle information) indicating the DRX cycle which is set up by the base station 2.

The DTX judging unit 19 can be included in the transmission data buffer unit 13. Each of the DTX judging unit 19, the Sleep request signal generating unit 20, the DTX cycle storage unit 21, and the DRX cycle storage unit 22 can be included in the protocol processing unit 11.

A control unit 23 controls all the processing units which construct the mobile terminal 3. For example, when the judgment result of the DTX judging unit 19 shows that the mobile terminal is able to make a transition to a DTX operation period during Active, and the protocol processing unit 11 acquires the judgment result of the base station 2 showing that the mobile terminal is able to make a transition to a DRX operation period during Active, the control unit 23 carries out a process of temporarily stopping the supply of electric power to data transmission processing units (e.g., the encoder unit 14 and the modulating unit 15) and data receiving processing units (e.g., the demodulating unit 17 and the decoder unit 18) according to both the DTX cycle information stored in the DTX cycle storage unit 21 and the DRX cycle information stored in the DRX cycle storage unit 22.

An electrical power supply stopping means is comprised of the DTX cycle storage unit 21, the DRX cycle storage unit 22, and the control unit 23.

In this embodiment, the example in which the control unit 23 temporarily stops the supply of the electric power to the transmission processing units and the receiving processing units is shown, though, instead of the control unit, the protocol processing unit 11 can stop the supply of the electric power to the transmission processing units and the receiving processing units temporarily.

In this Embodiment 1, although the example in which the control unit 23 temporarily stops the supply of the electric power to the encoder unit 14, the modulating unit 15, the demodulating unit 17, and the decoder unit 18 is explained, the targets for which the supply of the electric power is stopped are only an example. For example, the supply of the electric power to the protocol processing unit 11, the application unit 12, the transmission data buffer unit 13, the DTX judging unit 19, the Sleep request signal generating unit 20, the DTX cycle storage unit 21, the DRX cycle storage unit 22, and so on can be stopped temporarily.

FIG. 3 is a block diagram showing a base station of the mobile communications system in accordance with Embodiment 1 of the present invention.

An aGW communication unit 31 carries out transmission and reception of data to and from a base station control apparatus 1, and also carries out a process of outputting user data and control data which are transmitted thereto from the base station control apparatus 1 to a transmission data buffer unit 34.

An other base station communication unit 32 carry out transmission and reception of data to and from another base station 2, and also carries out a process of outputting user data and control data which are transmitted thereto from the other base station 2 to the transmission data buffer unit 34.

A protocol processing unit 33 performs delivery of information to the aGW communication unit 31 and the other base station communication unit 32, further outputs control data destined for a mobile terminal 3 to the transmission data buffer unit 34, and also acquires control data transmitted thereto from a mobile terminal 3 and carries out a protocol process and so on by using the control data.

The transmission data buffer units 34 is a memory or the like which temporarily stores the control data outputted from the protocol processing unit 33, and the user data outputted from the aGW communication unit 31 and the other base station communication unit 32.

An encoder unit 35 carries out an encoding process, such as an error correction process of making an error correction to the control data and the user data which are stored in the transmission data buffer unit 34.

The encoder unit 35 can alternatively output the control data and the user data to a modulating unit 36 without carrying out the encoding process of encoding the control data and the user data which are stored in the transmission data buffer unit 34.

The modulating unit 36 modulates the control data and the user data which are outputted thereto from the encoder unit 35, and carries out a process of outputting the modulated control data and the modulated user data to an antenna 37.

The antenna 37 transmits, as a radio signal, the data modulated by the modulating unit 36 to a mobile terminal 3, and receives a radio signal transmitted from a mobile station 3 and then outputs the radio signal to a demodulating unit 38.

The demodulating unit 38 carries out a demodulation process of demodulating the radio signal outputted thereto from the antenna 37, and then carries out a process of outputting the control data and the user data which the demodulating unit obtains by demodulating the radio signal to a decoder unit 39.

The decoder unit 39 carries out a decoding process, such as an error correction to the control data and the user data which the demodulating unit 38 has obtained by demodulating the radio signal, and carries out a process of outputting the decoded control data to the aGW communication unit 31, the other base station communication unit 32, the protocol processing unit 33, the Sleep request signal judging unit 40, a downlink scheduler unit 42, and an uplink scheduler unit 43, and outputting the decoded user data to the aGW communication unit 31 and the other base station communication unit 32.

The decoder unit 39 can alternatively output the control data and the user data to the protocol processing unit 33, the aGW communication unit 31, and so on without carrying out the decoding process of decoding the control data and the user data which the demodulating unit 38 has obtained by demodulating the radio signal.

The sleep request signal judging unit 40 judges whether or not a Sleep request signal is included in the control data outputted thereto from the decoder unit 39, and outputs the result of the judgment to the protocol processing unit 33.

When the judgment result of the Sleep request signal judging unit 40 shows that a Sleep request signal is included in the control data, the protocol processing unit 33 checks to see, for example, whether or not data to be transmitted to a mobile terminal 3 are stored in the transmission data buffer unit 34, and, when no data to be transmitted to a mobile terminal 3 are stored, judges whether or not the mobile terminal 3 is able to make a transition to a DRX operation period during Active which is a temporary data reception stop period during which the mobile terminal 3 stops reception of any data temporarily.

In this embodiment, the protocol processing unit 33 judges whether or not a mobile terminal 3 is able to make a transition to a DRX operation period during Active, and this judgment is equivalent to judgment of whether or not the base station 2 is able to make a transition to a DTX operation period during Active.

After judging that a mobile terminal 3 is able to make a transition to a DRX operation period during Active, the protocol processing unit 33 outputs, as control data, the result of the judgment to the transmission data buffer unit 34.

A QoS storage unit 41 is a memory or the like which store QoS which is quality information about the quality of a service which the base station 2 and a mobile terminal 3 which belongs to the base station transmit and receive, respectively.

The downlink scheduler unit 42 performs downlink scheduling on a mobile terminal 3 which belongs to the base station 2 according to an instruction from the protocol processing unit 33.

The uplink scheduler unit 43 performs uplink scheduling on a mobile terminal 3 which belongs to the base station 2 according to an instruction from the protocol processing unit 33.

A control unit 44 controls all the processing units which construct the base station 2.

FIG. 4 is a sequence diagram showing the description of processing carried out by the mobile communications system in accordance with Embodiment 1 of the present invention.

Next, the operation of the mobile communications system will be explained.

When a mobile terminal 3 is placed in the state 2 "Active (in a broad sense)" of FIG. 13, the DTX judging unit 19 of the mobile terminal 3 judges whether or not the mobile station is able to make a transition to a DTX operation period during Active (step ST1).

More specifically, the DTX judging unit 19 judges whether or not the mobile terminal 3 is able to perform a DTX operation during Active.

As an example of the DTX operation, there can be provided an operation of not transmitting (DTX: Discontinuous Transmission) information (e.g., CQI) which the mobile terminal 3 uses for uplink user data or downlink scheduling, a pilot signal (a signal which is used for synchronous detection compensation of uplink data, phase compensation of uplink data, etc.), and a reference signal (Sounding Reference Signal) intended for measurement of uplink channel quality.

As an alternative, the DTX operation can be an operation associated with one of the following periods (1) to (8):

(1) a period during which no information used for downlink scheduling (e.g., CQI) is transmitted;
(2) a period during which no pilot signal is transmitted;
(3) a period during which no reference signal (Sounding Reference Signal) intended for measurement of uplink channel quality is transmitted;
(4) a period during which no uplink scheduling request is transmitted;
(5) a period during which no uplink user data are transmitted;
(6) a period during which no transmission for enabling measurement of an uplink timing by a base station is carried out;
(7) a period during which no HARQ-compliant Ack signal/Nack signal for downlink data is transmitted; and
(8) a period during which no L1/L2 control signal is transmitted, or can be an operation associated with a combination of these periods.

The DTX judging unit 19 carries out the judgment of whether or not the mobile terminal is able to perform a DTX operation by, for example, checking to see whether there exist data in the transmission data buffer unit 13.

Concretely, when no data exist in the transmission data buffer unit 13, the DTX judging unit 19 determines that the mobile terminal can perform the DTX operation, whereas when data exist in the transmission data buffer unit 13, the DTX judging unit 19 determines that the mobile terminal cannot perform the DTX operation.

The DTX judging unit 19 outputs the result of the determination of whether the mobile terminal can perform the DTX operation to the protocol processing unit 11.

When the judgment result of the DTX judging unit 19 shows that the mobile terminal can perform a DTX operation, i.e., when the judgment result shows that the mobile terminal can make a transition to a DTX operation period during Active, the Sleep request signal generating unit 20 of the mobile terminal 3 generates a Sleep request signal according to an instruction from the protocol processing unit 11, and outputs, as control data, the Sleep request signal to the transmission data buffer unit 13.

In this case, the Sleep request signal is a signal having all of the following meanings (1) to (5):

(1) the mobile terminal 3 starts a DTX operation period during Active;
(2) there exist no data to be transmitted in the transmission data buffer unit 13 of the mobile terminal 3 or there exist no data to be transmitted immediately;
(3) the mobile terminal makes a request of the base station 2 to synchronize the DRX cycle and the DTX cycle in the state 2 "Active (in a broad sense)" of FIG. 13;
(4) the mobile terminal makes a request to make a transition to a DRX/DTX operation period during Active (the state 2-B of FIG. 13); and
(5) the mobile terminal makes a request to start a DRX operation period during Active, one of the meanings (1) to (5), or a combination of some of the meanings.

As an alternative, the Sleep request signal can be a signal which is notified and transmitted to the base station 2, the signal having all of the above-mentioned (1) to (5), a combination of some of the meanings, or either one of the meanings (1) to (5).

When the Sleep request signal generating unit 20 stores the control data (the Sleep request signal) in the transmission data buffer unit 13, the encoder unit 14 of the mobile terminal 3 carries out an encoding process of encoding the control data (the Sleep request signal) stored in the transmission data buffer unit 13.

After the encoder unit 14 carries out the encoding process, the modulating unit 15 of the mobile terminal 3 modulates the control data (the Sleep request signal) on which the encoding process has been performed, and then outputs the modulated control data (the Sleep request signal) to the antenna 16.

The antenna 16 of the mobile terminal 3 transmits, as a radio signal, the signal which the modulating unit 15 has modulated with the control data (the Sleep request signal) to the base station 2 (step ST2).

The example in which the mobile terminal 3 transmits, as a radio signal, the control data (the Sleep request signal) to the base station 2 is shown, though the mobile terminal can alternatively use, as the method of notifying the Sleep request signal, a method of mapping the Sleep request signal onto a physical channel, a method of mapping the Sleep request signal onto a MAC header or the like as a MAC signaling, or the like.

When receiving the radio signal transmitted thereto from the mobile terminal 3, the antenna 37 of the base station 2 outputs the radio signal to the demodulating unit 38 (step ST3).

When receiving the radio signal from the antenna 37, the demodulating unit 38 of the base station 2 performs a demodulation process on the radio signal and then outputs the demodulated control data (the Sleep request signal) to the decoder unit 39.

The decoder unit 39 of the base station 2 performs a decoding process on the control data (the Sleep request signal) which are demodulated by the demodulating unit 38, and outputs the decoded control data (the Sleep request signal) to both the protocol processing unit 33 and the Sleep request signal judging unit 40.

When receiving the control data from the decoder unit 39, the Sleep request signal judging unit 40 of the base station 2 judges whether or not a Sleep request signal is included in the control data and then outputs the result of the judgment to the protocol processing unit 33.

When receiving the judgment result indicating that a Sleep request signal is included in the control data from the Sleep request signal judging unit 40, the protocol processing unit 33 of the base station 2 judges whether or not the mobile terminal 3 is performing a DRX operation currently (step ST4), and, when the mobile terminal 3 is performing a DRX operation currently, shifts to a process of step ST6. As an alternative, the protocol processing unit 33, in step ST4, can judge whether or not the mobile terminal 3 is staying during a DRX operation period. The process of step ST4 is optional and is not an indispensable process.

When the mobile terminal 3 is not performing a DRX operation currently, the protocol processing unit 33 of the base station 2 judges whether or not the mobile terminal 3 is able to perform a DRX operation during Active (in a broad sense) (step ST5). In this example, the protocol processing unit 33 performs the judging process. As an alternative, either the downlink scheduler unit 42 or the uplink scheduler unit 43 can perform the judging process. The protocol processing unit 33, in step ST5, can alternatively judge whether or not the mobile terminal 3 is able to make a transition to a DRX operation period.

A DRX operation during Active (in a broad sense) means that the mobile terminal 3 does not perform any reception of control data and user data during a certain time period.

More particularly, a DRX operation during Active means that the mobile terminal receives a monitor signal which is specified by a specified DRX cycle, and performs a receiving operation succeedingly when there exist data destined for the mobile station itself, whereas when there exist no data destined for the mobile station itself, the mobile terminal stops the reception of the specified monitor signal.

It can also be considered that using a specified timer, the mobile terminal restores from an operation during a DRX operation period during Active (in a broad sense) to a general receiving operation.

The details of the description of the process of step ST5 by the protocol processing unit 33 will be mentioned below with reference to a flow chart of FIG. 5.

When the protocol processing unit 33, in this step ST5, judges that the mobile terminal cannot perform a DRX operation, the protocol processing unit 33 can repeat the judgment of step ST5 at certain time intervals by using a timer or the like.

When judging that the mobile terminal 3 can perform a DRX operation during Active (in a broad sense), the protocol processing unit 33 of the base station 2 changes the state of the base station 2 to a DRX/DTX operation period during Active (the state 2-B of FIG. 13) (step ST6).

When the protocol processing unit 33 judges whether or not the mobile terminal 3 can perform the DRX operation during Active (broad sense) in the above-mentioned way, i.e., when the protocol processing unit 33 judges whether or not the mobile terminal is able to make a transition to a DRX operation period during Active, the protocol processing unit 33 outputs, as control data, the result of the judgment to the transmission data buffer unit 34.

When the protocol processing unit 33 stores the control data (the judgment result) in the transmission data buffer unit 34, the encoder unit 35 of the base station 2 carries out an encoding process of encoding the control data (the judgment result) stored in the transmission data buffer unit 34.

After the encoder unit 35 performs the encoding process, the modulating unit 36 of the base station 2 modulates the control data (the judgment result) on which the encoding process has been performed, and outputs the modulated control data (the judgment result) to the antenna 37.

The antenna 37 of the base station 2 transmits, as a radio signal (a judgment result signal (information), a transition notification signal (information), or a shift notification signal (information)), the signal which the modulating unit 36 has modulated with the control data (the judgment result) to the mobile terminal 3 (step ST7).

In this example, after processing step ST6, the base station processes step ST7, as previously mentioned, though the base station can alternatively process step ST7 at the same time when the base station processes step ST6, or can process step ST7 before processing step ST6.

Furthermore, in this example, the base station 2 transmits the control data (the judgment result), as a radio signal, to the mobile terminal 3, as previously mentioned, though the base station can alternatively use, as the method of notifying the judgment result, a method of mapping the judgment result onto a physical channel, a method of mapping the judgment result onto a MAC header or the like as a MAC signaling, or the like.

In the process of step ST2, when the Sleep request signal is transmitted by using a channel (a transport channel or a physical channel) in which a response signal (an ACK signal/NACK signal) from the base station 2 to the mobile terminal 3 exists, i.e., when the Sleep request signal is transmitted from the mobile terminal 3 to the base station 2 by using a channel (a transport channel or a physical channel) which is supported by high-speed retransmission control with HARQ technique, the response signal (the ACK signal/NACK signal) can be transmitted together with the control data (the judgment result).

This case has an advantage of eliminating the necessity to perform further downlink scheduling and being able to notify the control data (the judgment result) with a shorter delay (Delay) as compared with the case in which the control data (the judgment result) are transmitted by using another channel (e.g., a DL-SCH).

When receiving the radio signal transmitted thereto from the base station 2, the antenna 16 of the mobile terminal 3 outputs the radio signal to the demodulating unit 17 (step ST8).

When receiving the radio signal from the antenna 16, the demodulating unit 17 of the mobile terminal 3 performs a demodulation process on the radio signal, and then outputs the control data (the judgment result) which the demodulating unit has obtained by demodulating the radio signal to the decoder unit 18.

The decoder unit 18 of the mobile terminal 3 performs a decoding process on the control data (the judgment result) which the demodulating unit 17 has obtained by demodulating the radio signal, and outputs the decoded control data (the judgment result) to the protocol processing unit 11.

The control unit 23 of the mobile terminal 3 judges whether to cause the state of the mobile terminal 3 to make a transition to a DRX/DTX operation period during Active (the state 2-B of FIG. 13) (step ST9).

When, in the process of step ST1, the judgment result of the DTX judging unit 19 shows that the mobile terminal can make a transition to a DTX operation period during Active, and the protocol processing unit 11 acquires the control data (the judgment result) of the base station 2 indicating that the mobile terminal can make a transition to a DRX operation period during Active, the control unit 23 of the mobile terminal 3 determines to cause the state of the mobile terminal 3 to make a transition to a DRX/DTX operation period during Active (the state 2-B of FIG. 13), and then causes the state of the mobile terminal 3 to make a transition to a DRX/DTX operation period during Active (the state 2-B of FIG. 13) (step ST10).

After the control unit 23 of the mobile terminal 3 causes the state of the mobile terminal 3 to make a transition to a DRX/DTX operation period during Active (the state 2-B of FIG. 13), the control unit 23 causes the mobile terminal to perform a DRX operation and a DTX operation (step ST11).

More specifically, the control unit 23 temporarily stops the supply of the electric power to the data transmission processing units (e.g., the encoder unit 14 and the modulating unit 15) in the cycle indicated by the DTX cycle information stored in the DTX cycle storage unit 21.

Furthermore, the control unit 23 temporarily stops the supply of the electric power to the data reception processing units (e.g., the demodulating unit 17 and the decoder unit 18) in the cycle indicated by the DRX cycle information stored in the DRX cycle storage unit 22.

As an alternative, during a period during which the period during which the supply of the electric power can be stopped temporarily according to the DTX cycle information and the period during which the supply of the electric power can be stopped temporarily according to the DRX cycle information overlap each other, the control unit temporarily stops the supply of the electric power to the data transmission processing units and the data reception processing units.

In this embodiment, although the example in which the control unit 23 temporarily stops the supply of the electric power to the encoder unit 14, the modulating unit 15, the demodulating unit 17, and the decoder unit 18 is explained, the targets for which the supply of the electric power is stopped are only an example. For example, the supply of the electric power to the protocol processing unit 11, the application unit 12, the transmission data buffer unit 13, the DTX judging unit 19, the Sleep request signal generating unit 20, the DTX cycle storage unit 21, the DRX cycle storage unit 22, and so on can be stopped temporarily.

If, in the process of step ST1, the protocol processing unit 11 acquires the control data (the judgment result) of the base station 2 indicating that the mobile terminal cannot make a transition to a DRX operation period during Active (or the protocol processing unit does not acquire the judgment result indicating that the mobile terminal can make a transition to a DRX operation period during Active) even if the judgment result of the DTX judging unit 19 shows that the mobile terminal can make a transition to a DTX operation period during Active, the control unit 23 of the mobile terminal 3 performs only a DTX operation without causing the state of the mobile terminal 3 to make a transition to a DRX/DTX operation period during Active (the state 2-B of FIG. 13) (step ST12).

More specifically, the control unit 23 does not stop the supply of the electric power to the data reception processing units (e.g., the demodulating unit 17 and the decoder unit 18), but temporarily stops the supply of electric power to the data transmission processing units (e.g., the encoder unit 14 and the modulating unit 15) in the cycle indicated by the DTX cycle information stored in the DTX cycle storage unit 21.

As an alternative, because the control unit 23 cannot temporarily stop the supply of the electric power to the reception processing units, the control unit 23 does not have to perform the process of temporarily stopping the supply of the electric power to the transmission processing units.

Hereafter, the description of the process of step ST5 carried out by the protocol processing unit 33 will be explained in detail.

FIG. 5 is a flow chart showing the description of the process of step ST5 carried out by the protocol processing unit 33.

The protocol processing unit 33 of the base station 2 checks to see whether or not waiting data to be transmitted to a mobile terminal 3 which belongs thereto are stored in the transmission data buffer unit 34 (step ST21).

In this example, the protocol processing unit 33 checks to see whether there exist data to be transmitted, as mentioned above, though the downlink scheduler unit 42 or the uplink scheduler unit 43 can alternatively check to see whether there exist data to be transmitted via the protocol processing unit 33, or can directly check to see whether there exist data to be transmitted in the transmission data buffer unit 34.

The protocol processing unit 33 of the base station 2 also checks the QoS of a service stored in the QoS storage unit 41, i.e., the QoS of the service which a mobile terminal 3 which has transmitted a "Sleep request signal" to the base station 2 receives and which the base station 2 transmits (step ST22).

In this example, the protocol processing unit 33 checks the QoS of the service, as previously mentioned, though the downlink scheduler unit 42 or the uplink scheduler unit 43 can alternatively check the QoS of the service via the protocol processing unit 33, or can directly check the QoS of the service stored in the QoS storage unit 41.

The protocol processing unit 33 of the base station 2 further checks the information (e.g., CQI) which is used for the downlink scheduling of the mobile terminal 3 which belongs thereto which the downlink scheduler unit 42 grasps (step ST23).

In this example, the protocol processing unit 33 checks the information which is used for the downlink scheduling of the mobile terminal 3, as previously mentioned, though the uplink scheduler unit 43 can alternatively check the information which is used for the downlink scheduling via the protocol processing unit 33, or can directly check the information which is used for the downlink scheduling which the downlink scheduler unit 42 grasps.

The protocol processing unit 33 of the base station 2 also checks the load of the scheduling on the downlink scheduler unit 42 (step ST24).

In this example, the protocol processing unit 33 checks the load on the downlink scheduler unit 42, as previously mentioned, though the uplink scheduler unit 43 can alternatively check the load on the downlink scheduler unit 42 via the protocol processing unit 33, or can directly check the load on the downlink scheduler unit 42.

The processes of steps ST21 to ST24 can be performed simultaneously, or can be performed in an arbitrary order. Furthermore, all the processes do not have to be performed.

The protocol processing unit 33 of the base station 2 judges whether or not the mobile terminal 3 in question is able to perform a DRX operation during Active (in a broad sense) on the basis of the pieces of information checked in steps ST21 to ST24 (step ST25).

Hereafter, an example of the judging process of step ST25 performed by the protocol processing unit 33 will be explained.

When, in step ST21, determining that waiting data to be transmitted to a mobile terminal 3 which has transmitted a "Sleep request signal" to the base station are stored in the transmission data buffer unit 34, the protocol processing unit 33 determines that the mobile terminal cannot carry out a DRX operation during Active (in a broad sense).

This is because if the protocol processing unit 33 determines that the mobile terminal 3 can carry out a DRX operation during Active when waiting data to be transmitted to the mobile terminal 3 which has transmitted a "Sleep request signal" to the base station are stored in the transmission data buffer unit 34, the mobile terminal 3 in question is unable to perform an operation of receiving the data stored in the transmission data buffer unit 34 during a DRX operation period.

Furthermore, when the QoS of the service stored in the QoS storage unit 41, which is checked in step ST22, i.e., the QoS of the service which the mobile terminal 3 which has transmitted a "Sleep request signal" to the base station receives and which the base station 2 transmits requires a high degree of real time nature, the protocol processing unit 33 determines that the mobile terminal cannot carry out a DRX operation during Active (in a broad sense).

This is because if the protocol processing unit 33 determines that the mobile terminal can carry out a DRX operation during Active (in a broad sense) when the QoS of the service requires a high degree of real time nature, even when, during a DRX operation period, for example, user data which require a high degree of real time nature are transmitted from a base station control apparatus, the base station cannot transmit the user data to the mobile terminal 3 and therefore cannot satisfy the QoS which is requested.

Furthermore, when the information used for the downlink scheduling (e.g., CQI) of the mobile terminal 3 which belongs thereto, which was checked in step ST23, shows bad quality, the protocol processing unit 33 determines that the mobile terminal 3 in question can carry out a DRX operation during Active (in a broad sense) even if there exist waiting data to be transmitted to the mobile terminal 3 in question in the transmission data buffer unit 34.

This is because there is a high possibility that when the CQI value shows bad quality, a receiving error occurs even though data are transmitted to the mobile terminal 3 in question at a high speed, it is preferable to achieve low power consumption in the mobile terminal 3 in question and to allocate the radio resources to another mobile terminal 3 having a good CQI value rather than to transmit data to the mobile terminal 3 in question, and therefore the throughput of the whole mobile communications system can be improved.

Furthermore, when the load on the downlink scheduling which the protocol processing unit 33 checked in step ST24 is high, the protocol processing unit 33 judges that the mobile terminal 3 which has transmitted a "Sleep request signal" to the base station cannot carry out a DRX operation during Active (in a broad sense).

Causing the mobile terminal 3 to implement a DRX operation during Active (in a broad sense), the load becomes high as compared with the general receiving operation for the following reasons: the downlink scheduler unit 42 has to ensure a resource for every DRX cycle of the monitor signal with which the mobile terminal 3 in question checks to see whether there exist data destined for the mobile terminal itself; it is impossible to transmit data to the mobile terminal 3 which is performing a DRX operation during Active (in a broad sense); and it is necessary to judge whether or not the mobile terminal is able to make a transition to a DRX operation period during Active (in a broad sense). Therefore, the reason why when the load on the downlink scheduling is high, the protocol processing unit 33 judges that the mobile terminal which has transmitted a "Sleep request signal" to the base station cannot carry out a DRX operation during Active is because there is a case in which the downlink scheduler unit 42 cannot support a DRX operation during Active (in a broad sense) from the viewpoint of the scheduling load.

In this example, the protocol processing unit 33 judges whether the mobile station can carry out the DRX operation during Active (in a broad sense), as previously mentioned, though instead of the protocol processing unit 33, either the downlink scheduler unit 42 or the uplink scheduler unit 43 can carry out the judgment, or the downlink scheduler unit 42 and the uplink scheduler unit 43 can carry out the judgment in cooperation with each other.

The information used for the judgment can be other than the pieces of information which are checked in steps ST21 to ST24, or all the pieces of information which are checked in steps ST21 to ST24 do not have to be used.

As can be seen from the above description, in accordance with this Embodiment 1, when judging whether or not a mobile terminal 3 is able to make a transition to a DTX operation period during Active, and then judging that the mobile station 3 is able to make a transition to a DTX operation period during Active, if the base station 2 judges that the mobile station is able to make a transition to a DRX operation period during Active, the mobile terminal 3 temporarily stops the supply of the electric power to the data transmission processing units and the data reception processing units of the mobile terminal 3. Therefore, this Embodiment offers an advantage of being able to achieve low power consumption in the mobile terminal 3 efficiently.

More specifically, because, when the mobile terminal 3 is not performing a DTX operation during Active (in a broad sense) (when the mobile terminal is performing a transmitting operation), the electric power source of the transmission processing units (a portion used for only radio communications) of the mobile terminal 3 is turned on, effective low power consumption cannot be achieved even if the mobile terminal performs a DRX operation.

However, by notifying a "Sleep request signal" which the mobile terminal 3 generates on the basis of the information which only the mobile terminal 3 can know (e.g., information indicating whether there exist data in the transmission data buffer unit 13 of the mobile terminal 3) to the base station 2, the base station 2 can perform a DRX operation more positively and simultaneously in synchronization with a DTX operation.

Thereby, low power consumption can be achieved more effectively in the mobile terminal 3. As a result, the standby time and the duration of call, and so on of the mobile terminal 3 can be lengthened.

In this Embodiment 1, the example in which the mobile terminal 3 transmits a "Sleep request signal" to the base station 2 is shown. As an alternative, in a case in which the mobile terminal 3 does not make any Sleep request, the mobile terminal 3 can transmit a "Sleep non-request signal" to the base station 2.

Figure 16:
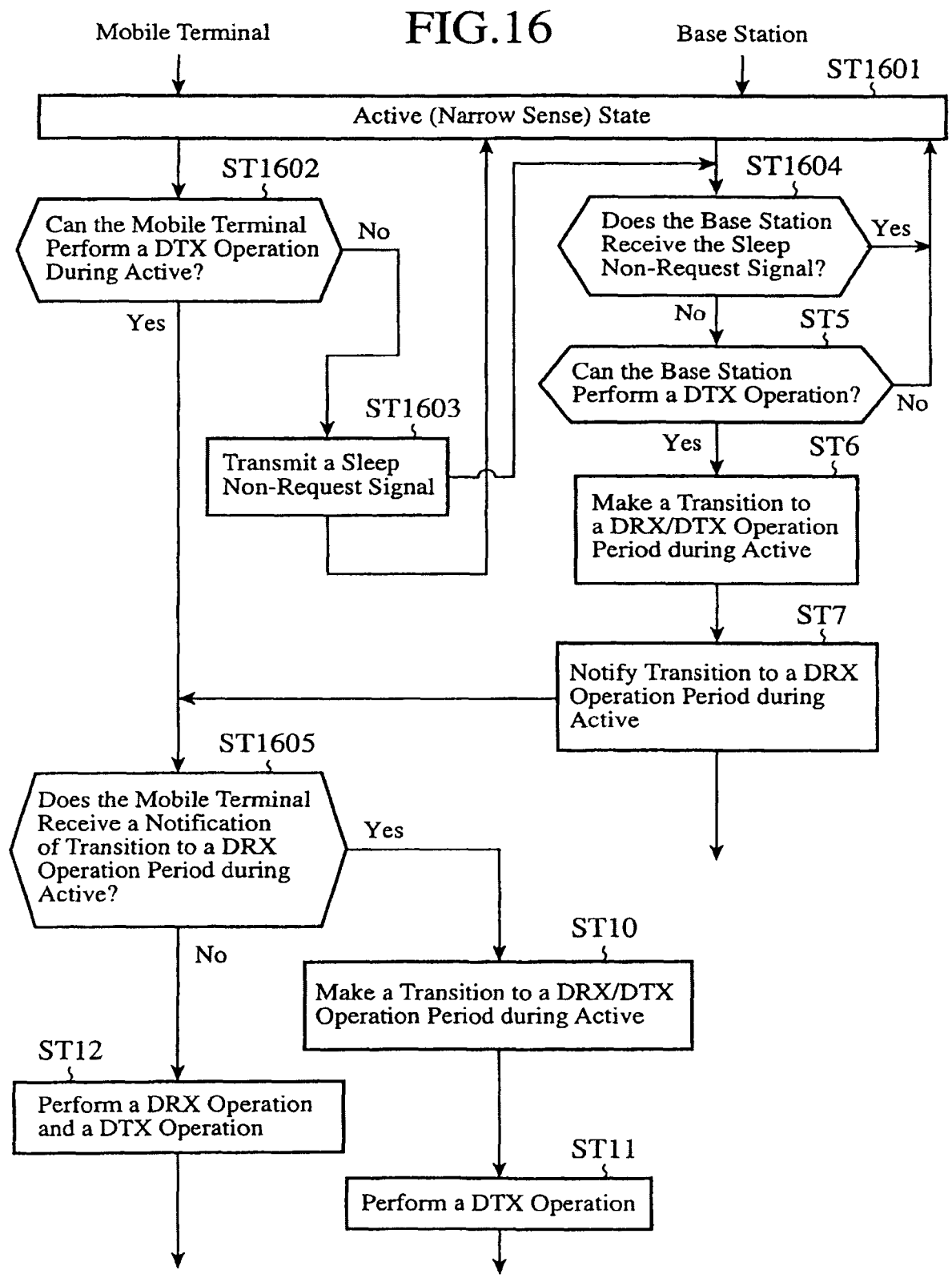
FIG. 16 is a sequence diagram showing the description of the processing carried out by the mobile communications system in accordance with Embodiment 1 of the present invention.

Hereafter, an example of the operation at the time of using a "Sleep non-request signal" will be explained with reference to FIG. 16.

In the steps designated by the same reference characters as those shown in FIG. 4, the same processes as those explained with reference to FIG. 4 are carried out and the explanation of these processes will be omitted hereafter.

Hereafter, a case in which the mobile terminal and the base station are placed in a state 2-A "Active (in a narrow sense)" of FIG. 13 will be considered (step ST1601).

When the mobile terminal 3 is placed in a state 2 "Active (in a narrow sense)" of FIG. 13, the DTX judging unit 19 of the mobile terminal 3 judges whether or not the mobile terminal is able to make a transition to a DTX operation period during Active (step ST1602).

More specifically, the DTX judging unit 19 judges whether or not the mobile terminal 3 is able to perform a DTX operation during Active.

Hereafter, as examples of a DTX operation, an operation of not transmitting (DTX: Discontinuous Transmission) information which the mobile terminal 3 uses for uplink user data or downlink scheduling (for example, CQI), a pilot signal (a signal which is used for synchronous detection compensation of uplink data, phase compensation of uplink data, and so on), and a reference signal (Sounding Reference Signal) intended for measurement of the uplink channel quality will be explained.

The DTX judging unit 19 carries out the judgment of whether or not the mobile terminal is able to perform a DTX operation by, for example, checking to see whether there exist data in the transmission data buffer unit 13.

Concretely, when there exist no data in the transmission data buffer unit 13, the DTX judging unit 19 judges that the mobile terminal can perform a DTX operation, whereas when there exist data in the transmission data buffer unit 13, the DTX judging unit 19 judges that the mobile terminal cannot perform a DTX operation.

The DTX judging unit 19 outputs the result of the judgment of whether or not the mobile terminal is able to perform a DTX operation to the protocol processing unit 11.

When the judgment result of the DTX judging unit 19 shows that the mobile terminal cannot perform a DTX operation, i.e., when the judgment result shows that the mobile terminal cannot make a transition to a DTX operation period during Active, the Sleep request signal generating unit 20 of the mobile terminal generates a Sleep non-request signal according to an instruction from the protocol processing unit 11, and outputs, as control data, the Sleep non-request signal to the transmission data buffer unit 13.

In this case, the Sleep non-request signal is a signal having all of the following meanings (1) to (6):

(1) the mobile terminal 3 ends a DTX operation period during Active;

(2) there exist data to be transmitted in the transmission data buffer unit 13 of the mobile terminal 3 or there exist data to be transmitted immediately;

(3) the mobile terminal notifies the amount of data in the transmission data buffer unit 13;

(4) the mobile terminal makes a request for allocation of uplink resources (scheduling);

(5) the mobile terminal makes a request to continue staying in the Active state; and (6) the mobile terminal makes a request to end a DRX operation period during Active, either one of the meanings (1) to (6), or a combination of some of the meanings.

As an alternative, the Sleep non-request signal can be a signal which is notified and transmitted to the base station 2, the signal having all of the above-mentioned (1) to (6), a combination of some of the meanings, or either one of the meanings (1) to (6).

When the Sleep request signal generating unit 20 stores the control data (the Sleep non-request signal) in the transmission data buffer unit 13, the encoder unit 14 of the mobile terminal 3 carries out an encoding process of encoding the control data (the Sleep non-request signal) stored in the transmission data buffer unit 13.

After the encoder unit 14 carries out the encoding process, the modulating unit 15 of the mobile terminal 3 modulates the control data (the Sleep non-request signal) on which the encoding process has been performed, and then outputs the modulated control data (the Sleep request signal) to the antenna 16.

The antenna 16 of the mobile terminal 3 transmits, as a radio signal, the control data which the modulating unit 15 has modulated (the Sleep non-request signal) to the base station 2 (step ST1603).

The example in which the mobile terminal 3 transmits, as a radio signal, the control data (the Sleep non-request signal) to the base station 2 is shown, though as the method of notifying the Sleep non-request signal, there can be provided, in addition to a method of mapping the signal onto a physical channel, a method of mapping the signal onto a MAC header or the like as a MAC signaling, and the like.

When receiving the radio signal transmitted thereto from the mobile terminal 3, the antenna 37 of the base station 2 outputs the radio signal to the demodulating unit 38.

When receiving the radio signal from the antenna 37, the demodulating unit 38 of the base station 2 performs a demodulation process on the radio signal and then outputs the control data (the Sleep non-request signal) which the demodulating unit has obtained by demodulating the radio signal to the decoder unit 39.

The decoder unit 39 of the base station 2 performs a decoding process on the control data (the Sleep non-request signal) which the demodulating unit 38 has obtained by demodulating the radio signal, and outputs the decoded control data (the Sleep non-request signal) to both the protocol processing unit 33 and the Sleep request signal judging unit 40.

When receiving the control data from the decoder unit 39, the Sleep request signal judging unit 40 of the base station 2 judges whether or not the Sleep non-request signal is included in the control data and then outputs the result of the judgment to the protocol processing unit 33 (step ST1604).

When receiving the judgment result indicating that the Sleep non-request signal is included in the control data from the Sleep request signal judging unit 40, the protocol processing unit 33 of the base station 2 judges that the mobile terminal 3 cannot start a DRX operation and then returns to the process of the step 1601.

In contrast, when not receiving the judgment result showing that the Sleep non-request signal is included in the control data from the Sleep request signal judging unit 40, the protocol processing unit 33 of the base station 2 judges whether or not the mobile terminal 3 is able to perform a DRX operation during Active (in a broad sense) (step ST5).

When, in this step ST5, judging that the mobile terminal is unable to perform a DRX operation, the protocol processing unit 33 can carry out the judgment of step ST1604 and that of step ST5 repeatedly at certain intervals by using a timer or the like.

In this case, the protocol processing unit 33 can carry out the judgment of step ST1604 and that of step ST5 in an arbitrary order.

In contrast, when, in step ST5, judging that the mobile terminal is able to perform a DRX operation, the protocol processing unit 33 performs the processes of steps ST6 and ST7.

When receiving the radio signal from the antenna 16, the demodulating unit 17 of the mobile terminal 3 performs a demodulation process on the radio signal and then outputs the control data (the judgment result) which the demodulating unit has obtained by demodulating the radio signal to the decoder unit 18.

The decoder unit 18 of the mobile terminal 3 performs a decoding process on the control data (the judgment result) which the demodulating unit 17 has obtained by demodulating the radio signal, and then outputs the decoded control data (the judgment result) to the protocol processing unit 11.

The control unit 23 of the mobile terminal 3 judges whether the mobile terminal has received a notification indicating switching of the state of the mobile terminal 3 to a DRX/DTX operation period during Active (the state 2-B of FIG. 13) (step ST1605).

When the control unit 23, in step ST1605, judges that the mobile terminal has received a notification indicating switching to a DRX/DTX operation period during Active, the control unit performs the processes of steps ST10 and ST11.

In contrast, when, in step ST1605, the control unit 23 does not judge that the mobile terminal has received a notification indicating switching to a DRX/DTX operation period during Active, the control unit performs the process of step ST12.

In this Embodiment 1, the example in which a base station 2 transmits a judgment result indicating whether or not a mobile terminal 3 is able to make a transition to a DRX operation period during Active to the mobile terminal 3 is shown. As an alternative, when the base station 2 judges that the mobile terminal can make a transition to a DRX operation period during Active, the base station can transmit a transition instruction for making a transition to a DRX/DTX operation period during Active (the state 2-B of FIG. 13) to the mobile terminal 3 so as to cause the mobile terminal 3 to make a transition to a DRX/DTX operation period during Active (the state 2-B of FIG. 13) according to the transition instruction from the base station 2.

Embodiment 2

FIG. 6 is a sequence diagram showing the description of processing carried out by a mobile communications system in accordance with Embodiment 2 of the present invention. Hereafter, the description of the processing carried out by the mobile communications system will be explained.

When judging that a mobile terminal 3 is able to perform a DRX operation during Active (in a broad sense) in the same way as that mentioned in Embodiment 1, a protocol processing unit 33 of a base station 2, when performing a DRX operation during Active (in a broad sense), determines both a DRX cycle used for the DRX operation during Active (in a broad sense) and a DTX cycle used for the DTX operation during Active (in broad sense) which are most suitable for reduction in the power consumption of the mobile terminal 3 (step ST31).

In this case, the most suitable DRX cycle and DTX cycle are the ones which lengthen a time period during which the electric power supply of the transmission processing units and the reception processing units of the mobile terminal 3 (a portion used for only radio communications) can be turned off as much as possible (i.e., which lengthen the time period within the limits of an optimal time period).

As concrete examples, a case in which the most suitable DRX cycle and DTX cycle are determined in such a way that they are equal to each other, a case in which the most suitable DRX cycle and DTX cycle are determined in such a way that one of them is an integer multiple of the other one and the DRX cycle and the DTX cycle are harmonic to each other, and so on can be considered. Furthermore, as other concrete examples, a case in which the DRX period and the DTX period are determined in such a way that they are equal to each other, a case in which the DRX period and the DTX period are determined in such a way that one of them is an integer multiple of the other one and the DRX period and the DTX period are harmonic to each other, and so on can be considered.

Hereafter, the case in which the DRX cycle and the DTX cycle are determined in such a way that they are equal to each other, and so on will be explained in detail, though using the same method, the DRX period and the DTX period can be determined in such a way that, for example, they are equal to each other.

Hereafter, a concrete example of the method of lengthening the time period during which the electric power supply of the portion used for only radio communications of the mobile terminal 3 can be turned off as much as possible will be explained with reference to FIG. 7.

In FIG. 7, a portion in which a period during which no transmitting operation is carried out and a period during which no receiving operation is carried out overlap each other is the time period during which the electric power supply of the portion used for only radio communications of the mobile terminal 3 can be turned off.

A pattern 1 of FIG. 7 shows an example (corresponding to Embodiment 1) in which the base station does not determine the DTX cycle and the DRX cycle in step ST31 of FIG. 6.

A pattern 2 of FIG. 7 shows an example of the case in which the base station, in step ST31 of FIG. 6, determines the DTX cycle and the DRX cycle in order to lengthen the time period during which the electric power supply of the portion used for only radio communications of the mobile terminal 3 can be turned off as much as possible.

As the DTX cycle and the DRX cycle which are determined for the pattern 2, there can be provided the following examples (1) to (3):

(1) the DTX cycle and the DRX cycle which are made to be equal to each other;

(2) the DTX cycle which is made to be an integer multiple of the DRX cycle (the DRX cycle and the DTX cycle are determined in such a way that one of them is an integer multiple of the other one); and (3) the DTX cycle which is made to be an integer divisor of the DRX cycle (the DRX cycle and the DTX cycle are determined in such a way that one of them is an integer multiple of the other one).

A pattern 3 of FIG. 7 shows an example of the case in which the base station, in step ST31 of FIG. 6, determines the DTX cycle and the DRX cycle and also determines the starting point (Starting Point) of the DTX cycle and that of the DRX cycle simultaneously in order to lengthen the time period during which the electric power supply of the portion used for only radio communications of the mobile terminal 3 can be turned off as much as possible. It is considered that making the DRX cycle and the DTX cycle be harmonic to each other includes the adjustment of the above-mentioned starting points.

At this time, the synchronization between the starting point of the DTX cycle and that of the DRX cycle is not limited to only a case in which they are made to completely coincide with each other, and a certain fixed offset can exist between them.

As the offset, there can be an offset between the uplink and downlink timings. Furthermore, it can be considered an offset which occurs when a time required for an Active period during a DRX operation period differs from a time required for an Active period during a DTX operation period.

In the case of the pattern 3, the time period during which the electric power supply of the portion used for only radio communications of the mobile terminal 3 can be turned off can be lengthened as compared with the case of the pattern 2.

Figure 17:
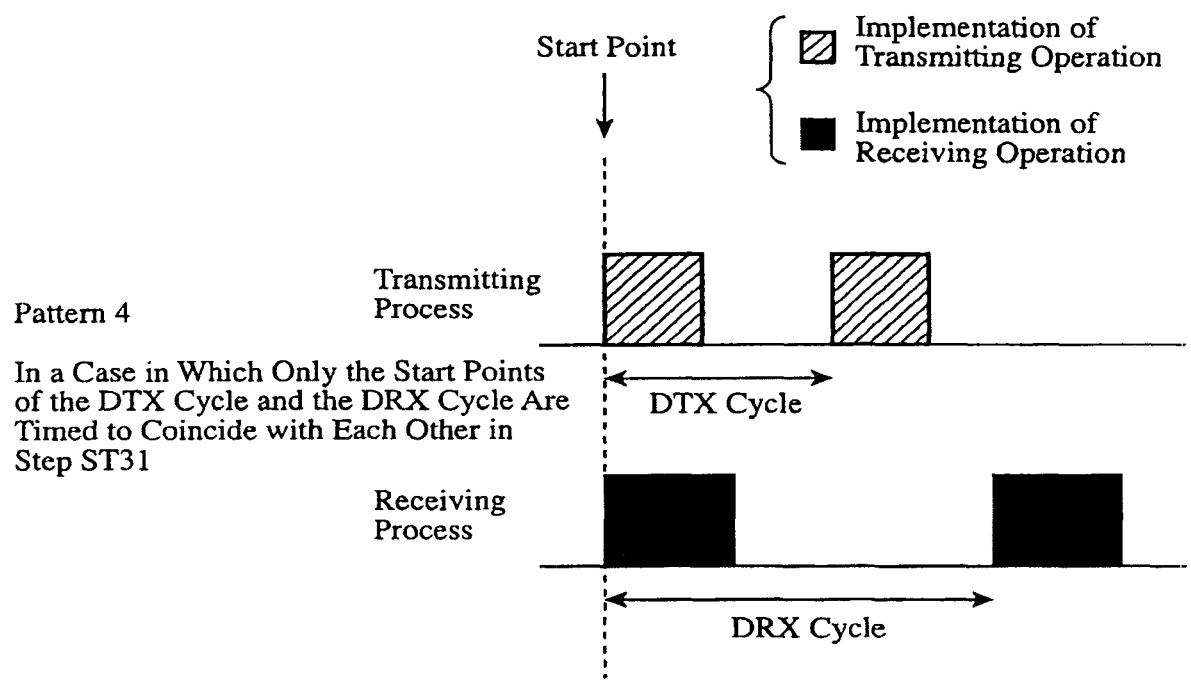
FIG. 17 is an explanatory drawing showing an example of determination of a DRX cycle and a DTX cycle.

A pattern 4 of FIG. 17 shows an example of the case in which the base station, in step ST31 of FIG. 6, achieves the synchronization between the starting point (Starting Point) of the DTX cycle and that of the DRX cycle in order to lengthen the time period during which the electric power supply of the portion used for only radio communications of the mobile terminal 3 can be turned off as much as possible. It is considered that making the DRX cycle and the DTX cycle be harmonic to each other includes the adjustment of the above-mentioned starting points.

In a case in which, for example, the DTX cycle or the DRX cycle is repeated only once, because even if the DTX cycle and the DRX cycle are determined, the determination of the DTX cycle and the DRX cycle is used only once, it is almost meaningless.

In a case in which by using the pattern 4, for example, the starting point of the DTX cycle and that of the DRX cycle are synchronized or either the DTX cycle or the DRX cycle is repeated only once, the time period during which the electric power supply of the portion used for only radio communications of the mobile terminal 3 can be turned off can be lengthened.

At this time, the synchronization between the starting point of the DTX cycle and that of the DRX cycle is not limited to only a case in which they are made to completely coincide with each other, and a certain fixed offset can exist between them.

As the offset, there can be an offset between the uplink and downlink timings. Furthermore, it can be considered an offset which occurs when a time required for an Active period during a DRX operation period differs from a time required for an Active period during a DTX operation period.

When determining the DTX cycle and the DRX cycle, the protocol processing unit 33 of the base station 2 can determine them in consideration of the pieces of information checked in steps ST21 to ST24 of FIG. 5 including "whether there exist waiting data to be transmitted to a mobile terminal 3 which belongs thereto", "QoS of service", "information which the downlink scheduler uses", and "the load of the downlink scheduler".

Furthermore, when determining the DTX cycle and the DRX cycle, the protocol processing unit 33 of the base station 2 can determine the DTX cycle which is used during Active (in a broad sense) to be infinite.

When the protocol processing unit determines the DTX cycle to be infinite, the mobile terminal 3 does not transmit any information used for downlink scheduling (e.g., CQI) during a DRX/DTX operation period during Active (in a broad sense).

Either the downlink scheduler unit 42 or the uplink scheduler unit 43 can perform the process of determining the DTX cycle and the DRX cycle, instead of protocol processing unit 33. As an alternative, the downlink scheduler unit 42 and the uplink scheduler unit 43 can perform the process of determining the DTX cycle and the DRX cycle in cooperation with each other.

In this example, before processing step ST6, the base station performs the process of step ST31, as previously mentioned, though the base station can alternatively perform the process of step ST31 at the same time when the base station performs the process of step ST6.

When determining the DTX cycle and the DRX cycle, the protocol processing unit 33 of the base station 2 causes the state of the base station 2 to make a transition to a DRX/DTX operation period during Active (the state 2-B of FIG. 13) (step ST6), like in the case of above-mentioned Embodiment 1.

Next, the protocol processing unit 33 of the base station 2 outputs, as control data, the judgment result showing whether or not the mobile terminal 3 is able to perform a DRX operation during Active (in a broad sense), i.e., the judgment result showing whether or not the mobile terminal 3 is able to make a transition to a DRX operation period during Active to the transmission data buffer unit 34. The protocol processing unit also outputs, as control data, the result (DTX cycle information and DRX cycle information) of the determination of the DTX cycle and the DRX cycle to the transmission data buffer unit 34.

It is assumed that the DTX cycle information includes an indicator indicating the DTX cycle, and so on. It is further assumed that the DRX cycle information includes an indicator indicating the DRX cycle, and so on.

When the protocol processing unit 33 stores the control data (the judgment result and the determination result) in the transmission data buffer unit 34, the encoder unit 35 of the base station 2 performs an encoding process on the control data (the judgment result and the determination result) stored in the transmission data buffer unit 34.

When the encoder unit 35 performs the encoding process, the modulating unit 36 of the base station 2 modulates the control data (the judgment result and the determination result) on which the encoding process has been performed, and then outputs the control data modulated by the modulating unit (the judgment result and the determination result) to the antenna 37.

The antenna 37 of the base station 2 transmits, as a radio signal, the signal which the modulating unit 36 has modulated with the control data (the judgment result and the determination result) to the mobile terminal 3 (step ST32).

The example in which the base station 2 transmits, as a radio signal, the signal which is modulated with the control data (the judgment result and the determination result) to the mobile terminal 3 is shown, though as the method of notifying the judgment result and the determination result, there can be provided, in addition to a method of mapping the control data onto a physical channel, a method of mapping the control data onto a MAC header or the like as a MAC signaling, and the like.

The notification of the DTX cycle and the DRX cycle can be carried out only when they are changed, or the notification of the DTX cycle and the DRX cycle can be carried out regularly regardless of whether or not they are changed.

As an alternative, the starting points (Starting Points) of the DTX cycle and the DRX cycle can be notified. Their starting points are notified with their slot numbers, frame numbers, symbol numbers, or the like.

The notification of the starting points of the DTX cycle and the DRX cycle can be carried out only when they are changed, or the notification of the starting points of the DTX cycle and the DRX cycle can be carried out regularly regardless of whether or not they are changed.

Like in the case of above-mentioned Embodiment 1, in the process of step ST2, when a Sleep request signal is transmitted by using a channel (a transport channel or a physical channel) in which a response signal (an ACK signal/NACK signal) from the base station 2 to the mobile terminal 3 exists, i.e., when the Sleep request signal is transmitted from the mobile terminal 3 to the base station 2 by using a channel (a transport channel and a physical channel) which is supported by high-speed retransmission control with HARQ, the response signal (the ACK signal/NACK signal) can be transmitted together with the control data (the judgment result and the determination result).

This case has an advantage of eliminating the necessity to perform further downlink scheduling and being able to notify the control data (the judgment result and the determination result) with a shorter delay (Delay) as compared with the case in which the control data (the judgment result and the determination result) are transmitted by using another channel (e.g., a DL-SCH).

When receiving the radio signal transmitted thereto from the base station 2, the antenna 16 of the mobile terminal 3 outputs the radio signal to the demodulating unit 17 (step ST33).

When receiving the radio signal from the antenna 16, the demodulating unit 17 of the mobile terminal 3 performs a demodulation process on the radio signal, and then outputs the control data (the judgment result and the determination result) which the demodulating unit has obtained by demodulating the radio signal to the decoder unit 18.

The decoder unit 18 of the mobile terminal 3 performs a decoding process to the control data (the judgment result and the determination result) which the demodulating unit 17 has obtained by demodulating the radio signal, and outputs the decoded control data (the decoded judgment result) to the protocol processing unit 11. The decoder unit also outputs the decoded control data (the decoded determination result) to both the DTX cycle storage unit 21 and the DRX cycle storage unit 22.

The control unit 23 of the mobile terminal 3 judges whether to cause the state of the mobile terminal 3 to make a transition to a DRX/DTX operation period during Active (the state 2-B of FIG. 13) (step ST9).

When, in the process of step ST1, the judgment result of the DTX judging unit 19 shows that the mobile terminal can make a transition to a DTX operation period during Active, and the protocol processing unit 11 acquires the control data (the judgment result) of the base station 2 indicating that the mobile terminal can make a transition to a DRX operation period during Active, the control unit 23 of the mobile terminal 3 judges to cause the state of the mobile terminal 3 to make a transition to a DRX/DTX operation period during Active (the state 2-B of FIG. 13).

When receiving the decoded control data (the decoded DTX cycle information) from the decoder unit 18, i.e., when receiving the DTX cycle information transmitted from the base station 2, the DTX cycle storage unit 21 of the mobile terminal 3 stores the DTX cycle information (steps ST34 and ST35).

When receiving the decoded control data (the decoded DRX cycle information) from the decoder unit 18, i.e., when receiving the DRX cycle information transmitted from the base station 2, the DRX cycle storage unit 22 of the mobile terminal 3 stores the DRX cycle information (steps ST34 and ST35).

The DTX cycle storage unit 21 and the DRX cycle storage unit 22 overwrite the DTX cycle information and the DRX cycle information which are already stored therein with the DTX cycle information and the DRX cycle information which are outputted from the decoder unit 18 to store them, respectively. As an alternative, the DTX cycle storage unit 21 and the DRX cycle storage unit 22 store the DTX cycle information and the DRX cycle information which are outputted from the decoder unit separately from the DTX cycle information and the DRX cycle information which are already stored therein, respectively.

Furthermore, when receiving pieces of information showing the starting points of the DTX cycle and the DRX cycle from the decoder unit 18, the DTX cycle storage unit and the DRX cycle storage unit also store them.

When the control unit 23 of the mobile terminal 3 judges to cause the state of the mobile terminal 3 to make a transition to a DRX/DTX operation period during Active (the state 2-B of FIG. 13), the control unit 23 causes the state of the mobile terminal 3 to make a transition to a DRX/DTX operation period during Active (the state 2-B of FIG. 13) in the same way that that in accordance with above-mentioned Embodiment 1 does (step ST10).

After the control unit 23 of the mobile terminal 3 causes the state of the mobile terminal 3 to make a transition to a DRX/DTX operation period during Active (the state 2-B of FIG. 13), the control unit 23 causes the mobile terminal to perform a DRX operation and a DTX operation in the same way that that of above-mentioned Embodiment 1 does (step ST11).

More specifically, the control unit 23 temporarily stops the supply of the electric power to the data transmission processing units (e.g., the encoder unit 14 and the modulating unit 15) in the cycle indicated by the DTX cycle information stored in the DTX cycle storage unit 21.

Furthermore, the control unit 23 temporarily stops the supply of the electric power to the data reception processing units (e.g., the demodulating unit 17 and the decoder unit 18) in the cycle indicated by the DRX cycle information stored in the DRX cycle storage unit 22.

As an alternative, during a period during which the period during which the supply of the electric power can be stopped temporarily according to the DTX cycle information and the period during which the supply of the electric power can be stopped temporarily according to the DRX cycle information overlap each other, the control unit 23 can temporarily stop the supply of the electric power to the data transmission processing units and the data reception processing units.

In this embodiment, although the example in which the control unit 23 temporarily stops the supply of the electric power to the encoder unit 14, the modulating unit 15, the demodulating unit 17, and the decoder unit 18 is explained, the targets for which the supply of the electric power is stopped are only an example. For example, the supply of the electric power to the protocol processing unit 11, the application unit 12, the transmission data buffer unit 13, the DTX judging unit 19, the Sleep request signal generating unit 20, the DTX cycle storage unit 21, the DRX cycle storage unit 22, and so on can be stopped temporarily.

When, in the process of step ST1, the protocol processing unit 11 acquires the control data (the judgment result) of the base station 2 indicating that the mobile terminal is unable to make a transition to a DRX operation period during Active even if the judgment result of the DTX judging unit 19 shows that the mobile terminal is able to make a transition to a DTX operation period during Active, the control unit 23 of the mobile terminal 3 performs only a DTX operation without causing the state of the mobile terminal 3 to make a transition to a DRX/DTX operation period during Active (the state 2-B of FIG. 13) (step ST12).

More specifically, the control unit 23 does not stop the supply of the electric power to the data reception processing units (e.g., the demodulating unit 17 and the decoder unit 18), but temporarily stops the supply of the electric power to the data transmission processing units (e.g., the encoder unit 14 and the modulating unit 15) during only the period indicated by the DTX cycle information stored in the DTX cycle storage unit 21.

As an alternative, because the control unit cannot temporarily stop the supply of the electric power to the reception processing units, the control unit does not have to perform the process of temporarily stopping the supply of the electric power to the transmission processing units.

As can be seen from the above description, in accordance with this embodiment 2, a mobile station 3 is constructed in such a way as to, when receiving DTX cycle information and DRX cycle information from a base station 2, stop the supply of the electric power to the transmission processing units and the reception processing units thereof according to the DTX cycle information and the DRX cycle information. Therefore, the present embodiment offers an advantage of being able to stop the supply of the electric power to the transmission processing units and the reception processing units during only an optimal time period which is determined in consideration of the status of the mobile terminal 3 and the status of the whole mobile communications system, thereby achieving low power consumption in the mobile terminal 3 more efficiently.

More specifically, in addition to the advantages provided by above-mentioned Embodiment 1, this Embodiment 2 can offer the following advantages.

This embodiment is advantageous in that, every time when a base station judges whether or not a mobile terminal is able to make a transition to a DRX/DTX operation period during Active (in a broad sense), the base station can determine a most suitable DTX cycle and a most suitable DRX cycle in consideration of the status of the mobile terminal 3 at that time and the status of the whole mobile communications system.

In addition, the mobile terminal can carry out a transmitting operation and a receiving operation simultaneously by synchronizing the starting point of the DTX cycle and that of the DRX cycle. As a result, the time period during which the electric power supply of the portion used for only radio communications of the mobile terminal 3 can be turned off can be further lengthened.

Thereby, low power consumption can be achieved more effectively in the mobile terminal 3. As a result, the standby time and the duration of call, and so on of the mobile terminal 3 can be lengthened.

Furthermore, a case in which the DTX cycle and the DRX cycle are determined, in step ST31, by using the pattern 2 in such a way that they are equal to each other.

An example of a method of, in this case, notifying the DRX cycle and the DTX cycle from the base station to the mobile terminal and a method of applying the DRX cycle and the DTX cycle in the mobile terminal will be explained hereafter.

In that case, in step ST32, only the DTX cycle (or the DRX cycle) can be notified from the base station to the mobile terminal.

The mobile terminal which has received only the DTX cycle stores the received DTX cycle in both the DTX cycle storage unit 21 and the DRX cycle storage unit 22 (step ST35). As an alternative, the mobile terminal which has received only the DRX cycle stores the received DRX cycle in both the DTX cycle storage unit 21 and the DRX cycle storage unit 22. After that, the mobile terminal performs a DRX operation and a DTX operation in the stored equal cycles, respectively.

Thereby, the amount of the information (the cycles) which is notified from the base station to the mobile terminal can be reduced. In the viewpoint of effective use of the radio resources, this method is useful.

Furthermore, in the case in which the DRX cycle and the DTX cycle are equal to each other, the DTX cycle storage unit 21 and the DRX cycle storage unit 22 can be integrated into one storage unit. As a result, this embodiment can provide an advantage of reducing the hardware of the mobile terminal.

Furthermore, a case in which the DTX cycle and the DRX cycle are determined in step ST31 by using the pattern 2 in such a way that they are harmonic to each other (they have a fixed relationship, such as an integer multiple relationship or an integer divisor relationship in the above-mentioned pattern 2, or they have the pattern 3, the pattern 4, or the like) will be considered.

An example of a method of, in this case, notifying the DRX cycle and the DTX cycle from the base station to the mobile terminal and a method of applying the DRX cycle and the DTX cycle in the mobile terminal will be explained hereafter.

In this case, in step ST32, only the DTX cycle (or the DRX cycle) and the harmonic relationship can be notified from the base station to the mobile terminal.

The mobile terminal which has received only the DTX cycle and the harmonic relationship stores the received DTX cycle in the DTX cycle storage unit 21, and also stores the result which it has calculated based on the DTX cycle and the harmonic relationship in the DRX cycle storage unit 22 (step ST35). As an alternative, the mobile terminal which has received only the DRX cycle and the harmonic relationship stores the result which it has calculated based on the DRX cycle and the harmonic relationship in the DTX cycle storage unit 21 and also stores the received DRX cycle in the DRX cycle storage unit 22. After that, the mobile terminal performs a DRX operation and a DTX operation in the stored equal cycles, respectively.

As a result, the amount of the information (the cycles) which is notified from the base station to the mobile terminal can be reduced. In the viewpoint of effective use of the radio resources, this method is useful.

When the harmonic relationship (an integer multiple relationship, an integer divisor relationship, or a fixed relationship) has a value (static: Static) which has been agreed between the mobile terminal and the base station in advance, it is not necessary to, in step ST32, notify the harmonic relationship from the base station to the mobile terminal. As a result, the amount of the information (the harmonic relationship) which is notified from the base station to the mobile terminal can be further reduced. In the viewpoint of effective use of the radio resources, this method is useful.

Also in the case of the pattern 3 and the pattern 4, the above-mentioned reduction in the amount of information can be achieved, and an advantage of making effective use of the radio resources can be provided similarly.

Hereafter, a variant 1 will be explained.

The base station can change the method of determining the DRX cycle and the DTX cycle according to a condition. As examples of the method, there can be provided (1) a method of, only when the condition is satisfied, carrying out step ST31 to, for example, make the DRX cycle and the DTX cycle be equal to each other or make them be harmonic to each other, whereas when the condition is not satisfied, not carrying out step ST31; and (2) a method of, when the condition is satisfied, carrying out step ST31 to, for example, make the DRX cycle and the DTX cycle be harmonic to each other, whereas also when the condition is not satisfied, carrying out step ST31 to, for example, make the DRX cycle and the DTX cycle be harmonic to each other in such a way that they have a harmonic relationship different from the relationship which is established when the condition is satisfied.

Examples of the condition include "whether to maintain the uplink synchronization", "whether or not the DRX cycle (or the DTX cycle) is equal to or longer than a threshold", and "whether or not the time which has elapsed after receiving TA finally is equal to or longer than a threshold".

As an example of the variant 1, a case in which the transmitting operation which the mobile terminal 3 performs in the DTX cycle is the one which the mobile terminal performs to allow the base station to carry out measurement of the uplink timing will be considered.

When maintaining the uplink synchronization in a DRX/DTX operation period during Active, the base station has to determine the DTX cycle which satisfies the condition that the uplink synchronization is maintained.

In contrast, when not maintaining the uplink synchronization, the base station does not have to determine the DTX cycle which satisfies the condition that the uplink synchronization is maintained. Therefore, there is a merit of making the method of determining the DRX cycle and the method of determining the DTX cycle differ from each other according to whether or not the condition is satisfied.

Concretely, when maintaining the uplink synchronization in the DRX/DTX operation period during Active, the base station carries out step ST31, whereas when not maintaining the uplink synchronization in the DRX/DTX operation period during Active, the base station does not carry out step ST31. Of course, there can be a case in which, when maintaining the uplink synchronization in the DRX/DTX operation period during Active, the base station does not carry out step ST31, whereas when not maintaining the uplink synchronization in the DRX/DTX operation period during Active, the base station carries out step ST31.

As a result, when, for example, the uplink synchronization is maintained, the DRX cycle and the DTX cycle can be made to be equal to each other and their starting points are synchronized (the pattern 3), whereas when the uplink synchronization is not maintained, the DRX cycle and the DTX cycle can be made to, for example, differ from each other.

Furthermore, a case in which, in step ST32, for example, only the DRX cycle and its starting point are notified from the base station to the mobile terminal will be considered.

In this case, when maintaining the uplink synchronization, the mobile terminal stores the DRX cycle and its starting point which are notified thereto in step ST33 in the DTX cycle storage unit 21 and the DRX cycle storage unit 22, and applies them also to a DTX operation.

In contrast, when not maintaining the uplink synchronization, the mobile terminal stores the DRX cycle and its starting point which are notified thereto in step ST33 only in the DRX cycle storage unit 22, but does not apply them to a DTX operation without storing them in the DTX cycle storage unit 21. At that time, the DTX operation can be made to follow the previous contents of the DTX cycle storage unit 21.

In this way, while the amount of the information (the cycles) notified from the base station to the mobile terminal can be reduced, the determining method of determining the DRX cycle and the determining method of determining the DTX cycle can be made to differ from each other according to whether or not the condition is satisfied.

In the viewpoint of effective use of the radio resources, it is useful to reduce the amount of the information notified from the base station to the mobile terminal. In this case, a notification of information indicating whether to maintain the uplink synchronization from the base station to the mobile terminal can be made independently of the notification of the cycles. Also in this case, because the amount of information of the parameter showing whether to maintain the uplink synchronization becomes small as compared with the amount of information used for notifying the DTX cycle, this variant is useful in the viewpoint of effective use of the radio resource.

In this Embodiment 2 and the variant 1, the case in which the DRX cycle is transmitted from the base station to the mobile terminal is mentioned, though there can be a case in which the DRX cycle (or the DTX cycle) is determined beforehand. The above-mentioned example can be applied to even such a case.

Concretely, when, in step ST32, the judgment result indicating whether or not the mobile terminal is able to perform a DRX operation is notified, the mobile terminal stores the DRX cycle which is determined beforehand in the DTX cycle storage unit 21 (step ST35). After that, the mobile terminal performs a DRX operation and a DTX operation in the stored equal cycles, respectively.

The DRX cycle (or the DTX cycle) which is determined beforehand can be a value which is statically determined as a value of the mobile communications system, or can be notified semi-statically by using an L3 message or the like which is transmitted from the base station to the mobile terminal when a session of a radio bearer is started.

In this Embodiment 2 and the variant 1, the example in which the mobile terminal 3 transmits a "Sleep request signal" to the base station 2 is shown. As an alternative, when the mobile terminal 3 does not make any Sleep request, the mobile terminal 3 can transmit a "Sleep non-request signal" to the base station 2.

Figure 18:
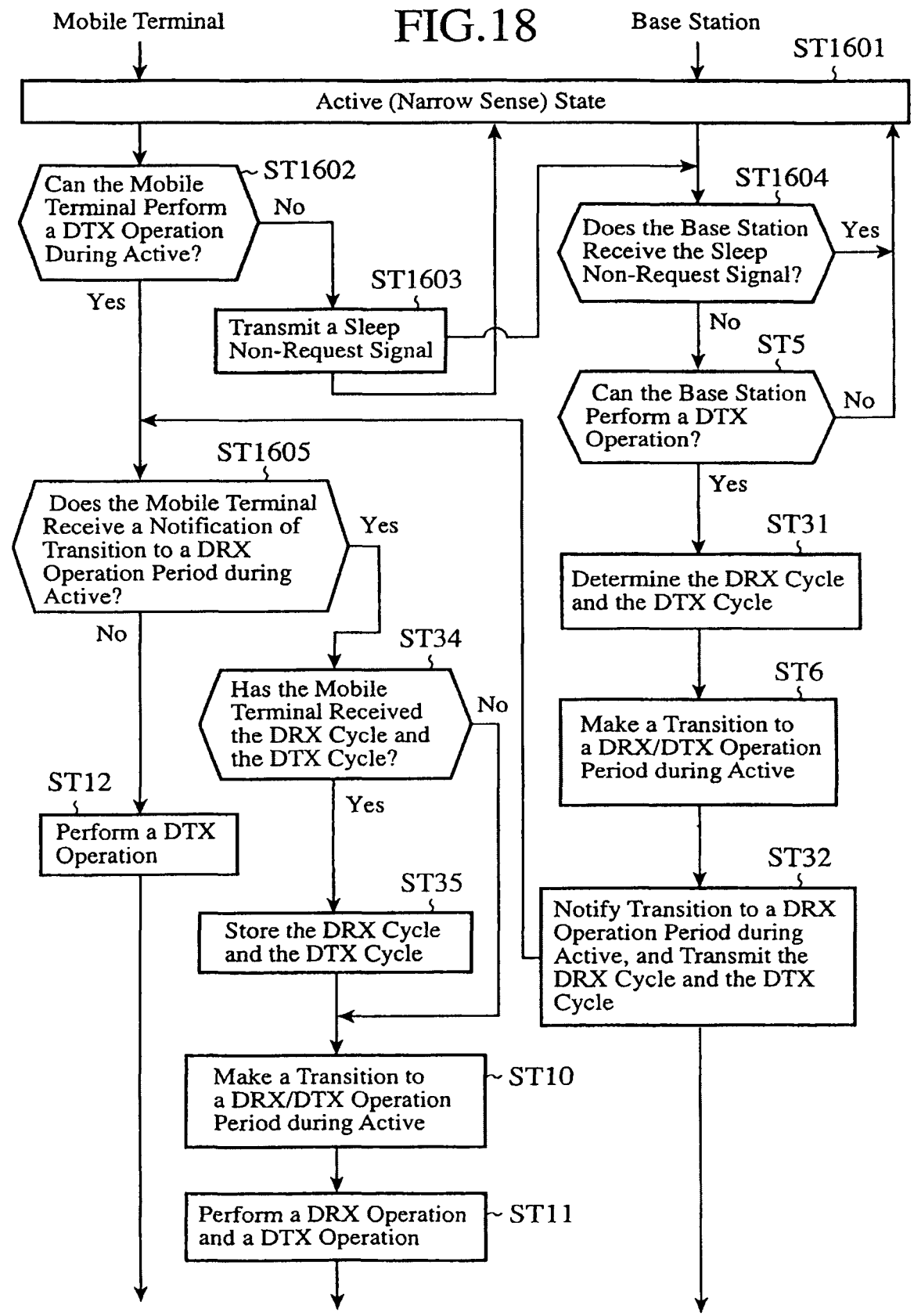
FIG. 18 is a sequence diagram showing the description of the processing carried out by the mobile communications system in accordance with Embodiment 2 of the present invention.

FIG. 18 is a sequence diagram showing the description of processing which is carried out by the mobile communications system in the case in which a "Sleep non-request signal" in accordance with Embodiment 2 of the present invention is used. Because the detailed explanation of FIG. 18 is the same as the explanation of FIG. 6, the detailed explanation of FIG. 18 will be omitted.

Furthermore, in this Embodiment 2, the example in which the base station 2 transmits the judgment result showing whether or not the mobile terminal 3 is able to make a transition to a DRX operation period during Active to the mobile terminal 3 is shown. As an alternative, when determining that the mobile terminal is able to make a transition to a DRX operation period during Active, the base station 2 can transmit a transition instruction for making a transition to a DRX/DTX operation period during Active (the state 2-B of FIG. 13) to the mobile terminal 3 so as to cause the mobile terminal 3 to make a transition a DRX/DTX operation period during Active (the state 2-B of FIG. 13) according to the transition instruction from the base station 2.

Embodiment 3

FIG. 8 is a sequence diagram showing the description of processing carried out by a mobile communications system in accordance with Embodiment 3 of the present invention.

In above-mentioned Embodiments 1 and 2, the example in which a base station 2 determines whether or not a mobile terminal 3 is able to make a transition to a DTX operation period during Active, and, when the mobile terminal is able to make a transition to a DTX operation period during Active, the mobile terminal temporarily stops the supply of the electric power to the data transmission processing units and the data reception processing units thereof if the base station 2 determines that the mobile terminal 3 is able to make a transition to a DTX operation period during Active is shown. The protocol processing unit 11 of the mobile terminal 3 can determine whether to give a higher priority to low power consumption (or can determine whether to give a higher priority to throughput), and can transmit a parameter showing the result of the determination to the base station 2.

In this case, the protocol processing unit 11 constructs a priority determining means, and the transmission data buffer unit 13, the encoder unit 14, the modulating unit 15, and the antenna 16 construct a parameter transmitting means.

More specifically, in accordance with this Embodiment 3, the parameter showing whether the mobile terminal 3 gives a higher priority to low power consumption is disposed in mobile terminal capability information (UE Capabilities) showing the capabilities of the mobile terminal 3. In this Embodiment 3, an example in which the parameter showing whether the mobile terminal 3 gives a higher priority to low power consumption is disposed will be explained, though a parameter showing whether the mobile terminal 3 gives a higher priority to throughput can be alternatively disposed.

This parameter is not a value specific to the mobile terminal 3, and can be varied according to various factors including the state of the mobile terminal 3 and the user's intention.

As an alternative, the entire mobile terminal capability information (UE Capabilities) including the parameter showing whether the mobile terminal gives a higher priority to low power consumption can be varied.

In accordance with this Embodiment 3, the mobile terminal capability information (UE Capabilities) including the above-mentioned parameter can be notified from the mobile terminal 3 to the network at a time other than a time of RRC (Radio Resource Control) connection (such as a time of attach, a time of calling, or a time of location registration).

More specifically, the mobile terminal 3 notifies the mobile terminal capability information (UE Capabilities) indicating the capabilities of the mobile terminal 3 when the mobile terminal capability information is changed. As an alternative, even when the mobile terminal capability information (UE Capabilities) is not changed, the mobile terminal can notify the mobile terminal capability information at predetermined intervals.

In the case in which the mobile terminal notifies the mobile terminal capability information (UE Capabilities) when the mobile terminal capability information is changed, the mobile terminal can notify only a changed parameter or can notify the entire mobile terminal capability information (UE Capabilities).

Hereafter, the description of the processing carried out by the mobile communications system will be explained concretely.

Every time when the mobile terminal capability information (UE Capabilities) is changed or at predetermined intervals, the protocol processing unit 11 of the mobile terminal 3 outputs, as control data, the mobile terminal capability information (UE Capabilities) including the parameter indicating whether the mobile terminal gives a higher priority to low power consumption to the transmission data buffer unit 13.

The encoder unit 14 of the mobile terminal 3 performs an encoding process on the mobile terminal capability information (UE Capabilities) which is the control data stored in the transmission data buffer unit 13.

The modulating unit 15 of the mobile terminal 3 modulates the mobile terminal capability information (UE Capabilities) which is the control data on which the encoding process has been performed by the encoder unit 14, and the antenna 16 transmits, as a radio signal, the control data modulated by the modulating unit 15 to the base station 2 (step ST41).

In this embodiment, the example in which the mobile terminal 3 transmits, as the control data, the mobile terminal capability information (UE Capabilities) including the parameter to the base station 2 is shown. As an alternative, the mobile terminal 3 can transmit only the parameter to the base station 2.

Hereafter, an example of the mobile terminal capability information (UE Capabilities) will be explained.

For example, in a case in which the mobile terminal 3 is used in a mode in which it is inserted into a card slot of a notebook personal computer, the mobile terminal 3 enters either a state of "the priority of low power consumption: low" or a state of "the priority of throughput: high".

In contrast, in a case in which the mobile terminal 3 is used in a mode of a mobile phone, the mobile terminal 3 enters either a state of "the priority of low power consumption: high" or a state of "the priority of throughput: low".

This is because, in these cases, the capacity of the battery of the notebook personal computer is large as compared with the capacity of the battery of the mobile phone.

In this Embodiment 3, the example in which the mobile terminal 3 transmits, as the control data, the mobile terminal capability information (UE Capabilities) including the parameter to the base station 2 is shown. Concrete methods of notifying the mobile terminal capability information (UE Capabilities) include a method of mapping the mobile terminal capability information onto a layer 3 message according to a protocol called RRC (Radio Resource Control), a method of mapping the mobile terminal capability information onto a physical channel, and a method of mapping the mobile terminal capability information onto a MAC header or the like as a MAC signaling.

In this case, if the mobile terminal capability information is notified at the same time when a "Sleep request signal" as shown in above-mentioned Embodiment 1 is transmitted, the mobile terminal capability information directly shows the priority of the request which the mobile terminal 3 has made to make a transition to a DRX/DTX operation period during Active (the state 2-B of FIG. 13) by using the "Sleep request signal" and is effective.

Especially, a mapping method effective for a case of mapping and notifying both the "Sleep request signal" and "the priority of low power consumption (or the priority of throughput)" onto a physical channel will be disclosed.

Conventionally (refer to the 3GPP Release6 standard TS25.309), there exists an L1 signaling (a physical channel mapping signal) which is called a "Happy Bit" mapped onto a physical channel.

The "Happy Bit" is an uplink indicator which is used to notify the base station 2 about whether or not the mobile terminal 3 is satisfied with the current "Serving Grant value"

which is provided from the uplink scheduler unit 43 of the base station 2 to the mobile terminal 3 to enable uplink data transmission.

That is, the "Happy Bit" is an indicator which is effective only at the time of uplink data transmission. In other words, because the case in which the mobile terminal 3 has made a request with the "Sleep request signal" means that the mobile terminal 3 has determined to start a DTX operation period during Active, there is no point in transmitting the "Happy Bit", but there is a point in transmitting "the priority of low power consumption (or the priority of throughput)".

On the contrary, in a case in which the mobile terminal 3 has not made any request with the "Sleep request signal", because the mobile terminal 3 has not determined to start a DTX operation period during Active, there is a point in transmitting "Happy Bit", but there is no point in transmitting "the priority of low power consumption (or the priority of throughput)".

In a case in which the "Happy Bit", the "Sleep request signal", and "the priority of low power consumption (the priority of throughput)" are mapped, as an L1 signaling, onto a physical channel without devising any method, they need three bits.

For example, when they are mapped onto a physical channel as shown in FIG. 9, the same amount of information can be notified from the mobile terminal 3 to the base station 2 by using 2 bits, and therefore it becomes possible to reduce the amount of mapping onto the physical channel by 1 bit. This is effective from the viewpoint of effective use of the radio resources.

FIG. 9 simply shows an example, and it can be assumed that any other mapping method is equivalent to the technology disclosed in this embodiment as long as the other mapping method includes the step of changing information shown by another bit between the "Happy Bit" and "the priority of low power consumption (or the priority of throughput)" according to whether or not a request with the "Sleep request signal" has been made.

When the antenna 37 receives the radio signal transmitted thereto from the mobile terminal 3, the demodulating unit 38 of the base station 2 demodulates the radio signal (step ST42).

The decoder unit 39 of the base station 2 performs a decoding process on the mobile terminal capability information (UE Capabilities) which is the control data which the demodulating unit 38 has obtained by demodulating the radio signal, and stores the decoded mobile terminal capability information (UE Capabilities) in the protocol processing unit 33 (step ST43).

The protocol processing unit 33 of base station 2 checks to see whether the mobile terminal 3 gives a higher priority to low power consumption (or whether the mobile terminal 3 gives a higher priority to the throughput) with reference to the parameter included in the mobile terminal capability information (UE Capabilities) (step ST44).

When the mobile terminal 3 gives a higher priority to low power consumption, the protocol processing unit 33 of the base station 2 performs an operation of enabling the mobile terminal to make a transition to a DRX/DTX operation period during Active (the state 2-B of FIG. 13) in order to achieve low power consumption during Active (in a broad sense) (the state 2 of FIG. 13) (step ST45).

For example, the protocol processing unit enables the sequence in FIG. 4 to allow the base station 2 to receive the Sleep request signal transmitted from the mobile terminal 3, and to judge whether or not the mobile terminal is able to make a transition to a DRX operation period during Active.

When the mobile terminal 3 does not give a higher priority to low power consumption (i.e., when the mobile terminal 3 gives a higher priority to the throughput), the protocol processing unit 33 of the base station 2 performs an operation of disabling the mobile terminal to make a transition to a DRX/DTX operation period during Active (the state 2-B of FIG. 13) without achieving low power consumption during Active (in a broad sense) (the state 2 of FIG. 13) (step ST46).

For example, the protocol processing unit does not judge whether or not the mobile terminal is able to make a transition to a DRX operation period during Active.

As can be seen from the above description, the system in accordance with this embodiment 3 is constructed in such a way as to determine whether a mobile terminal gives a higher priority to low power consumption, and transmits a parameter showing the result of the determination to a base station 2. Therefore, the present embodiment offers an advantage of providing further efficient achievement of low power consumption during Active (in a broad sense) (the state 2 of FIG. 13), and providing an optimal reduction in the power consumption of the mobile terminal 3.

Furthermore, this Embodiment 3 can offer the following advantages.

By notifying the parameter when the mobile terminal capability information (UE Capabilities) showing the capabilities of the mobile terminal 3 is changed, or by notifying the parameter in a predetermined cycle even when the mobile terminal capability information (UE Capabilities) is not changed, it is possible to notify the mobile terminal capability information (UE Capabilities) from the mobile terminal 3 to the base station 2 even if the mobile terminal 3 is during Active (the state 2 of FIG. 13). This advantage becomes more remarkable in a case of a packet communication system which is based on a continuous connection. This is because the number of RRC connections decreases due to a continuous connection, and therefore the number of timings at which the mobile terminal capability information (UE Capabilities) can be notified is few as long as a conventional technology is simply used.

Thereby, it becomes possible to notify a change in the parameter showing which achievement of low power consumption or improvement in the throughput the mobile terminal gives a higher priority from the mobile terminal 3 to the base station 2 even if the mobile terminal 3 is during Active (the state 2 of FIG. 13), and low power consumption during Active (the state 2 of FIG. 13) can be achieved more effectively. As a result, a more optimal reduction in the power consumption of the mobile terminal 3 can be achieved.

In a variant 1, the base station, in step ST44, can check to see whether the mobile terminal 3 gives a higher priority to low power consumption (or whether the mobile terminal 3 gives a higher priority to the throughput), and, when determining that the mobile terminal 3 gives a higher priority to low power consumption, in step ST45, can set the DRX cycle and the DTX cycle to be equal to or longer than a threshold X.

In contrast, when, in step ST44, determining that the mobile terminal 3 does not give a higher priority to low power consumption, the base station, in step ST46, can set the DRX cycle and the DTX cycle to be shorter than the threshold X.

The lengths of the DRX cycle and the DTX cycle affect low power consumption in the mobile terminal, and, because the period during which the electric power supply of the mobile terminal is turned off can be lengthened if the cycles are long, it becomes easy to achieve low power consumption. Therefore, this variant offers an advantage of being able to provide further efficient achievement of low power consumption during Active (in a broad sense) according to the state of the mobile terminal (the state 2 of FIG. 13), and an optimal reduction in the power consumption of the mobile terminal 3.

The variant 1 can also be implemented by separately notifying both the parameter indicating "whether the mobile terminal gives a higher priority to low power consumption", and a parameter indicating "whether the mobile terminal gives a higher priority to the DRX cycle's becoming long (whether the mobile terminal allows the DRX cycle to become long)" or "whether the mobile terminal gives a higher priority to the DTX cycle's becoming long (whether the mobile terminal allows the DTX cycle to become long)" from the mobile terminal to the base station.

In a variant 2, the base station, in step ST44, can check to see whether the mobile terminal 3 gives a higher priority to the throughput (or the mobile terminal 3 gives a higher priority to low power consumption), and, when determining that the mobile terminal 3 does not give a higher priority to the throughput, in step ST45, can allow the mobile terminal not to maintain the uplink synchronization during a DRX/DTX operation period during uplink Active.

In contrast, when, in step ST44, determining that the mobile terminal 3 gives a higher priority to the throughput, the base station can disallow the mobile terminal not to maintain the uplink synchronization during a DRX/DTX operation period during Active.

In a case in which the uplink synchronization is not maintained, when data (control data or user data) are transmitted from the mobile terminal to the base station, a procedure for establishing uplink synchronization is needed before the data transmission.

In contrast, when the uplink synchronization is maintained, such a procedure is not needed. Therefore, whether or not the uplink synchronization is maintained affects the throughput. Therefore, this variant offers an advantage of being able to provide further efficient achievement of low power consumption during Active (in a broad sense) (the state 2 of FIG. 13) according to the state of the mobile terminal, and an optimal reduction in the power consumption of the mobile terminal 3.

The variant 2 can also be implemented by separately notifying both the parameter indicating "whether the mobile terminal gives a higher priority to the throughput (or whether the mobile terminal gives a higher priority to low power consumption)" and a parameter indicating "whether the mobile terminal maintains the uplink synchronization" from the mobile terminal to the base station.

Embodiment 4

In above-mentioned Embodiment 3, the example in which a parameter showing the result of determination of whether a mobile terminal 3 gives a higher priority to low power consumption is included in the mobile terminal capability information (UE Capabilities), and the mobile terminal capability information (UE Capabilities) is transmitted to a base station 2 is shown. As an alternative, the above-mentioned parameter can be transmitted to the base station 2 separately from the mobile terminal capability information (UE Capabilities) without the above-mentioned parameter being included in the mobile terminal capability information (UE Capabilities).

Every time when the above-mentioned parameter is changed or in a predetermined cycle even when the above-mentioned parameter is not changed, the mobile terminal 3 transmits the above-mentioned parameter to the base station 2.

This Embodiment 4 offers an advantage of being able to notify the above-mentioned parameter without changing the functionality of the mobile terminal capability information (UE Capabilities).

The variants 1 and 2 of above-mentioned Embodiment 3 can also be applied to this Embodiment 4.

Embodiment 5

FIG. 10 is a sequence diagram showing the description of processing carried out by a mobile communications system in accordance with Embodiment 5 of the present invention.

In above-mentioned Embodiment 3, the example in which the protocol processing unit 11 of a mobile terminal 3 determines whether the mobile terminal gives a higher priority to low power consumption, a parameter showing the result of the determination is included in the mobile terminal capability information (UE Capabilities), and the mobile terminal capability information (UE Capabilities) is then transmitted to a base station 2 is shown. The protocol processing unit 11 of the mobile terminal 3 can determine whether the mobile terminal gives a higher priority to low power consumption with reference to the residue of a battery thereof.

Concretely, this process is carried out as follows.

First, the protocol processing unit 11 (or a control unit 23) of the mobile terminal 3 checks the battery residue (step ST51).

The protocol processing unit 11 (or the control unit 23) of the mobile terminal 3 compares the battery residue with a predetermined threshold (a lower limit of the battery residue at which the mobile terminal has to give a higher priority to low power consumption), and, when the battery residue is equal to or shorter than the predetermined threshold, determines that the mobile terminal gives a higher priority to low power consumption (i.e., determines that the mobile terminal does not give a higher priority to the throughput). In contrast, when the battery residue is greater than the predetermined threshold, the mobile terminal determines that the mobile terminal does not give a higher priority to low power consumption (i.e., determines that the mobile terminal gives a higher priority to the throughput) (step ST52).

The protocol processing unit 11 (or the control unit 23) of the mobile terminal 3 can alternatively determine whether the mobile terminal gives a higher priority to low power consumption in consideration of whether or not the battery is under charge. This is because the mobile terminal can perform the operation of giving a higher priority to the throughput without caring about the battery residue when the battery is under charge.

The predetermined threshold can be a specified value which is set up beforehand, or can be a value which is determined by a notification or calculation by an upper layer.

Because the description of the processes of steps ST41 to ST46 is the same as those of above-mentioned Embodiment 3, the explanation of the description will be omitted.

Like in the case of above-mentioned Embodiment 4, the parameter showing the result of the determination of whether the mobile terminal gives a higher priority to low power consumption can be transmitted to the base station 2 separately from the mobile terminal capability information (UE Capabilities) without the above-mentioned parameter being included in the mobile terminal capability information (UE Capabilities).

In this Embodiment 5, the example in which the mobile terminal 3 transmits the parameter showing the result of the determination of whether the mobile terminal gives a higher priority to low power consumption to the base station 2 is shown. As an alternative, the mobile terminal 3 can transmit the battery residue to the base station 2, and the base station 2 can determine whether the mobile terminal gives a higher priority to low power consumption with reference to the battery residue.

Figure 11:
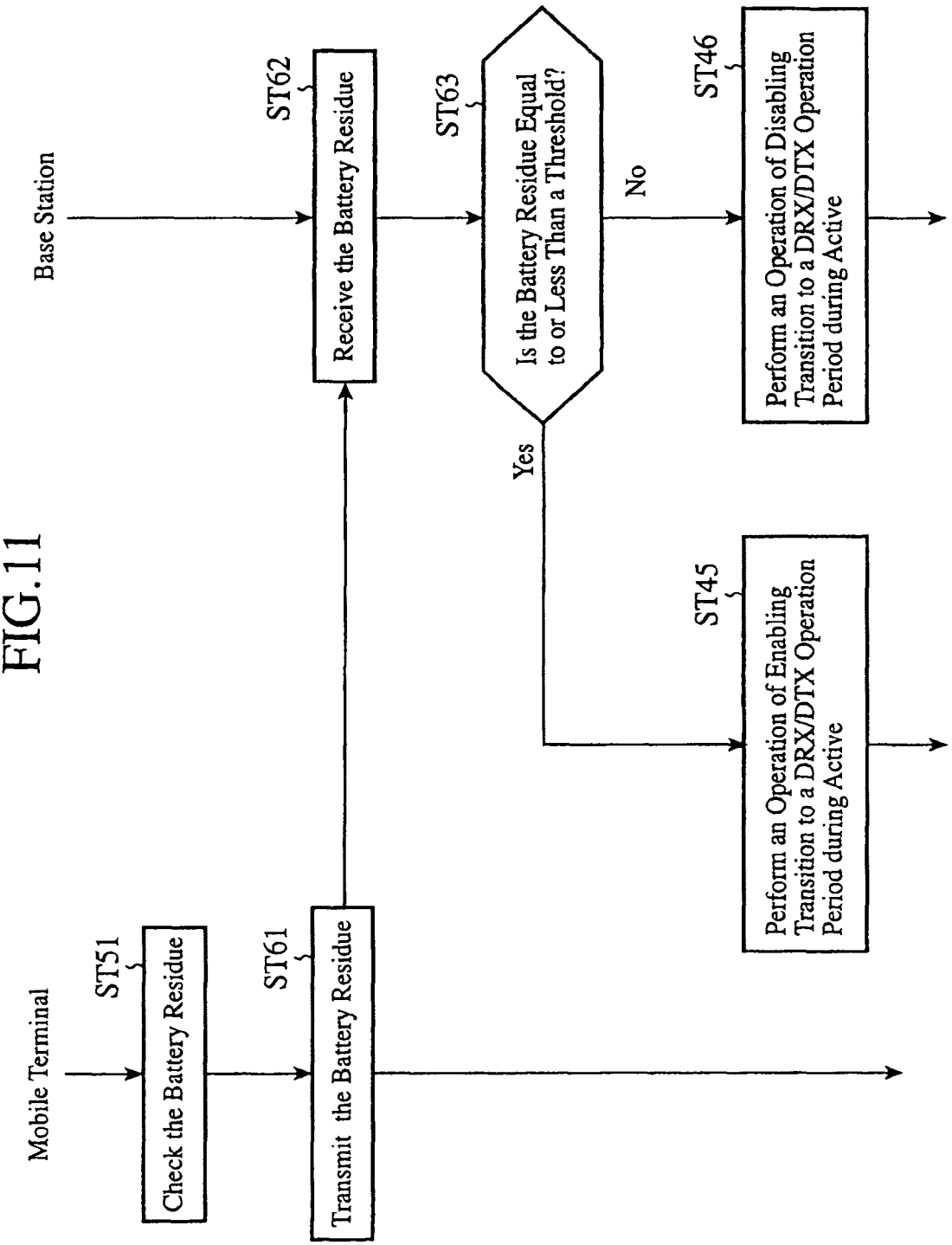
FIG. 11 is a sequence diagram showing the description of the processing carried out by the mobile communications system in accordance with Embodiment 5 of the present invention.

FIG. 11 is a sequence diagram showing the description of the processing carried out by the mobile communications system in accordance with Embodiment 5 of the present invention.

The protocol processing unit 11 (or the control unit 23) of the mobile terminal 3 checks the battery residue (step ST51).

After checking the battery residue, the protocol processing unit 11 (or the control unit 23) of the mobile terminal 3 transmits the battery residue to the base station 2 (step ST61).

As a concrete method of notifying the battery residue, there is, for example, a method of notifying the battery residue to the base station 2 by using a layer 3 message according to a protocol called RRC (Radio Resource Control). Furthermore, there are a method of mapping the battery residue onto a physical channel, a method of mapping the battery residue onto a MAC header as a MAC signaling, and the like.

When checking the battery residue, the protocol processing unit 11 (or the control unit 23) of the mobile terminal 3 checks to see whether or not the battery is being charged, and, when the battery is being charged, can notify the battery residue to the base station 2 after assuming the battery residue to be a maximum (or to be infinite). As an alternative, the mobile terminal can transmit a parameter indicating whether or not the battery is being charged to the base station 2 separately from the battery residue. As an alternative, the mobile terminal can transmit a parameter indicating whether or not the battery is being charged to the base station 2 without transmitting the battery residue.

As the information which is transmitted to the base station 2, one of the following pieces of information (1) to (3) can be considered.

(1) An absolute value of the battery residue is transmitted.
(2) The ratio of the battery residue to the capacity of the battery is transmitted.
(3) An indicator is transmitted.

In a case in which the indicator is transmitted, it is possible to reduce the amount of transmitted information as compared with a case in which either the absolute value of the battery residue or the ratio of the battery residue to the capacity of the battery is transmitted. Therefore, this is advantageous from the viewpoint of being able to use the radio resources effectively. FIG. 12 is an explanatory drawing showing an example of the indicator.

When receiving the battery residue from the mobile terminal 3 (step ST62), the protocol processing unit 11 (or the control unit 23) of the mobile terminal 3 compares the battery residue with a predetermined threshold (a lower limit of the battery residue at which the mobile terminal has to give a higher priority to low power consumption) (step ST63).

When the battery residue is equal to or shorter than the predetermined threshold, the protocol processing unit 33 (or the control unit 44) of the base station 2 performs an operation of enabling a transition to a DRX/DTX operation period during Active (the state 2-B of FIG. 13) (step ST45).

In contrast, when the battery residue exceeds the predetermined threshold, the protocol processing unit performs an operation of disabling a transition to a DRX/DTX operation period during Active (the state 2-B of FIG. 13) (step ST46).

Also in the case of this Embodiment 5, while the system runs so as to make the mobile terminal 3 give a higher priority to the throughput when there is much battery residue in the mobile terminal 3, the system runs so as to make the mobile terminal 3 give a higher priority to low power consumption when there is little battery residue in the mobile terminal 3, like in the case of above-mentioned Embodiments 3 and 4. As a result, low power consumption during Active (in a broad sense) (the state 2 of FIG. 13) can be achieved efficiently.

The variants 1 and 2 of above-mentioned Embodiment 3 can also be applied to this Embodiment 5.

Embodiment 6

In above-mentioned Embodiment 5, the example in which a mobile terminal determines whether to give a higher priority to low power consumption by using the battery residue of the mobile terminal as a criterion of the determination is shown. As an alternative, the user can input his or her (an intention showing whether the mobile terminal 3 gives a higher priority to low power consumption) to the mobile terminal 3, and the mobile terminal 3 can determine whether to give a higher priority to low power consumption by using the user's intention as a criterion of the determination.

The mobile terminal 3 can alternatively transmit information showing the user's intention to the base station 2, and the base station 2 can determine whether to give a higher priority to low power consumption by using the user's intention as a criterion of the determination.

In the case of this Embodiment 6, the system makes it possible for a mobile terminal to run according to the user's intention showing whether the mobile terminal gives a higher priority to low power consumption (or whether the mobile terminal gives a higher priority to the throughput), and, as a result, to achieve low power consumption during Active (in a broad sense) (the state 2 of FIG. 13) efficiently according to the user's intention.

The variants 1 and 2 of above-mentioned Embodiment 3 can also be applied to this Embodiment 6.

Embodiment 7

In nonpatent reference 6, it is shown that a DRX cycle, as well as first-time transmission data, is transmitted from a base station to a mobile terminal. Generally, the DRX cycle, as well as the first-time transmission data, is notified by using an L1/L2 control signal.

In contrast, in an LTE system, it is examined in downlink data transmission and in uplink data transmission that HARQ is applied. When HARQ (Hybrid ARQ) is applied, for example, a base station transmits data to a mobile terminal via a downlink, and the mobile terminal transmits an Ack signal/Nack signal to the base station according to the status of reception of the data. When succeeding in the reception of the data, the mobile terminal transmits the Ack signal to the base station, whereas when failing in the reception of the data, the mobile terminal transmits the Nack signal to the base station.

When receiving the Ack signal from the mobile terminal, the base station transmits new data, whereas when receiving the Nack signal from the mobile terminal, the base station retransmits the data. That is, the base station retransmits the data until receiving the Ack signal showing the success of the reception of the data from the mobile terminal.

In accordance with nonpatent reference 6, after the Ack signal has been received, DRX cycles are counted after the expiration of a predetermined timer time interval.

However, when HARQ is applied and retransmission occurs, a problem arises if the base station transmits information indicating the DRX cycle as well as the first-time transmission data.

The base station has to determine a time to allocate resources to the mobile terminal next time when notifying the DRX cycle to the mobile terminal. However, when the base station transmits the DRX cycle as well as the first-time transmission data, if the Nack signal is sent back thereto from the mobile terminal and retransmission is needed, the base station must delay the time at which the base station allocates resources for the first-time transmission data to the mobile terminal by a time required for the retransmission. That is, the base station must change the time at which the base station allocates resources to the mobile terminal every time when the base station retransmits data to the mobile terminal.

Thus, there arises a problem that the scheduling load on the base station increases because of the retransmission of data.

In accordance with this Embodiment 7, in order to solve the above-mentioned problems, a method of, in the case of the downlink, a base station notifying DRX cycle information to a mobile terminal using a control signal is disclosed.

Figure 19:
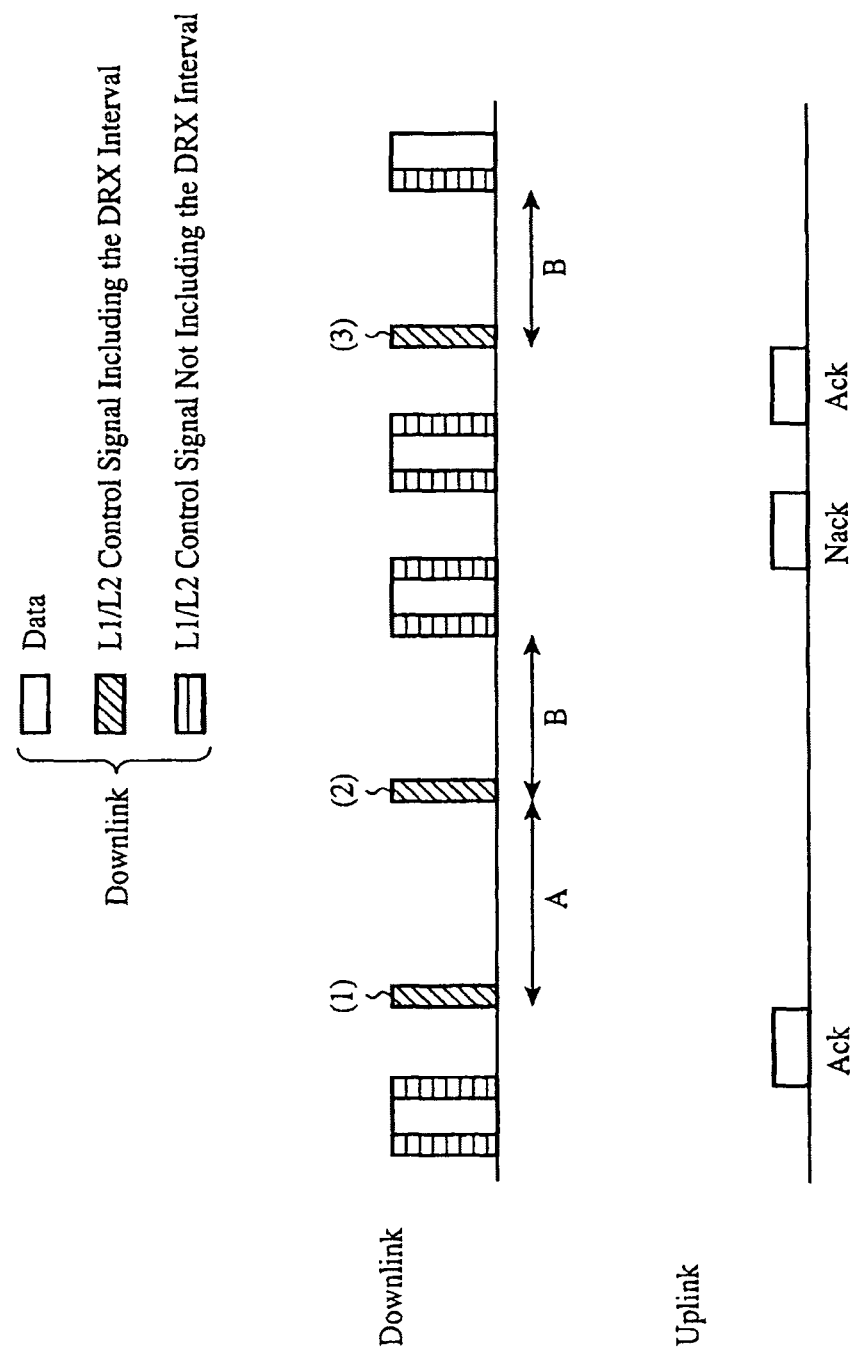
FIG. 19 is an explanatory drawing showing an example of a method of notifying a DRX cycle from a base station to a mobile terminal.

FIG. 19 is an explanatory drawing showing an example of the method of notifying the DRX cycle information from a base station to a mobile terminal.

In the figure, in the case of the downlink, each open box shows data, each horizontally shaded box shows an L1/L2 control signal including no DRX cycle (DRX interval) information, and each diagonally shaded box shows an L1/L2 control signal including the DRX cycle. In the case of the uplink, an Ack signal or a Nack signal is transmitted from the mobile terminal to the base station.

As shown in FIG. 19, instead of transmitting the DRX cycle information, as well as the first-time transmission data, in a conventional way, the base station uses a first L1/L2 control signal which is not accompanied by any data so as to transmit the DRX cycle information after receiving the Ack signal transmitted from the mobile terminal via the uplink.

When receiving the Ack signal from the mobile terminal after transmitting, via the downlink, first-time transmission data, the base station transmits DRX cycle (A) information at the timing at which the base station transmits an L1/L2 control signal next time (refer to (1) in the figure) and then makes a transition to a DRX operation.

After making a transition to a DRX operation, when there exist no downlink data to be transmitted to the mobile terminal, the base station transmits only an L1/L2 control signal to the mobile terminal. The DRX cycle information can be included in this L1/L2 control signal (refer to (2) in the figure).

In the case in which the DRX cycle information is included in the L1/L2 control signal, a DRX cycle (B) is updated and the mobile terminal makes a transition to a DRX operation. In contrast, in a case in which the DRX cycle information is not included in the L1/L2 control signal, it can be decided beforehand that an immediately preceding DRX cycle is applied.

Next, after making a transition to a DRX operation, when downlink data which the base station has to transmit to the mobile terminal occur, the base station transmits the downlink data to the mobile terminal. The base station does not transmit the DRX cycle information together with the downlink data.

Similarly, after making a transition to a DRX operation, when the mobile terminal receives the downlink data from the base station, but fails in the reception of the downlink data, the mobile terminal transmits the Nack signal to the base station.

The base station which has received the Nack signal from the mobile terminal transmits downlink retransmission data to the mobile terminal. The base station does not transmit the DRX cycle information together with the downlink retransmission data.

In contrast, when the mobile terminal receives the downlink data from the base station and succeeds in the reception of the downlink data, the mobile terminal transmits the Ack signal to the base station. The base station which has received the Ack signal from the mobile terminal transmits an L1/L2 control signal including the DRX cycle information (refer to B in the figure) at the timing which the base station transmits an L1/L2 control signal to the mobile terminal next time.

In FIG. 19, the L1/L2 control signal including the DRX cycle (B) information is transmitted at the time of (3) even though the DRX cycle (B) information transmitted at the time of (2) is not changed, though when there is no change in the DRX cycle, the L1/L2 control signal does not have to include the DRX cycle (B) information and information (a trigger) notifying a transition to a DRX operation can be transmitted instead.

In a case in which there exist downlink data, what is necessary is just to make the start timing (the starting point) of the DRX cycle be the transmission timing of either the DRX cycle information which the base station has transmitted to the mobile terminal after receiving the Ack signal from the mobile terminal or an L1/L2 control signal including the DRX transition information.

In contrast, in a case in which there exist no downlink data, what is necessary is just to make the start timing of the DRX cycle be the transmission timing of either the DRX cycle information which the base station has transmitted to the mobile terminal or an L1/L2 control signal including the DRX transition information.

Figure 20:
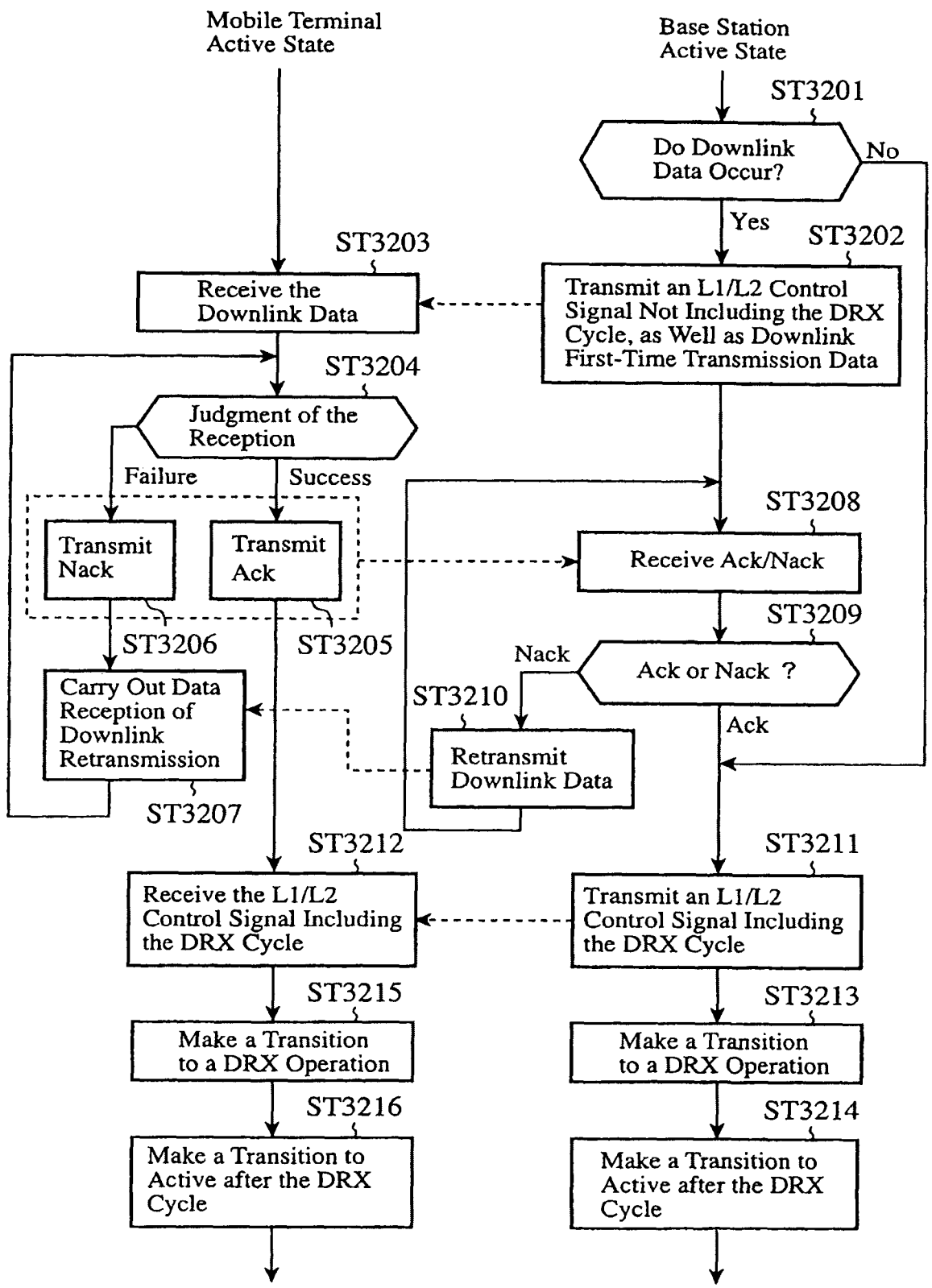
FIG. 20 is a sequence diagram showing an example of the description of processing carried out by the mobile terminal and the base station.

FIG. 20 is a sequence diagram showing an example of the description of processing carried out by the mobile terminal and the base station.

The base station judges whether or not downlink data destined for the mobile terminal occur (step ST3201), and, when downlink data occur, transmits an L1/L2 control signal not including the DRX cycle, as well as downlink first-time transmission data, to the mobile terminal (step ST3202).

The mobile terminal receives the downlink data (step ST3203), and judges the state of the reception of the data (step ST3204).

When the result of the reception shows a success (step ST3205), the mobile terminal transmits the Ack signal to the base station, whereas when the result of the reception shows a failure, the mobile terminal transmits the Nack signal to the base station (step ST3206).

The base station receives the reception result (the Ack signal/the Nack signal) from the mobile terminal (step ST3208), and judges whether the reception result is the Ack signal or the Nack signal (step ST3209).

When the judgment result is the Nack signal, the base station transmits downlink retransmission data (step ST3210). However, the base station does not send the DRX cycle information together with the retransmission data.

After transmitting the Nack signal, the mobile terminal receives the downlink retransmission data (step ST3207), and judges the state of the reception of the downlink data again and then transmits the Ack signal/the Nack signal to the base station according to the judgment result.

The base station repeatedly transmits the downlink retransmission data until receiving the reception judgment result which is the Ack signal from the mobile terminal.

When the result of the judgment of the reception state of the downlink retransmission data shows a success, the mobile terminal transmits the Ack signal to the base station.

When the reception judgment result from the mobile terminal is the Ack signal, after transmitting an L1/L2 control signal including the DRX cycle (step ST3211), the base station makes a transition to a DRX operation (step ST3213).

After receiving the L1/L2 control signal including the DRX cycle (step ST3212), the mobile terminal makes a transition to a DRX operation (step ST3215).

After the DRX cycle, the base station enters a state in which the base station can perform scheduling on the mobile terminal in question and then makes a transition to active (step ST3214). The mobile terminal becomes active after the DRX cycle, too (step ST3216).

When no downlink data destined for the mobile terminal occur in the base station, the base station transmits an L1/L2 control signal including the DRX cycle (step ST3211), and then makes a transition to a DRX operation.

When receiving the L1/L2 control signal including the DRX cycle (step ST3212), the mobile terminal makes a transition to a DRX operation in the DRX cycle included in the L1/L2 control signal (step ST3215).

After the DRX cycle, the base station then enters a state in which the base station can perform scheduling on the mobile terminal in question and then makes a transition to active (step ST3214). The mobile terminal becomes active after the DRX cycle, too (step ST3216).

For example, in a case in which there exist downlink data, the transmission timing of an L1/L2 control signal including the DRX cycle information, which the base station has transmitted to the mobile terminal after receiving the Ack signal from the mobile terminal, is defined as the start timing of the DRX cycle. In contrast, in a case in which there exist no downlink data, the transmission timing of an L1/L2 control signal including the DRX cycle information, which the base station has transmitted to the mobile terminal, is defined as the start timing of the DRX cycle. As a result, the timing at which the base station becomes active after performing a DRX operation becomes the same as the timing at which the mobile terminal becomes active after performing a DRX operation, and it is therefore possible for them to transmit and receive next data, an L1/L2 control signal or the like.

In the above-mentioned example, the case in which the information which the base station transmits to the mobile terminal is the DRX cycle information is described. As an alternative, when there is no change in the DRX cycle, the DRX transition information can be transmitted instead.

As disclosed above, by transmitting either the DRX cycle information or the DRX transition information to the mobile terminal using an L1/L2 control signal or the like which is not accompanied by any data after receiving the Ack signal from the mobile terminal, the base station can make a transition to a DRX operation without causing any problem also when retransmission occurs in the system to which HARQ is applied.

Furthermore, this embodiment offers an advantage of being able to reduce the load of the scheduling on the base station because the base station does not have to change the time to allocate resources to the mobile terminal every time when the base station carries out retransmission.

In addition, because the base station transmits either the DRX cycle information or the DRX transition information to the mobile terminal using an L1/L2 control signal or the like which is not accompanied by any data after receiving the Ack signal from the mobile terminal, there can be provided an advantage of being able to eliminate the necessity to set the DRX cycle to be equal to or longer than a required time corresponding to a maximum of the number of times that HARQ is retransmitted, and to setup the DRX cycle arbitrarily without being dependent on the maximum of the number of times that HARQ is retransmitted.

Furthermore, even when the mobile terminal is not able to receive the DRX cycle or the DRX transition information, the occurrence of receiving errors after the DRX cycle can be prevented because the mobile terminal performs a receiving operation without starting a DRX operation, and then receives data at a timing which is notified thereto from the base station after the DRX cycle.

Thus, the present embodiment offers an advantage of being able to prevent the occurrence of receiving errors also when the mobile terminal cannot receive either the DRX cycle or the DRX transition information and a state transition error occurs.

The present embodiment offers a further advantage of being able to cause state transition errors to be hard to produce because neither the base station nor the mobile terminal starts a DRX operation also when the base station carries out reception of the Ack signal from the mobile terminal with an error.

In addition, because state transition errors are hard to produce, there is provided another advantage of being able to eliminate the timer.

Furthermore, in the above-mentioned embodiment, the transmission timing of the DRX cycle from the base station is the timing at which the base station transmits the first L1/L2 control signal after receiving the Ack signal, though in order to ensure that the base station and the mobile terminal make a transition to DRX operations, the transmission timing of the DRX cycle from the base station can be the transmission timing of an L1/L2 control signal at the expiration of n×TTI (n is large from 1) after the reception of the Ack signal.

As a result, the present embodiment offers an advantage of making it possible for the scheduler of the base station to adjust the timing at which the scheduler sets up the DRX cycle according to the scheduling load thereon after the reception of the Ack signal.

As an alternative, the above-mentioned n can be determined beforehand or can be notified from the base station to the mobile terminal before the retransmission is started (for example, it can be considered that when a session of a radio bearer is set up, a notification of the above-mentioned n is made by using an L3 message transmitted from the base station to the mobile terminal, an L1/L2 control signal which is transmitted together with the first-time transmission data, or the like).

As a result, the mobile terminal does not have to carry out continuous reception of an L1/L2 control signal which succeeds the transmission of the Ack signal until after the expiration of nTTI, and this translates into low power consumption.

Furthermore, in the above-mentioned embodiment, although the transmission timing of the DRX cycle information or DRX transition information from the base station is the transmission timing of the first L1/L2 control signal which succeeds the reception of the Ack signal, the base station can transmit the DRX transition information at the same time when the base station transmits the DRX cycle information or at a subsequent timing, and, when transmitting the DRX transition information, can make a transition to a DRX operation.

By doing in this way, the scheduler load on the base station increases during an interval between the transmission timing of the DRX cycle information and the transmission timing of the DRX transition information, though, as shown in the nonpatent reference 6, there is provided an advantage of being able to reduce the scheduler load on the base station as compared with a case in which the DRX cycle information is transmitted together with the first-time transmission data.

Furthermore, as disclosed in above-mentioned Embodiment 2, it is also possible to employ the method of making the DTX cycle and the DRX cycle be equal or harmonic to each other.

Figure 21:
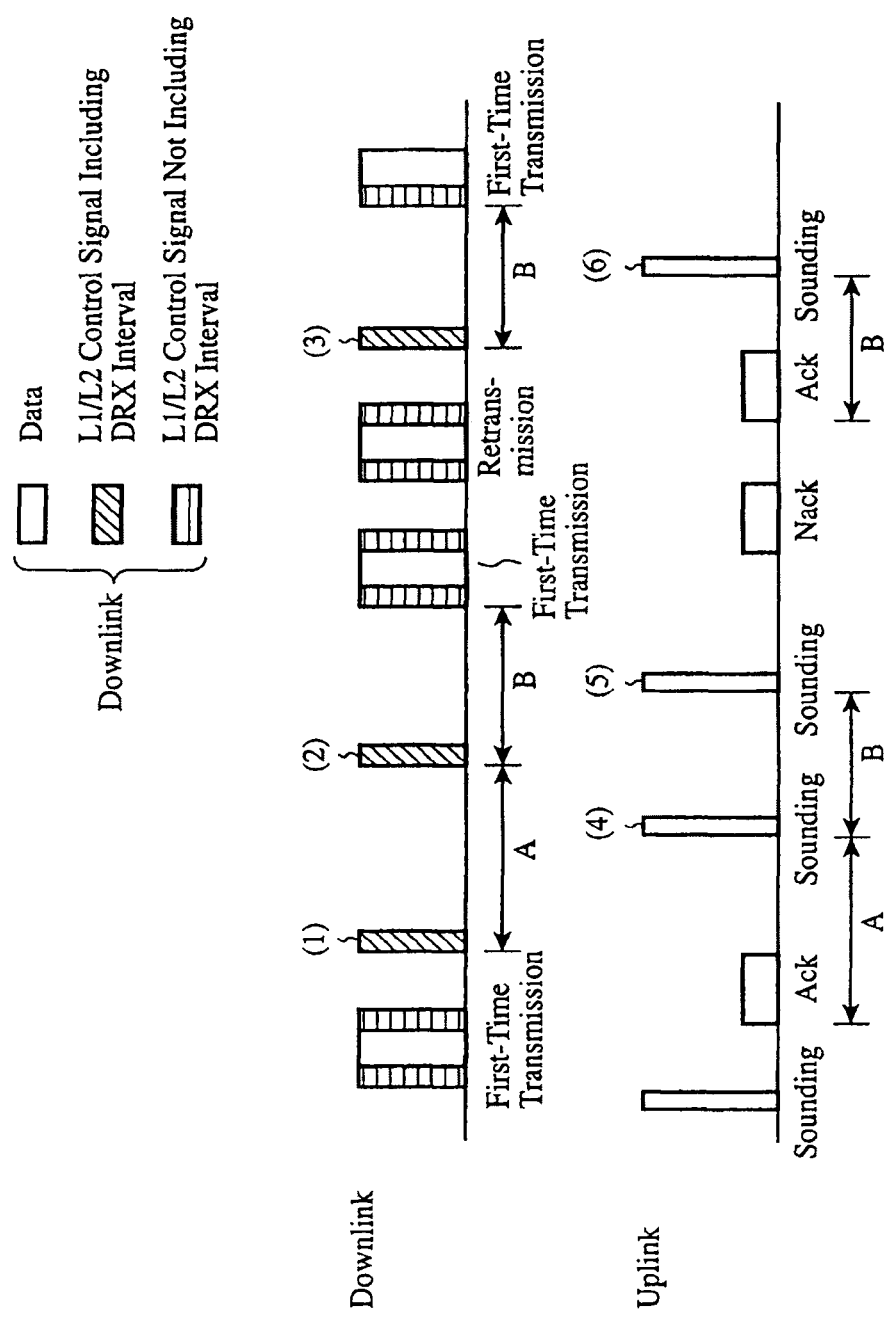
FIG. 21 is an explanatory drawing showing an example of the method of notifying a DRX cycle from the base station to the mobile terminal in a case in which a DTX cycle and the DRX cycle are set up in such a way that they are equal to each other.

FIG. 21 is an explanatory drawing showing an example of a method of notifying the DRX cycle from the base station to the mobile terminal in a case in which the DTX cycle and the DRX cycle are made to be equal to each other.

In FIG. 21, in the case of the downlink, each open box shows data, each horizontally shaded box shows an L1/L2 control signal including no DRX cycle (DRX interval) information, and each diagonally shaded box shows an L1/L2 control signal including the DRX cycle. In the case of the uplink, an Ack signal, a Nack signal, and a sounding signal which is used for uplink channel quality evaluation and for uplink synchronization are transmitted from the mobile terminal to the base station.

As shown in FIG. 21, the base station transmits the DRX cycle information by using an L1/L2 control signal which the base station transmits for the first time after receiving the Ack signal transmitted from the mobile terminal via the uplink, instead of transmitting the DRX cycle information together with the first-time transmission data in a conventional way.

When receiving the Ack signal from the mobile terminal after transmitting the first-time transmission data via the downlink, the base station transmits DRX cycle (A) information at the transmission timing of the next L1/L2 control signal (refer to (1) in the figure), and then makes a transition to a DRX operation.

When receiving the L1/L2 control signal including the DRX cycle (A) information, the mobile terminal sets the DTX cycle to the DRX cycle (A).

The mobile terminal transmits a sounding signal to the base station at a timing after performing a DTX operation in the DTX cycle (A) (refer to (4) in the figure).

When there exist no downlink data to be transmitted to the mobile terminal after the DRX cycle (A), the base station transmits only an L1/L2 control signal to the mobile terminal. The DRX cycle information can be included in this L1/L2 control signal (in the figure, refer to (2)).

In the case in which the DRX cycle information is included in the L1/L2 control signal, a DRX cycle (B) is updated and the base station makes a transition to a DRX operation. In contrast, in a case in which the DRX cycle information is not included in the L1/L2 control signal, an immediately preceding DRX cycle can be applied as previously determined.

When receiving the L1/L2 control signal including the DRX cycle (B) information, the mobile terminal sets the DTX cycle to the DRX cycle (B).

The mobile terminal transmits a sounding signal to the base station at a timing after performing a DTX operation in the DTX cycle (B) (refer to (5) in the figure).

When downlink data to be transmitted to the mobile terminal occur after the DRX cycle (B), the base station transmits the downlink data to the mobile terminal. However, the base station does not transmit the DRX cycle information together with the downlink data.

When receiving the downlink data from the base station and getting a reception result indicating a failure of the reception, the mobile terminal transmits the Nack signal to the base station.

The base station which has received the Nack signal from the mobile terminal transmits downlink retransmission data. However, the base station does not transmit the DRX cycle information together with the downlink retransmission data.

In contrast, when receiving the downlink data from the base station and getting a reception result indicating a success of the reception, the mobile terminal transmits the Ack signal to the base station.

The base station which has received the Ack signal from the mobile terminal, at the timing which the base station transmits the next L1/L2 control signal, transmits the next L1/L2 control signal including the DRX cycle (B) information (refer to (3) in the figure).

When receiving the L1/L2 control signal including the DRX cycle (B) information, the mobile terminal sets the DTX cycle to the DRX cycle (B).

The mobile terminal then transmits a sounding signal to the base station at a timing after performing a DTX operation in the DTX cycle (B) (refer to (6) in the figure).

In the series of operations of the mobile terminal and the base station, when, in step ST3212 in the sequence of FIG. 20, receiving the DRX cycle information transmitted from the base station, the mobile terminal has only to set the DRX cycle information to indicate the DTX cycle and make a transition to a DTX operation in the DTX cycle.

When there exist downlink data, what is necessary is just to make the start timing of the DRX cycle be the transmission timing of an L1/L2 control signal including either the DRX cycle information or the DRX transition information which the base station has transmitted to the mobile terminal after receiving the Ack signal from the mobile terminal.

In contrast, when there exist no downlink data, what is necessary is just to make the start timing of the DRX cycle be the transmission timing of an L1/L2 control signal including either the DRX cycle information or the DRX transition information which the base station has transmitted to the mobile terminal.

When there exist downlink data, what is necessary is just to make the start timing of the DTX cycle be the transmission timing of an Ack signal which is transmitted from the mobile terminal to the base station immediately before an L1/L2 control signal including either the DRX cycle information or the DRX transition information which the base station has transmitted to the mobile terminal.

In contrast, when there exist no downlink data, what is necessary is just to make the start timing of the DTX cycle be the transmission timing of a sounding signal which is transmitted immediately before an L1/L2 control signal including either the DRX cycle information or the DRX transition information which the base station has transmitted to the mobile terminal.

As an alternative, when there exist downlink data, it is preferable to make the start timing of the DTX cycle be the reception timing of an L1/L2 control signal including either the DRX cycle information or the DRX transition information which the base station has transmitted to the mobile terminal.

In contrast, when there exist no downlink data, it is preferable to make the start timing of the DTX cycle be the reception timing of an L1/L2 control signal including either the DRX cycle information or the DRX transition information which the base station has transmitted to the mobile terminal.

In the above-mentioned example, the mobile terminal sets the DTX cycle thereof to the DRX cycle notified thereto from the base station. As an alternative, the mobile terminal can set the DTX cycle thereof to the DRX cycle as shown in above-mentioned Embodiment 2. Furthermore, the notification method of notifying the DTX cycle and the application method of applying the DTX cycle as shown in above-mentioned Embodiment 2 can be applied to this embodiment.

By making the base station transmit either the DRX cycle information or the DRX transition information to the mobile terminal by using an L1/L2 control signal or the like which is not accompanied by any data after the base station receives an Ack signal so as to make the DTX cycle and the DRX cycle be equal to each other, as disclosed above, in addition to the advantages described in this Embodiment 7, the advantages described in above-mentioned Embodiment 2 are provided also in the system to which HARQ is applied.

Furthermore, in this Embodiment 7, the case in which the DRX cycle information is transmitted from the base station to the mobile terminal by using an L1/L2 control signal or the like is described, though there can be a case in which the DRX cycle information is determined beforehand and the base station allocates resources to the mobile terminal at a timing of the DRX cycle which is determined beforehand. The present invention can also be applied to such a case.

The DRX cycle information which is determined beforehand is notified by using an L3 message or the like which is transmitted from the base station to the mobile terminal when a session of a radio bearer is started.

In a case in which the DRX cycle which is notified by using an L3 message is, for example, time intervals, the invention disclosed by this Embodiment 7 can be applied. In this case, when the DRX cycle can be changed, what is necessary is just to transmit either the DRX cycle information or the DRX operation transition information by using an L1/L2 control signal which is transmitted from the base station to the mobile terminal, whereas when the DRX cycle cannot be changed, the DRX cycle information cannot be transmitted and what is necessary is just to transmit information about a transition to a DRX operation.

Each of the base station and the mobile terminal has only to make a transition to a DRX operation on the basis of either the DRX cycle information or the information about a transition to a DRX operation which is transmitted by using an L1/L2 control signal.

In a case in which the DRX cycle notified by using an L3 message is specified by, for example, an absolute time, there arises a problem that a time which is allocated beforehand is changed due to the retransmission.

For example, it can be considered that, in order to specify the absolute time, on a time axis, 512 radio frames (10 ms) are numbered (0 to 511) and 10 radio frames are further numbered (0 to 9) for every TTI, and these numberings are repeated.

By using an L3 message, to which time the DRX cycle is allocated is specified. For example, TTI number 5 in the radio frame number (n=0, 1, 2, . . . , 511) n is specified by the message.

In this case, the DRX cycle is started at the timing of TTI number 5 for every radio frame. There arises a problem that HARQ causes retransmission of the downlink first-time transmission data which have occurred at a timing of TTI number 5 of a certain radio frame and therefore the current time passes the timing of the TTI number 5 of the next radio frame.

In order to solve the above-mentioned problem, in the case in which the DRX cycle which is notified by using an L3 message is specified with, for example, an absolute time, the base station has only to notify information about a change in the absolute time specifying the DRX cycle using an L1/L2 control signal which is transmitted to the mobile terminal.

As a parameter which is notified to the mobile terminal in order to change the absolute time, there can be, for example, a radio frame number, a TTI number, a TTI number shift amount, or the like. For example, TTI number 9 is notified to the mobile terminal, or TTI number shift amount 6 (the TTI number is set to 1) is notified to the mobile terminal. As an alternative, a radio frame number can be similarly notified to the mobile terminal.

Each of the base station and the mobile terminal has only to make a transition to a DRX operation on the basis of the information about a change in the absolute time specifying the DRX cycle which is transmitted by using an L1/L2 control signal.

By using the method disclosed above, even in a case in which the DRX cycle is beforehand determined by using an L3 message or the like which is transmitted from the base station to the mobile terminal when a session of a radio bearer is started, it is possible to solve the problem that HARQ causes retransmission of data and therefore the current time passes the next allocated timing, and, as a result, the base station cannot transmit downlink data which will occur next time.

Next, a case in which DRX cycles corresponding to a plurality of signals or a plurality of radio bearers are set up in parallel will be explained.

Figure 22:
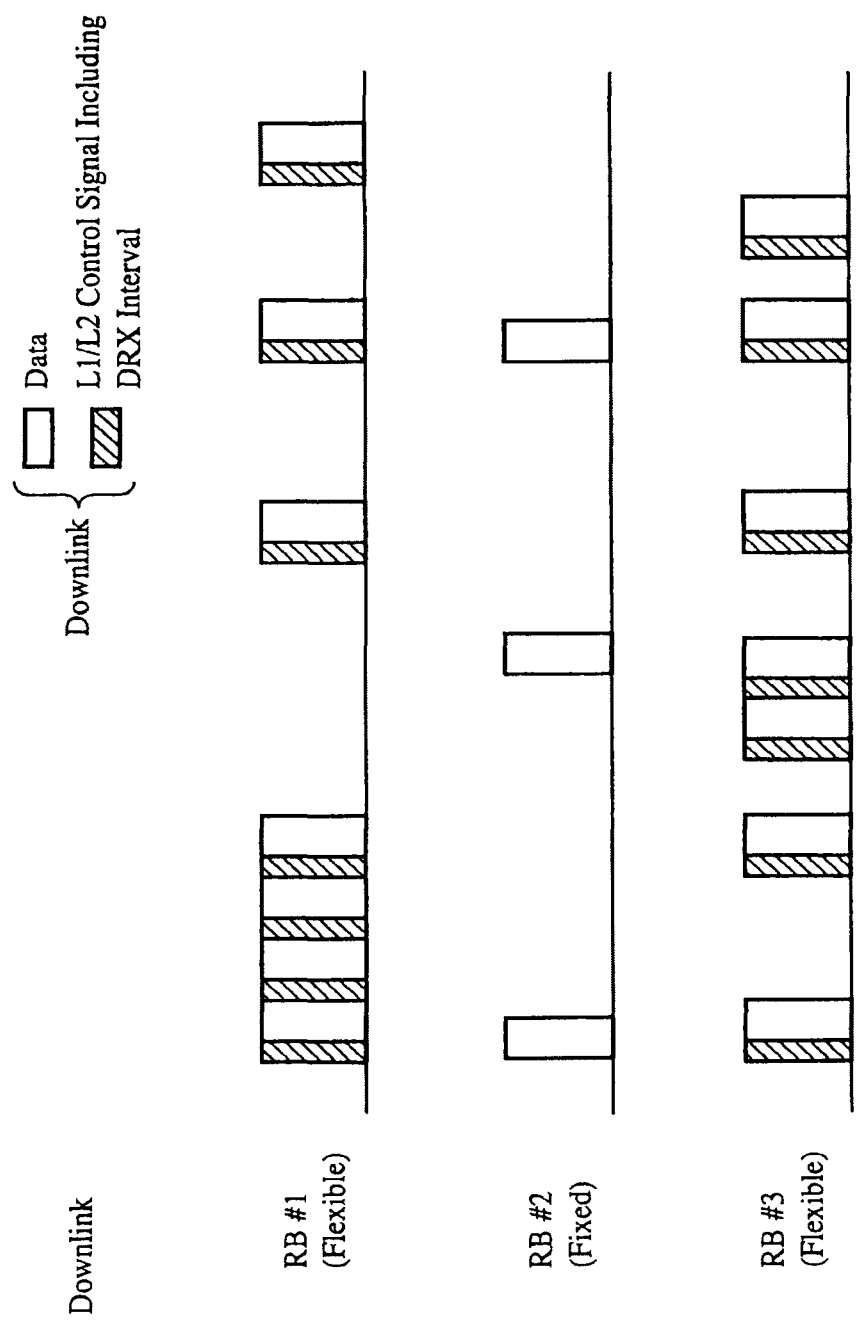
FIG. 22 is an explanatory drawing showing an example of a timing at which DRX cycles corresponding to a plurality of radio bearers are set up in parallel for downlink.

FIG. 22 is an explanatory drawing showing a case in which DRX cycles corresponding to a plurality of radio bearers are set up in parallel for downlink.

In FIG. 22, radio bearers (RB) #1 and #3 show allocation of flexible (Flexible) DRX cycles, and a radio bearer RB #2 shows allocation of a fixed (Fixed) DRX cycle.

The flexible allocation is also called dynamic allocation, and the DRX cycle is notified from the base station to the mobile terminal by using an L1/L2 control signal which is transmitted together with the first-time transmission data.

The fixed allocation is a case in which the base station allocates resources to the mobile terminal at a timing of the DRX cycle which is determined beforehand, and the DRX cycle information which is determined beforehand is notified by using an L3 message or the like which is transmitted from the base station to the mobile terminal before a session of a radio bearer is started.

In a case in which a plurality of RB(s) are running simultaneously, the DRX cycle is determined by using one of the following two types of methods:

(1) a method of making the mobile terminal calculate the DRX cycle from the one of each RB notified from the base station; and (2) a method of making the base station calculate the DRX cycle from the one of each RB, and notifying the calculated DRX cycle to the mobile terminal.

In the case of using the method (1), the DRX cycle is not notified from the base station to the mobile terminal by using an L1/L2 control signal which is transmitted together with the first-time transmission data, but the method, as disclosed in this Embodiment 7, of notifying either the DRX cycle information or the information about a transition to a DRX operation by using the first L1/L2 control signal after the base station receives an Ack signal can be employed. However, for the fixed allocation, in order to make the base station and the mobile terminal share timing information about the time at which they enter DRX operations, a notification of the information about a transition to a DRX operation is needed, as mentioned above.

In the case of using the method (2), because the base station adjusts the DRX cycle and then notifies this DRX cycle, as one DRX cycle, to the mobile terminal, this method is flexible allocation if even single flexible allocation has been made. A case in which only fixed allocation is made is fixed allocation. Therefore, the method disclosed in this Embodiment 7 can also be applied to this case.

In a case in which DRX cycles corresponding to a plurality of radio bearers are set up in parallel in this way, it is possible to solve the problems which arise because of HARQ by using the method disclosed in this Embodiment 7.

Next, a variant 1 will be explained.

In the above-mentioned example, the method of notifying the DRX cycle information to the mobile terminal by using an L1/L2 control signal or the like which is not accompanied by any data after the base station receives an Ack signal in a case in which there exist downlink data is explained. Hereafter, a method of notifying the DTX cycle information to the mobile terminal by using an L1/L2 control signal or the like after the base station transmits an Ack signal in a case in which there exist uplink data will be explained.

Figure 23:
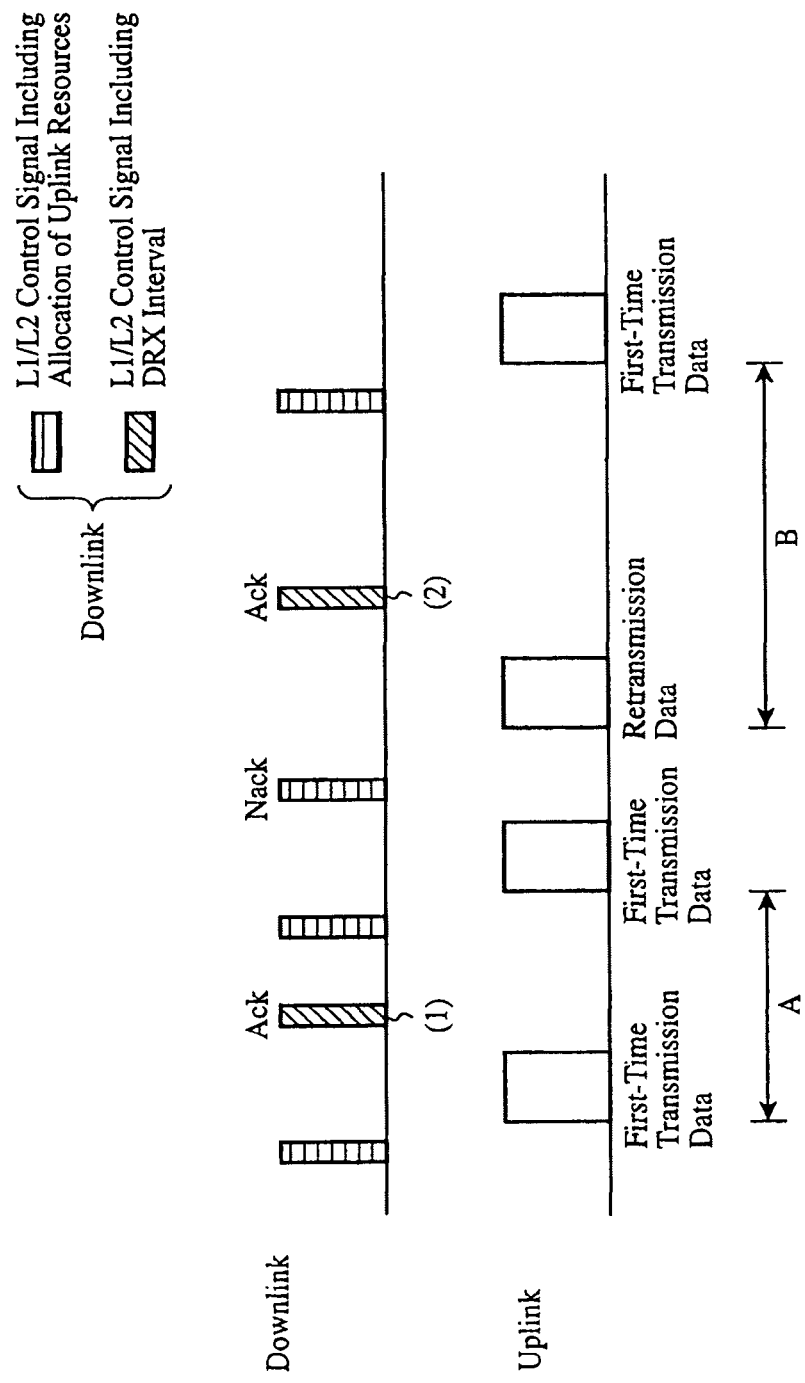
FIG. 23 is an explanatory drawing showing an example of the method of notifying the DTX cycle from the base station to the mobile terminal in a case in which there exist uplink data.

FIG. 23 is an explanatory drawing showing an example of the method of notifying the DTX cycle from the base station to the mobile terminal in a case in which there exist uplink data.

In FIG. 23, in the case of the downlink, each horizontally shaded box shows an L1/L2 control signal including no DRX cycle (DRX interval) information, and each diagonally shaded box shows an L1/L2 control signal including the DRX cycle. An Ack signal or a Nack signal for uplink data is transmitted from the base station to the mobile terminal. In the case of the uplink, each open box shows data and data are transmitted from the mobile terminal to the base station.

As shown in FIG. 23, when succeeding in reception of data transmitted from the mobile terminal via the uplink, the base station transmits DTX cycle (A) information, as well as the Ack signal, to the mobile terminal by using an L1/L2 control signal (refer to (1) in the figure).

When receiving the DTX cycle (A) information from the base station, the mobile terminal makes a transition to a DTX operation in the DTX cycle (A) from a transmission timing at which the mobile terminal carries out transmission immediately before receiving the DTX cycle (A) information.

Next, after the DTX cycle (A), when there exist uplink data, the mobile terminal transmits the first-time transmission data to the base station.

In contrast, when failing in the reception of the data transmitted from the mobile terminal via the uplink, the base station transmits information about allocation of uplink resources for retransmission by using an L1/L2 control signal, as well as the Nack signal.

The mobile terminal which has received the Nack signal transmits retransmission data to the base station.

In contrast, when succeeding in the reception of the retransmission data transmitted from the mobile terminal via the uplink, the base station transmits DTX cycle (B) information by using an L1/L2 control signal, as well as the Ack signal (refer to (2) in the figure).

When receiving the DTX cycle (B) information from the base station, the mobile terminal makes a transition to a DTX operation in the DTX cycle (B) from a transmission timing at which the mobile terminal carries out transmission immediately before receiving the DTX cycle (B) information.

In this example, because the Ack signal transmitted from the base station to the mobile terminal does not accompany any information about allocation of uplink resources when the DTX cycle information transmitted at the time of (1) is not changed at the time of (2) of FIG. 23, the Ack signal does not have to include the DTX cycle information. In this case, what is necessary is just to determine beforehand that the DTX cycle is reset to a DTX cycle which is notified immediately before the expiration of the DTX cycle.

Although the DTX cycle information is described above as the information which the base station transmits to the mobile terminal, the information which the base station transmits to the mobile terminal can be the DTX transition information when there is no change in the DTX cycle, like in the case of DRX.

What is necessary is just to make the start timing of the DTX cycle be the transmission timing at which the mobile terminal carries out transmission immediately before the mobile terminal receives the DTX cycle information from the base station. The mobile terminal makes a transition to a DTX operation in the DTX cycle from the transmission timing.

In a case in which there is no change in the DTX cycle, when the DRX cycle information is not sent to the mobile terminal from the base station, what is necessary is just to make the start timing of the DTX cycle be the transmission timing at which the mobile terminal carries out transmission immediately before the mobile terminal receives an Ack signal from the base station.

As an alternative, the start timing of the DTX cycle can be the receiving timing at which the mobile terminal receives the DTX cycle information from the base station. The mobile terminal makes a transition to a DTX operation in the DTX cycle from the receiving timing.

In a case in which there is no change in the DTX cycle, when the DRX cycle information is not sent to the mobile terminal from the base station, what is necessary is just to make the start timing of the DTX cycle be the receiving timing at which the mobile terminal receives an Ack signal from the base station.

FIG. 23 shows, as an example, a case in which no allocation of resources for uplink data is determined beforehand. In this case, before the mobile terminal transmits uplink data, the mobile terminal receives an L1/L2 control signal including uplink resource allocation information transmitted from the base station. What is necessary is just for the mobile terminal to transmit uplink data at a timing after performing a DTX operation using resources based on this uplink resource allocation information.

In a case in which allocation of resources for uplink data is determined beforehand, the mobile terminal does not have to receive the uplink resource allocation information transmitted from the base station before transmitting uplink data, and has only to transmit the uplink data using the predetermined resources at a timing after performing a DTX operation.

Next, an example in which there coexist a case in which there exist uplink data and a case in which there exist no uplink data will be explained.

An explanation will be made as to a method of, in the case in which there exist uplink data, transmitting a DTX cycle signal, as well as an Ack signal which is transmitted from the base station to the mobile terminal, whereas, in the case in which there exist no uplink data, transmitting the DTX cycle by using an L1/L2 control signal which is transmitted from the base station to the mobile terminal after transmitting an uplink transmission signal.

Figure 24:
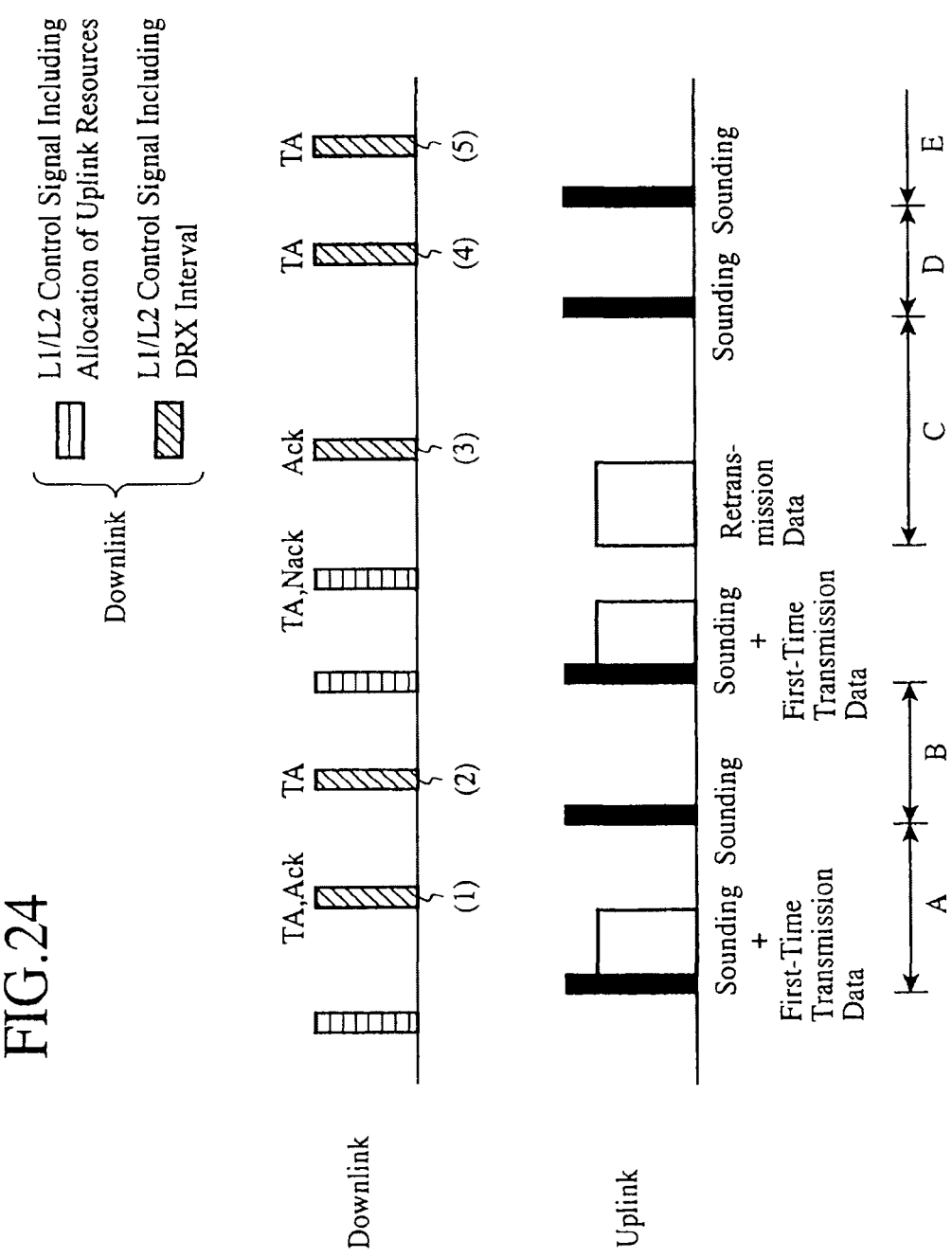
FIG. 24 is an explanatory drawing showing an example in a case in which a sounding signal is transmitted as an uplink transmission signal in a case in which there exist no uplink data.

FIG. 24 is an explanatory drawing showing an example in which the uplink transmission signal in the case in which there exist no uplink data is a sounding signal.

In FIG. 24, in the case of the downlink, each horizontally shaded box shows an L1/L2 control signal including no DRX cycle (DRX interval) information, and each diagonally shaded box shows an L1/L2 control signal including the DRX cycle. Either an Ack signal or a Nack signal to uplink data is transmitted from the base station to the mobile terminal. In the case of the uplink, each open box shows data and each solid filled box shows a sounding signal, and they are transmitted from the mobile terminal to the base station.

As shown in FIG. 24, the mobile terminal transmits uplink data, as well as a sounding signal, to the base station.

When succeeding in reception of the data transmitted from the mobile terminal, the base station transmits DTX cycle (A) information using an L1/L2 control signal, as well as an Ack signal and an uplink timing adjustment signal (TA) (refer to (1) in the figure), to the mobile terminal.

When receiving the DTX cycle (A) information from the base station, the mobile terminal makes a transition to a DTX operation in the DTX cycle (A) from the transmission timing at which the mobile terminal carries out transmission immediately before receiving the DTX cycle (A) information.

Next, after the DTX cycle (A), the mobile terminal transmits a sounding signal to the base station when there exist no uplink data therein.

When receiving the sounding signal, the base station transmits DTX cycle (B) information using an L1/L2 control signal, as well as a timing adjustment signal (TA), to the mobile terminal (refer to (2) in the figure).

When receiving the DTX cycle (B) information from the base station, the mobile terminal make a transition to a DTX operation in the DTX cycle (B) from the transmission timing at which the mobile terminal carries out transmission (transmission of a sounding signal) immediately before receiving the DTX cycle (B) information.

Next, after the DTX cycle (B), the mobile terminal transmits first-time transmission data, as well as a sounding signal, to the base station when there exist uplink data therein.

When failing in the reception of the data transmitted from the mobile terminal via the uplink, the base station transmits information about allocation of uplink resources for retransmission by using an L1/L2 control signal, as well as a Nack signal and a timing adjustment signal, to the mobile terminal. However, no information indicating the DTX cycle is included in the Nack signal.

When receiving the Nack signal from the base station, the mobile terminal transmits retransmission data to the base station.

When succeeding in the reception of the retransmission data transmitted from the mobile terminal via the uplink, the base station transmits DTX cycle (C) information by using an L1/L2 control signal, as well as an Ack signal, to the mobile terminal (refer to (3) in the figure).

When receiving the DTX cycle (C) information from the base station, the mobile terminal makes a transition to a DTX operation in the DTX cycle (C) from the transmission timing at which the mobile terminal carries out transmission immediately before receiving the DTX cycle (C) information.

Next, after the DTX cycle (C), the mobile terminal transmits a sounding signal to the base station when there exist no uplink data therein.

When receiving the sounding signal, the base station transmits DTX cycle (D) information by using an L1/L2 control signal, as well as a timing adjustment signal (TA), to the mobile terminal (refer to (4) in the figure).

When receiving the DTX cycle (D) information from the base station, the mobile terminal makes a transition to a DTX operation in the DTX cycle (D) from the transmission timing at which the mobile terminal carries out transmission (transmission of a sounding signal) immediately before receiving the DTX cycle (D) information.

Next, after the DTX cycle (D), the mobile terminal transmits a sounding signal to the base station when there exist no uplink data therein.

When receiving the sounding signal, the base station transmits DTX cycle (E) information by using an L1/L2 control signal, as well as a timing adjustment signal (TA), to the mobile terminal (refer to (5) in the figure).

When receiving the DTX cycle (E) information from the base station, the mobile terminal makes a transition to a DTX operation in the DTX cycle (E) from the transmission timing at which the mobile terminal carries out transmission (transmission of a sounding signal) immediately before receiving the DTX cycle (E) information.

Also in this case, when there is no change in the DRX cycle, the Ack signal which is transmitted from the base station to the mobile terminal does not have to accompany with the DRX cycle information. In this case, what is necessary is just to predetermine that, for example, the DTX cycle is set to be the same as the immediately preceding DTX cycle.

What is necessary is just to the start timing of the DTX cycle be the transmission timing at which the mobile terminal carries out transmission immediately before receiving the DTX cycle information from the base station. The mobile terminal makes a transition to a DTX operation in the DTX cycle from the transmission timing.

In a case in which there is no change in the DTX cycle, when the DRX cycle information is not sent to the mobile terminal from the base station, what is necessary is just to make the start timing of the DTX cycle be the transmission timing at which the mobile terminal carries out transmission immediately before the mobile terminal receives either an Ack signal or a timing adjustment signal from the base station.

As an alternative, the start timing of the DTX cycle can be the receiving timing at which the mobile terminal receives the DTX cycle information from the base station.

The mobile terminal makes a transition to a DTX operation in the DTX cycle from the receiving timing.

In a case in which there is no change in the DTX cycle, when the DRX cycle information is not sent to the mobile terminal from the base station, what is necessary is just to make the start timing of the DTX cycle be the receiving timing at which the mobile terminal receives either an Ack signal or a timing adjustment signal from the base station.

In FIG. 24, the case in which a sounding signal is used as an uplink transmission signal in the case in which there exist no uplink data is shown, though the uplink transmission signal is not limited to a sounding signal, and another signal, such as a CQI signal, can be used as long as the other signal is an uplink transmission signal in the case in which there exist no uplink data.

In the above-mentioned example, the case in which the DTX cycle information is transmitted from the base station to the mobile terminal by using an L1/L2 control signal is described. The present invention disclosed in this embodiment can also be applied to a case in which the DTX cycle information is predetermined and the base station allocates resources to the mobile terminal at a timing of the predetermined DTX cycle.

The predetermined DTX cycle information is notified by using an L3 message or the like which is transmitted from the base station to the mobile terminal when a session of a radio bearer is started. Therefore, even in a case in which, for example, the predetermined DTX cycle is time intervals or specified by absolute times, the present invention disclosed in this embodiment can also be applied by using the same method as that used in the case of downlink.

Furthermore, by using the same method as that disclosed previously in the case of downlink, the present invention disclosed in this embodiment can also be applied to a case in which DTX cycles corresponding to a plurality of signals or a plurality of radio bearers are set up in parallel.

In addition, as disclosed in above-mentioned Embodiment 2, it is also possible to employ the method of making the DTX cycle and the DRX cycle be equal or harmonic to each other.

However, in a case in which the mobile terminal has to receive a certain signal related to uplink transmission from the base station, it is preferable for the mobile terminal to set up, as a parameter, a time which elapses from the receiving timing of this received signal to a transmission timing after performing a DTX operation.

FIG. 25 is an explanatory drawing showing the parameter which is the time which elapses from the receiving timing of the received signal to a transmission timing after the mobile terminal performs a DTX operation.

FIG. 25(A) shows a case in which there exist uplink data.

The base station transmits DTX cycle (A) information, as well an Ack signal which is a response to uplink data, to the mobile terminal (refer to (1) in the figure).

When receiving the DTX cycle (A) information from the base station, the mobile terminal makes a transition to a DTX operation, and also makes the DRX cycle equal to the DTX cycle and then makes a transition to a DRX operation.

However, in order to make provision for transmission of uplink data after the DTX cycle (A), the mobile terminal receives information about allocation of uplink resources at an earlier time before the DTX cycle (A) by a parameter (tp).

Because the base station knows the DTX cycle (A) and the parameter (tp) which the base station has transmitted to the mobile terminal, the base station can calculate the timing at which the base station transmits the information about allocation of uplink resources to the mobile terminal.

FIG. 25(B) shows a case in which an uplink CQI is transmitted.

After transmitting a CQI to the mobile terminal, the base station transmits DTX cycle (B) information to the mobile terminal (refer to (2) in the figure).

When receiving the DTX cycle (B) information from the base station, the mobile terminal makes a transition to a DTX operation, and also makes the DRX cycle equal to the DTX cycle and then makes a transition to a DRX operation.

However, in order to make provision for transmission of a CQI after the DTX cycle (B), the mobile terminal receives a downlink reference signal at an earlier time before the DTX cycle (B) by a parameter (tp).

Because the base station knows the DTX cycle (B) and the parameter (tp) which the base station has transmitted to the mobile terminal, the base station can calculate the timing at which the base station transmits the downlink reference signal to the mobile terminal.

The parameter (tp) can be either a positive value (the mobile terminal receives the signal at an earlier time before the transmission timing by tp) or a negative value the mobile terminal receives the signal at a later time after the transmission timing by tp).

The parameter (tp) can be set up in advance and can be shared between the base station and the mobile terminal, can be notified from the base station to the mobile terminal when a session of a radio bearer is started, or can be notified from the base station to the mobile terminal together with the DTX cycle.

By using one of these methods disclosed in this embodiment, the DRX cycle and the DTX cycle are made to be equal to each other formally, and the advantages described in above-mentioned Embodiment 2 can be provided.

Next, a variant 2 will be explained.

Hereafter, a method of making the base station notify the DTX cycle information and the DRX cycle information to the mobile terminal in a case in which data transmissions are carried out via the downlink and the uplink, respectively.

In a case in which data transmissions are carried out via the downlink and the uplink, respectively, when HARQ is applied, even if transmission of uplink data has been completed previously and there exist only downlink data, an uplink Ack signal/Nack signal which is a response to the downlink data is needed.

Furthermore, even if transmission of uplink data has been completed previously and there exist only uplink data, a downlink Ack signal/Nack signal which is a response to the uplink data is needed.

Therefore, even if the DRX cycle and the DTX cycle are set to be different values, the mobile terminal cannot make a transition to either a DRX operation or a DTX operation until both the transmission of data via the uplink and the transmission of data via the downlink are completed. Therefore, it is useless to set the DRX cycle and the DTX cycle to have different values.

Furthermore, the base station notifies both the DRX cycle and the DTX cycle to the mobile terminal, and, when the start timing of a DRX operation and the start timing of a DTX operation work individually, the mobile terminal makes a transition to either a DRX operation or a DTX operation even though transmission of an Ack signal/Nack signal is carried out via the downlink or the uplink. A problem is therefore that a receiving error occurs in either the uplink or the downlink.

Therefore, it is preferable to make the DRX cycle and the DTX cycle be equal to each other in the case in which data transmissions are carried out via the downlink and the uplink, respectively.

In the variant 2, in the case in which data transmissions are carried out via the downlink and the uplink, respectively, the method for uplink data transmission disclosed in above-mentioned Embodiment 7 is applied to a case in which the DRX cycle and the DTX cycle are made to be equal to each other and the transmission of downlink data has been completed previously, while a method to which the method for downlink data transmission disclosed in above-mentioned Embodiment 7 is applied is applied to a case in which the DRX cycle and the DTX cycle are made to be equal to each other and the transmission of uplink data has been completed previously.

FIG. 26 is an explanatory drawing showing an example of the method of notifying both the DRX cycle and the DTX cycle from the base station to the mobile terminal in the case in which data transmissions are carried out via the downlink and the uplink, respectively, and the DRX cycle and the DTX cycle are made to be equal to each other.

This case is divided into the following two states:
(1) a case in which the transmission of downlink data has been completed previously; and
(2) a case in which the transmission of uplink data has been completed previously.

FIG. 26(A) shows the case in which the transmission of downlink data has been completed previously, and FIG. 26(B) shows the case in which the transmission of uplink data has been completed previously.

In the case in which the transmission of downlink data has been completed previously, the base station transmits DTX cycle (A) information by using an L1/L2 control signal, as well as an Ack signal which is a response to either uplink last first-time transmission data or uplink last retransmission data, to the mobile terminal (refer to (1) in the figure).

When receiving the DTX cycle (A) information from the base station, the mobile terminal makes the DRX cycle be equal to the DTX cycle (A).

What is necessary is just to make the start timing of the DRX cycle be the transmission timing of an L1/L2 control signal including the DTX cycle which the base station transmits to the mobile terminal.

Furthermore, what is necessary is just to make the start timing of the DTX cycle be the transmission timing of the uplink last data (retransmission data) which the mobile terminal transmits to the base station.

A feature of the method disclosed above is that, as compared with the case in which above-mentioned Embodiment 7 is applied to downlink data and the variant 1 is applied to uplink data, the base station does not have to transmit the DRX cycle information about the DRX cycle at the time of completing transmission of downlink (retransmission) data to the mobile terminal. Therefore, there is provided an advantage of being able to reduce the scheduling load on the scheduler of the base station.

In the case in which the transmission of uplink data has been completed previously, the base station transmits DRX cycle (B) information to the mobile terminal by using the first L1/L2 control signal after receiving an Ack signal which is a response to either downlink last first-time transmission data or downlink last retransmission data (refer to (2) in the figure).

When receiving the DTX cycle (B) information from the base station, the mobile terminal makes the DTX cycle be equal to the DRX cycle (B).

What is necessary is just to make the start timing of the DRX cycle be the transmission timing of an L1/L2 control signal including the DRX cycle which the base station transmits to the mobile terminal.

Furthermore, what is necessary is just to make the start timing of the DTX cycle be the transmission timing at which the base station transmits an Ack signal which is a response to the downlink last (retransmission) data which the mobile terminal transmits to the base station.

Furthermore, in a case in which the mobile terminal has to receive a certain signal from the base station prior to uplink transmission, a time which elapses from this receiving timing to a transmission timing after performing a DTX operation can be set up as a parameter.

As a result, the mobile terminal can calculate the receiving timing of the certain signal from the base station which the mobile terminal receives prior to uplink transmission.

This parameter can be set up in advance and can be shared between the base station and the mobile terminal, can be notified from the base station to the mobile terminal when a session of a radio bearer is started, or can be notified from the base station to the mobile terminal together with the DTX cycle.

A feature of the method disclosed above is that, as compared with the case in which above-mentioned Embodiment 7 is applied to downlink data and the variant 1 is applied to uplink data, the base station does not have to transmit the DTX cycle information about the DTX cycle at the time of completing transmission of downlink (retransmission) data to the mobile terminal. Therefore, there is provided an advantage of being able to reduce the scheduling load on the scheduler of the base station.

In accordance with the invention disclosed in this variant 2, in the case in which data transmissions are carried out via the downlink and the uplink, respectively, the method for uplink data transmission disclosed in above-mentioned Embodiment 7 is applied to a case in which the DRX cycle and the DTX cycle are made to be equal to each other and the transmission of downlink data has been completed previously, while the method for downlink data transmission disclosed in above-mentioned Embodiment 7 is applied to a case in which the DRX cycle and the DTX cycle are made to be equal to each other and the transmission of uplink data has been completed previously. Therefore, in addition to the advantages described in above-mentioned Embodiment 2, this variant offers an advantage of eliminating a useless operation of setting up the DRX cycle or the DTX cycle, and being able to prevent occurrence of a receiving error in the uplink or in the downlink which results from making a transition to either a DRX operation or a DTX operation even though transmission of an Ack signal/Nack signal is carried out via the downlink or the uplink.

Embodiment 8

In above-mentioned Embodiment 7, the method of, when, in data transmission with HARQ at a time of a DRX (DTX) operation, data transmission in a HARQ mode ends in success (when the mobile terminal transmits the Ack signal in the case of DRX or when the base station transmits the Ack signal in the case of DTX), notifying a DRX (DTX) period, which is effective until the next data transmission, from the base station to the mobile terminal using an L1/L2 control signal is explained.

As a result, even in a case in which retransmission with HARQ continues and the current time exceeds the original DRX cycle, because a DRX (DTX) period is notified from the base station to the mobile terminal after the last transmission is completed, there is provided an advantage of eliminating the risk of the mobile terminal starting a DRX (DTX) operation accidentally in the course of the retransmission with HARQ, and being able to reduce the load of the scheduling on the base station. A problem is however that in the course of the data transmission via the downlink in the HARQ mode, the mobile terminal has to receive an L1/L2 control signal once from the base station after transmitting an Ack signal.

Furthermore, because the timing at which the next Active starts during the DRX (DTX) operation period is dependent upon the timing at which the transmission with HARQ ends in success, there is a problem that a time interval which elapses until each first-time transmission is started differs each time, and the timing at which the next Active starts during the DRX (DTX) operation period cannot be predicted until the transmission with HARQ ends in success.

In accordance with this Embodiment 8, a DRX (DTX) control method of, even when, in data transmission with HARQ at a time of a DRX operation, a DRX (DTX) cycle is set up at a time of first-time transmission and the current time exceeds a DRX (DTX) period end timing which is set up for the first time through retransmission with HARQ, giving a higher priority to the retransmission without starting a DRX (DTX) operation, and then delaying the DRX (DTX) period end timing by the next DRX (DTX) cycle to set up the DRX (DTX) period end timing again will be explained.

Furthermore, there can be provided an advantage of, even when retransmission is repeated in data transmission using HARQ, and the current time exceeds the DRX (DTX) period end timing which is assumed first, being able to perform DRX/DTX control without paying attention to the number of times that the retransmission is carried out, and to reduce the scheduling load on the base station.

Unlike in the case of above-mentioned Embodiment 7, it is not necessary to transmit any information from the base station to the mobile terminal by using an L1/L2 control signal in the course of downlink transmission, and therefore the mobile terminal can make a transition to a DRX operation without waiting for an L1/L2 control signal from the base station. Furthermore, there is a possibility that the next Active (WakeUp) timing changes according to the number of times that the retransmission with HARQ is carried out, like in the case of above-mentioned Embodiment 7, though because the time interval which is delayed with respect to the DRX cycle which is set up at the time of the first-time transmission is determined according to a fixed rule, the time interval which elapses until each first-time transmission is started can be assumed to some extent. Furthermore, by setting up the DTX (DRX) cycle according to the fixed rule, there can be provided an advantage of making it easy to deal with a sudden change in the traffic.

FIG. 27 is a sequence diagram showing a flow of control in a DRX operation of the mobile communications system in accordance with Embodiment 8 of the present invention.

Hereafter, a flow of DRX control of the mobile communications system in accordance with this Embodiment 8 will be explained.

When the mobile communications system grasps that the base station and the mobile terminal are during Active (in a broad sense), downlink data on which the mobile terminal has to perform a DRX operation occurs.

At that time, the base station shifts to a setting process of setting up the DRX cycle, and then sets up the DRX cycle which is optimal for reducing the power consumption of the mobile terminal 3 and which is used for a DRX operation during Active (in a broad sense) (step ST5101).

FIG. 29 is a flow chart showing an example of an operation of setting up the DRX cycle in step ST5101.

As shown in FIG. 29, this method can be applied to not only a setup of the DTX cycle, but also a setup of the DRX cycle.

First, the protocol processing unit 33 of the base station 2 checks to see whether or not the mobile terminal is performing a DRX/DTX operation.

When judging that the mobile terminal is not performing any DRX/DTX operation (step ST5301), the protocol processing unit judges whether or not the mobile terminal 3 is able to perform either a DRX operation or a DTX operation during Active (in a broad sense) in the same way that that of above-mentioned Embodiment 1 does (step ST5302).

In a case in which the mobile terminal is able to perform a DRX/DTX operation, and data or a control signal which the base station transmits are only what generates an Idle period periodically, the base station enters a DRX operation mode (step ST5303).

In a case in which there are two or more data or control signals which require a DRX or DTX operation and have different DRX/DTX cycles (step ST5304), the base station calculates the DRX/DTX period end timings in the DRX/DTX cycles which are the nearest from the current time and compares them with each other (step ST5305).

The base station then sets the DRX/DTX period end timing which is the nearest from the data transmission start timing as the "next DRX/DTX period end timing". At that time, by doing in the same way, the base station sets the DRX/DTX period end timing which is the nearest from the next WakeUp timing (if there exist transmission data, the timing at which data transmission is started next time) as the "second-next DRX/DTX period end timing" (step ST5306).

The base station further sets a timing difference between the next DRX/DTX period end timing and the data transmission start timing as a "DRX/DTX cycle". At that time, by doing in the same way, the base station also calculates the next DRX/DTX cycle and the second-next DRX/DTX cycle (step ST5307).

When setting up the DRX cycle in the above-mentioned way (step ST5101), the base station notifies these pieces of DRX cycle information (including the next DRX cycle information) using an L1/L2 control signal, as well as data, to the mobile terminal (step ST5102). If, in, in this step, performing the operation for a second or subsequent time after entering the DRX operation mode, there exist no data to be transmitted in the base station when the base station wakes up after the DRX period is completed (step ST5119), the base station transmits only an L1/L2 control signal including the DRX cycle information to the mobile terminal.

The mobile terminal receives both the data and the L1/L2 control signal from the base station (step ST5103).

When the mobile terminal is not placed in the HARQ mode (step ST5104), the mobile terminal performs a DRX operation (sleeps) on the basis of the DRX cycle notified from the base station until the next "DRX period end timing" (steps ST5118 and ST5120).

In contrast, when the mobile terminal is placed in the HARQ mode (step ST5104), the mobile terminal checks the data received in step ST5103 and, when judging that the received data have no problem, transmits an Ack signal to the base station (step ST5108), whereas when the received data have a problem, the mobile terminal transmits a Nack signal to the base station (step ST5107).

Like the mobile terminal, after checking to see whether or not the base station is placed in the HARQ mode (step ST5105), the base station stands by until the next "DRX period end timing" if the base station is not placed in the HARQ mode.

In contrast, when the base station is placed in the HARQ mode, the base station receives the Ack signal/Nack signal transmitted from the mobile terminal (step ST5109) and, when receiving the Ack signal, makes a transition to a process of step ST5113 (step ST5110).

In contrast, when not receiving the Ack signal, the base station retransmits only data to the mobile terminal (step ST5111).

The base station carries out the processes of steps ST5109 to ST5111 repeatedly until receiving the Ack signal from the mobile terminal. Similarly, the mobile terminal also receives retransmission data (step ST5112), and carries out the processes of steps ST5106 to ST5112 repeatedly until transmitting the Ack signal to the base station (step ST5108) because the received data have no problem.

When receiving the Ack signal from the mobile terminal, the base station checks to see whether the current timing exceeds the DRX period end timing which is determined by the DRX cycle set up in step ST5101 (step ST5113).

When the current timing exceeds the DRX period end timing, the base station delays the DRX period end timing by the "next DRX cycle" which is calculated in step ST5101, and updates the "next DRX period end timing" in such a way that the "second-next DRX period end timing" is defined as the "next DRX period end timing" (step ST5115).

As an alternative, the base station, in step ST5115, can recalculate the "next DRX cycle" by performing the DRX/DTX cycles setting processes of steps ST5304 to ST5307 shown in FIG. 29, and can update the "next DRX period end timing" in such a way that the DRX period end timing which is delayed by the recalculated "next DRX cycle" is defined as the "next DRX period end timing".

After that, when the current time exceeds the "next DRX period end timing (step ST5119), the base station returns to the process of step ST5101 and then sets up the next DRX cycle (step ST5101).

The mobile terminal performs a similar operation.

More specifically, when the time at which the mobile terminal advances to step ST5114 exceeds the "DRX period end timing" which the mobile terminal has acquired from the DRX cycle information which is included in the L1/L2 control signal received from the base station in step ST5103, the mobile terminal updates the "next DRX period end timing" in such a way that the "second-next DRX period end timing" which the mobile terminal has obtained by delaying the "DRX period end timing" by the "next DRX cycle" is defined as the "next DRX period end timing" (step ST5116).

After that, the mobile terminal sleeps until the "next DRX period end timing" (steps ST5118 and ST5120), returns to the process of ST5103 after performing a DRX operation (after WakeUp), and waits for reception from the base station.

The mobile terminal, in step ST5103, can receive the "next DRX period end timing" in step ST5116 from the base station. As an alternative, the mobile terminal, in step ST5103, can receive only the "DRX cycle" and the "next DRX cycle, and can calculate and set up the "next DRX period end timing" again on the basis of these cycles.

As an alternative, when the mobile terminal, in step ST5103, receives the DRX cycle information about data and the DRX cycle information about a control signal which occur in the downlink (when there are two or more pieces of information to be transmitted, such as data and control signal, and their DRX cycles differ from one another, all pieces of DRX cycle information about the different DRX cycles) by using an L1/L2 control signal, and then determines that the time at which the mobile terminal advances to step ST5114 exceeds the "DRX period end timing" after the retransmission has ended in success, the mobile terminal, in step ST5116, can recalculate the "next DRX cycle" on the basis of those pieces of DRX cycle information by using the method described in steps ST5304 to ST5307 of FIG. 29, and can update the "next DRX period end timing" in such a way that the "DRX period end timing" (=the recalculated "second-next DRX period end timing") which is delayed by the recalculated "next DRX cycle" is defined as the "next DRX period end timing".

As a result, the present embodiment offers an advantage of being able to reduce the amount of DRX cycle information which is notified, in step ST5102, from the base station to the mobile terminal by using an L1/L2 control signal, and to make effective use of the radio resources.

FIG. 30 is a timing chart showing an actual operation with the DRX motion control sequence explained with reference to FIG. 27.

FIG. 30 shows an example of timings in which in downlink communications, after data retransmission has occurred in the HARQ mode, the time at which the data retransmission is completed exceeds the DRX cycle.

First, an L1/L2 control signal including the first data and DRX cycle information (DRX cycle (A)) is transmitted from the mobile terminal to the mobile station via the downlink (this step is equivalent to ST5102 of FIG. 27).

Because the mobile terminal is placed in the HARQ mode, the mobile terminal receives the DRX cycle (A) information by way of the L1/L2 control signal, calculates the "DRX period end timing" on the basis of this DRX cycle (A), checks to see whether the received data have any problem, and, when the received data have a problem, transmits a Nack signal to the base station via the uplink.

When receiving the Nack signal, the base station retransmits the data to the mobile terminal via the downlink. At that time, no DRX cycle information is not included in the L1/L2 control signal.

When the data which the mobile terminal has received for the second time do not have any problem, the mobile terminal transmits an Ack signal to the base station via the uplink, and, after that, sleeps until the calculated "DRX period end timing".

On the other hand, after the base station similarly stands by until the "DRX period end timing", the base station, in step ST5101, sets up the next DRX cycle (B) and notifies this next DRX cycle (B) to the mobile terminal by using an L1/L2 control signal.

At that time, because no downlink user data occur, only the L1/L2 control signal is transmitted.

The mobile terminal wakes up after the "DRX period end timing", receives the L1/L2 control signal including the information about this DRX cycle (B), calculates the next "DRX period end timing", and sleeps until this DRX period end timing (a timing of A+B).

After standing by until the timing of "A+B", the base station, in step ST5101, sets up a new DRX cycle (A) and notifies this new DRX cycle (A) to the mobile terminal by using an L1/L2 control signal.

At that time, downlink user data occur and the base station transmit the downlink user data, as well as the L1/L2 control signal, to the mobile terminal.

The mobile terminal which has slept until the timing of "A+B" receives the L1/L2 control signal including the new DRX cycle (A) and user data after waking up.

At that time, the transmission with HARQ ends in failure due to degradation in the quality of the radio communications, and the mobile terminal then succeeds in reception of the data which have been retransmitted for a third time (which have been transmitted for a fourth time in total) and then transmits an Ack signal to the base station via the uplink.

At that time, because the current time already exceeds the "DRX period end timing (the timing of A+B+A in FIG. 30)" which is calculated from the DRX cycle (A) which is notified first, the "DRX period end timing" which is delayed by the DRX cycle (A) is set up again as the "DRX period end timing (a timing of A+B+2×A)", and the mobile terminal and the base station are made to sleep until this timing.

As mentioned above, by performing the DRX control in consideration of the HARQ mode, the mobile communications system can carry out the DRX control even when the retransmission with HARQ is prolonged.

Furthermore, when the retransmission with HARQ is prolonged, because both the base station and the mobile terminal can update the next DRX period end timing automatically, the scheduling load of the base station t can be reduced as compared with conventional examples.

In addition, like in the case of above-mentioned Embodiment 7, it is not necessary to transmit any information from the base station to the mobile terminal by using an L1/L2 control signal in the course of downlink transmission, and the mobile terminal can make a transition to a DRX operation without waiting for any L1/L2 control signal from the base station and therefore further reduction of the power consumption can be accomplished.

Similarly, the DTX control of the mobile communications system will be explained hereafter.

FIG. 28 is a sequence diagram showing a flow of the DTX control of the mobile communication system.

Hereafter, the flow of the DTX control of the mobile communications system will be explained.

When transmission data occur in the mobile terminal while the mobile terminal does not carry out data communications via the uplink (step ST5201), the mobile terminal transmits a scheduling request (referred to as an SR from here on) to make a request for resource allocation and scheduling for uplink transmission to the base station first (step ST5202).

When receiving the SR from the mobile terminal (step ST5203), the base station allocates resources for the uplink (step ST5205), sets up the DTX cycle (step ST5206), and notifies these pieces of information to the mobile terminal by way of a downlink L1/L2 control signal.

Because a method of setting up the DTX cycle in step ST5206 is already described in the explanation of the DRX control, the explanation of the method will be omitted.

When receiving the resource allocation for the uplink, the DTX cycle information, and so on from the base station by way of the L1/L2 control signal (step ST5207), the mobile terminal performs a setup of radio resources for transmission, a setup of the DTX cycle, or a setup of a "DTX period end timing" on the basis of those pieces of information (step ST5207), and starts transmission of uplink data (step ST5208).

When receiving the uplink data from the mobile terminal (step ST5209), if the base station is not placed in the HARQ mode (step ST5211), the base station returns to the process of step ST5206 in synchronization with the "DTX period end timing" and then sets up the next DTX cycle.

In contrast, when the base station is placed in the HARQ mode (step ST5211), the base station checks the received data (step ST5212) and, when the received data have no problem, transmits an Ack signal to the mobile terminal (step ST5214), whereas when the received data have a problem, transmits a Nack signal to the mobile terminal (step ST5213).

The mobile terminal receives either the Ack signal or the Nack signal from the base station (step ST5216), and, when receiving the Ack signal (step ST5217), shifts to a process of step ST5220, whereas when receiving the Nack signal (step ST5217), the mobile terminal retransmits the uplink data to the base station (step ST5218).

The mobile terminal repeatedly carries out the processes of steps ST5216 to ST5218 until receiving the Ack signal from the base station. Similarly, the base station also receives the uplink data which are, in step ST5218, retransmitted thereto (step ST5213), and carries out the processes of steps ST5212 to ST5215 repeatedly until transmitting the Ack signal to the mobile terminal because the received data have no problem.

When succeeding in the transmission of the data, the mobile terminal checks to see whether the current timing exceeds the "next DTX period end timing" which is calculated in step ST5207 (step ST5220), and, when the current timing exceeds the next DTX period end timing, the mobile terminal delays the "next DTX period end timing" by the "next DTX cycle" and updates the "next DTX period end timing" in such a way that the "second-next DTX period end timing" is defined as the "next DTX period end timing" (step ST5221).

As an alternative, without, in step ST5204, receiving the "DTX cycle information", which is explained above, from the base station, the mobile terminal can receive the DTX cycle of data or a control signal which occurs in the uplink (in a case in which there are two or more cycles, a plurality of DTX cycles), and, when delaying the "next DTX period end timing" in step ST5221, in step ST5221, can delay the "next DTX period end timing" by using the "next DTX cycle" which is recalculated according to the DTX cycle setting method described in steps ST5304 to ST5307 of FIG. 29.

As a result, in the first step ST5206, the mobile terminal does not have to transmit the information about the next or subsequent DTX cycle by using an L1/L2 control signal, and can make effective use of the radio resources.

In contrast, when succeeding in the reception of the data from the mobile terminal, the base station checks to see whether the current timing exceeds the "next DTX period end timing" (step ST5219), and, when the current timing exceeds the next DTX period end timing, delays the "next DTX period end timing" by the "next DTX cycle" and updates the "next DTX period end timing" in such a way that the "second-next DTX period end timing" is defined as the "next DTX period end timing" (step ST5222). By this timing, the base station sets up the next DTX cycle in step ST5206, and transmits information indicating this DTX cycle to the mobile terminal by way of an L1/L2 control signal.

In step ST5222, instead of the DTX cycle calculated in step ST5206, the base station can use, as the value of the "DTX cycle" which is used when delaying the "next DTX period end timing", the "next DTX cycle" which the base station recalculates by using the method described in steps ST5304 to ST5307 of FIG. 29, like the mobile terminal.

The mobile terminal stands by until the "next DTX period end timing" after, in step ST5221, updating the "next DTX period end timing".

While standing by until the "next DTX period end timing", the mobile terminal, in by step ST5223, receives the next DTX cycle from the base station. It is desirable that during that time (during steps ST5221 to ST5223) and during steps ST5223 to ST5224, the mobile terminal carries out a DTX operation (sleeps) in order to reduce the power consumption.

After completing the DTX operation at the timing of step ST5224 (after waking up), the mobile terminal repeatedly carries out the processes of steps ST5207 to ST5223.

FIGS. 31 and 32 are timing charts showing an actual operation with the DTX motion control sequence explained with reference to FIG. 28.

FIG. 31 shows an operation timing in a case in which data transmission occurs in the uplink at a time when the system is placed in the HARQ mode, and FIG. 32 shows an operation timing in a case in which data and a control signal having two different DTX cycles similarly occur in the uplink at a time when the system is placed in the HARQ mode.

First, the operation timing in the case in which data transmission occurs in the uplink in the HARQ mode will be explained with reference to FIG. 31.

In FIG. 31, when transmission data (1) occur, an SR is transmitted to the base station via the uplink.

After receiving the SR, the base station notifies both uplink resource allocation information for the data (1) and a DTX cycle (A) for the data (1) to the mobile terminal by way of a downlink L1/L2 control signal.

When receiving the uplink resource allocation information and the DTX cycle (A), the mobile terminal transmits the data (1) (first-time transmission) by using an uplink resource allocated thereto.

However, in the example of FIG. 31, the mobile terminal fails in the transmission (first-time transmission) of the data (1), and carries out retransmission of the data three times (transmits the data four times in total).

After the mobile terminal carries out the third-time retransmission of the data (1), the base station succeeds in the reception of the data and transmits an Ack signal to the mobile terminal, and the mobile terminal receives the Ack signal.

At that time, because the current time already exceeds the "next DTX period end timing (the timing at which a time A has elapsed from the first-time transmission)" which is calculated from the DTX cycle (A) which is notified first, the "second-next DTX period end timing (a timing of A+A)" which is delayed by the next DTX cycle (A) is set up again as the "next DTX end timing", and the mobile terminal is made to sleep until this timing.

During that time, the base station, in step ST5206, sets up a DTX cycle (a DTX cycle (B)), and notifies the "next DTX cycle (B)" to the mobile terminal by way of a downlink L1/L2 control signal.

The mobile terminal receives the "next DTX cycle (B)" and sets up the "next DTX end timing" again after waking up, and then transmits data (2) to the base station. After receiving an Ack signal from the base station, the mobile terminal sleeps until the "next DTX end timing (=a timing at the expiration of A+A+B after the first-time transmission of the data (1))".

Next, an example of the operation in a case in which data and a control signal having two different DTX cycles occur in the uplink at a time when the system is placed in the HARQ mode will be explained with reference to FIG. 32.

When data (1) occur in the uplink, an SR is transmitted from the mobile terminal to the base station, and, in response to the SR, information about resource allocation and information about a DTX cycle (a DTX cycle (A)) are notified from the base station to the mobile terminal by way of a downlink L1/L2 control signal.

The DTX cycle (A) notified at that time is determined according to the same method as that explained for the case of the DRX cycle setting of step ST5101 with reference to FIG. 29. More specifically, the "DTX period end timing" which is the nearest to the current time is selected from the DTX cycle a of data and the DTX cycle b of a sounding signal for measurement of an uplink CQI, and the time which elapses from the first-time transmission to the "DTX period end timing" is calculated as the DTX cycle.

For example, in the example of FIG. 32, because a comparison between the DTX cycle a of the data and the DTX cycle b of the sounding signal shows that the DTX cycle a of the data is nearer to the current time, the DTX cycle (A) which is to be notified to the mobile terminal is the DTX cycle a of the data.

The mobile terminal to which this DTX cycle (A) is notified transmits data (1), as well as a sounding signal, to the base station by using a resource allocated thereto, but the base station cannot receive them properly and the mobile terminal performs retransmission of only the data (1) twice.

When the base station succeeds in the reception of the data after the mobile terminal performs the second-time retransmission of the data, because the timing at which an Ack signal is sent back to the mobile terminal already exceeds the "DTX period end timing (the timing at which a time A has elapsed after the first-time transmission of the data (1))" which is calculated from the DTX cycle (A) which is notified first, both the base station and the mobile terminal delay the "DTX period end timing" by the next DTX cycle (A) (=the data cycle a), and sets up the timing at which a time 2×A has elapsed from the first-time transmission of the data (1) again as the "DTX period end timing".

The mobile terminal sleeps until this timing, while the base station sets up the next DTX cycle (B) in synchronization with the mobile terminal's waking up, and notifies the next DTX cycle (B) to the mobile terminal by way of an L1/L2 control signal.

When performing the calculation of this DTX cycle (B), the base station uses a procedure of comparing the next DTX period end timing based on the data cycle a (i.e., the timing at which a time 3×a has elapsed since the first-time transmission of the data (1)) with the next DTX period end timing based on the sounding signal cycle b (i.e., the timing at which a time b has elapsed since the first-time transmission of the data (1)), selecting the period end timing based on the DTX cycle b which is nearer to the current timing, and setting up, as the DTX cycle (B), a time interval from the timing at which the mobile terminal is scheduled to wake up to the next period end timing based on the DTX cycle b.

In this example, the base station calculates the DTX cycle at the time of the DTX cycle setting (step ST5206), as previously explained. As an alternative, the mobile terminal can receive the DTX cycle of each data and, in step ST5207 or ST5221, can calculate and set up the DTX cycle.

Furthermore, in a case in which the system comes into a DTX operation during a DRX operation period, and makes the starting point of the DTX cycle be synchronized with that of the DRX cycle, as described in, for example, above-mentioned Embodiment 2, the system can selectively use either a method of synchronizing the Active start timing during the DTX operation period with the starting point of the current DRX cycle or a method of giving a higher priority to transmission of uplink data and a control signal which occur currently and then synchronizing the Active start timing during the DTX operation period with the starting point of the DRX cycle from the "next DTX cycle" according to the state of the uplink, and can support either of the synchronizing methods by using the DRX/DTX cycle setting and the DRX/DTX control method described in above-mentioned Embodiment 8. In this case, the DTX cycle can also be synchronized with the DRX cycle.

By setting up the next DTX cycle in synchronization with the mobile terminal's waking up by using the above-mentioned method, there can be provided a DTX control method of being able to reduce the frequency of transmission of an L1/L2 control signal between the base station and the mobile terminal to a minimum and to also reduce the processing loads on them even in a case in which there exist data and a control signal having different DTX cycles and even in a case in which retransmission occurs at a time exceeding the DTX cycle in the HARQ mode.

Furthermore, because the system carries out the DRX/DTX cycle setting and the DRX/DTX control according to a fixed rule, even when a sudden change occurs in the traffic, the system can expect the starting point of the DRX/DTX cycle to some extent, and therefore, also in a case in which the system comes into a DTX operation during a DRX operation period, and the starting point of the DTX cycle and the DTX cycle are synchronized with the starting point of the DRX cycle and the DRX cycle, respectively, the system can carry out the DTX cycle setting according to the priorities of data and control signals and the state of the uplink without straining itself.

Furthermore, as a variant 1 of this Embodiment 8, there can be a case in which, as shown in FIG. 33, while the mobile terminal receives data (1) in an immediately preceding DRX cycle, received data (2) having a DRX cycle (B) occur and the length of this DRX cycle (B) is short enough for this cycle to occur one or more times during the DRX interval a of the data (1).

In such a case, referring to the sequence diagram of the DRX control explained with reference to FIG. 27, it is necessary to, in performing the DRX cycle setting in the next step ST5101 when an immediately preceding DRX operation is completed (if Yes in step ST5119), set up the "current DRX cycle" by taking into consideration both the DRX cycle (B) of the data (2) which occur newly and the DRX cycle (A) of the data (1) which have already existed. It is necessary to, when setting up the "current DRX cycle" in step ST5101, set up the DRX cycle again by using the DRX/DTX cycle setting method which is explained with reference to FIG. 29.

In the case of using the DRX cycle setting method explained until now, what is necessary is just to compare the DRX period end timings of the two different DRX cycles with each other and to set up, as the DRX cycle, the time which has elapsed until one of the period end timings which is nearer to the starting point of the current DRX cycle.

However, in the case of this example, because the DRX cycle (B) is included in the DRX cycle, it is necessary to set up the DRX cycle in such a way that the mobile terminal can wake up at the starting point of the new DRX cycle (B). That is, the DRX cycle must be set up in such a way that it falls within a time interval C from the starting point of the DRX cycle (A) to the starting point of the DRX cycle (B).

After that, what is necessary is just to update the DRX cycle according to the flow shown in the flow chart of FIG. 29. The setup of the DRX cycle in accordance with this variant can also be applied to a case in which a similar status occurs in the DTX control.

Furthermore, in a case in which data (1) are being retransmitted with HARQ when data (2) having a new DRX cycle occur during a DRX operation period of the data (1), and, after that, the current time exceeds an immediately preceding DRX cycle (A) when the retransmission ends in success, in step ST5116 of FIG. 27, the "next DRX period end timing" can be delayed by the immediately preceding DRX cycle (A) by using the method as explained above, or the DRX cycle (B) of the downlink data (2) which has occurred newly can be notified from the base station to the mobile terminal by way of an L1/L2 control signal during the data retransmission with HARQ, and, in step ST5116 of FIG. 27, the DRX cycle can be recalculated by using the method explained in steps ST5304 to ST5307 of FIG. 29 and the "next DRX organization end timing" can be delayed by the re-calculated DRX cycle.

As mentioned above, by using the DRX/DTX control method and the DRX/DTX cycle setting method as explained in this Embodiment 8, there can be provided an advantage of, even when retransmission is continuously carried out in the HARQ mode, and the current time exceeds the DRX (DTX) cycle which is set up, being able to perform the DRX/DTX control without paying attention to the number of times that the retransmission is carried out in the HARQ mode, and to reduce the scheduling load on the base station as compared with the case of using a conventional technique.

Furthermore, unlike in the case of above-mentioned Embodiment 7, because the base station does not have to transmit any L1/L2 control signal to the mobile terminal in the course of downlink transmission in the HARQ mode, the mobile terminal can make a transition to a DRX operation without receiving an L1/L2 control signal from the base station and therefore the power consumption of the mobile terminal can be reduced.

In addition, because the system performs the DRX/DTX cycle setting and the DRX/DTX control according to a fixed rule, the Active timing of DRX/DTX can be expected to some extent even when a sudden change occurs in the traffic and both the base station and the mobile terminal can perform the DRX/DTX control individually. For example, also in a case in which the DRX control for the downlink and the DTX control for the uplink are shifted from each other in time and it is desired to synchronize the starting point of the DTX cycle in the DTX control with the starting point of the DRX cycle in the DRX control, from which time the starting point of the DTX cycle or the DTX cycle itself can be synchronized with the DRX cycle can be set up flexibly according to the priorities of uplink data and control signals and the retransmission status in the HARQ mode.

Furthermore, because the system performs the DRX/DTX cycle setting and the timing control according to a fixed rule, the load of these control operations can be distributed between the base station and the mobile terminal, and, as a result, the scheduling load on the base station can be reduced. In addition, also in a case in which data which needs a new DRX operation occurs, and the DRX/DTX cycle is so short that the DRX/DTX cycle falls within the DRX/DTX cycle of the previously-occurred data, the DRX cycle can be changed at a timing according to a fixed rule, and both the base station and the mobile terminal can perform this control operation individually, like in the case of the variant 1. Thus, there can be provided an advantage of being able to provide a high-flexibility DRX/DTX control method which can handle a combination of a plurality of DRX/DTX cycles and a change in the DRX/DTX cycle which is caused by occurrence of new data. In addition, by synchronizing the DTX cycle with the DRX cycle, there can be provided the same advantages as those offered by above-mentioned Embodiment 2.

Embodiment 9

In the nonpatent reference 8, a case in which two DRX cycles are set up is shown. However, the nonpatent reference 8 does not take into consideration at all a case in which HARQ is applied. A problem with a conventional method of notifying DRX cycle information using an L1/L2 control signal, as well as first-time transmission data, a conventional method of notifying DRX cycle information at a time of a setup of a radio bearer, and a conventional method of predetermining DRX cycle information is therefore that when the time of retransmission with HARQ exceeds the DRX cycle, it becomes impossible to make a DRX operation.

The nonpatent reference 8 also discloses a method of notifying a signal indicating a change in the DRX cycle instead of the DRX cycle information, though the above-mentioned problem also arises in this method.

In this Embodiment 9, in order to solve the above-mentioned problem, a method which is a combination of above-mentioned Embodiment 7 and above-mentioned Embodiment 8 will be disclosed.

FIG. 34 is an explanatory drawing showing a case, as shown in the nonpatent reference 8, in which two DRX cycles are set up. In FIG. 34, each open box shows downlink data and an L1/L2 control signal, and each diagonally shaded box shows an L1/L2 control signal.

A DRX cycle [1] is set up in such a way as to be longer than a DRX cycle [2], the DRX cycle [1] is predetermined and is shared by the base station and the mobile terminal, and the DRX cycle [2] is transmitted from the base station to the mobile terminal when a radio bearer is set up.

The mobile terminal which makes a transition to a DRX operation in the DRX cycle [1], and performs a receiving process after the DRX cycle [1], and, when there exist downlink data, receives the downlink data (refer to (1) in the figure). When there exist no more downlink data, the mobile terminal makes a transition to a DRX operation in the DRX cycle [2].

The mobile terminal performs a receiving process after the DRX cycle [2], and, when there exist downlink data, receives the downlink data (refer to (2) in the figure) and continues receiving the downlink data until after the next DRX cycle [2] (refer to (2) in the figure).

The mobile terminal receives an L1/L2 control signal after the next DRX cycle [2], and, when there exist no downlink data, makes a transition to a DRX operation in the DRX cycle [2] (refer to (3) in the figure).

Furthermore, the mobile terminal performs a receiving process after the DRX cycle [2], and, when there exist no downlink data, makes a transition to a DRX operation in the DRX cycle [2] (refer to (4) in the figure).

The mobile terminal then carries out reception at an earlier one of a timing after the DRX cycle [1] and a timing after the DRX cycle [2]. In the example of FIG. 34, because the timing after the DRX cycle [1] is earlier than that after the DRX cycle [2], the mobile terminal carries out downlink reception at the timing after the DRX cycle [1]. When there exist no downlink data, the mobile terminal makes a transition to a DRX operation in the DRX cycle [1] (refer to (5) in the figure).

Although the conventional example shown in the nonpatent reference 8 uses such a method, the conventional example does not taken into consideration at all any case in which HARQ is applied. A problem with the method, as shown in FIG. 34, of notifying the DRX cycle information by using an L1/L2 control signal, as well as final first-time transmission data in (1), is therefore that when the time of retransmission with HARQ exceeds the DRX cycle [2], it becomes impossible to make a transition to a DRX operation.

A further problem is that when retransmission with HARQ occurs immediately before the DRX cycle [1] and the time of the retransmission exceeds the DRX cycle [1], the mobile terminal cannot perform reception after the DRX cycle [1].

The nonpatent reference 8 also discloses the method of notifying a signal indicating a change in the DRX cycle instead of the DRX cycle information, though the above-mentioned problem also arises in this method.

In this Embodiment 9, in order to solve the above-mentioned problem, a method which is a combination of above-mentioned Embodiment 7 and above-mentioned Embodiment 8 will be disclosed.

FIG. 35 is an explanatory drawing showing an example of the method which is a combination of above-mentioned Embodiment 7 and above-mentioned Embodiment 8, the method being used for a case in which two DRX cycles are set up.

The method disclosed in above-mentioned Embodiment 7 is applied to the setup of the DRX cycle [2], and the method disclosed in above-mentioned Embodiment 8 is applied to the setup of the DRX cycle [1].

In the case of the downlink, each open box shows downlink first-time transmission data or downlink retransmission data, and an L1/L2 control signal, each horizontally shaded box shows downlink last first-time transmission data or downlink retransmission data, and each diagonally shaded box shows an L1/L2 control signal including a DRX transition signal.

In the case of the uplink, each open box shows an uplink Ack signal/Nack signal which is a response to either downlink first-time transmission data or downlink retransmission data, and each diagonally shaded box shows an Ack signal which is a response to either downlink last first-time transmission data or downlink retransmission data.

After the base station transmits downlink data to the mobile terminal (refer to (1) in the figure) and then transmits either last first-time transmission data or retransmission data to the mobile terminal, when receiving an Ack signal from the mobile terminal, the base station transmits a DRX transition signal to the mobile terminal by using the first L1/L2 control signal after the reception of the Ack signal (refer to (2) in the figure).

When receiving the DRX transition signal from the base station, the mobile terminal makes a transition to a DRX operation in the DRX cycle [2].

The mobile terminal carries out reception of an L1/L2 control signal after the DRX cycle [2], and, when there exist data destined for the mobile terminal, receives the downlink data (refer to (3) in the figure).

In contrast, when there exist no data destined for the mobile terminal after carrying out reception of an L1/L2 control signal after the DRX cycle [2], the mobile terminal makes a transition to a DRX operation in the DRX cycle [2]

again. By using the above-mentioned method, the system repeatedly carries out these series of operations.

Next, the base station transmits downlink data to the mobile terminal, and, when the time of transmission of either downlink first-time transmission data or downlink retransmission data exceeds a timing after the DRX cycle [1] due to retransmission or the like (refer to (4) in the figure), carries out the transmission of either the downlink first-time transmission data or the downlink retransmission data succeedingly.

When receiving an Ack signal from the mobile terminal after transmitting either the last first-time transmission data or the retransmission data to the mobile terminal, the base station transmits a DRX transition signal to the mobile terminal by using the first L1/L2 control signal after receiving the Ack signal (refer to (5) in the figure).

When receiving the DRX transition signal, the mobile terminal makes a transition to a DRX operation in the DRX cycle [2]. However, because the time of the transmission of either the downlink first-time transmission data or the downlink retransmission data exceeds the timing after the DRX cycle [1] due to the retransmission or the like (refer to (4) in the figure), the mobile terminal gives a higher priority to the retransmission or the like and sets up the DRX cycle again by further delaying the DRX cycle by the DRX cycle [1] without starting a DRX operation in the DRX cycle [1].

In this case, what is necessary is just to predetermine, in both the base station and the mobile terminal, that the DRX cycle [1] is set again. Information indicating that the DRX cycle [1] is set again can be alternatively notified from the base station to the mobile terminal.

When the DRX cycle [1] is set again and there exist neither downlink first-time transmission data nor downlink retransmission data from the base station to the mobile terminal at a timing after the next DRX cycle [1], the mobile terminal makes a transition to a DRX operation in the DRX cycle [1].

By using the method disclosed in this Embodiment 9, there can be provided an advantage of being able to solve the problem that it becomes impossible to make a transition to a DRX operation after the DRX cycle [2], and it becomes impossible to carry out reception after the DRX cycle [1] even in a case in which two DRX cycles are set up.

In this Embodiment 9, the case in which the method disclosed in above-mentioned Embodiment 7 is applied to the setup of the DRX cycle [2], and the method disclosed in above-mentioned Embodiment 8 is applied to the setup of the DRX cycle [1] is shown. As an alternative, the method disclosed in above-mentioned Embodiment 8 can also be applied to the setup of the DRX cycle [2].

In this Embodiment 9, although it is assumed that the number of DRX cycles which are set up is two, even when a plurality of DRX cycles are set up, the method disclosed in above-mentioned Embodiment 7 and the method disclosed in above-mentioned Embodiment 8 can be combined.

Embodiment 10

In above-mentioned Embodiment 9, the example in which the method disclosed in above-mentioned Embodiment 7 and the method disclosed in above-mentioned Embodiment 8 are combined is shown. In this Embodiment 10, an explanation will be made as to a method which is a combination of the method disclosed in above-mentioned Embodiment 7 and a conventional method will be explained, for selecting one of them according to a large and small relation between a required time corresponding to a maximum (MAX) number of retransmissions with HARQ, and the DRX cycle.

A base station transmits DRX cycle information which differs according to conditions as will be shown below to a mobile terminal.

The required time corresponding to the maximum (MAX) number of retransmissions with HARQ is expressed as Tmax, and the DRX cycle is expressed as TDRX.

(1) In a case of Tmax>=TDRX, the base station employs the method in accordance with above-mentioned Embodiment 7

In this case, the base station notifies the DRX cycle information to the mobile terminal by using an L1/L2 control signal or the like after receiving an Ack signal.

In this case, the start timing of the DRX cycle is the timing at which, when there exist downlink data, the base station transmits an L1/L2 control signal including the DRX cycle information to the mobile terminal after receiving an Ack signal from the mobile terminal.

In contrast, when there exist no downlink data, the start timing of the DRX cycle is the timing at which the base station transmits an L1/L2 control signal including the DRX cycle information to the mobile terminal.

When there exist downlink data, the start timing of the DRX cycle can be alternatively the timing at which the base station transmits an L1/L2 control signal to the mobile terminal.

(2) In a case of Tmax<TDRX, the base station employs the conventional method.

In this case, the base station notifies the DRX cycle information by using an L1/L2 control signal, an inband signal (the DRX cycle information is mapped onto a MAC header or the like as a MAC signaling), or the like, as well as first-time transmission data, to the mobile terminal.

In this case, the start timing of the DRX cycle is the transmission timing at which the base station transmits either the L1/L2 control signal or the inband signal to transmit the DRX cycle information, as well as the first-time transmission data, regardless of whether or not there exist downlink data.

Tmax can be predetermined, can be determined semi-statically, or can be determined dynamically.

FIG. 36 is a sequence diagram of the mobile terminal and the base station which employ the method which is a combination of the method disclosed in above-mentioned Embodiment 7 and a conventional method, for selecting one of them according to a large and small relation between the required time corresponding to the maximum (MAX) number of retransmissions with HARQ, and the DRX cycle.

When downlink data occurs (step ST8101), the base station judges whether or not Tmax<TDRX is satisfied (step ST8102).

When TDRX is larger than Tmax, the base station transmits the DRX cycle information, as well as the first-time transmission data, to the mobile terminal (step ST8103).

When receiving the first-time transmission data from the base station (step ST8104), the mobile terminal judges whether or not the DRX cycle information has been sent thereto together with the first-time transmission data (step ST8105).

When the DRX cycle information has been sent thereto, the mobile terminal sets the DRX cycle start timing as the timing of reception of the first-time transmission data (step ST8106), and enters a retransmission state with HARQ (ST8107).

When succeeding in the reception of the downlink data, the mobile terminal transmits an Ack signal to the base station and then escapes from the retransmission state.

After transmitting the Ack signal, the mobile terminal makes a transition to a DRX operation (step ST8108).

After receiving the Ack signal from the mobile terminal, the base station escapes from the retransmission state and makes a transition to a DRX operation for a mobile terminal A (step ST8109).

Each of the mobile terminal and the base station makes a transition to an active state after the DRX cycle (steps ST8110 and ST8111).

When TDRX is equal to or smaller than Tmax, the base station enters a retransmission state with HARQ without transmitting the DRX cycle information together with the first-time transmission data (step ST8112).

The mobile terminal judges whether or not the DRX cycle information has been transmitted thereto from the base station together with the first-time transmission data (step ST8105).

When the DRX cycle information has not been transmitted thereto, the mobile terminal enters a retransmission state with HARQ, (step ST8112).

When succeeding in the reception of the downlink data, the mobile terminal transmits an Ack signal to the base station and then escapes from the retransmission state.

After transmitting the Ack signal, the mobile terminal makes a transition to a DRX operation.

After receiving the Ack signal from the mobile terminal, the base station transmits the DRX cycle information to the mobile terminal by using the first L1/L2 control signal (step ST8113).

When receiving the DRX cycle signal from the base station (step ST8114), the mobile terminal sets up the DRX cycle start timing as the transmission timing of an Ack signal (step ST8115), and then makes a transition to a DRX operation (step ST8116).

After transmitting the DRX cycle information to the mobile terminal (step ST8113), the base station makes a transition to a DRX operation for a mobile terminal A (step ST8117).

Each of the mobile terminal and the base station makes a transition to an active state after the DRX cycle (steps ST8118 and ST8119).

As mentioned above, by using the method which is a combination of the method disclosed in above-mentioned Embodiment 7 and a conventional method, for selecting one of them according to a large and small relation between the required time corresponding to the maximum (MAX) number of retransmissions with HARQ, and the DRX cycle, in the case of Tmax<TDRX, the DRX cycle can be transmitted by using an L1/L2 control signal which is the same as that used when transmitting the first-time transmission data, even if retransmission occurs after that, the base station does not have to change the time allocated after the DRX cycle. Therefore, the scheduler load can be reduced.

Furthermore, because the base station recognizes that downlink data to be transmitted to the mobile terminal will occur immediately, the base station will have to shorten the DRX cycle, and, even after the following relation: Tmax>=TDRX is established, can avoid the problem with the retransmission by using the method disclosed in above-mentioned Embodiment 7.

Embodiment 11

It can be considered that in a case in which the DTX cycle is made to be equal to a CQI transmission cycle (i.e., a cycle in which the result of measurement of the quality of a downlink communication path is transmitted), the DTX cycle is predetermined or is set up in such a way as to be equal or longer than to the DRX cycle.

In such a case, there is a possibility that the timing at which an uplink Ack signal/Nack signal for downlink data is transmitted coincides with the transmission timing of a CQI.

Because PAPR (Peak to Average Power Ratio) becomes large when an Ack signal/Nack signal is transmitted at the same time when a CQI signal is transmitted, there arise problems, such as increase in the power consumption, reduction in the transmission power, and increase in the adjacent channel leakage power.

This Embodiment 11 discloses the following three types of methods of solving these problems in the case in which the timing at which an uplink Ack signal/Nack signal is transmitted coincides with the transmission timing of a CQI. Those methods include:

(a) a method of delaying the CQI transmission timing;

(b) a method of skipping the CQI transmission (at a timing at which they coincide with each other, no CQI is transmitted); and (c) a method of delaying the transmission timing at which an Ack signal/Nack signal is transmitted without changing the CQI transmission timing.

By using one of these methods, the system makes it possible to prevent the case in which an Ack signal/Nack signal is transmitted at the same time when a CQI signal is transmitted, and also makes it possible for the mobile terminal and the base station to make a transition to a DTX operation. In this embodiment, there is disclosed the following two types of methods of setting up the start timing of the DTX cycle including:

(A) a method of setting up the start timing of the DTX cycle in such a way as to be the CQI transmission timing which is predetermined; and (B) a method of setting up the start timing of the DTX cycle in such a way as to be the delayed CQI transmission timing.

As a combination of the CQI transmission timing and the start timing of the DTX cycle, there is disclosed the following methods including:

a method of being able to apply either (A) or (B) to the method (a);

a method of being able to apply (A) to the method (b); and a method of being able to apply (A) to the method (c).

FIG. 37 is an explanatory drawing showing examples in which the timing at which an uplink Ack signal/Nack signal is transmitted coincides with the CQI transmission timing.

FIG. 37(*a*) shows an example in which the CQI transmission timing is delayed by only 1 TTI and the start timing of the DTX cycle is set up in such a way as to be the predetermined CQI transmission timing, and FIG. 37(*b*) shows an example in which the CQI transmission is skipped and the start timing of the DTX cycle is set up in such a way as to be the predetermined CQI transmission timing.

When receiving a downlink reference signal from the base station, the mobile terminal calculates the quality CQI of the downlink communication path from the reference signal and then transmits a CQI signal corresponding to the quality CQI to the base station. It can be considered that the transmission cycle (TCQI) of the CQI signal is predetermined, or the transmission cycle is set up in such a way as to be equal to or longer than the DRX cycle.

On the other hand, when downlink data are transmitted from the base station via the downlink, the mobile terminal receives the downlink data and then transmits an Ack signal/Nack signal to the base station according to the status of the reception of the downlink data.

Therefore, when receiving a downlink reference signal, as well as downlink data, from the base station, the mobile terminal calculates the quality CQI of the downlink communication path from the downlink reference signal, and, while transmitting a CQI signal corresponding to the quality CQI to the base station, transmits an Ack signal/Nack signal to the base station according to the status of the reception of the downlink data.

In this case, the transmission timing of the Ack signal/Nack signal may coincide with the transmission timing of the CQI signal.

In such a case, as shown in FIG. 37(a), the mobile terminal delays the CQI transmission timing by one TTI. Thereby, the Ack signal/Nack signal is transmitted without the transmission timing of the Ack signal/Nack signal coinciding with the transmission timing of the CQI signal.

In this case, because the start timing of the DTX cycle is set up in such a way as to be the predetermined CQI transmission timing, the mobile terminal which has transmitted the CQI can make a transition to a DTX operation by the time the next CQI transmission timing comes.

In the example of FIG. 37(b), the mobile terminal skips the CQI transmission. Thereby, the Ack signal/Nack signal is transmitted without the transmission timing of the Ack signal/Nack signal coinciding with the transmission timing of the CQI signal.

In this case, because the start timing of the DTX cycle is set up in such a way as to be the predetermined CQI transmission timing, the mobile terminal which has transmitted the Ack signal/Nack signal can make a transition to a DTX operation by the time the next CQI transmission timing comes.

FIG. 38 is an explanatory drawing showing examples in which the timing at which an uplink Ack signal/Nack signal is transmitted coincides with the CQI transmission timing. FIG. 38(a) shows an example in which the CQI transmission timing is delayed by only one TTI and the start timing of the DTX cycle is set up in such a way as to be the delayed CQI transmission timing.

When receiving a downlink reference signal from the base station, the mobile terminal calculates the quality CQI of the downlink communication path from the reference signal, and then transmits a CQI signal corresponding to the quality CQI to the base station. It can be considered that the transmission cycle (TCQI) of the CQI signal is predetermined, or the transmission cycle is set up in such a way as to be equal to or longer than the DRX cycle.

On the other hand, when downlink data are transmitted from the base station via the downlink, the mobile terminal receives the downlink data and then transmits an Ack signal/Nack signal to the base station according to the status of the reception of the downlink data.

Therefore, when receiving a downlink reference signal, as well as downlink data, from the base station, the mobile terminal calculates the quality CQI of the downlink communication path from the downlink reference signal, and, while transmitting a CQI signal corresponding to the quality CQI to the base station, transmits an Ack signal/Nack signal to the base station according to the status of the reception of the downlink data.

In this case, the transmission timing of the Ack signal/Nack signal may coincide with the transmission timing of the CQI signal.

In such a case, the mobile terminal delays the CQI transmission timing by one TTI. Thereby, the Ack signal/Nack signal is transmitted without the transmission timing of the Ack signal/Nack signal coinciding with the transmission timing of the CQI signal.

In this case, because the start timing of the DTX cycle is set up in such a way as to be the delayed CQI transmission timing, the mobile terminal which has transmitted the CQI can make a transition to a DTX operation by the time the CQI transmission timing comes after the DTX cycle TCQI.

Because the mobile communications system makes it possible to prevent the case in which an Ack signal/Nack signal is transmitted at the same time when a CQI signal is transmitted from occurring by using the method disclosed in this Embodiment 11, the system can prevent the PAPR from becoming large and can therefore prevent problems, such as increase in the power consumption, reduction in the transmission power, and increase in the adjacent channel leakage power, from arising.

In addition, by determining the start timing of the DTX cycle by using the disclosed method, the mobile communications system makes it possible to make a transition to a DTX operation.

Embodiment 12

The nonpatent reference 8 shows a case in which two DRX cycles are set up. However, the DRX operation method shown in this nonpatent reference 8 has a problem from the viewpoint of low power consumption in a mobile terminal.

The problem with the DRX operation method of the nonpatent reference 8 will be explained hereafter with reference to FIG. 34 which is an explanatory drawing shown in the nonpatent reference 8.

Because the DRX operation method of the nonpatent reference 8 is already explained in Embodiment 9, the details of the explanation will be omitted hereafter.

The problem is that even though a mobile terminal which is running in a DRX cycle [2] which is set up in such a way as to be shorter than a DRX cycle [1] do not have any data which the mobile terminal receives continuously, the mobile terminal has to perform an operation of receiving an L1/L2 control signal in the DRX cycle [2] until the expiration of the DRX cycle [1] (refer to (4) in FIG. 34).

The above-mentioned problem becomes significant when achieving low power consumption in the mobile terminal.

Furthermore, the above-mentioned problem becomes more remarkable when the difference between the DRX cycle [1] and the DRX cycle [2] is large.

In accordance with this Embodiment 12, the above-mentioned problem is solved by using the following method.

When a mobile terminal receives (monitors) an L1/L2 control signal after the DRX cycle and there exist data destined for the mobile terminal itself, the mobile terminal makes a transition to a DRX operation in a "DRX cycle equal to or shorter than the current DRX cycle".

Furthermore, there is disclosed a DRX operation method of, when the mobile terminal receives (monitors) an L1/L2 control signal after the DRX cycle and there exist no data destined for the mobile terminal itself, making the mobile terminal make a transition to a DRX operation in a "DRX cycle equal to or longer than the current DRX cycle".

Hereafter, the DRX operation method for use in the mobile communications system in accordance with the present Embodiment 1 will be explained.

FIG. 39 is an explanatory drawing showing an example of the DRX operation method for use in the mobile communications system in accordance with Embodiment 12 of the present invention. In FIG. 39, each open box shows downlink data and each diagonally shaded box shows an L1/L2 control signal.

DRX cycles shown have the following relation in their lengths: an initial DRX cycle is longer than a DRX cycle [2], the DRX cycle [2] is longer than a DRX cycle [3], the DRX cycle [3] is shorter than a DRX cycle [4], and the DRX cycle [4] is shorter than a DRX cycle [5].

The mobile terminal which has made a transition to a DRX operation in the initial DRX cycle performs a process of receiving an L1/L2 control signal after the initial DRX cycle, and, when there exist downlink data destined for the mobile terminal itself, receives the downlink data (refer to (1) in FIG. 39).

The DRX cycle [2] is included, as a "DRX cycle equal to or shorter than the current DRX cycle", in this L1/L2 control signal.

The mobile terminal sets up the received DRX cycle [2] as the DRX cycle thereof.

The mobile terminal performs the process of receiving an L1/L2 control signal, and, when there exist downlink data continuously, receives the downlink data (refer to (2) in FIG. 39).

After the DRX cycle [2], the mobile terminal performs the process of receiving an L1/L2 control signal and there exist downlink data destined for the mobile terminal itself, receives the downlink data (refer to (3) in FIG. 39).

The DRX cycle [3] is included as, a "DRX cycle equal to or shorter than the current DRX cycle" which is a further shorter DRX cycle, in this L1/L2 control signal.

The mobile terminal sets up the received DRX cycle [3] as the DRX cycle thereof.

The mobile terminal performs the process of receiving an L1/L2 control signal, and, when there exist no downlink data continuously, performs a DRX operation in the DRX cycle (i.e., the DRX cycle [3]) (refer to (4) in FIG. 39).

In this example, the start point of the DRX cycle [3] is the head of a subframe including an L1/L2 control signal with which the DRX cycle [3] is notified to the mobile terminal (refer to FIG. 39). In another example, the DRX cycle [3] can be the head of a subframe including an L1/L2 control signal with which the mobile terminal checks that there exist no downlink data continuously (refer to (4) in FIG. 39).

After the DRX cycle [3], the mobile terminal performs the process of receiving an L1/L2 control signal and, when there exist no downlink data destined for the mobile terminal itself, makes a transition to a DRX operation (refer to (5) in FIG. 39). The DRX cycle [4] is included, as a "DRX cycle equal to or longer than the current DRX cycle", in this L1/L2 control signal. The mobile terminal performs the DRX operation (5) of FIG. 39 by using this DRX cycle [4].

After the DRX cycle [4], the mobile terminal performs the process of receiving an L1/L2 control signal and, when there exist no downlink data destined for the mobile terminal itself, makes a transition to a DRX operation (refer to (6) in FIG. 39).

The DRX cycle [5] is included as, a "DRX cycle equal to or longer than the current DRX cycle" which is a further longer DRX cycle, in this L1/L2 control signal. The mobile terminal performs the DRX operation (6) of FIG. 39 by using this DRX cycle [5].

FIG. 40 is a sequence diagram showing an example of the description of processing carried out by the mobile terminal and the base station in accordance with Embodiment 12 of the present invention.

The base station notifies the initial DRX cycle to the mobile terminal, and sets up the initial DRX cycle as the DRX cycle of the mobile terminal (step ST4001).

The mobile terminal receives the initial DRX cycle from the base station, and sets up the initial DRX cycle as the DRX cycle thereof (step ST4002).

As examples of a method of notifying the initial DRX cycle from the base station to the mobile terminal, there can be considered the following methods:

(1) a method of, when a radio bearer is set up, notifying the initial DRX cycle by using L3 signaling from the base station to the mobile terminal;

(2) a method of notifying the initial DRX cycle from the base station to the mobile terminal at a dynamic timing by using either an L1/L2 control signal or an inband signaling (a MAC signaling); and (3) a method of setting up the initial DRX cycle in both the base station and the mobile terminal as a specified value (Static) of the mobile communications system.

As an example of the specified value, there can be considered a maximum (e.g., 5,120 [TTI]) of the DRX cycle or the like. Because it is not necessary to notify the initial DRX cycle from the base station to the mobile terminal in the case in which the initial DRX cycle is set up as a specified value, there can be provided an advantage of making effective use of the radio resources. Furthermore, because it is not necessary to notify a wireless section, no receiving errors occur in the mobile terminal. Therefore, there can be provided another advantage of being able to avoid a problem that different initial DRX cycles are set up in the base station and the mobile terminal, respectively, due to a receiving error which occurs in the mobile terminal, and therefore the mobile terminal cannot receive any downlink data destined for the mobile terminal itself properly.

Each of the base station and the mobile terminal makes a transition to a DRX operation in the above-mentioned DRX cycle (steps ST4003 and ST4004).

The base station then judges whether downlink data destined for the mobile terminal have occurred (step ST4005).

First, the description of processing which the base station carries out when downlink data has occurred will be explained.

When downlink data occurs, the base station makes a transition to a process of step ST4006.

The base station notifies that there exist downlink data destined for the mobile terminal by using an L1/L2 control signal after the DRX cycle (step ST4006).

In other words, the base station carries out allocation (Allocation) of the downlink data (refer to (1) in FIG. 39).

The base station carries out allocation of the downlink data to the mobile terminal and also notifies a "DRX cycle equal to or shorter than the current DRX cycle" to the mobile terminal, and further sets up the "DRX cycle equal to or shorter than the current DRX cycle" which the base station has notified to the mobile terminal as the DRX cycle of the mobile terminal (step ST4008). In this case, the processes in steps ST4006 and ST4008 can be carried out simultaneously, or the order in which they are carried out is arbitrary.

The mobile terminal performs a receiving process of receiving an L1/L2 control signal after the DRX cycle (step ST4007).

The mobile terminal receives the "DRX cycle equal to or shorter than the current DRX cycle" through the receiving process of receiving an L1/L2 control signal (step ST4009).

The mobile terminal sets up the received "DRX cycle equal to or shorter than the current DRX cycle" as the DRX cycle thereof (step ST4010). Refer to (1) in FIG. 39.

The mobile terminal judges whether there exist data destined for the mobile terminal itself as a result of the reception (monitoring) of the L1/L2 control signal (step ST4011).

When there exist data destined for the mobile terminal itself, the mobile terminal makes a transition to a process of step ST4013. In this case, the processes in steps ST4007 to ST4011 can be carried out simultaneously, or the order in which they are carried out is arbitrary.

The base station transmits downlink data by using the radio resources, in step ST4006, allocated to the mobile terminal (step ST4012).

The mobile terminal receives the downlink data according to the radio resources, in step ST4007, allocated thereto by the base station (step ST4013).

The base station judges whether the next transmission timing (i.e., the timing of the next resource block (RB)) exceeds the DRX cycle (step ST4014).

When the next transmission timing does not exceed the DRX cycle, the base station shifts to a process of step ST4016.

The base station judges whether data destined for the mobile terminal have occurred continuously (step ST4016). When data have occurred, the base station shifts to a process of step ST4017.

The base station allocates the downlink data to the mobile terminal by using a continuous L1/L2 control signal (step ST4017). Refer to (2) in FIG. 39.

The base station allocates the downlink data to the mobile terminal by using the continuous L1/L2 control signal (step ST4017). Refer to (2) in FIG. 39.

The base station, in step ST4012, transmits the downlink data according to the radio resources allocated in step ST4017.

The mobile terminal judges whether the next receiving timing (the timing of the next resource block) exceeds the DRX cycle (step ST4015).

When the next receiving timing does not exceed the DRX cycle, the mobile terminal shifts to a process of step ST4018.

The mobile terminal performs the receiving process of receiving an L1/L2 control signal with the continuous L1/L2 control signal (step ST4018).

The mobile terminal judges whether there exist data destined for the mobile terminal itself as a result of the reception (monitoring) of the L1/L2 control signal (step ST4019). When there exist data destined for the mobile terminal itself, the mobile terminal shifts to the process of step ST4013.

The mobile terminal, in step ST4013, receives the downlink data according to the radio resources, in step ST4018, allocated thereto by the base station.

On the other hand, the base station judges whether the next transmission timing (i.e., the timing of the next resource block) exceeds the DRX cycle (step ST4014).

When judging that the next transmission timing exceeds the DRX cycle, the base station shifts to the process of step ST4005. Refer to (3) in FIG. 39.

The mobile terminal judges whether the next receiving timing (i.e., the timing of the next resource block) exceeds the DRX cycle (step ST4015).

When the next receiving timing exceeds the DRX cycle, the mobile terminal shifts to the process of step ST4007.

The base station also judges whether data destined for the mobile terminal have occurred continuously (step ST4016).

When no data have occurred, the base station shifts to the process of step ST4003 and performs a DRX operation in the "DRX cycle" (refer to (4) in FIG. 39).

The mobile terminal judges whether there exist data destined for the mobile terminal itself as a result of the reception (monitoring) of the L1/L2 control signal (step ST4019).

When there exist no data destined for the mobile terminal itself, the mobile terminal shifts to the process of step ST4004 and performs a DRX operation in the "DRX cycle".

Next, a case in which no downlink data have occurred will be explained.

When no downlink data have occurred, the base station shifts to a process of step ST4020.

The base station does not notify that there exist downlink data destined for the mobile terminal by using an L1/L2 control signal after the DRX cycle (step ST4020). In other words, the base station does not carry out allocation (Allocation) of downlink data (refer to (5) in FIG. 39).

As an alternative, the base station, in step ST4020, can notify that there exist no downlink data destined for the mobile terminal by using an L1/L2 control signal after the DRX cycle. In the case in which the base station notifies that there exist no downlink data destined for the mobile terminal, there can be provided an advantage of reducing the occurrence of receiving errors in the mobile terminal as compared with the case in which the base station does not notify that there exist no downlink data destined for the mobile terminal, because the base station notifies the clear information to the mobile terminal.

Next, the base station notifies a "DRX cycle equal to or longer than the current DRX cycle" to the mobile terminal by using an L1/L2 control signal after the DRX cycle, and sets up the "DRX cycle equal to or longer than the current DRX cycle" which the base station has notified to the mobile terminal as the DRX cycle of the mobile terminal (step ST4021).

After that, the base station shifts to the process of step ST4003 and performs a DRX operation in the "DRX cycle". In this case, the processes in steps ST4020 and ST4021 can be carried out simultaneously, or the order in which they are carried out is arbitrary.

The mobile terminal performs the receiving process of receiving the L1/L2 control signal after the DRX cycle (step ST4007).

The mobile terminal receives the "DRX cycle equal to or longer than the current DRX cycle" through the receiving process of receiving the L1/L2 control signal (step ST4009).

The mobile terminal sets up the received "DRX cycle equal to or longer than the current DRX cycle" as the DRX cycle thereof (step ST4010). Refer to (5) in FIG. 39.

The mobile terminal judges whether there exist data destined for the mobile terminal itself as a result of the reception (monitoring) of the L1/L2 control signal (step ST4011). As an alternative, the mobile terminal judges whether the mobile terminal has received a notification indicating that there exist no downlink data.

When there exist no data destined for the mobile terminal itself or when receiving a notification indicating that there exist no downlink data, the mobile terminal shifts to the process of step ST4004 and performs a DRX operation in the "DRX cycle". In this case, the processes in steps ST4007 to ST4011 can be carried out simultaneously, or the order in which they are carried out is arbitrary.

In the above-mentioned explanation, the example in which a "DRX cycle equal to or shorter than the current DRX cycle" and a "DRX cycle equal to longer than the current DRX cycle" are notified respectively by using L1/L2 control signals in steps ST4006 and step ST4020 is shown. As an alternative, they can be notified by using inband signals (a MAC signaling), instead of L1/L2 control signals.

As an alternative, when a radio bearer is set up, by using L3 signaling, a set of DRX cycles can be notified from the base station to the mobile terminal.

As an example of the set of DRX cycles, there can be a set of "a DRX cycle A, a DRX cycle B, a DRX cycle C, and a DRX cycle D". Assume that they have the following relation: "the DRX cycle A>the DRX cycle B>the DRX cycle C>the DRX cycle D".

In this case, as a trigger for changing the DRX cycle, there can be provided an L1/L2 control signal after the DRX cycle, as shown in each of steps ST4006 and ST4020.

More specifically, in a case in which the mobile terminal is notified that there exist downlink data destined for the mobile terminal by using an L1/L2 control signal (step ST4006), or in a case in which the mobile terminal is notified that the DRX cycle is changed to a DRX cycle equal to or shorter than the current DRX cycle, a DRX cycle which is shorter than the current DRX cycle by one is set up in both the base station and the mobile terminal. Concretely, in a case in which the current DRX cycle is the DRX cycle B, the DRX cycle C is set up as the DRX cycle.

In contrast, in a case in which the mobile terminal is not notified that there exist downlink data destined for the mobile terminal by using an L1/L2 control signal (step ST4020), in a case in which the mobile terminal is notified that there exist no downlink data destined for the mobile terminal, or in a case in which the mobile terminal is notified that the DRX cycle is changed to a DRX cycle equal to or longer than the current DRX cycle, a DRX cycle which is longer than the current DRX cycle by one is set up in both the base station and the mobile terminal. Concretely, when the current DRX cycle is the DRX cycle B, the DRX cycle A is set up as the DRX cycle. Because it becomes unnecessary to notify the DRX cycle by using an L1/L2 control signal in every DRX cycle by notifying a set of DRX cycles when a radio bearer is set up, there can be provided an advantage of making effective use of the radio resources.

Furthermore, in the mobile communications system, a set of DRX cycles can be alternatively set up for both the base station and the mobile terminal as specified values (Static). A concrete example of the set of DRX cycles is the same as that in the case in which a set of DRX cycles is notified at a time of a setup of a radio bearer.

Furthermore, an example of a trigger for changing the DRX cycle is the same as that in the case in which a set of DRX cycles is notified at a time of a setup of a radio bearer.

Because it is not necessary to notify any DRX cycles from the base station to the mobile terminal in the case in which a set of DRX cycles is set up as specified values, there can be provided an advantage of making effective use of the radio resources. Furthermore, because it is not necessary to notify a wireless section, no receiving errors occur in the mobile terminal. Therefore, there can be provided another advantage of being able to avoid a problem that different DRX cycles are set up in the base station and the mobile terminal, respectively, due to a receiving error which occurs in the mobile terminal, and therefore the mobile terminal cannot receive any downlink data destined for the mobile terminal itself properly.

Furthermore, in the above-mentioned explanation, the example in which a "DRX cycle equal to or shorter than the current DRX cycle" and a "DRX cycle equal to or longer than the current DRX cycle" are, in steps ST4006 and ST4020, notified respectively by using L1/L2 control signals is shown. As an alternative, only a difference ("a DRX cycle newly set up—the current DRX cycle") can be notified. As a result, the amount of information at the time of notifying a DRX cycle from the base station to the mobile terminal (the number of bits or the number of symbols) can be reduced, and therefore there can be provided an advantage of making effective use of the radio resources. The method using the above-mentioned difference can be used independently upon any method of notifying a DRX cycle from the base station to the mobile terminal (the method of notifying a "DRX cycle equal to or shorter than the current DRX cycle" and a "DRX cycle equal to or longer than the current DRX cycle" by using L1/L2 control signals, inband signals, or L3 signaling, and the method of setting them as specified values in the mobile communications system).

Furthermore, when there is no necessity to change the DRX cycle according to traffic conditions, it is possible not to notify any DRX cycle. Thereby, there can be provided an advantage of making further effective use of the radio resources.

There can be provided the following advantage by using the DRX operation method as shown above.

Generally, when there exist data destined for the mobile terminal, the traffic destined for the mobile terminal becomes high and it is therefore desirable to shorten the time interval during which the mobile terminal does not carry out any reception.

In contrast, when there exist no data destined for the mobile terminal, the traffic becomes low and it can be therefore considered that the time interval during which the mobile terminal does not carry out any reception can be lengthened.

By using the DRX operation method disclosed in this Embodiment 12, in the mobile communications system, a mobile terminal can receive (monitor) an L1/L2 control signal in the DRX cycle, and, when, as a result, judging that there exist data destined for the mobile terminal, change the DRX cycle to a "DRX cycle equal to or shorter than the current DRX cycle", whereas when there exist no data destined for the mobile terminal, the mobile terminal can change the DRX cycle to a "DRX cycle equal to or longer than the current DRX cycle".

Therefore, in accordance with this Embodiment 12, there can be provided a DRX operation method of being able to change the DRX cycle according to the status of the traffic.

As a result, this embodiment can offer an advantage of making it possible for a mobile terminal to achieve low power consumption according to the status of the traffic. As an example of the achievement of low power consumption in the mobile terminal, examples 1 and 2 of the power supply of the receiving system of the mobile terminal of FIG. 39, each of the examples having a time interval during which it can be considered that the mobile terminal is able to turn off the power supply of the receiving system, are shown.

Furthermore, the DRX operation method shown in this Embodiment 12 features the DRX cycle having many possible values regardless of the method of notifying a DRX cycle from the base station to the mobile terminal (i.e., the method of notifying a "DRX cycle equal to or shorter than the current DRX cycle" and a "DRX cycle equal to or longer than the current DRX cycle" by using L1/L2 control signals, inband signals, or L3 signaling, and the method of setting up them as specified values of the mobile communications system). As a result, the present embodiment can offer an advantage of being able to flexibly deal with the status of the traffic.

As especially compared with the DRX operation method disclosed in the nonpatent reference 8, the present embodiment can particularly offer the following advantage.

A problem with the nonpatent reference 8 is that the mobile terminal has to perform an operation of receiving an L1/L2 control signal in the DRX cycle [2] until the DRX cycle [1] has elapsed even though there exist no data which the mobile terminal receives continuously (refer to (4) in FIG. 34). In other words, a problem is that the mobile terminal cannot set up the DRX cycle according to the status of the traffic quickly. That is, a problem is that even when there exist no data destined for the mobile terminal, the mobile terminal cannot change (lengthen) the DRX cycle quickly.

According to the DRX operation method disclosed in this Embodiment 12, because the mobile terminal is able to receive (monitor) an L1/L2 control signal in the DRX cycle and to change the DRX cycle quickly according to the status of the traffic to the mobile terminal at that time, the problem with the above-mentioned nonpatent reference 8 can be solved.

As a result, because the mobile terminal can set up the DRX cycle quickly according to the status of the traffic by using the DRX operation method disclosed in this Embodiment 12, there can be provided an advantage of being able to eliminate the necessity to receive any unnecessary L1/L2 control signal which occurs because the mobile terminal cannot change (lengthen) the DRX cycle even though the traffic becomes low, thereby achieving low power consumption in the mobile terminal more effectively.

A variant 1 of Embodiment 12 will be explained.

In Embodiment 12, any arbitrary values can be set up as a "DRX cycle equal to or shorter than the current DRX cycle" and a "DRX cycle equal to or longer than the current DRX cycle", respectively. In contrast, in this variant 1, a method of making a relation between the current DRX cycle and a DRX cycle which is newly set up according to the status of the traffic be set will be disclosed.

An example of the relation between the current DRX cycle and the DRX cycle which is newly set up will be shown hereafter.

(a) A method of defining the difference between them. An example of a method of acquiring the new DRX cycle concretely is shown as follows:

A "DRX cycle equal to or shorter than the current DRX cycle"=the "current DRX cycle"+$N$ A "DRX cycle equal to or longer than the current DRX cycle"=the "current DRX cycle"−$N$ (b) A method of defining a relation of an integer divisor and a relation of an integer multiple. An example of the method of acquiring the new DRX cycle concretely is shown as follows:

A "DRX cycle equal to or shorter than the current DRX cycle"=the "current DRX cycle"×$1/N$ A "DRX cycle equal to or longer than the current DRX cycle"=the "current DRX cycle"×$N$ In the following explanation, the case (b) in which the relation of an integer divisor and the relation of an integer multiple are defined will be shown.

FIG. 41 is an explanatory drawing showing an example of the DRX operation method for use in the mobile communications system in accordance with the variant 1. In FIG. 41, each open box shows downlink data and each diagonally shaded box shows an L1/L2 control signal.

A mobile terminal which has made a transition to a DRX operation in an initial DRX cycle ("x" in FIG. 41) performs a process of receiving an L1/L2 control signal after the initial DRX cycle, and, when there exist downlink data destined for the mobile terminal itself, receives the downlink data (refer to (1) in FIG. 41).

When there exist data destined for the mobile terminal, because the status of the traffic becomes high, the mobile terminal sets up the "current DRX cycle×1/N" as a new DRX cycle in order to shorten the time interval during which the mobile terminal does not carry out any reception. In FIG. 41, an example of N=2 is shown. Therefore, the value which is newly set up as the DRX cycle is "x/2".

When the mobile terminal performs a process of receiving an L1/L2 control signal and there exist downlink data continuously, the mobile terminal receives the downlink data (refer to (2) in FIG. 41).

After the DRX cycle (x/2), when the mobile terminal performs the process of receiving an L1/L2 control signal and there exist downlink data destined for the mobile terminal itself, the mobile terminal receives the downlink data (refer to (3) in FIG. 41).

The mobile terminal then sets up the "current DRX cycle×1/N" as the new DRX cycle. In FIG. 41, an example of N=2 is shown. Therefore, the value which is newly set up as the DRX cycle is "x/4".

When the mobile terminal performs the process of receiving an L1/L2 control signal and there exist no downlink data continuously, the mobile terminal performs a DRX operation in the DRX cycle (x/4) (refer to (4) in FIG. 41). In this example, the start point of the DRX cycle is the head of a subframe including an L1/L2 control signal after the DRX cycle (refer to the FIG. 41).

After the DRX cycle (x/4), when the mobile terminal performs the process of receiving an L1/L2 control signal and there exist no downlink data destined for the mobile terminal itself, the mobile terminal makes a transition to a DRX operation (refer to (5) in FIG. 41).

The mobile terminal sets up the DRX cycle which the mobile terminal uses for this DRX operation as follows.

When the mobile terminal performs the receiving process of receiving an L1/L2 control signal and there exist no downlink data, because the status of the traffic becomes low, the mobile terminal sets up the "current DRX cycle×N" as the new DRX cycle in order to lengthen the time interval during which the mobile terminal does not carry out any reception. In FIG. 41, an example of N=2 is shown. Therefore, the value which is newly set up as the DRX cycle is "x/2".

After the DRX cycle (x/2), when the mobile terminal performs the process of receiving an L1/L2 control signal and there exist no downlink data destined for the mobile terminal itself, the mobile terminal makes a transition to a DRX operation (refer to (6) in FIG. 41). The DRX cycle which the mobile terminal uses for this DRX operation is set to "x/2×2=x", and is "x".

FIG. 42 is a sequence diagram showing an example of the description of processing carried out by the mobile terminal and the base station in accordance with the variant 1. FIG. 42 is similar to FIG. 40 which is the sequence diagram showing an example of the description of the processing carried out by the mobile terminal and the base station in accordance with Embodiment 12. Because the same processes are performed in steps designated by the same step numerals, the explanation of the processes will be omitted hereafter.

The base station notifies a maximum DRX cycle, a minimum DRX cycle, and "N" showing the relation between the current DRX cycle and the DRX cycle which is newly set up to the mobile terminal (step ST4201).

The mobile terminal receives the maximum DRX cycle, the minimum DRX cycle, and "N" from the base station (step ST4202).

These maximum DRX cycle and minimum DRX cycle which are notified from the base station to the mobile terminal are parameters newly required for the variant 1.

Embodiment 12 shows the example in which the base station notifies the new DRX cycle to the mobile terminal in every DRX cycle, the DRX cycle set is notified from the base station to the mobile terminal in advance, or the DRX cycle set is defined in the mobile communications system.

In contrast with this, in accordance with the variant 1, the new DRX cycle is not explicitly notified from the base station to the mobile terminal, but in each of the base station and the mobile terminal, the "new DRX cycle" is set up on the basis of the "current DRX cycle" and "N". By setting up the maximum DRX cycle and the minimum DRX cycle as parameters, there is provided an advantage of being able to prevent a long DRX cycle which does not fall within a permissible range or a short DRX cycle which does not fall within the permissible range from being set up.

As an example of the maximum DRX cycle, 5,120 [TTI] can be provided. As an example of the minimum DRX cycle, 1 [TTI] can be provided.

As examples of the method of notifying these maximum and minimum DRX cycles, and "N" from the base station to the mobile terminal, there can be provided the following methods:

(1) a method of, when a radio bearer is set up, notifying them from the base station to the mobile terminal by using L3 signaling; and (2) a method of setting up them in both the base station and the mobile terminal as specified values (Static) of the mobile communications system.

In the case in which the maximum and minimum DRX cycles, and "N" are set up as specified values, there can be provided an advantage of being able to use the radio resources effectively because it is not necessary to notify the maximum DRX cycle, the minimum DRX cycle, and "N" from the base station to the mobile terminal. Furthermore, because it is not necessary to notify a wireless section, no receiving errors occur in the mobile terminal. Therefore, there can be another advantage of being able to avoid a problem that the maximum DRX cycle, the minimum DRX cycle, and "N" are set up for the base station and the mobile terminal by a different base station due to a receiving error which occurs in the mobile terminal, and therefore the mobile terminal cannot receive any downlink data destined for the mobile terminal itself properly.

The maximum DRX cycle, the minimum DRX cycle, and "N" can be notified simultaneously, or can be notified at different times and the order in which they are notified can be arbitrary.

In the method of notifying a "DRX cycle equal to or shorter than the current DRX cycle" and a "DRX cycle equal to or longer than the current DRX cycle", which is described in Embodiment 12, in a case in which, when a radio bearer is set up, the DRX cycle set is notified from the base station to the mobile terminal or the DRX cycle set is set up in both the base station and the mobile terminal as specified values of the mobile communications system, the parameters: the above-mentioned "maximum DRX cycle" and "minimum DRX cycle" can be used. As a result, even in a DRX cycle included in the DRX cycle set, the base station can notify a DRX cycle which the base station can set up at that time to the mobile terminal. As a result, there can be provided an advantage of being able to implement a more optimal DRX operation method according to a relation with other mobile terminals, the sum of mobile terminals in the same cell, the status of the traffic of the mobile terminal, and so on.

There can be a case in which there arises a necessity to make the notification method changeable according to the status of the traffic and so on. Therefore, in addition to the above-mentioned notification method, there can be provided a notification method using an L1/L2 control signal, an inband signal, or the like in such a way that the notification from the base station to the mobile terminal can be made more dynamically.

First, the description of processing which is performed when downlink data occur will be explained.

When downlink data occurs, the base station makes a transition to a process of step ST4006.

The base station notifies the mobile terminal that there exist downlink data therein by using an L1/L2 control signal after the DRX cycle (step ST4006). In other words, the base station carries out allocation (Allocation) of the downlink data (refer to (1) in FIG. 41).

Next, the base station calculates, as a temporary DRX cycle, a "DRX cycle' (the DRX cycle'=the DRX cycle×1/N)" in order to set up a new DRX cycle (step ST4203).

The base station judges whether or not the DRX cycle' is shorter than the minimum DRX cycle which the base station, in step ST4201, notified to the mobile terminal (step ST4204).

When the DRX cycle' is not shorter than the minimum DRX cycle, the base station shifts to a process of step ST4205.

The base station sets up the DRX cycle' as the DRX cycle (step ST4205).

In contrast, when the DRX cycle' is shorter than the minimum DRX cycle, the base station shifts to a process of step ST4206.

The base station cancels the DRX cycle' and does not change the DRX cycle (step ST4206). As an alternative, the base station can set up, as the DRX cycle, the minimum DRX cycle which the base station, in step ST4201, notified.

The mobile terminal performs the receiving process of receiving an L1/L2 control signal after the DRX cycle (step ST4007).

The mobile terminal judges whether there exist data destined for the mobile terminal itself as a result of the reception (monitoring) of the L1/L2 control signal (step ST4011). When there exist data destined for the mobile terminal itself, the mobile terminal shifts to a process of step ST4211. The mobile terminal calculates a "DRX cycle' (the DRX cycle'=the DRX cycle×1/N)" as a temporary DRX cycle in order to set up a new DRX cycle (step ST4211).

The mobile terminal judges whether or not the DRX cycle' is shorter than the minimum DRX cycle which the mobile terminal received in step ST4202 (step ST4212).

When the DRX cycle' is not shorter than the minimum DRX cycle, the mobile terminal shifts to a process of step ST4213.

The mobile terminal sets up the DRX cycle' as the DRX cycle (step ST4213).

In contrast, when the DRX cycle' is shorter than the minimum DRX cycle, the mobile terminal shifts to a process of step ST4214.

The mobile terminal cancels the DRX cycle' and does not change the DRX cycle (step ST4214). As an alternative, the mobile terminal can set up, as the DRX cycle, the minimum DRX cycle which the mobile terminal received in step ST4202.

The base station transmits downlink data by using the radio resources which the base station, in step ST4006, allocated to the mobile terminal (step ST4012).

The mobile terminal receives the downlink data according to the radio resources, in step ST4007, allocated thereto by the base station (step ST4013).

Next, a case in which no downlink data occur will be explained.

When no downlink data occur, the base station shifts to a process of step ST4020.

The base station does not notify the mobile terminal that there exist downlink data by using an L1/L2 control signal after the DRX cycle (step ST4020). In other words, the base station does not carry out allocation (Allocation) of downlink data, or notifies the mobile terminal that there exist no downlink data (refer to (5) in FIG. 41).

Next, the base station calculates a "DRX cycle'" (the DRX cycle'=the DRX cycle×N)" as a temporary DRX cycle in order to set up a new DRX cycle (step ST4207).

The base station judges whether or not the DRX cycle' is longer than the maximum DRX cycle which the base station, in step ST4201, notified to the mobile terminal (step ST4208).

When the DRX cycle' is not longer than the maximum DRX cycle, the base station shifts to a process of step ST4209. The base station sets up the DRX cycle' as the DRX cycle (step ST4209).

In contrast, when the DRX cycle' is longer than the maximum DRX cycle, the base station shifts to a process of step ST4210.

The base station cancels the DRX cycle' and does not change the DRX cycle (step ST4210). As an alternative, the base station can set up, as the DRX cycle, the maximum DRX cycle which the base station notified in step ST4201.

The mobile terminal performs the receiving process of receiving an L1/L2 control signal after the DRX cycle (step ST4007).

The mobile terminal judges whether there exist data destined for the mobile terminal itself as a result of the reception (monitoring) of the L1/L2 control signal (step ST4011).

When there exist no data destined for the mobile terminal itself or when receiving a notification indicating that there exist no downlink data, the mobile terminal shifts to a process of step ST4215.

The mobile terminal calculates a "DRX cycle'" (the DRX cycle'=the DRX cycle×N)" as a temporary DRX cycle in order to set up a new DRX cycle (step ST4215).

The mobile terminal judges whether or not the DRX cycle' is longer than the maximum DRX cycle which the mobile terminal received in step ST4202 (step ST4216).

When the DRX cycle' is not longer than the maximum DRX cycle, the mobile terminal shifts to a process of step ST4217.

The mobile terminal sets up the DRX cycle' as the DRX cycle (step ST4217).

In contrast, when the DRX cycle' is longer than the maximum DRX cycle, the mobile terminal shifts to a process of step ST4218.

The mobile terminal cancels the DRX cycle' and does not change the DRX cycle (step ST4218). As an alternative, the mobile terminal can set up, as the DRX cycle, the maximum DRX cycle which the mobile terminal received in step ST4202.

In addition to the advantages provided using Embodiment 12, by using the DRX operation method shown in the above-mentioned variant 1, the following advantages can be offered.

In accordance with Embodiment 12, as a "DRX cycle equal to or shorter than the current DRX cycle" and a "DRX cycle equal to or longer than the current DRX cycle", arbitrary values are notified from the base station to the mobile terminal. In contrast, in accordance with the variant 1, the relation "N" between the current DRX cycle and the DRX cycle which is newly set up according to the status of the traffic is notified from the base station to the mobile terminal. As a result, the amount of information which is notified from the base station to the mobile terminal is reduced, and there is provided an advantage of being able to make effective use of the radio resources.

Furthermore, by using the method of defining the above-mentioned relation of an integer divisor and the above-mentioned relation of an integer multiple in the relation between the current DRX cycle and the DRX cycle which is newly set up, the DRX cycle which is newly set up is the "n-th power of N"-fold initial DRX cycle, or is the "n-th power of 1/N"-fold initial DRX cycle. As a result, there can be provided an advantage of being able to predict downlink resources which are allocated to the mobile terminal by the base station. Furthermore, by, in a case in which mismatching of the DRX cycle (a state transition error) occurs between the base station and the mobile terminal due to occurrence of an receiving error or the like when the mobile terminal receives an L1/L2 control signal, making the base station notify an L1/L2 control signal to the mobile terminal in a "longer DRX cycle" which is longer by one, the mobile terminal can receive the L1/L2 control signal, and therefore there is provided an advantage of being able to make the system recover from the state transition error.

As to the DRX operation method which is used when HARQ is applied and retransmission occurs, there are disclosed two broad examples in this specification.

They are the method shown in above-mentioned Embodiment 7 and the method shown in above-mentioned Embodiment 8. In order to provide the advantage of being able to predict the downlink resources which the base station allocates to the mobile terminal, it is preferable to use the method shown in above-mentioned Embodiment 8 so as to increase the compatibility with the DRX operation method which is used when HARQ is applied and retransmission occurs.

As especially compared with the DRX operation method disclosed in the nonpatent reference 8, the present embodiment can particularly offer the following advantage.

By using the method (a) of defining the above-mentioned relation of an integer divisor and the above-mentioned relation of an integer multiple in the relation between the current DRX cycle and the DRX cycle which is newly set up, which is shown in the variant 1, like in the case of using the method disclosed by the nonpatent reference 8, there is provided an advantage of being able to prevent an L1/L2 control signal receiving operation, as shown in (4) of FIG. 34, which should be avoided from the viewpoint of low power consumption in the mobile terminal, from occurring. As a result, there can be provided an advantage of being able to construct a mobile communications system which is more advantageous to low power consumption in the mobile terminal, as compared with the method disclosed by the nonpatent reference 8.

A variant 2 of Embodiment 12 will be explained.

In accordance with Embodiment 12, when the base station does not allocate downlink data to the mobile terminal once, the base station sets a "DRX cycle equal to or longer than the current DRX cycle" to the mobile terminal by using an L1/L2 control signal after the DRX cycle. Also when the mobile terminal recognizes once that no downlink data are allocated thereto by using an L1/L2 control signal after the DRX cycle, the mobile terminal sets up the "DRX cycle equal to or longer than the current DRX cycle" notified thereto from the base station.

In contrast, in accordance with the variant 2, when the base station judges that the number of consecutive times that the base station has not carried out any allocation of downlink data to the mobile terminal reaches M times by using L1/L2 control signals after the DRX cycle, the base station sets a "DRX cycle equal to or longer than the current DRX cycle" to the mobile terminal. Also when the mobile terminal has consecutively recognized M times that no downlink data have been allocated thereto by using L1/L2 control signals after the DRX cycle, the mobile terminal sets up the "DRX cycle equal to or longer than the current DRX cycle" notified thereto from the base station.

FIG. 43 is an explanatory drawing showing an example of the DRX operation method in the mobile communications system in accordance with the variant 2. In FIG. 43, each open box shows downlink data and each diagonally shaded box shows an L1/L2 control signal.

DRX cycles shown have the following relation in their lengths: an initial DRX cycle is longer than a DRX cycle [2], the DRX cycle [2] is longer than a DRX cycle [3], the DRX cycle [3] is shorter than a DRX cycle [4], and the DRX cycle [4] is shorter than a DRX cycle [5].

The mobile terminal which has made a transition to a DRX operation in the initial DRX cycle performs a process of receiving an L1/L2 control signal after the initial DRX cycle, and, when there exist downlink data destined for the mobile terminal itself, receives the downlink data (refer to (1) in FIG. 43).

The DRX cycle [2] is included in this L1/L2 control signal as a "DRX cycle equal to or shorter than the current DRX cycle". Together with this DRX cycle, "M (DRX cycle [2])" corresponding to the DRX cycle [2] is notified from the base station to the mobile terminal. The mobile terminal sets up the received DRX cycle [2] as the DRX cycle.

When the mobile terminal performs the receiving process of receiving an L1/L2 control signal and there exist downlink data continuously, the mobile terminal receives the downlink data (refer to (2) in FIG. 43).

After the DRX cycle [2], when the mobile terminal performs the receiving process of receiving an L1/L2 control signal and there exist downlink data destined for the mobile terminal itself, the mobile terminal receives the downlink data (refer to (3) in FIG. 43).

The DRX cycle [3] is included in this L1/L2 control signal as a "DRX cycle equal to or shorter than the current DRX cycle". Together with this DRX cycle, "M (DRX cycle [3])" corresponding to the DRX cycle [3] is notified from the base station to the mobile terminal.

In FIG. 43, a case of "M (DRX cycle [3])=2" is explained. The mobile terminal sets up the received DRX cycle [3] as the DRX cycle.

When the mobile terminal performs the receiving process of receiving an L1/L2 control signal and there exist no downlink data continuously, the mobile terminal performs a DRX operation in the DRX cycle (DRX cycle [3]) (refer to (4) in FIG. 43).

In this example, the start point of the DRX cycle [3] is the head of a subframe including an L1/L2 control signal with which the DRX cycle [3] is notified (refer to FIG. 43).

After the DRX cycle [3], when the mobile terminal performs the receiving process of receiving an L1/L2 control signal and there exist no downlink data destined for the mobile terminal itself, the mobile terminal makes a transition to a DRX operation (refer to (5) in FIG. 43).

The DRX cycle [4] may be included in this L1/L2 control signal as a "DRX cycle equal to or longer than the current DRX cycle". However, because the mobile terminal recognizes only once by using the L1/L2 control signal after the DRX cycle [3] that no allocation of downlink data has been carried out, and "M (DRX cycle [3])=2", the mobile terminal does not set up the DRX cycle [4] as the DRX cycle in (5) of FIG. 32. Therefore, the DRX cycle is kept to be the DRX cycle [3].

After the DRX cycle [3], when the mobile terminal performs the receiving process of receiving an L1/L2 control signal and there exist no downlink data destined for the mobile terminal itself, the mobile terminal makes a transition to a DRX operation (refer to (6) in FIG. 43). Because the mobile terminal has consecutively recognized M times (M (DRX cycle 3)=2) by using L1/L2 control signals after the DRX cycle [3] that no allocation of downlink data has not been carried out, the mobile terminal sets up the DRX cycle [4] as the DRX cycle.

FIG. 44 is a sequence diagram showing an example of the description of processing carried out by the mobile terminal and the base station in accordance with the variant 2. FIG. 44 is similar to FIG. 40 which is the sequence diagram showing an example of the description of the processing carried out by the mobile terminal and the base station in accordance with Embodiment 12 of the present invention. Because the same processes are performed in steps designated by the same step numerals, the explanation of the processes will be omitted hereafter.

The description of processing which is carried out when downlink data occur will be explained.

When downlink data occurs, the base station shifts to a process of step ST4006.

The base station notifies the mobile terminal that there exist downlink data by using an L1/L2 control signal after the DRX cycle (step ST4006). In other words, the base station carries out allocation (Allocation) of the downlink data (refer to (1) in FIG. 43).

While the base station allocates the downlink data to the mobile terminal, the base station notifies a "DRX cycle equal to or shorter than the current DRX cycle" to the mobile terminal and sets up, as the DRX cycle of the mobile terminal, the "DRX cycle equal to or shorter than the current DRX cycle" which the base station has notified (step ST4008).

The base station notifies "M" corresponding to the "DRX cycle equal to or shorter than the current DRX cycle" which the base station, in step ST4408, notified to the mobile terminal (step ST4401). In this case, the processes in steps ST4006, ST4008, and ST4401 can be carried out simultaneously, or the order in which they are carried out is arbitrary.

The parameter "M" is defined as follows.

In a case in which the status of the traffic becomes low and the frequency of occurrence of downlink data destined for the mobile terminal drops, the parameter is used for adjusting the timing at which the current DRX cycle is changed to a longer DRX cycle.

As a concrete example of the use of the parameter, the base station sets a "DRX cycle equal to or longer than the current DRX cycle" to the mobile terminal when judging that the number of consecutive times that the base station has not preformed any allocation of downlink data to the mobile terminal reaches M times by using L1/L2 control signals after the DRX cycle. When the mobile terminal has consecutively recognized M times that no downlink data have been allocated thereto by using L1/L2 control signals after the DRX cycle, the mobile terminal sets the "DRX cycle equal to or longer than the current DRX cycle" notified thereto from the base station as the DRX cycle.

The mobile terminal performs the receiving process of receiving an L1/L2 control signal after the DRX cycle (step ST4007).

The mobile terminal receives the "DRX cycle equal to or shorter than the current DRX cycle" through the receiving process of receiving the L1/L2 control signal (step ST4009).

Next, the mobile terminal receives "M" from the base station (step ST4402).

The parameter "M" is newly provided by the variant 2.

The mobile terminal judges whether there exist data destined for the mobile terminal itself as a result of the reception (monitoring) of the L1/L2 control signal (step ST4011). When there exist data destined for the mobile terminal itself, the mobile terminal shifts to a process of step ST4403.

The mobile terminal sets up, as the DRX cycle thereof, the DRX cycle which the mobile terminal received in step ST4009 (step ST4403). Refer to (1) in FIG. 43.

The base station transmits downlink data by using the radio resources which the base station, in step ST4006, allocated to the mobile terminal (step ST4012).

The mobile terminal receives the downlink data according to the radio resources which are, in step ST4007, allocated thereto by the base station (step ST4013).

Next, a case in where no downlink data occur will be explained.

When no downlink data occur, the base station shifts to a process of step ST4020.

The base station does not notify the mobile terminal that there exist no downlink data by using an L1/L2 control signal after the DRX cycle (step ST4020). In other words, the base station does not carry out allocation (Allocation) of downlink data (refer to (5) in FIG. 43).

The base station notifies a "DRX cycle equal to or longer than the current DRX cycle" to the mobile terminal by using an L1/L2 control signal after the DRX cycle (step ST4021).

The base station judges whether the number of consecutive times that the base station has not carried out any allocation of downlink data to the mobile terminal reach M times ("M" corresponds to the current DRX cycle) by using L1/L2 control signals after the DRX cycle (step ST4404). When the number of consecutive times that the base station has not carried out any allocation of downlink data to the mobile terminal is smaller than M times, the base station shifts to the process of step ST4003 and performs a DRX operation without changing the DRX cycle (refer to (5) in FIG. 43).

In contrast, when the number of consecutive times that the base station has not carried out any allocation of downlink data to the mobile terminal reaches M times, the base station shifts to a process of step ST4405 (refer to (6) in FIG. 43). The base station sets up the "DRX cycle equal to or longer than the current DRX cycle" which the base station has notified to the mobile terminal as the DRX cycle of the mobile terminal (step ST4405). After that, the base station shifts to the process of step ST4003 and performs a DRX operation (refer to (6) in FIG. 43).

The mobile terminal performs the receiving process of receiving an L1/L2 control signal after the DRX cycle (step ST4007).

The mobile terminal receives the "DRX cycle equal to or longer than the current DRX cycle" through the receiving process of an L1/L2 control signal (step ST4009).

The mobile terminal judges whether there exist data destined for the mobile terminal itself as a result of the reception (monitoring) of the L1/L2 control signal (step ST4011). When there exist no data destined for the mobile terminal itself, the mobile terminal shifts to a process of step ST4406.

The mobile terminal judges if it has consecutively checked to see that no allocation of downlink data to the mobile terminal has been performed M times ("M" corresponds to the current DRX cycle) by using L1/L2 control signals after the DRX cycle (step ST4406). When the number of consecutive times which the mobile terminal has recognized that no allocation of downlink data to the mobile terminal has been performed is smaller than M times, the mobile terminal shifts to the process of step ST4004 and performs a DRX operation without changing the DRX cycle (refer to (5) in FIG. 43).

In contrast, when the number of consecutive times which the mobile terminal has recognized that no allocation of downlink data to the mobile terminal has been performed reaches M times, the mobile terminal shifts to a process of step ST4407 (refer to (6) in FIG. 43).

The mobile terminal sets up, as the DRX cycle, the "DRX cycle equal to or longer than the current DRX cycle" which the mobile terminal has received (step ST4407). After that, the mobile terminal shifts to the process of step ST4004 and performs a DRX operation (refer to (6) in FIG. 43).

In the above-mentioned explanation, the example in which the base station notifies "M" by using an L1/L2 control signal in step ST4401 is shown. As an alternative, the base station can notify "M" by using an inband signal (a MAC signaling), instead of the L1/L2 control signal, while associating the inband signal with the corresponding DRX cycle.

As an alternative, when a radio bearer is set up, a "set of Ms" can be notified from the base station to the mobile terminal while the M set is associated with a set of DRX cycles notified by using L3 signaling. As an alternative, "Ms" corresponding to all the DRX cycles can be notified from the base station to the mobile terminal.

By, when a radio bearer is set up, notifying the "M set" from the base station to the mobile terminal while associating the M set with the DRX cycle set, it becomes unnecessary to notify "M" when notifying a "DRX cycle equal to or shorter than the current DRX cycle" by using an L1/L2 control signal in every DRX cycle. Therefore, there can be provided an advantage of being able to make effective use of the radio resources.

Furthermore, the "M set" can be alternatively set up, as specified values (Static), in both the base station and the mobile terminal while being associated with the DRX cycle set which is defined in the mobile communications system. As an alternative, "Ms" corresponding to all the DRX cycles can be notified from the base station to the mobile terminal.

In the case in which the "M set" is set up as specified values, there can be provided an advantage of being able to make effective use of the radio resources because it is not necessary to notify the DRX cycle from the base station to the mobile terminal.

Furthermore, because it is not necessary to notify a wireless section, no receiving errors occur in the mobile terminal. Therefore, there can be provided another advantage of being able to avoid a problem that different DRX cycles are set up in the base station and the mobile terminal, respectively, due to a receiving error which occurs in the mobile terminal, and therefore the mobile terminal cannot receive any downlink data destined for the mobile terminal itself properly.

In addition to the advantages provided using Embodiment 12, by using the DRX operation method shown in the above-mentioned variant 2, the following advantages can be offered.

In accordance with Embodiment 12, even when the number of consecutive times that the base station has not carried out any allocation of downlink data to the mobile terminal using an L1/L2 control signal after the DRX cycle is one, the base station sets up a "DRX cycle equal to or longer than the current DRX cycle" to the mobile terminal. When checking to see once that no allocation of downlink data has been carried out by using an L1/L2 control signal after the DRX cycle, the mobile terminal sets up a "DRX cycle equal to or longer than the current DRX cycle" notified thereto from the base station, too.

In contrast, in accordance with the variant 2, when judging that no allocation of downlink data to the mobile terminal has been continuously carried out M times by using an L1/L2 control signal after the DRX cycle, the base station sets a "DRX cycle equal to or longer than the current DRX cycle" to the mobile terminal. When the mobile terminal has continuously recognized M times that no downlink data have been allocated thereto by using an L1/L2 control signal after the DRX cycle, the mobile terminal sets up the "DRX cycle equal to or longer than the current DRX cycle" notified thereto from the base station, too.

As a result, when no allocation of downlink data has been carried out, the mobile terminal can adjust the time interval during which to check see whether the status of the traffic becomes low actually without making a transition to the "DRX cycle equal to or longer than the current DRX cycle" quickly. Furthermore, the system makes it possible to change the number of consecutive times that the mobile terminal has recognized that no downlink data have been allocated thereto.

As a result, there can be provided an advantage of being able to efficiently adjust the downlink throughput and low power consumption in the mobile terminal.

A variant 3 of Embodiment 12 will be explained.

In the variant 3, an example of a method which is most suitable for a case of using a combination of the variant 1 and the variant 2 is shown. Concretely, the parameter "N" of the variant 1 is made to be equal to the parameter "M" of the variant 2.

FIG. 45 is an explanatory drawing showing an example of a DRX operation method for use in a mobile communications system in accordance with the variant 3. In FIG. 45, each open box shows downlink data and each diagonally shaded box shows an L1/L2 control signal.

The mobile terminal which has made a transition to a DRX operation in an initial DRX cycle ("x" in FIG. 45) performs a receiving process of receiving an L1/L2 control signal after the initial DRX cycle, and, when there exist downlink data destined for the mobile terminal itself, receives the downlink data (refer to (1) in FIG. 45).

Because the status of the traffic becomes high when there exist data destined for the mobile terminal, the mobile terminal sets up, as a new DRX cycle, the "current DRX cycle×1/N" in order to shorten the time interval during which the mobile terminal does not carry out any reception. FIG. 45 shows an example of N=2. Therefore, the value which is newly set up as the DRX cycle is "x/2".

When the mobile terminal performs the receiving process of receiving an L1/L2 control signal and there exist downlink data continuously, the mobile terminal receives the downlink data (refer to (2) in FIG. 45).

After the DRX cycle (x/2), when the mobile terminal performs the receiving process of receiving an L1/L2 control signal and there exist downlink data destined for the mobile terminal itself, the mobile terminal receives the downlink data (refer to (3) in FIG. 45).

The mobile terminal sets up the "current DRX cycle×1/N" as the new DRX cycle. FIG. 45 shows the example of N=2. Therefore, the value which is newly set up as the DRX cycle is "x/4".

When the mobile terminal performs the process of receiving an L1/L2 control signal and there exist no downlink data continuously, the mobile terminal performs a DRX operation in the DRX cycle=x/4 (refer to (4) in FIG. 45).

In this example, the start point of the DRX cycle is the head of a subframe including an L1/L2 control signal after the DRX cycle (refer to FIG. 45).

After the DRX cycle (x/4), when the mobile terminal performs the receiving process of receiving an L1/L2 control signal and there exist no downlink data destined for the mobile terminal itself, the mobile terminal makes a transition to a DRX operation (refer to (5) in FIG. 45). Because the mobile terminal has checked to see only once that no allocation of downlink data thereto has been carried out by using an L1/L2 control signal after the DRX cycle=x/4, and "M=N=2", the mobile terminal does not change the DRX cycle in (5) of FIG. 45.

After the DRX cycle (x/4), when the mobile terminal performs the receiving process of receiving an L1/L2 control signal and there exist no downlink data destined for the mobile terminal itself, the mobile terminal makes a transition to a DRX operation (refer to (6) in FIG. 45). At that time, because the mobile terminal has recognized twice that no allocation of downlink data thereto has been carried out by using an L1/L2 control signal after the DRX cycle=x/4, the mobile terminal changes the DRX cycle in (6) of FIG. 45. The DRX cycle is "x/4×2=x/2".

A sequence diagram showing an example of the description of processing carried out by the mobile terminal and the base station in accordance with the variant 3 can be a combination of FIG. 42 which is the sequence diagram of the variant 1, and FIG. 44 which is the sequence diagram of the variant 2. Therefore, the explanation of the description of the processing carried out by the mobile terminal and the base station in accordance with the variant 3 will be omitted.

By using the DRX operation method shown in the above-mentioned variant 3, in addition to the advantages provided by the use of Embodiment 12, the variant 1, and the variant 2, the following advantages can be provided.

By making the parameter "N" of the variant 1 and the parameter "M" of the variant 2 have the same value, the mobile terminal certainly monitors an L1/L2 control signal in a "longer DRX cycle" which is longer by one (refer to (6) and (7) in FIG. 45).

Thereby, by, in a case in which mismatching of the DRX cycle (a state transition error) occurs between the base station and the mobile terminal due to occurrence of an receiving error or the like when the mobile terminal receives an L1/L2 control signal, making the base station notify an L1/L2 control signal to the mobile terminal in either a "longer DRX cycle" which is longer by one or the initial DRX cycle, the mobile terminal can receive the L1/L2 control signal, and therefore there is provided an advantage of being able to make the system recover from the state transition error.

As to the DRX operation method which is used when HARQ is applied and retransmission occurs, there are disclosed two broad examples in this specification.

They are the method shown in above-mentioned Embodiment 7 and the method shown in above-mentioned Embodiment 8. In order to acquire the advantages of the above-mentioned variant 3, it is preferable to use the method shown in above-mentioned Embodiment 8 so as to increase the compatibility with the DRX operation method which is used when HARQ is applied and retransmission occurs.

As especially compared with the DRX operation method disclosed in the nonpatent reference 8, the present embodiment can particularly offer the following advantages.

By, in the variant 3, using the method of keeping constant the relation between the current DRX cycle and a DRX cycle which is newly set up according to the status of the traffic, there is provided an advantage of being able to prevent any excess L1/L2 control signal receiving operation as shown in (4) of FIG. 34, like in the case of using the method disclosed by the nonpatent reference 8. As a result, there can be provided an advantage of being able to construct a mobile communications system which is more advantageous to low power consumption in the mobile terminal, as compared with the method disclosed by the nonpatent reference 8.

A variant 4 of Embodiment 12 will be explained.

In Embodiment 12, the method of notifying the "initial DRX cycle" from the base station to the mobile terminal is shown. In contrast, in this variant 4, a method of setting up the initial DRX cycle according to the QoS of the service is disclosed.

The description of processing carried out by the mobile terminal and the base station is similar to that shown in FIG. 40 which is the sequence diagram showing an example of the description of the processing carried out by the mobile terminal and the base station in accordance with Embodiment 12. Therefore, the processing carried out by the mobile terminal and the base station of this variant will be explained hereafter with reference to FIG. 40, focusing on a different portion.

The base station, in step ST4001, does not notify the initial DRX cycle to the mobile terminal.

Instead, when a radio bearer is set up, the base station selects the initial DRX cycle according to the QoS of the service which the base station notifies to the mobile terminal (e.g., according to the example 1 of FIG. 46), and sets up the initial DRX cycle as the DRX cycle.

Together with the base station, instead of receiving the initial DRX cycle, the mobile terminal, in step ST4002, selects an initial DRX cycle and sets up this initial DRX cycle as the DRX cycle according to the QoS of the service which is notified from the base station (according to the example 1 of FIG. 46).

The example 1 of FIG. 46 shows an example of the relation between the QoS of the service and the initial DRX cycle.

A grouping of the QoS is not limited to the example 1 of FIG. 46. As another example, the initial DRX cycle can be associated with the QoS of the service according to the providing service.

Furthermore, the DRX cycle is not limited to being specified in units of TTI as shown in the example 1 of FIG. 46, or can be specified in units of time [ms], subframe, or the like.

Furthermore, the relation between the QoS of the service and the initial DRX cycle can be defined in the mobile communications system, or can be notified from the base station to the mobile terminal.

When multiple services are implemented in the mobile communications system, the mobile communications system can select an initial DRX cycle corresponding to the highest one of the QoSs of services which can be provided in the base station and the mobile terminal, and can set up the selected initial DRX cycle as the DRX cycle.

Furthermore, the mobile communications system can set up a maximum DRX cycle according to the QoS of the service, as shown in an example 2 of FIG. 46. As an alternative, the mobile communications system can set up a minimum DRX cycle according to the QoS of the service.

This variant 4 can also be applied to the variant 1, the variant 2, and the variant 3.

By using the DRX operation method shown in the above-mentioned variant 4, in addition to the advantages provided by the use of Embodiment 12, the variant 1, the variant 2, and the variant 3, the following advantages can be provided.

Even in a case in which downlink data destined for the mobile terminal occur in the base station, if the mobile terminal is performing a DRX operation, the base station cannot transmit the downlink data to the mobile terminal.

Therefore, setting the DRX cycle to a longer one can achieve low power consumption in the mobile terminal, but causes a demerit of reducing the downlink throughput. More specifically, by, when the service is requested to have a high QoS, setting either the initial DRX cycle or the maximum DRX cycle to be a shorter one, the mobile communications system makes it possible to perform a DRX operation while satisfying the QoS of the service.

By using the variant 4, a DRX operation using either an optimal initial DRX cycle or an optimal maximum DRX cycle according to the QoS of the service can be implemented without notifying the initial DRX cycle, the maximum DRX cycle, or both the initial DRX cycle and the maximum DRX cycle from the base station to the mobile terminal.

As a result, there can be provided an advantage of enabling the mobile terminal to perform an optimal DRX operation which translates into low power consumption in the mobile terminal while satisfying the QoS of the service.

Furthermore, because it is not necessary to notify the initial DRX cycle, the maximum DRX cycle, or both the initial DRX cycle and the maximum DRX cycle from the base station to the mobile terminal, there can be provided an advantage of making effective use of the radio resources.

Embodiment 13

In the nonpatent reference 9, as data transmission methods of transmitting data for a E-MBMS (Evolved Multimedia Broadcast Multicast Service), and services (non-MBMS and non-EMBMS) other than the E-MBMS, there is disclosed a method of transmitting data with time division multiplexing (Time Division Multiplexing: TDM).

FIG. 47 is an explanatory drawing showing an example of allocation of radio resources to the E-MBMS and to services other than the E-MBMS. Units in which time division is carried out are, as an example, units of subframe (Subframe), as will be described below.

The nonpatent reference 10 discloses that only one leading symbol or only two leading symbols included in a subframe which is allocated to the E-MBMS with time division multiplexing (TDM) is used for a Unicast service.

An example of the allocation of the radio resources is shown in FIG. 48. This figure illustrates that only one leading symbol (refer to (1) in FIG. 48) included in a subframe which is allocated to the E-MBMS is used for a Unicast service.

The nonpatent references 9 and 10 describe nothing about a DRX operation (a DRX operation during Active).

In a case in which data about the E-MBMS and data about services other than the E-MBMS are time-division-multiplexed, and only one or several leading symbols included in a subframe which is allocated to the E-MBMS can be used for a Unicast service, there arises the following problem about a relation with a DRX operation (a DRX operation during Active).

The problem shown in Embodiment 13 will be explained with reference to FIG. 49.

A mobile terminal is performing a DRX operation in a DRX cycle (x). The mobile terminal is receiving (monitoring) an L1/L2 control signal in every DRX cycle (refer to (1) and (2) in FIG. 49). When judging that there exist downlink data destined for the mobile terminal itself as a result of the receiving process of receiving the L1/L2 control signal, the mobile terminal receives the downlink data by using the radio resources which are allocated thereto with an L1/L2 control signal.

The radio resources which are allocated to the mobile terminal with an L1/L2 control signal in dynamic scheduling are included in the same subframe as that in which the L1/L2 control signal is included with respect to the time axis.

In contrast, when judging that there exist no downlink data destined for the mobile terminal itself as a result of the receiving process of receiving the L1/L2 control signal, the mobile terminal performs a DRX operation in the DRX cycle (refer to (1) in FIG. 49).

There arises the following problem at a timing at which a cycle in which the E-MBMS is transmitted, i.e., a cycle in which E-MBMS data are time-division multiplexed coincides with the timing at which the mobile terminal comes into Active (refer to FIG. 15) during a DRX operation period.

Symbols available for a Unicast service which are included in a subframe allocated to the E-MBMS are only one or two leading symbols of the subframe, and the number of the symbols is smaller than the number of symbols (one, two, or three leading symbols) which are allocated to an L1/L2 control signal included in a subframe which is not allocated to the E-MBMS.

Therefore, there is a possibility that the mobile terminal which is performing a DRX operation is unable to judge whether there exist data destined for the mobile terminal itself in an L1/L2 control signal even if the mobile terminal monitors the L1/L2 control signal at the timing at which the cycle in which the E-MBMS is transmitted coincides with the timing at which the mobile terminal comes into Active (refer to FIG. 15) during a DRX operation period.

Hereafter, an operation for the E-MBMS and a DRX operation method in the mobile communications system in accordance with Embodiment 13 will be explained.

FIG. 50 is an explanatory drawing showing an example of the operation for the E-MBMS and the DRX operation method in the mobile communications system in accordance with Embodiment 13 of the present invention.

In FIG. 50, each open box shows downlink data for Unicast, each diagonally-to-the-right-and-upward-shaded box shows an L1/L2 control signal, and each diagonally-to-the-right-and-downward-shaded box shows data for the E-MBMS.

A mobile terminal performs a DRX operation in a DRX cycle (x). The mobile terminal receives (monitors) an L1/L2 control signal in every DRX cycle (refer to (1) in FIG. 50).

When judging that there exist downlink data destined for the mobile terminal itself as a result of the receiving process of receiving the L1/L2 control signal, the mobile terminal receives the downlink data by using radio resources which are allocated thereto with an L1/L2 control signal.

The radio resources which are allocated to the mobile terminal with an L1/L2 control signal in dynamic scheduling are included in the same subframe as that in which the L1/L2 control signal is included with respect to the time axis.

In contrast, when judging that there exist no downlink data destined for the mobile terminal itself as a result of the receiving process of receiving the L1/L2 control signal, the mobile terminal performs a DRX operation in the DRX cycle (refer to (1) in FIG. 50).

In a case in which the cycle in which the E-MBMS is transmitted, i.e., the cycle in which E-MBMS data are time-division multiplexed coincides with the timing at which the mobile terminal comes into Active (refer to FIG. 15) during a DRX operation period (refer to (2) in FIG. 50), the mobile terminal does not perform the receiving operation of receiving an L1/L2 control signal in the DRX operation (skips the receiving operation).

The mobile terminal which is performing a DRX operation performs the receiving operation of receiving an L1/L2 control signal in the DRX operation in the next subframe (refer to (3) in FIG. 50) in the cycle in which the E-MBMS is transmitted.

When allocation of downlink data transmission to the mobile terminal is carried out by using an L1/L2 control signal of the next subframe in the cycle in which the E-MBMS is transmitted, the base station transmits the downlink data and the mobile terminal receives the downlink data in the same subframe according to the allocation (refer to (4) in FIG. 50).

Furthermore, in a case in which the cycle in which the E-MBMS is transmitted does not coincide with the timing at which the mobile terminal comes into Active during a DRX operation period (the receiving timing of an L1/L2 control signal during the DRX operation period), the mobile terminal performs the receiving operation of receiving an L1/L2 control signal in the DRX operation at a timing which does not differ from that in the case in which the mobile terminal does not skip the receiving operation (refer to (5) in FIG. 50).

FIG. 51 is a sequence diagram showing an example of the description of processing carried out by a mobile terminal and a base station in accordance with Embodiment 13 of the present invention.

The base station notifies a E-MBMS transmission cycle and the starting point (Starting Point) of the E-MBMS transmission cycle to the mobile terminal (step ST6101). It can be considered that each of the starting points is notified with a frame number, a subframe number, a slot number, a symbol number, or the like.

Generally, it is enough for only a mobile terminal which receives a E-MBMS service to receive the notification of the E-MBMS transmission cycle and the starting point of the E-MBMS transmission cycle. However, this Embodiment 13 is characterized in that, in step ST6101, not only either a mobile terminal which receives a E-MBMS service or a mobile terminal having a capability of receiving a E-MBMS service, but also all mobile terminals which belong to the base station receives the transmit information about a E-MBMS service (the E-MBMS transmission cycle and the starting point of the E-MBMS transmission cycle) from the base station.

This is because there is a possibility that any mobile terminal other than a mobile terminal which receives a E-MBMS service or a mobile terminal having a capability of receiving a E-MBMS service performs a DRX operation during Active, too. For this reason, it can considered that a BCH (Broadcast Channel) or the like which is a channel via which broadcast information is transmitted is used for the above-mentioned notification.

A mobile terminal receives the E-MBMS transmission cycle and the starting point of the E-MBMS transmission cycle from the base station (step ST6102).

In a mobile communications system in which a mobile terminal which does not perform any DRX operation during Active or a mobile terminal which does not have the capability of performing a DRX operation during Active is permitted, all mobile terminals which belong to the base station do not have to receive the transmit information about a E-MBMS service, and a mobile terminal which does not perform any DRX operation during Active or a mobile terminal which does not have the capability of performing a DRX operation during Active does not have to receive the transmit information about the E-MBMS service.

Each of the base station and the mobile terminal then makes a transition to a DRX operation in the DRX cycle (steps ST6103 and ST6104).

The base station judges whether downlink data destined for the mobile terminal has occurred (step ST6105).

First, the description of the processing in a case in which downlink data has occurred will be explained.

When downlink data has occurred, the base station shifts to a process of step ST6106.

The base station judges whether the timing of transmission of an L1/L2 control signal during a DRX operation period to the mobile terminal coincides with the transmission timing of the E-MBMS (step ST6106). When the timing of transmission of an L1/L2 control signal coincides with the transmission timing of the E-MBMS, the base station shifts to a process of step ST6111.

The base station does not perform the transmitting operation at the transmission timing of an L1/L2 control signal in a general DRX operation (skips the transmitting operation) (step ST6111).

In the next subframe (refer to (3) in FIG. 50) of the transmission timing of an L1/L2 control signal in a general DRX operation, the base station performs the transmitting operation of transmitting an L1/L2 control signal to the mobile terminal in the DRX operation.

The mobile terminal judges whether the receiving timing of an L1/L2 control signal during a DRX operation period coincides with the transmission timing of the E-MBMS (step ST6107).

When the receiving timing of an L1/L2 control signal coincides with the transmission timing of the E-MBMS, the mobile terminal makes a transition to a process of step ST6112.

The mobile terminal decides not to perform (to skip) the receiving operation at the receiving timing of an L1/L2 control signal in a general DRX operation (refer to (2) in FIG. 50) (step ST6112).

In the next subframe at the receiving timing of an L1/L2 control signal in a general DRX operation (refer to (3) in FIG. 50), the mobile terminal performs the receiving operation of receiving an L1/L2 control signal in the DRX operation.

The base station, in step ST6111 or ST6108, transmits the downlink data by using the radio resources allocated to the mobile terminal (step ST6113).

The mobile terminal judges whether there exist data destined for the mobile terminal itself as a result of the reception (monitoring) of the L1/L2 control signal (step ST6110). When there exist data destined for the mobile terminal itself, the mobile terminal shifts to a process of step ST6114.

The mobile terminal receives the downlink data according to the radio resources which are, in step ST6112 or ST6109, allocated thereto by the base station (step ST6114).

The base station judges whether the timing of transmission of an L1/L2 control signal during a DRX operation period to the mobile terminal coincides with the transmission timing of the E-MBMS (step ST6106).

When the timing of transmission of an L1/L2 control signal does not coincide with the transmission timing of the E-MBMS, the base station shifts to a process of step ST6108.

The base station performs the transmitting operation at the timing of transmission of an L1/L2 control signal in a general DRX operation (step ST6108). After that, the base station shifts to a process of step ST6113.

The mobile terminal performs the receiving operation at the receiving timing of an L1/L2 control signal in a general DRX operation (step ST5109). After that, the mobile terminal shifts to a process of step ST6114.

Next, a case in which no downlink data have occurred will be explained.

When no downlink data have occurred, the base station shifts to the process of step ST6103 (step ST6105).

The mobile terminal judges whether there exist data destined for the mobile terminal itself as a result of the reception (monitoring) of an L1/L2 control signal (step ST6110). When there exist no data destined for the mobile terminal itself, the mobile terminal shifts to the process of step ST6104.

This Embodiment 13 can offer the following advantage.

There can be provided an advantage of being able to provide both a E-MBMS service and a Unicast service while preventing any discrepancies from occurring in the services, without providing any new information which is to be transmitted and received between a base station and a mobile terminal.

In order to solve the problem shown in this Embodiment 13, the not providing of any new information which is to be transmitted and received between a base station and a mobile terminal is a solving means effective for achieving effective use of the radio resources.

A variant 1 of Embodiment 13 will be explained.

Embodiment 13 solves the problem by not performing any operations of transmitting and receiving an L1/L2 control signal in the DRX operation in the case in which the cycle in which the E-MBMS is transmitted coincides with the timing at which the mobile terminal comes into Active during a DRX operation period.

In this variant 1, even in the case in which the cycle in which the E-MBMS is transmitted coincides with the timing at which the mobile terminal comes into Active during a DRX operation period (refer to (2) in FIG. 50), the mobile terminal transmits and receives an L1/L2 control signal in the DRX operation in the DRX cycle by using one or several leading symbols which can be used for a Unicast service. As a result, the following new problem arises.

A portion other than the one or more symbols which are included in a subframe allocated to the E-MBMS and which can be used for a Unicast service are used by the E-MBMS, but cannot be used for any Unicast service. Therefore, in a case in which, by using one or more symbols which are included in a subframe allocated to the E-MBMS and which can be used for a Unicast service, transmission of downlink data is allocated to a mobile terminal by way of an L1/L2 control signal which is transmitted from a base station to the mobile terminal, there arises a problem that data for the E-MBMS collides with data for the Unicast (refer to (3) in FIG. 49).

In this variant 1, in the case in which the cycle in which the E-MBMS is transmitted coincides with the timing at which the mobile terminal comes into Active during a DRX operation period and in the case in which allocation of downlink data is performed by way of an L1/L2 control signal, the problem is solved by carrying out allocation of downlink data actually in the next subframe (or after a certain subframe which is defined in the mobile communications system, or after a certain subframe which is notified from the base station to the mobile terminal).

An example of an operation for the E-MBMS and a DRX operation method of the mobile communications system in accordance with the variant 1 will be explained with reference to FIG. 50. In FIG. 50, each open box shows downlink data for Unicast, each diagonally-to-the-right-and-upward-shaded box shows an L1/L2 control signal, and each diagonally-to-the-right-and-downward-shaded box shows data for the E-MBMS.

A mobile terminal is performing a DRX operation in a DRX cycle (x). The mobile terminal is receiving (monitoring) an L1/L2 control signal in every DRX cycle (refer to (1) in FIG. 50).

When judging that there exist downlink data destined for the mobile terminal itself as a result of the receiving process of receiving the L1/L2 control signal, the mobile terminal receives the downlink data by using the radio resources which are allocated thereto with an L1/L2 control signal.

The radio resources which are allocated to the mobile terminal with an L1/L2 control signal in dynamic scheduling are included in the same subframe as that in which the L1/L2 control signal is included with respect to the time axis.

In contrast, when judging that there exist no downlink data destined for the mobile terminal itself as a result of the receiving process of receiving an L1/L2 control signal, the mobile terminal performs a DRX operation in the DRX cycle (refer to (1) in FIG. 50).

Even in the case in which the cycle in which the E-MBMS is transmitted, i.e., the cycle in which E-MBMS data are time-division multiplexed coincides with the timing at which the mobile terminal comes into Active during a DRX operation period (refer to FIG. 15) (refer to (2) in FIG. 50), the mobile terminal transmits and receives an L1/L2 control signal in the DRX operation in the DRX cycle by using one or several leading symbols which can be used for a Unicast service.

In a case in which downlink data are allocated to the mobile terminal by using an L1/L2 control signal, the base station and the mobile terminal do not transmit and receive the downlink data in the same subframe, but transmit and receive the downlink data in the next subframe in the cycle in which the E-MBMS is transmitted (refer to (4) in FIG. 50).

Furthermore, in a case in which the cycle in which the E-MBMS is transmitted does not coincide with the timing at which the mobile terminal comes into Active during a DRX operation period (the receiving timing of an L1/L2 control signal during the DRX operation period), when downlink data are allocated to the mobile terminal by using an L1/L2 control signal, the base station and the mobile terminal transmit and receive the downlink data in the same subframe as that for the radio resources which are allocated to the mobile terminal with an L1/L2 control signal, with respect to the time axis, like in the case of general dynamic scheduling.

FIG. 52 is a sequence diagram showing an example of the description of processing carried out by a mobile terminal and a base station in accordance with the variant 1. FIG. 52 is similar to FIG. 51 which is the sequence diagram showing an example of the description of the processing carried out by a mobile terminal and a base station in accordance with Embodiment 13 of the present invention. Because the same processes are performed in steps designated by the same step numerals, the explanation of the processes will be omitted hereafter.

The description of processing which is carried out when downlink data have occurred will be explained.

When downlink data has occurred, the base station shifts to a process of step ST6201.

The base station notifies the mobile terminal that there exist downlink data by using an L1/L2 control signal after the DRX cycle (step ST6201). In other words, the base station carries out allocation (Allocation) of the downlink data (refer to (2) in FIG. 50). After that, the base station shifts to a process of step ST6106.

The mobile terminal performs the receiving process of receiving the L1/L2 control signal after the DRX cycle (step ST6202). After that, the mobile terminal shifts to a process of step ST6110.

The mobile terminal judges whether there exist data destined for the mobile terminal itself as a result of the reception (monitoring) of the L1/L2 control signal (step ST6110). When there exist data destined for the mobile terminal itself, the mobile terminal shifts to a process of step ST6107.

The base station judges whether the timing of transmission of an L1/L2 control signal to the mobile terminal during a DRX operation period coincides with the transmission timing of the E-MBMS (step ST6106). When the timing of transmission of an L1/L2 control signal coincides with the transmission timing of the E-MBMS, the base station shifts to a process of step ST6203.

The base station skips the transmission timing of the downlink data by one subframe (step ST6203), and transmits the downlink data in the next subframe in the cycle in which the E-MBMS is transmitted (refer to (4) in FIG. 50) (step ST6113).

The mobile terminal judges whether the timing of transmission of an L1/L2 control signal to the mobile terminal during a DRX operation period coincides with the transmission timing of the E-MBMS (step ST6107).

When the timing of transmission of an L1/L2 control signal coincides with the transmission timing of the E-MBMS, the mobile terminal shifts to a process of step ST6204.

The mobile terminal skips the receiving timing of the downlink data by one subframe (step ST6204). The mobile terminal then receives the downlink data in the next subframe in the cycle in which the E-MBMS is transmitted (refer to (4) in FIG. 50) (step ST6114).

The base station judges whether the timing of transmission of an L1/L2 control signal to the mobile terminal during a DRX operation period coincides with the transmission timing of the E-MBMS (step ST6106).

When the timing of transmission of an L1/L2 control signal does not coincide with the transmission timing of the E-MBMS, the base station shifts to the process of step ST6113.

By using the radio resources which are allocated to the mobile terminal, the base station transmits the downlink data to the mobile terminal in the same subframe as that for the radio resources allocated with an L1/L2 control signal, with respect to the time axis, like in the case of general dynamic scheduling.

The mobile terminal judges whether the timing of reception of an L1/L2 control signal by the mobile terminal during a DRX operation period coincides with the transmission timing of the E-MBMS (step ST6107).

When the receiving timing of an L1/L2 control signal does not coincide with the transmission timing of the E-MBMS, the mobile terminal shifts to the process of step ST6114.

The mobile terminal, in step ST6202, receives the downlink data according to the radio resources allocated thereto by the base station in the same subframe as that for the radio resources allocated with an L1/L2 control signal, with respect to the time axis, like in the case of general dynamic scheduling.

Next, a case in which no downlink data have occurred will be explained.

When no downlink data have occurred, the base station shifts to a process of step ST6103 (step ST6105).

The mobile terminal judges whether there exist data destined for the mobile terminal itself as a result of the reception (monitoring) of an L1/L2 control signal (step ST6110). When there exist no data destined for the mobile terminal itself, the mobile terminal shifts to a process of step ST6104.

In the above-mentioned explanation, the example in which when the transmission timing of an L1/L2 control signal during a DRX operation period coincides with the transmission timing of the E-MBMS, the mobile terminal skip the receiving timing of downlink data by one subframe, and the base station and the mobile terminal transmit and receive the downlink data in the next subframe in the cycle in which the E-MBMS is transmitted is shown. In another example, the base station and the mobile terminal can transmit and receive downlink data after the expiration of either a subframe which is defined in the mobile communications system after the cycle in which the E-MBMS is transmitted, or a subframe which is notified from the base station to the mobile terminal.

In this case, by adding the following parameter to an L1/L2 control signal during a DRX operation period (e.g., only an L1/L2 control signal in the case in which the transmission timing of the L1/L2 control signal during a DRX operation period coincides with the transmission timing of the E-MBMS), the above-mentioned operation can be carried out. For example, the parameter has a value of "0: making a transition to a DRX operation", "1: monitoring an L1/L2 control signal in the next subframe" or "2: monitoring an L1/L2 control signal after n subframes", a value of "0: making a transition to a DRX operation", "1: allocation of downlink data in the next subframe", or "2: allocation of downlink data after n subframes", or the like.

By using the DRX operation method shown in the above-mentioned variant 1, in addition to the advantages provided by the use of Embodiment 13, the following advantages can be provided.

As compared with Embodiment 13, the mobile communications system can provide both a E-MBMS service and a Unicast service while preventing any discrepancies from occurring in the services, without changing the timing at which the mobile terminal comes into Active during a DRX operation period (refer to the FIG. 15) in the DRX operation during Active.

There can be provided an advantage of being able to, in a case in which the mobile terminal performs an operation other than an operation of checking to see (monitoring) whether or not downlink data destined for the mobile terminal itself are allocated thereto at the timing at which the mobile terminal comes into Active during a DRX operation period, prevent the operation timing (cycle) of that operation from being changed.

As an example of the operation other than the operation of checking to see whether or not downlink data destined for the mobile terminal itself are allocated to the mobile terminal during a DRX operation period, there can be considered the following operations: (1) transmission of Sounding RS, (2) transmission of CQI, (3) measurement of a peripheral cell, and so on.

Only the operation of checking to see whether or not downlink data destined for the mobile terminal itself are allocated to the mobile terminal during a DRX operation period can be allocated to a subframe next to the cycle in which a certain E-MBMS is transmitted by using the method shown in Embodiment 13, while the above-mentioned operation (1), (2), (3), or the like can be allocated to the same subframe in the cycle in which the E-MEMS is transmitted. However, it is effective to synchronize the timings at which the mobile terminal must perform a transmitting operation and a receiving operation, respectively, with each other as much as possible from the viewpoint of low power consumption in the mobile terminal. Therefore, this variant 1 is effective for low power consumption in the mobile terminal.

Embodiment 14

There is an idea that, in a mobile communications system, a mobile terminal monitors an L1/L2 control signal by using both C-RNTI (Cell Radio Network Temporary Identifier) and G-RNTI (group RNTI) (GERAN Radio Network Temporary Identifier) which are allocated thereto.

The C-RNTI is the identifier which is allocated to the mobile terminal by a control RNC (Controlling Radio Network Controller). The C-RNTI is unique (unique) in the cell.

There arises a problem that a mobile terminal which is performing a DRX operation in a DRX cycle cannot capture an L1/L2 control signal corresponding to its G-RNTI at a timing at which the DRX cycle does not coincide with the transmission cycle of the G-RNTI.

When a mobile terminal to which a G-RNTI is allocated performs a DRX operation (a DRX operation during Active), the following problem occurs in the mobile terminal.

The problem to be solved by Embodiment 14 will be explained with reference to FIG. 53.

In FIG. 53, each diagonally-to-the-right-and-upward-shaded box shows an L1/L2 control signal for C-RNTI, and each diagonally-to-the-right-and-downward-shaded box shows an L1/L2 control signal for G-RNTI.

When a mobile terminal in question is performing a DRX operation in a DRX cycle (X), the mobile terminal receives (monitors) an L1/L2 control signal in every DRX cycle (X) (refer to (1), (2), (4), (5), and (6) in FIG. 53). Therefore, it can be considered that the mobile terminal performs a low power consumption operation which is illustrated in the example of the receiving system power supply of the mobile terminal as shown in FIG. 53.

Hereafter, a case in which not only a C-RNTI but also a G-RNTI is allocated from the base station to the mobile terminal, and there occurs the necessity of monitoring an L1/L2 control signal using the G-RNTI will be considered. The notification cycle or the change cycle of an L1/L2 control signal corresponding to the G-RNTI is expressed as "Y".

The mobile terminal which is performing a DRX operation in the DRX cycle (X) is able to receive an L1/L2 control signal corresponding to the G-RNTI at a timing at which the cycle X coincides with the cycle Y (in FIG. 53, each of (1) and (5)).

In contrast, a mobile terminal which tries to achieve low power consumption in the DRX cycle (X) is unable to receive the L1/L2 control signal corresponding to the G-RNTI at a timing at which the cycle X coincides with the cycle Y (in FIG. 53, (3)).

As mentioned above, the mobile terminal to which the G-RNTI is allocated has a problem which arises when achieving low power consumption therein.

Hereafter, a DRX operation method of a mobile communications system in accordance with Embodiment 14 will be explained.

FIG. 54 is an explanatory drawing showing an example of the DRX operation method of the mobile communications system in accordance with Embodiment 14 of the present invention.

When a mobile terminal in question is performing a DRX operation in a DRX cycle (X), the mobile terminal receives (monitors) an L1/L2 control signal in every DRX cycle (X) (refer to (1), (3), (5), (7), and (9) in FIG. 54).

Hereafter, a case in which not only a C-RNTI but also a G-RNTI is allocated from the base station to the mobile terminal, and there occurs the necessity of monitoring an L1/L2 control signal using the G-RNTI will be considered. The notification cycle or the change cycle of an L1/L2 control signal corresponding to the G-RNTI is expressed as "Y".

The base station calculates a DRX cycle again for the mobile terminal to which the G-RNTI is allocated. In the case of the re-calculation, the base station calculates the DRX cycle in such a way that the mobile terminal can receive an L1/L2 control signal corresponding to the G-RNTI at a timing at which the cycle X does not coincide with the cycle Y (refer to (3) in FIG. 53).

As an example, it can be considered that the greatest common measure of the cycle X and the cycle Y can be newly set up as the DRX cycle. For example, a cycle "Z" in FIG. 53 is the greatest common measure.

When the DRX cycle (Z) is notified again from the base station to the mobile terminal, the mobile terminal receives an L1/L2 control signal at each of (1), (2), (3), (4), (5), (6), (7), (8), and (9) in FIG. 54, and also receives an L1/L2 control signal even at a timing at which the cycle X does not coincide with the cycle Y (refer to (3) in FIG. 53).

FIG. 55 is a sequence diagram showing an example of the description of processing carried out by the mobile terminal and the base station in accordance with Embodiment 14 of the present invention.

The base station notifies the DRX cycle to the mobile terminal, and sets up the DRX cycle as the DRX cycle of the mobile terminal (step ST6501).

The mobile terminal receives the DRX cycle from the base station, and sets up the DRX cycle as the DRX cycle thereof (step ST6502).

As examples of a method of notifying an initial DRX cycle from the base station to the mobile terminal, there can be considered the following methods:

(1) a method of, when a radio bearer is set up, notifying the initial DRX cycle by using L3 signaling from the base station to the mobile terminal; and (2) a method of notifying the initial DRX cycle from the base station to the mobile terminal at a dynamic timing by using either an L1/L2 control signal or an inband signaling (a MAC signaling).

Each of the base station and the mobile terminal makes a transition to a DRX operation in the DRX cycle (steps ST6503 and ST6504).

The base station notifies the G-RNTI to the mobile terminal (step ST6505).

The mobile terminal receives the G-RNTI from the base station (step ST6506).

The base station re-calculates the DRX cycle which the base station sets to the mobile terminal from both the DRX cycle which the base station, in step ST6501, notified to the mobile terminal, and the notification cycle (or the change cycle) of an L1/L2 control signal corresponding to the G-RNTI (step ST6507).

The base station re-notifies the DRX cycle to the mobile terminal, and sets up the DRX cycle as the DRX cycle of the mobile terminal (step ST6508).

The mobile terminal receives the DRX cycle again from the base station, and sets up the DRX cycle as the DRX cycle (step ST6509).

The base station makes a transition to a DRX operation in the DRX cycle (step ST6510).

The mobile terminal makes a transition to a DRX operation in the DRX cycle (step ST6511). In this case, the mobile terminal can perform a DRX operation in the DRX cycle notified thereto from the base station regardless of whether the G-RNTI has been notified thereto.

The problem shown in this Embodiment 14 arises not only in a case in which a G-RNTI is allocated to the mobile terminal, but also in a case in which the mobile terminal has to receive plural pieces of information included in an L1/L2 control signal in a different cycle. Also in this case, the problem can be solved by using this Embodiment 14.

This Embodiment 14 can offer the following advantages.

There can be provided an advantage of being able to, without providing any new information which is to be transmitted and received between a base station and a mobile terminal, make the base station and the mobile terminal implement DRX operations during Active even in a case in which a G-RNTI is allocated to the mobile terminal while preventing any discrepancies from occurring in the mobile communications system.

In order to solve the problem shown in this Embodiment 14, the not providing of any new information which is to be transmitted and received between a base station and a mobile terminal is a solving means effective for achieving effective use of the radio resources.

Furthermore, the mobile terminal can perform a DRX operation in the DRX cycle notified thereto from the base station regardless of whether the G-RNTI has been notified thereto, and therefore there can be provided another advantage of being able to simplify the description of the processing carried out by the mobile terminal.

INDUSTRIAL APPLICABILITY

As mentioned above, the mobile communications system in accordance with the present invention is suitable for, for example, a case in which it is necessary to reduce the power consumption of a mobile terminal 3, and to lengthen the standby time, the duration of call, and so on of the mobile terminal 3.

The invention claimed is:

1. A mobile communication system comprising:
a mobile terminal; and
a base station,
wherein when the mobile terminal and the base station carry out radio communication with each other, the mobile terminal measures quality of a downlink communication path and periodically transmits a result of the measurement of the quality to the base station with a predetermined transmission cycle, and the base station carries out downlink scheduling according to the result of the measurement of the quality, and
wherein when a periodic timing at which to transmit the result of the measurement of the quality to the base station coincides with a timing at which to transmit a positive response signal or a negative response signal to the base station, the mobile terminal transmits the positive response signal or the negative response signal at a start of the transmission cycle and does not transmit, at said start, the result of the measurement of the quality.

2. A mobile terminal comprising:
a quality measurement unit that measures quality of a downlink communication path; and
a transmitting unit that periodically transmits a result of the measurement made by the quality measurement unit to a base station with a predetermined transmission cycle,
wherein when a periodic timing at which to transmit the result of the measurement made by the quality measurement unit to the base station coincides with a timing at which to transmit a positive response signal or a negative response signal to the base station, the transmitting unit transmits the positive response signal or the negative response signal at a start of the transmission cycle and does not transmit, at said start, the result of the measurement made by the quality measurement.

3. The mobile communication system according to claim 1, wherein the mobile terminal transmits either the positive response signal or the negative response signal without transmitting the result of the measurement of the quality by delaying the transmission of the result of the measurement of the quality by one transmission time interval (TTI), and the predetermined transmission cycle is reset to be the same as the delayed transmission of the result of the measurement of the quality.

4. The mobile communication system according to claim 3, wherein the predetermined transmission cycle is the discontinuous transmission (DTX) cycle of the mobile terminal.

5. The mobile communication system according to claim 3, wherein the predetermined transmission cycle is greater than the length of one transmission time interval (TTI).

6. The mobile terminal according to claim 2, wherein the mobile terminal transmits either the positive response signal or the negative response signal without transmitting the result of the measurement of the quality by delaying the transmission of the result of the measurement of the quality by one transmission time interval (TTI), and the predetermined transmission cycle is reset to be the same as the delayed transmission of the result of the measurement of the quality.

7. The mobile terminal according to claim 6, wherein the predetermined transmission cycle is the discontinuous transmission (DTX) cycle of the mobile terminal.

8. The mobile terminal according to claim 6, wherein the predetermined transmission cycle is greater than the length of one transmission time interval (TTI).

9. A method, implemented by a mobile terminal, comprising:
measuring, by a quality measurement unit, quality of a downlink communication path; and
periodically transmitting a result of the measurement made by the quality measurement unit to a base station with a predetermined transmission cycle,
wherein when a periodic timing at which to transmit the result of the measurement made by the quality measurement unit to the base station coincides with a timing at which to transmit a positive response signal or a negative response signal to the base station, the transmitting includes transmitting either the positive response signal or the negative response signal at a start of the transmission cycle and does not include transmitting, at said start, the result of the measurement made by the quality measurement.

* * * * *